(12) United States Patent
Bi et al.

(10) Patent No.: US 8,456,453 B2
(45) Date of Patent: *Jun. 4, 2013

(54) WIRELESS FILE TRANSMISSION

(75) Inventors: Depeng Bi, Mt. Prospect, IL (US);
Daniel A. Boals, Costa Mesa, CA (US);
S. Christopher Gladwin, Chicago, IL (US); James Y. Wilson, Crystal Lake, IL (US); Jose T. George, Bloomingdale, IL (US); Scott Merkle, Barrington, IL (US)

(73) Assignee: Warren & Lewis Investment Corporation, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/970,473

(22) Filed: Dec. 16, 2010

(65) Prior Publication Data
US 2012/0206418 A1    Aug. 16, 2012

Related U.S. Application Data

(63) Continuation of application No. 11/975,312, filed on Oct. 18, 2007, now Pat. No. 7,889,181, which is a continuation of application No. 10/199,475, filed on Jul. 19, 2002, now Pat. No. 7,423,637, which is a continuation of application No. 08/784,688, filed on Jan. 15, 1997, now Pat. No. 6,724,372, which is a continuation-in-part of application No. 08/543,786, filed on Oct. 16, 1995, now abandoned.

(51) Int. Cl.
*G06F 3/033* (2006.01)

(52) U.S. Cl.
USPC .......................................................... 345/179

(58) Field of Classification Search
USPC ..................... 345/156–179; 370/913; 725/89, 725/110; 709/227, 250; 178/18.01–18.09, 178/19.01–19.05

See application file for complete search history.

(56) References Cited

U.S. PATENT DOCUMENTS

| | | | |
|---|---|---|---|
| 5,148,155 A | 9/1992 | Martin et al. | |
| 5,384,743 A | 1/1995 | Rouy | |
| 5,408,250 A | 4/1995 | Bier | |
| 5,426,699 A | 6/1995 | Wunderlich et al. | |
| 5,534,893 A | 7/1996 | Hansen et al. | |
| 5,561,446 A * | 10/1996 | Montlick | 345/173 |
| 5,583,993 A | 12/1996 | Foster et al. | |
| 5,608,449 A | 3/1997 | Swafford et al. | |
| 5,682,511 A | 10/1997 | Sposato et al. | |
| 5,701,582 A | 12/1997 | DeBey | |
| 5,708,961 A | 1/1998 | Hylton et al. | |
| 5,729,549 A | 3/1998 | Kostreski et al. | |
| 5,729,767 A | 3/1998 | Jones et al. | |
| 5,767,894 A | 6/1998 | Fuller et al. | |
| 5,815,146 A | 9/1998 | Youden et al. | |
| 5,835,732 A * | 11/1998 | Kikinis et al. | 710/303 |
| 5,903,667 A | 5/1999 | Kuzenuki et al. | |
| 5,914,481 A | 6/1999 | Danielson et al. | |
| 6,006,304 A | 12/1999 | Mukai et al. | |
| 6,266,685 B1 | 7/2001 | Danielson et al. | |
| 7,423,637 B2 * | 9/2008 | Boals et al. | 345/179 |

* cited by examiner

*Primary Examiner* — Abbas Abdulselam
(74) *Attorney, Agent, or Firm* — McKenna Long & Aldridge, LLP

(57) ABSTRACT

A computer system which includes one or more wireless interface devices that are adapted to communicate with a remote host over a radio link. Each of the wireless interface devices is a pen-based device which includes an ink field in which pen events are translated into pen data packets and transmitted to the remote host over the radio link. Local inking is provided at the wireless interface device in order to maintain the pen paradigm in essentially real time.

37 Claims, 127 Drawing Sheets

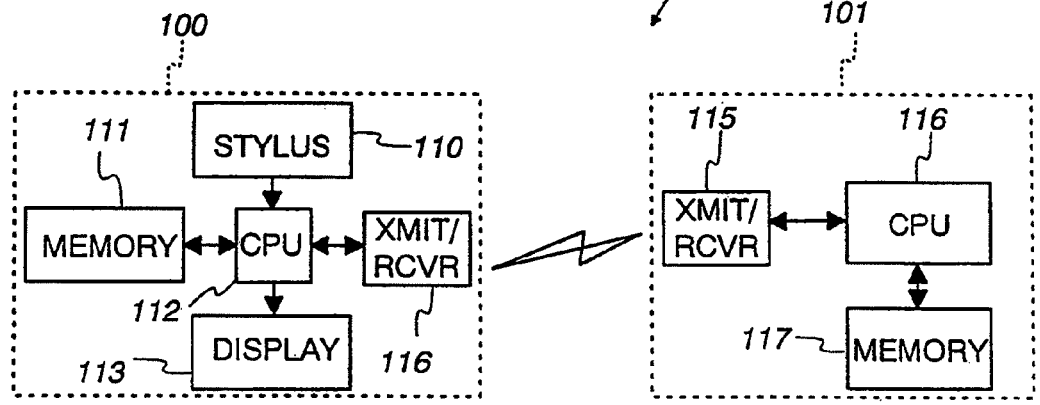
Fig. 1
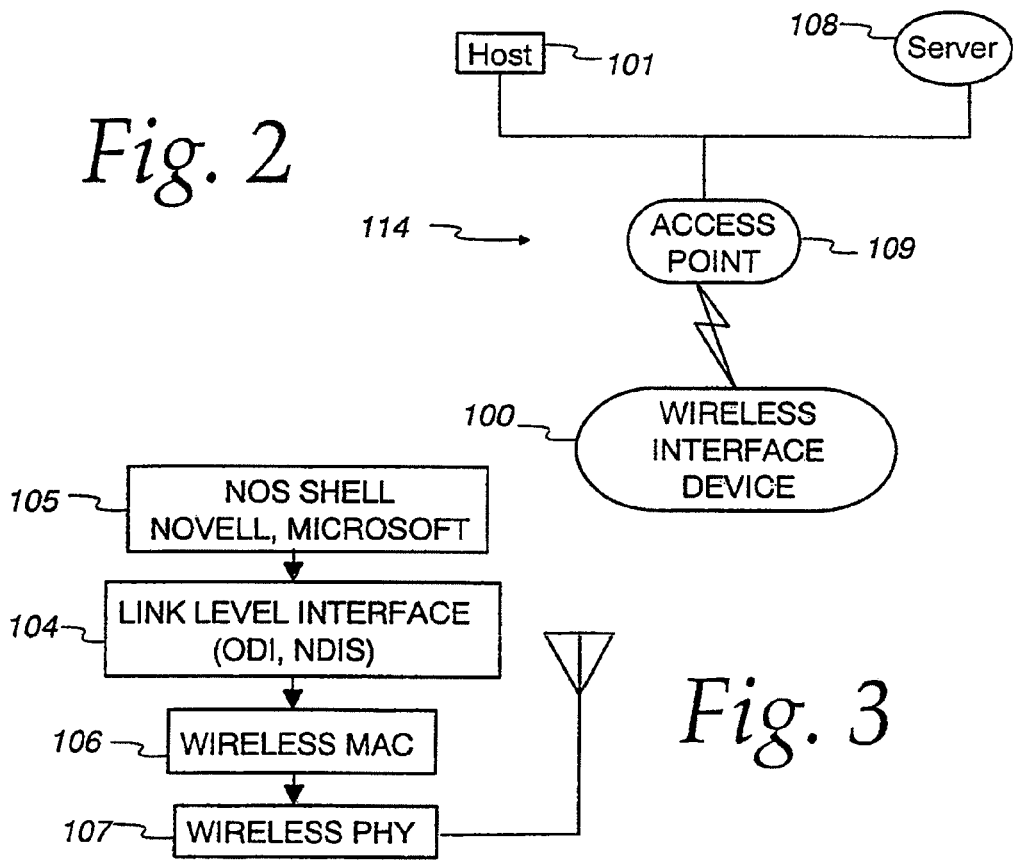
Fig. 2
Fig. 3

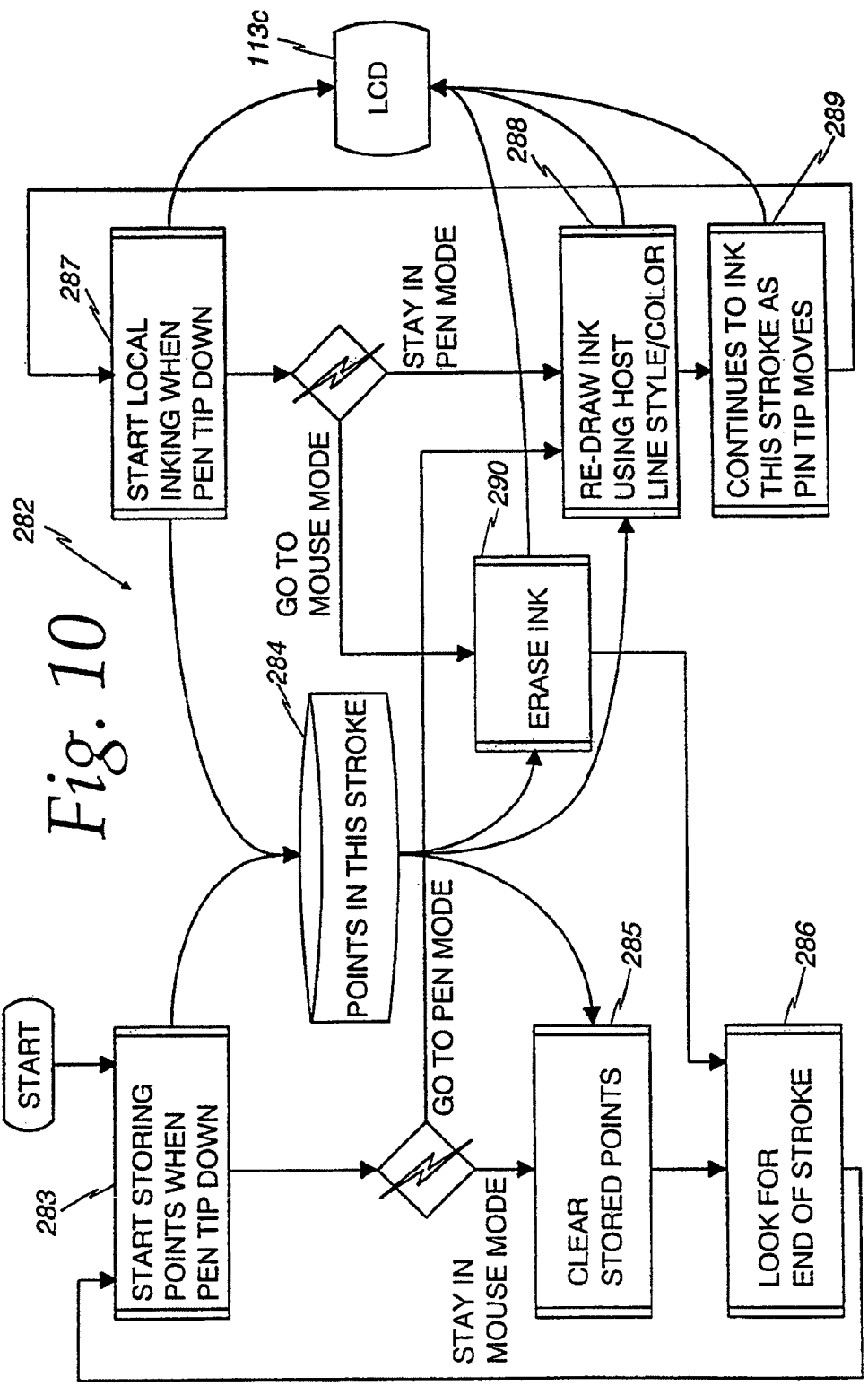

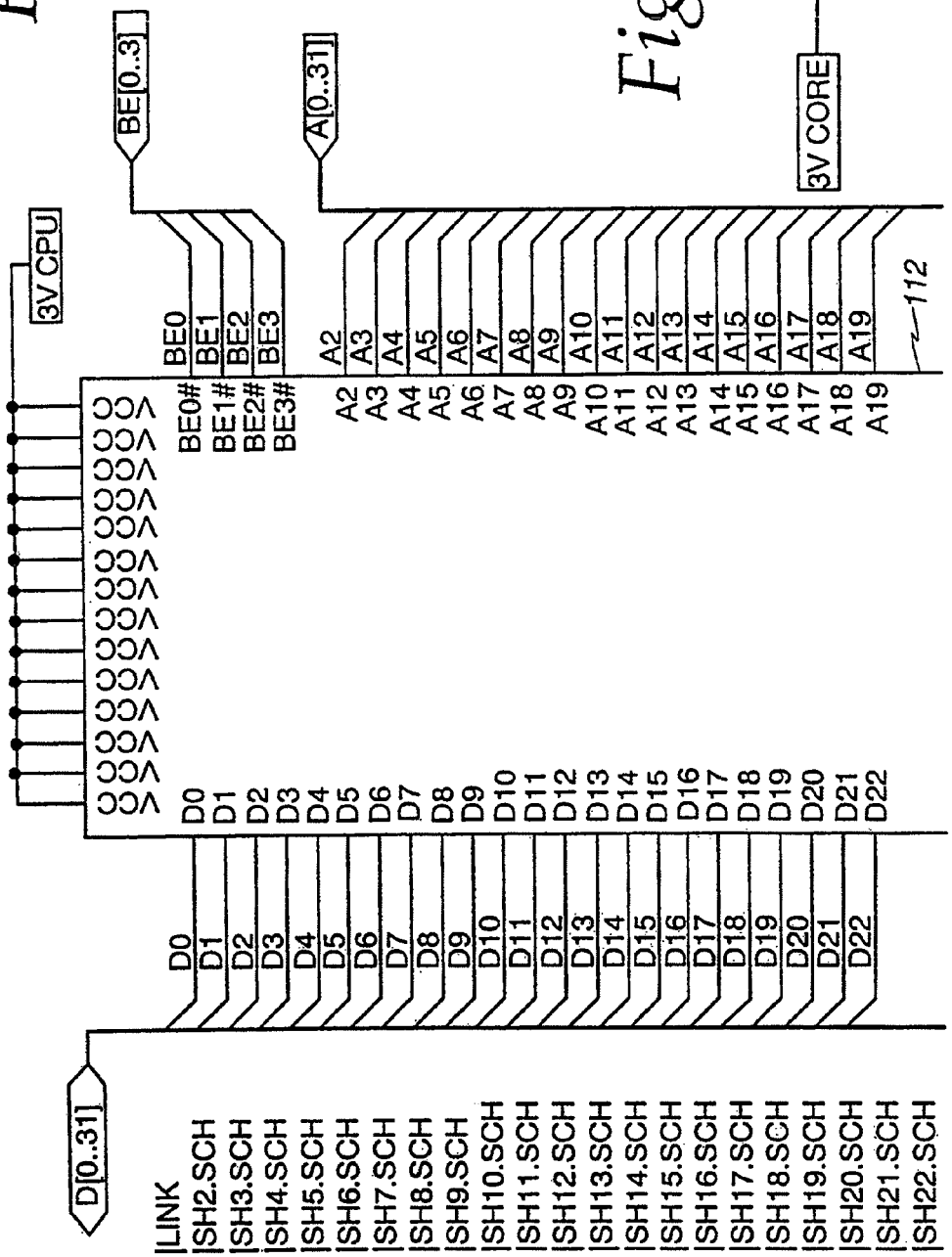

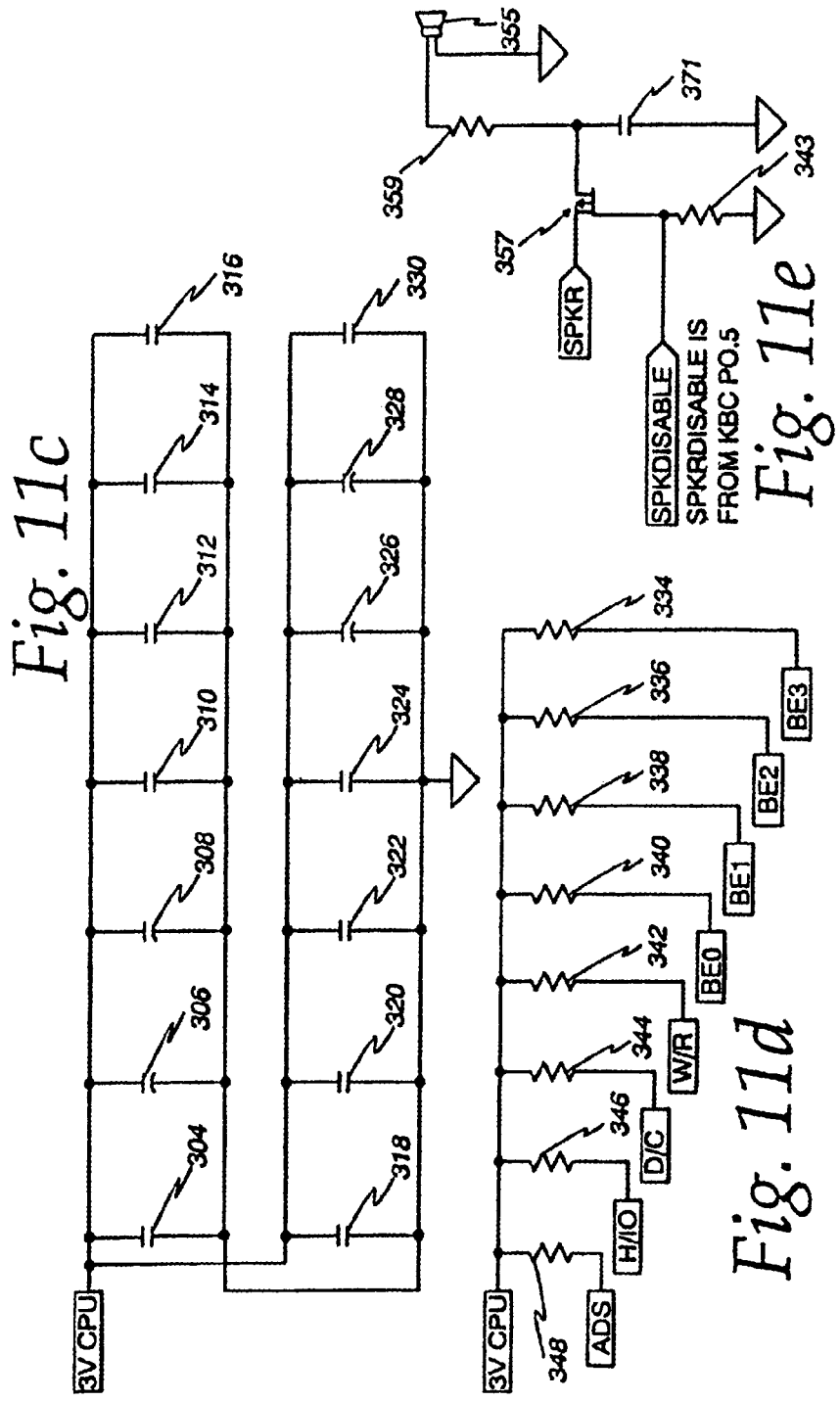

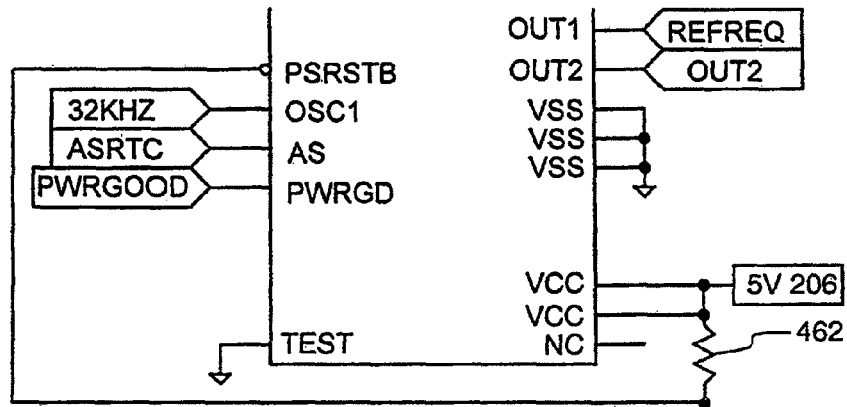
Fig. 13a
Fig. 13b
Fig. 13b
Fig. 13c
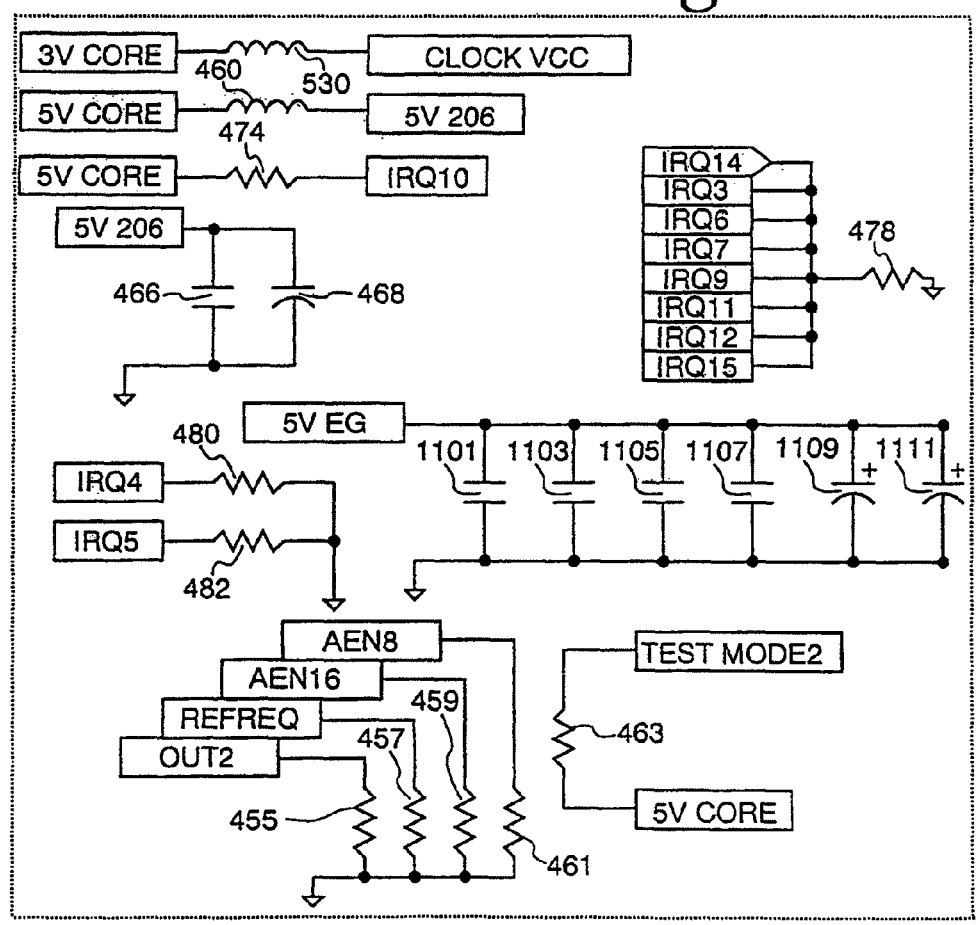

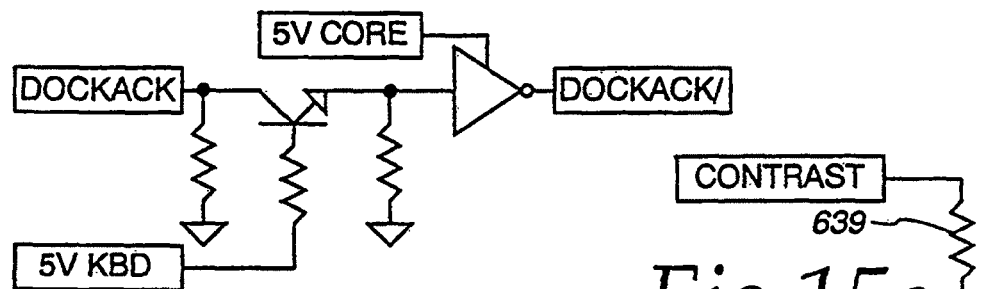
Fig. 15d
Fig 15e
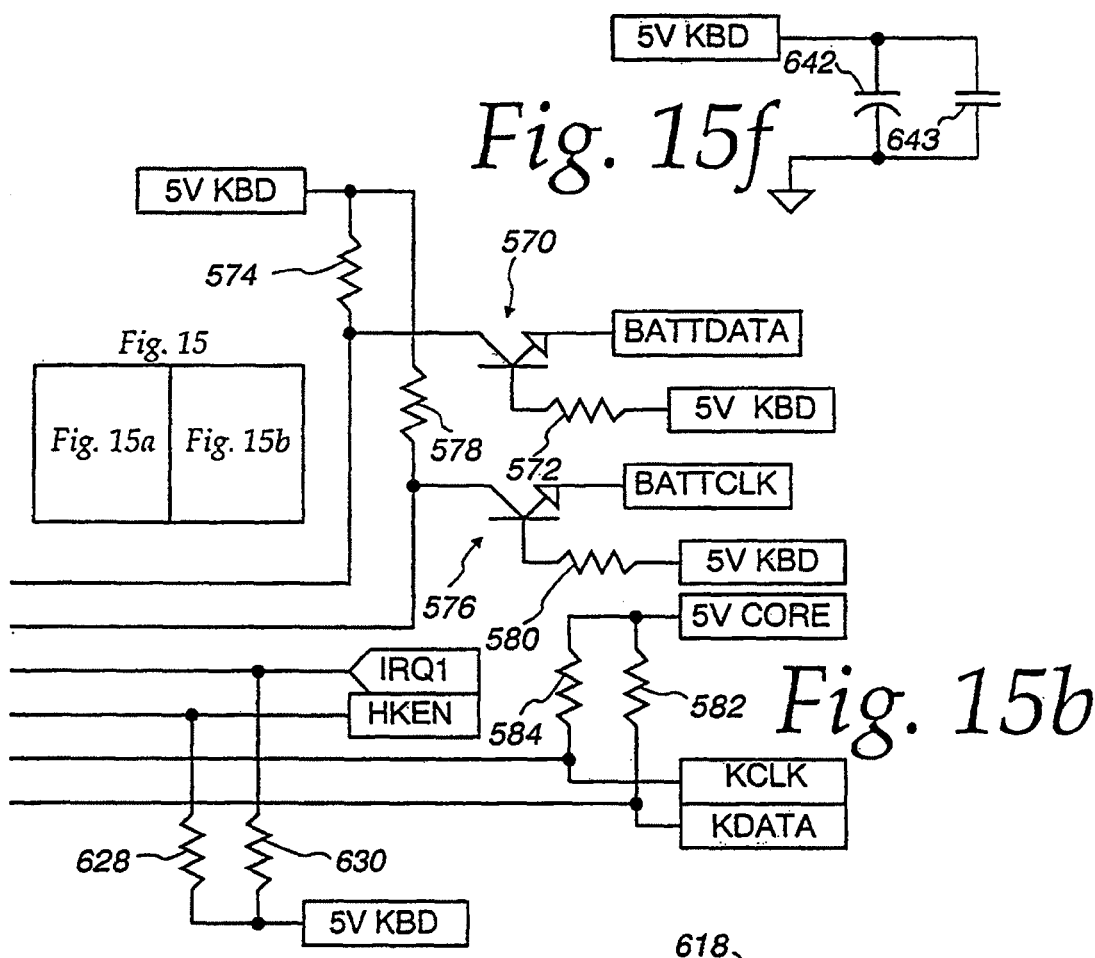
Fig. 15f
Fig. 15
| Fig. 15a | Fig. 15b |
Fig. 15b
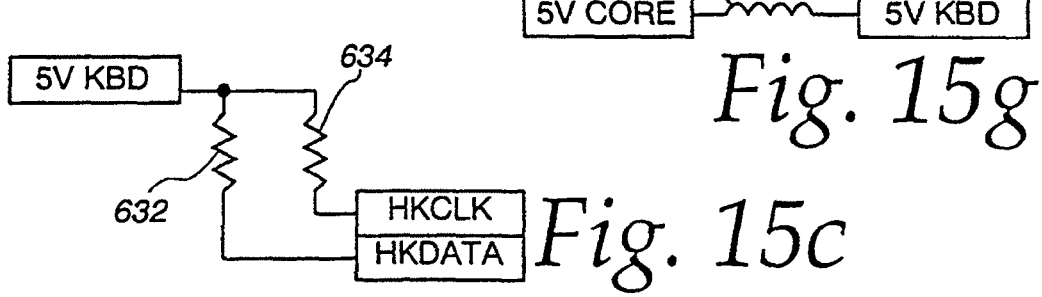
Fig. 15g
Fig. 15c

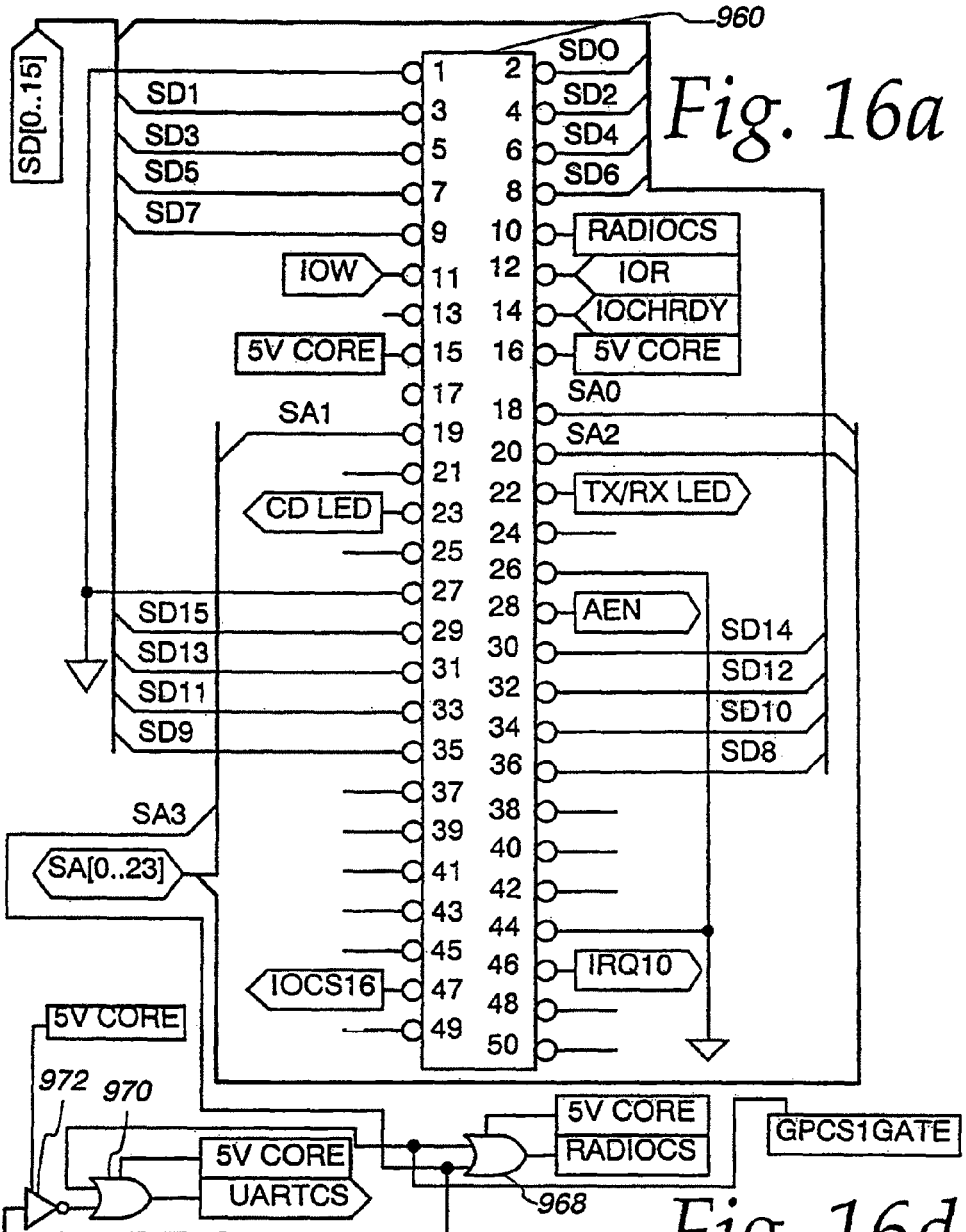
*Fig. 16a*
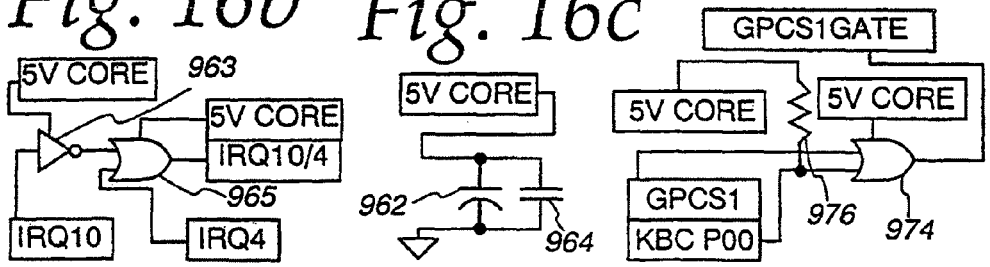
*Fig. 16b*  *Fig. 16c*  *Fig. 16d*

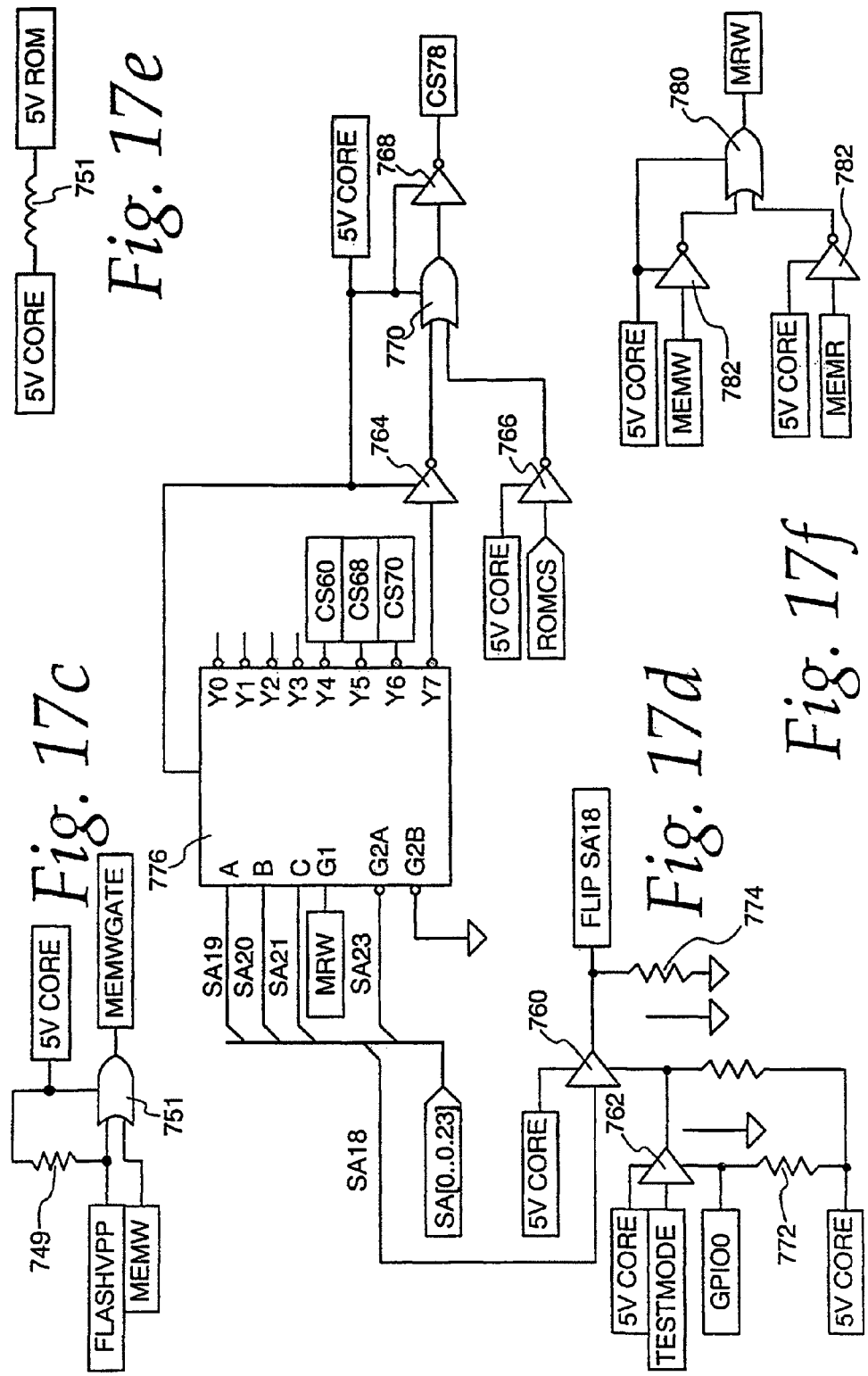

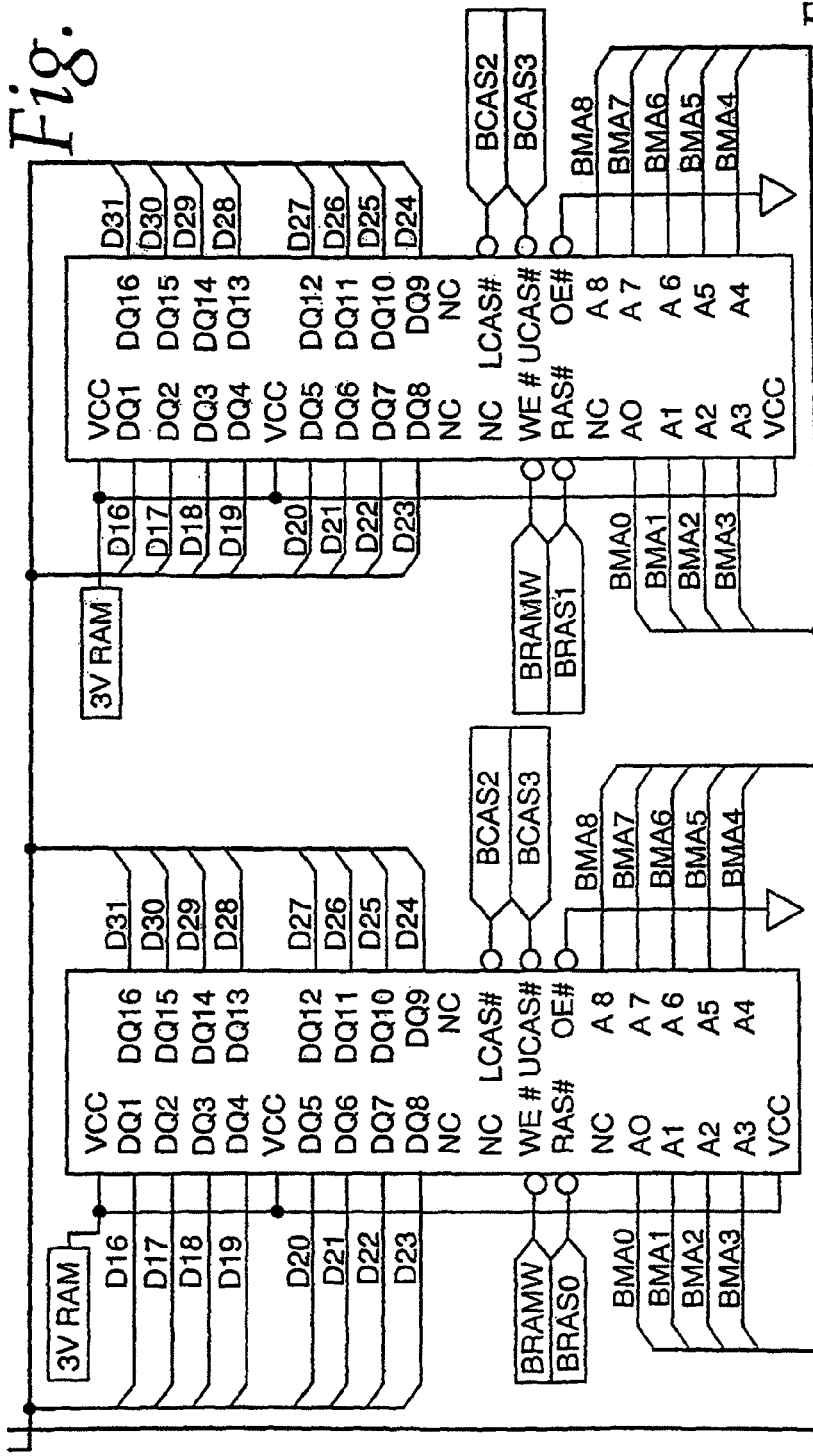

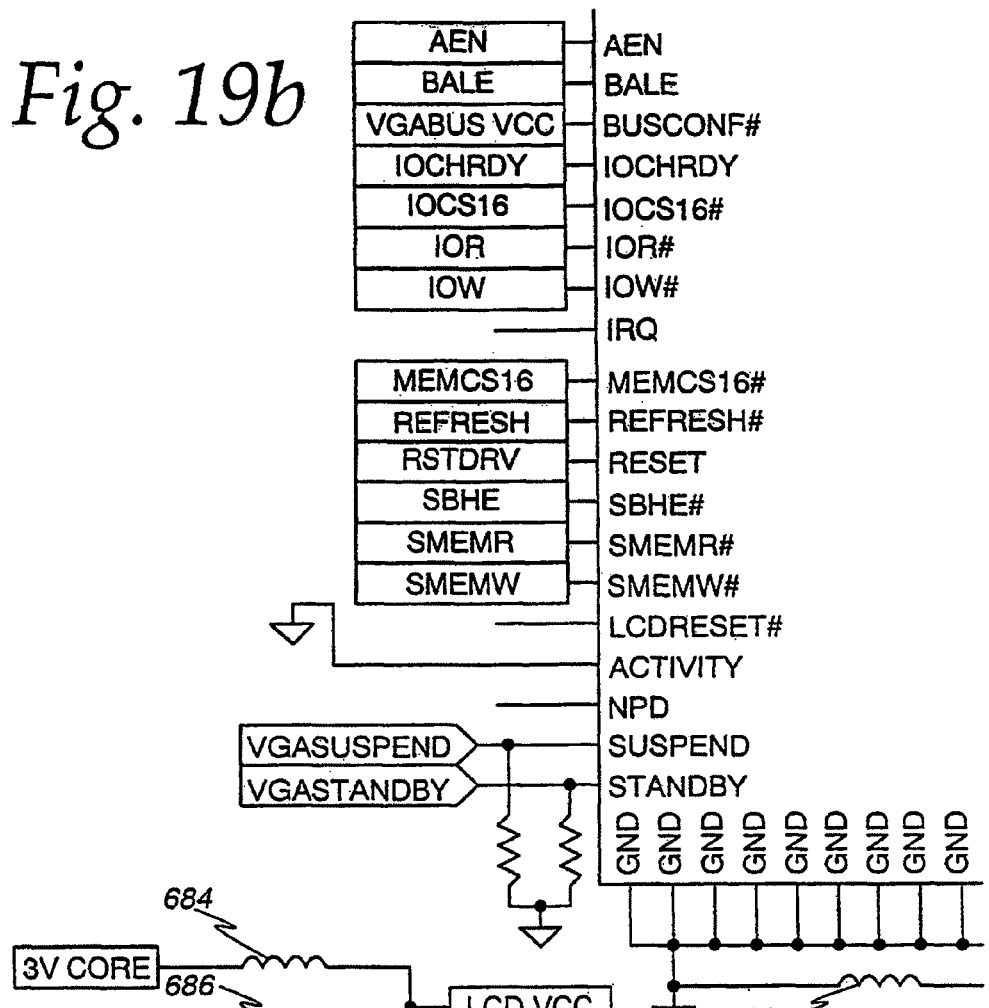
Fig. 19b
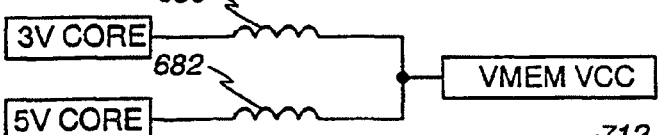
Fig. 19g
Fig. 19h
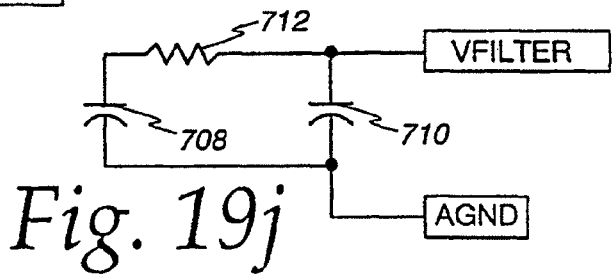
Fig. 19i
Fig. 19j

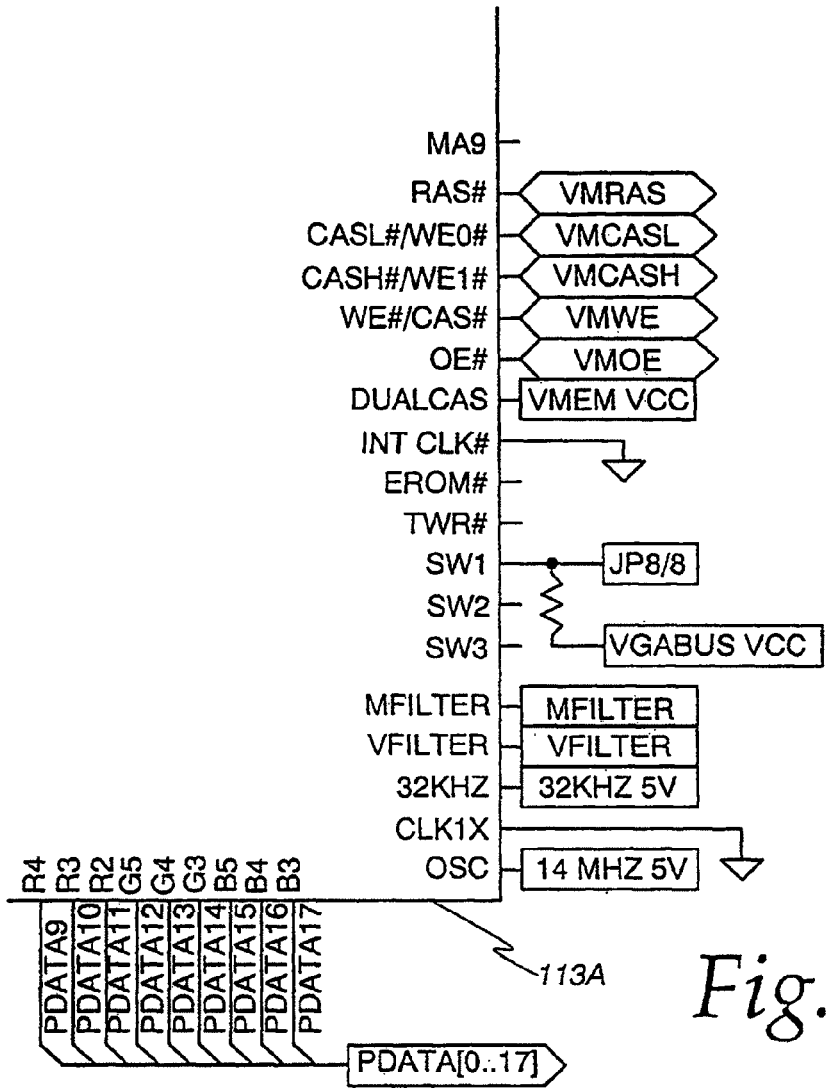
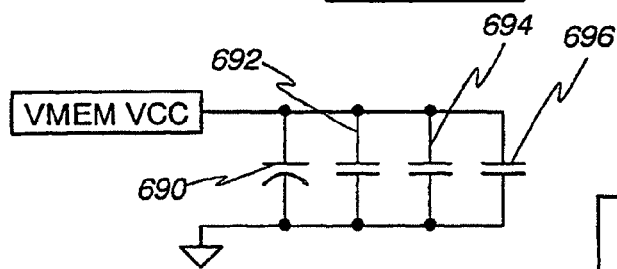
Fig. 19f
Fig. 19m
| | Fig. 19 | |
|---|---|---|
| Fig. 19a | Fig. 19c | Fig. 19e |
| Fig. 19b | Fig. 19d | Fig. 19f |

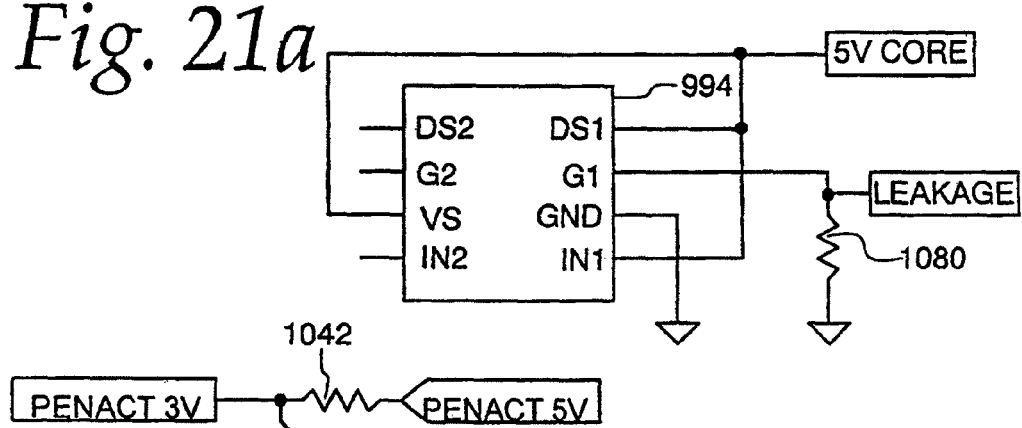
Fig. 21a
Fig. 21b
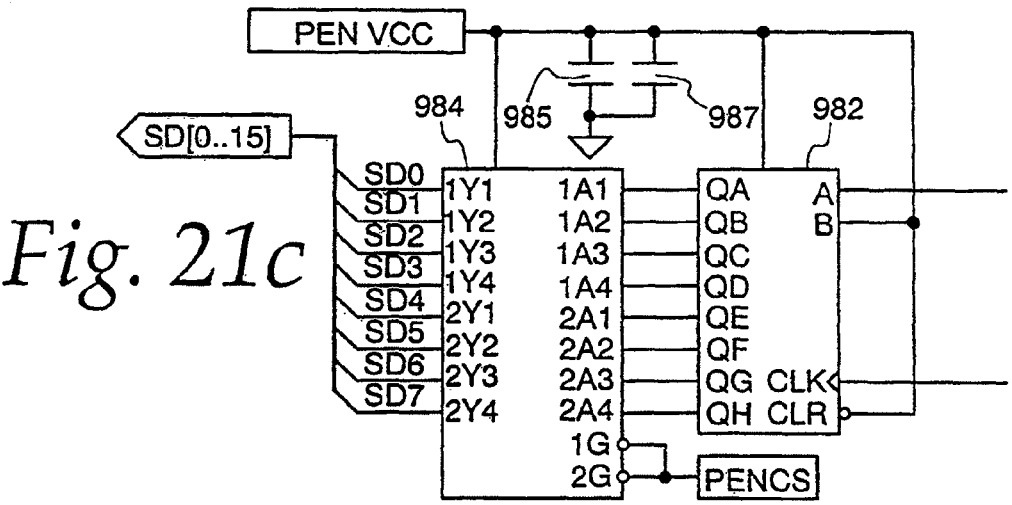
Fig. 21c
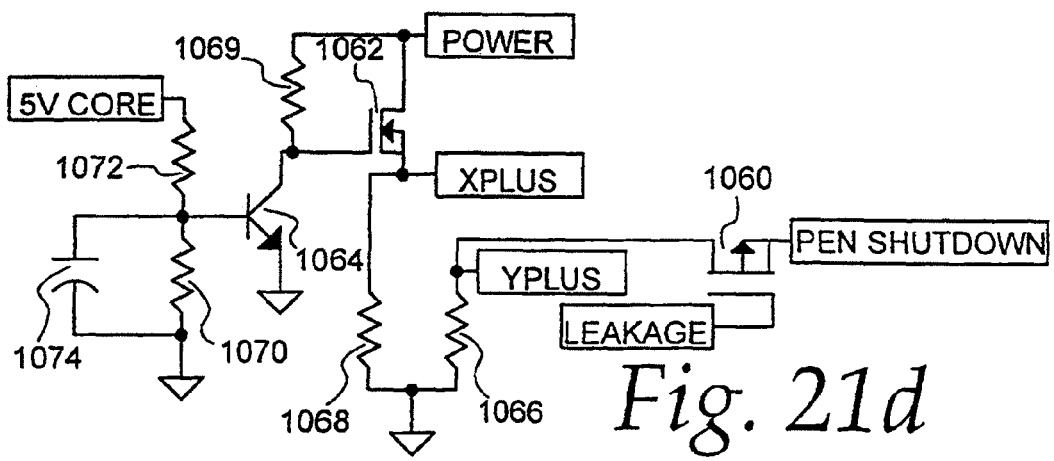
Fig. 21d

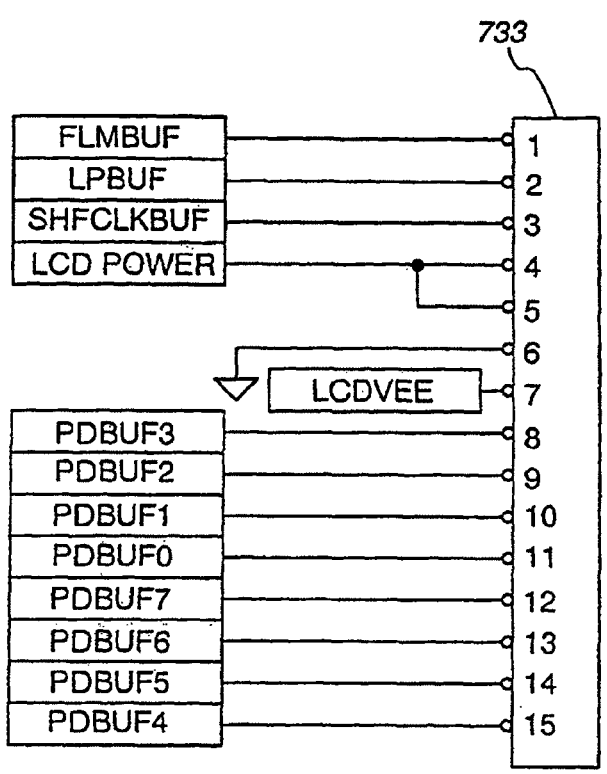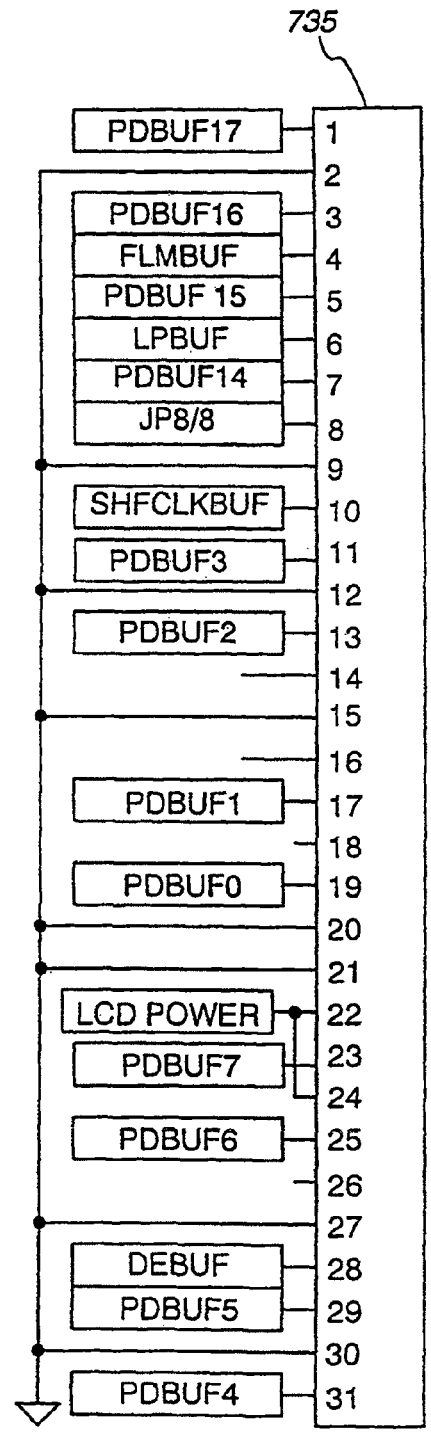

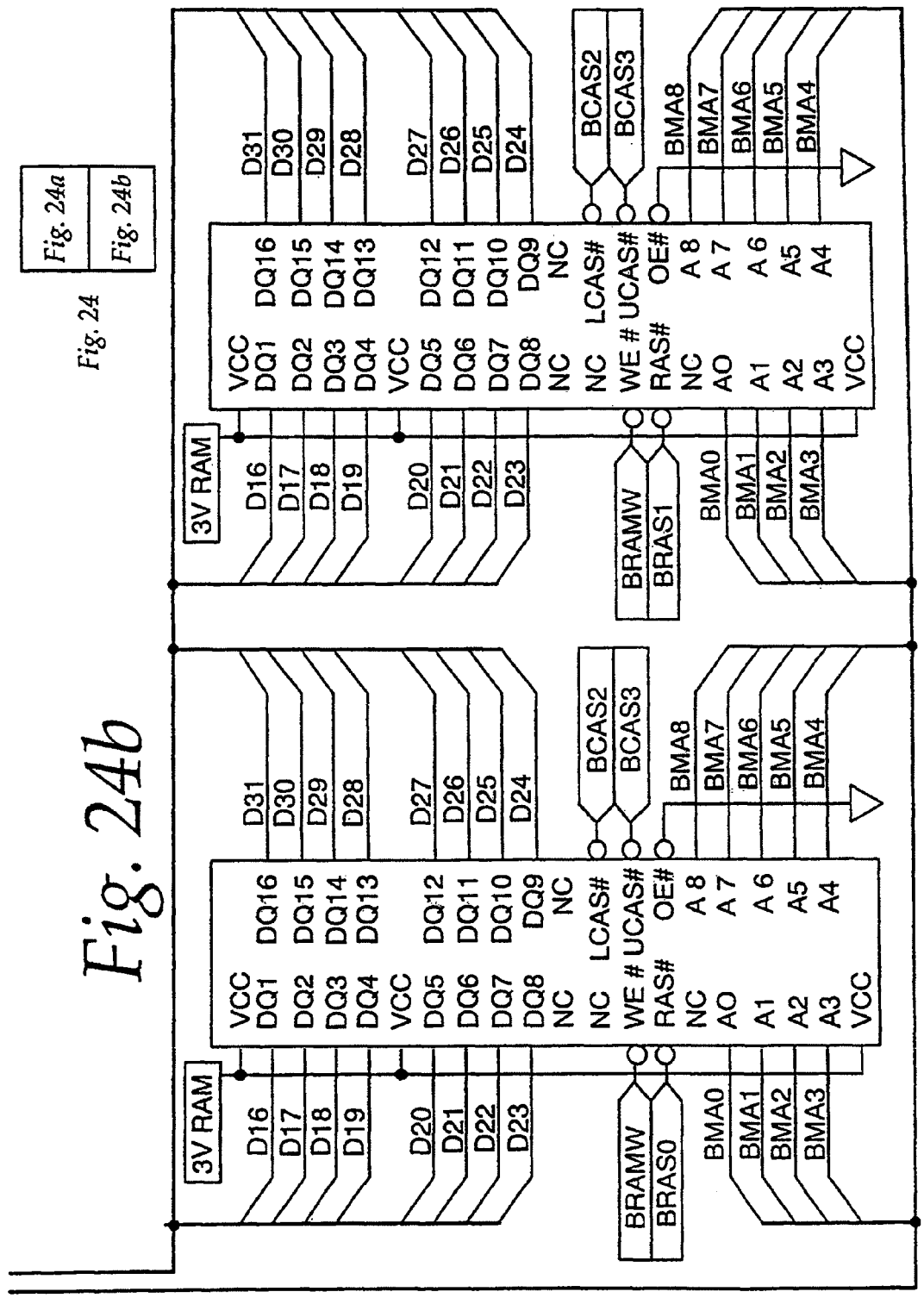

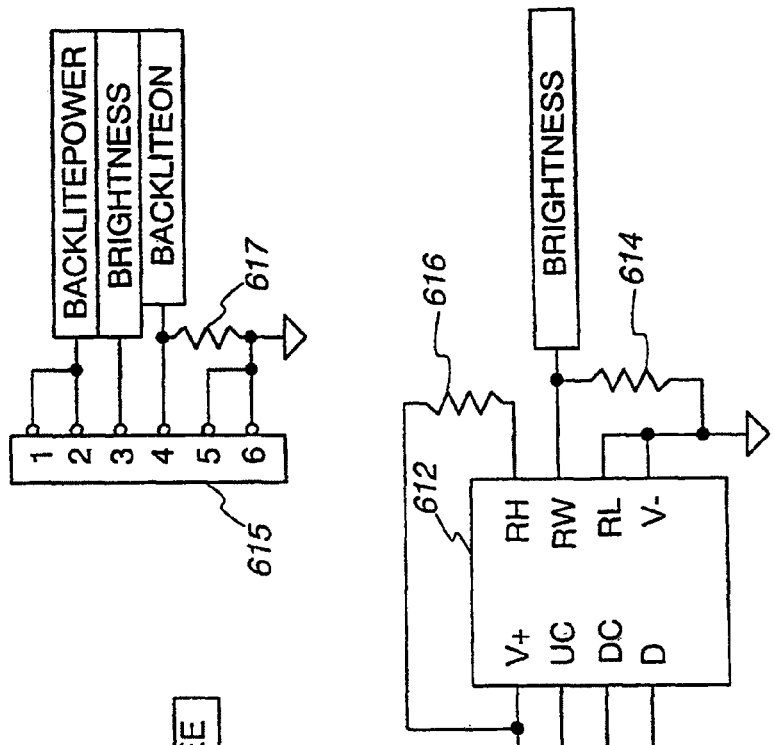
Fig. 27b
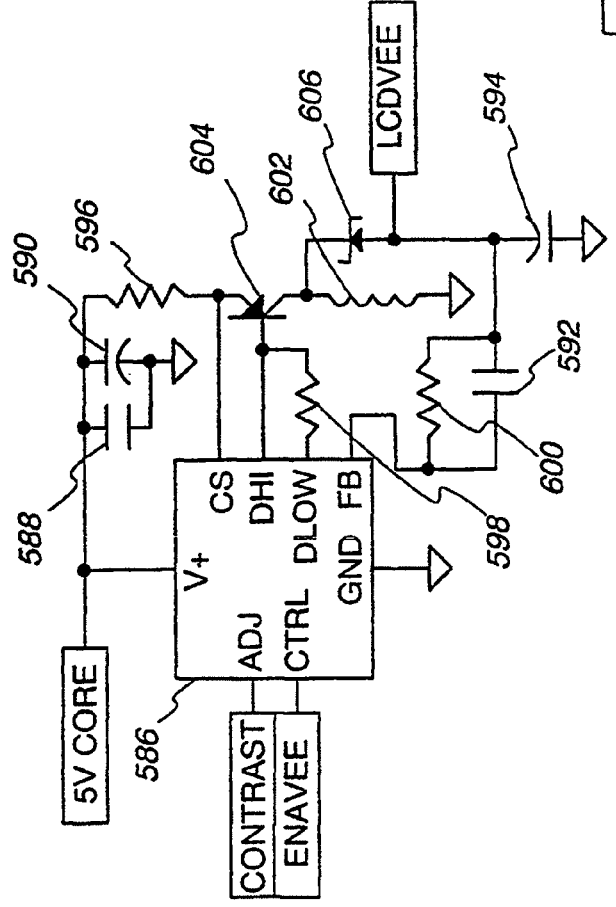
Fig. 27a
Fig. 27c

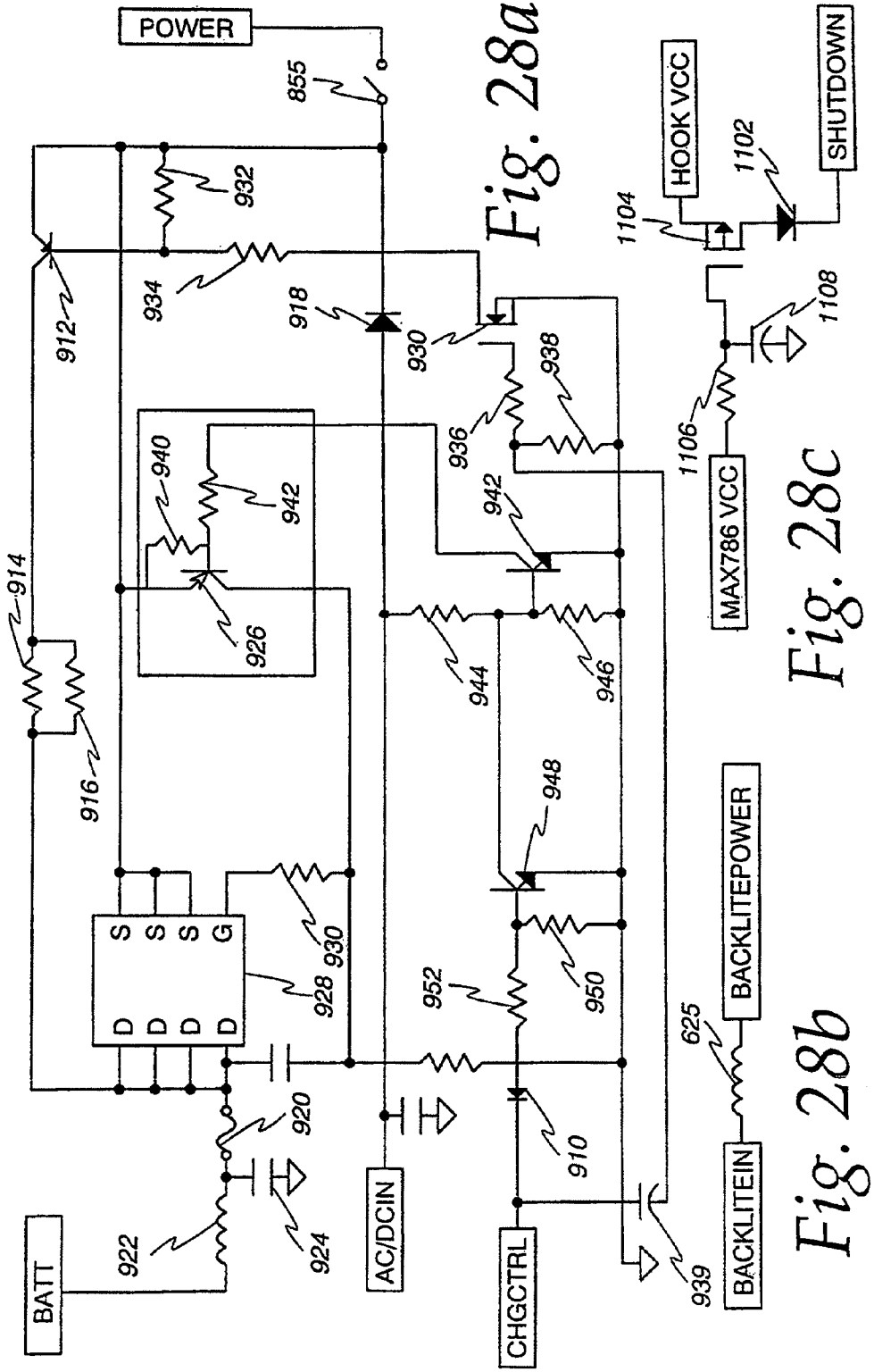

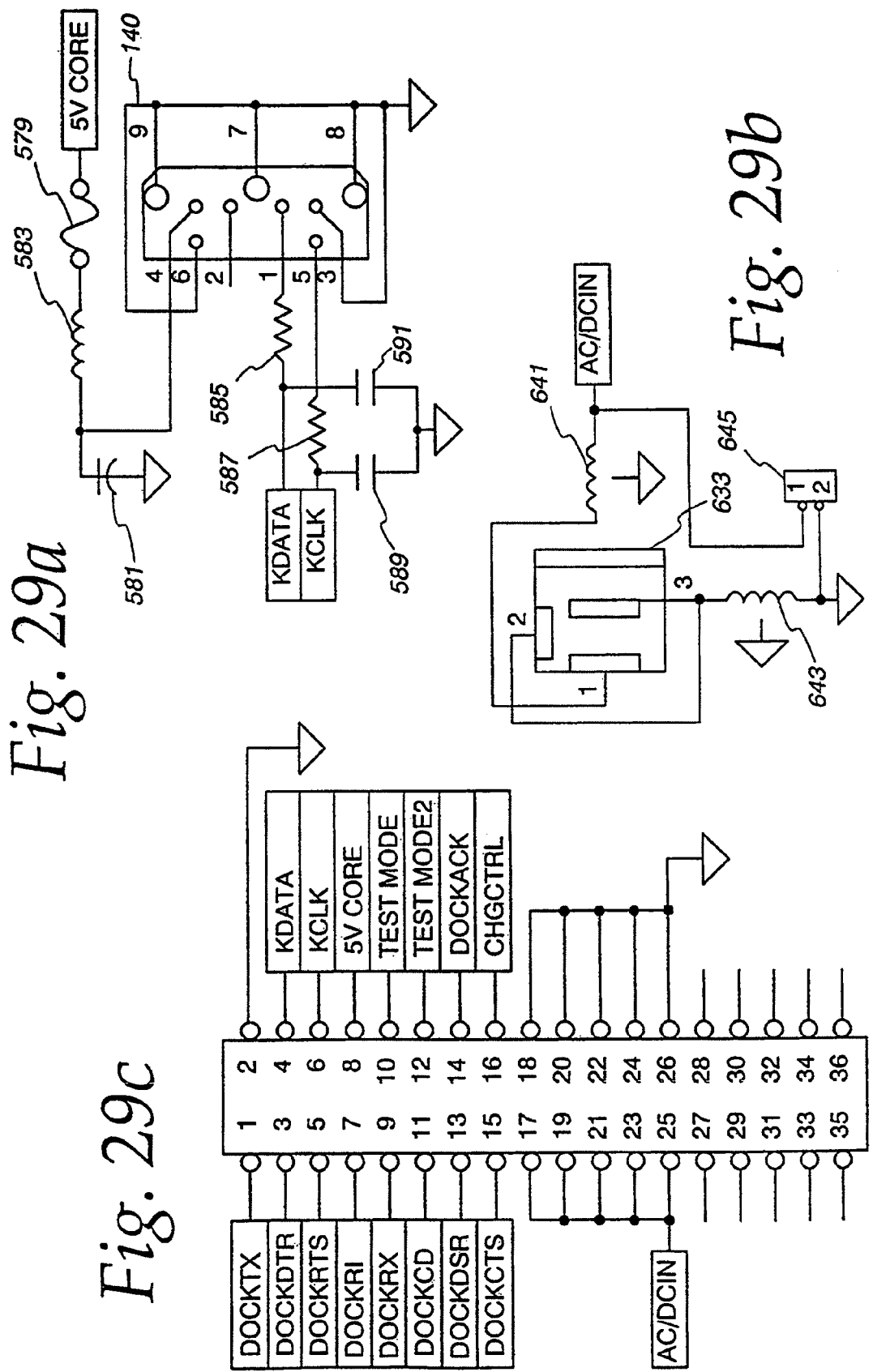

*Fig. 44*
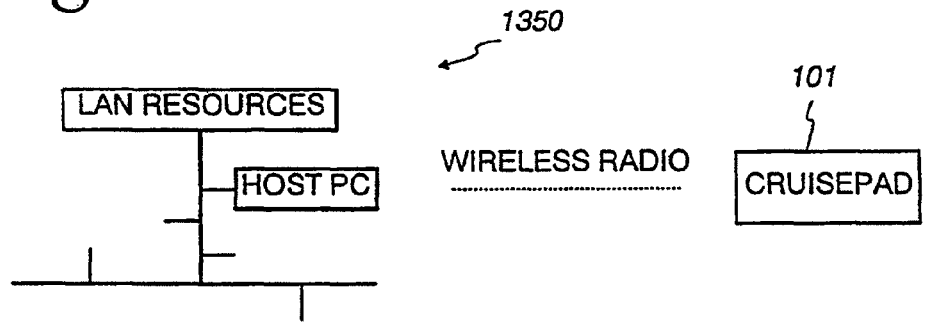
*Fig. 45*            *Prior Art*
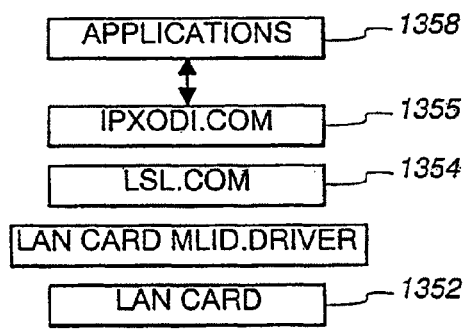
*Fig. 46*
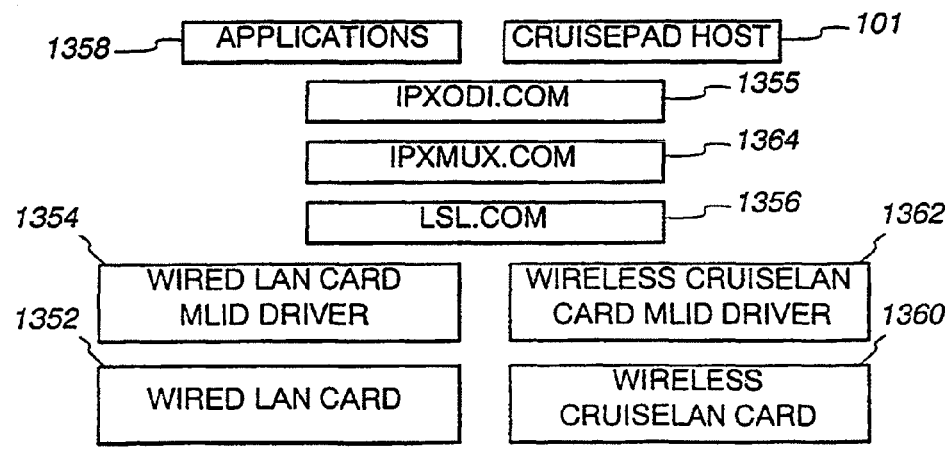

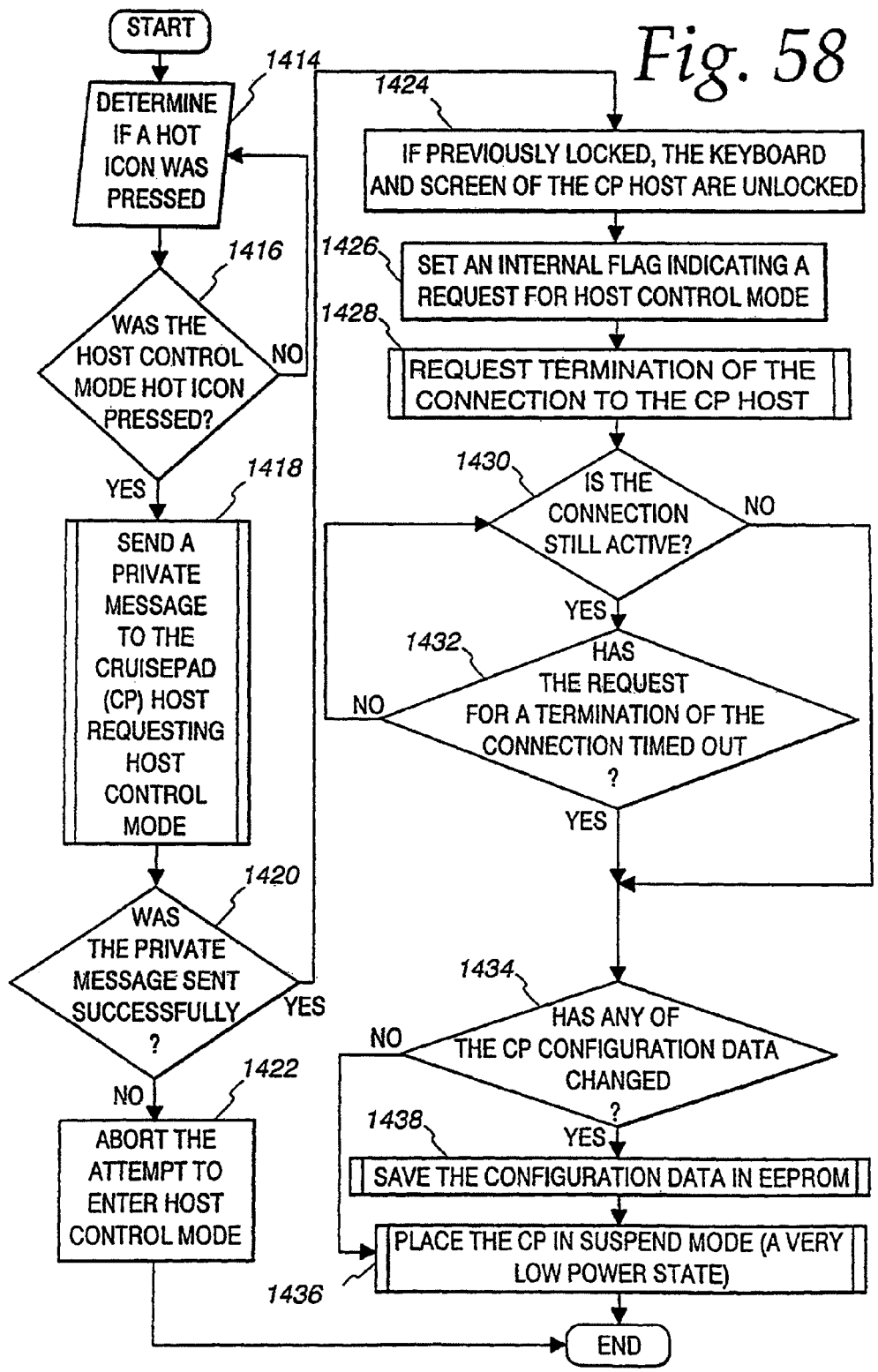

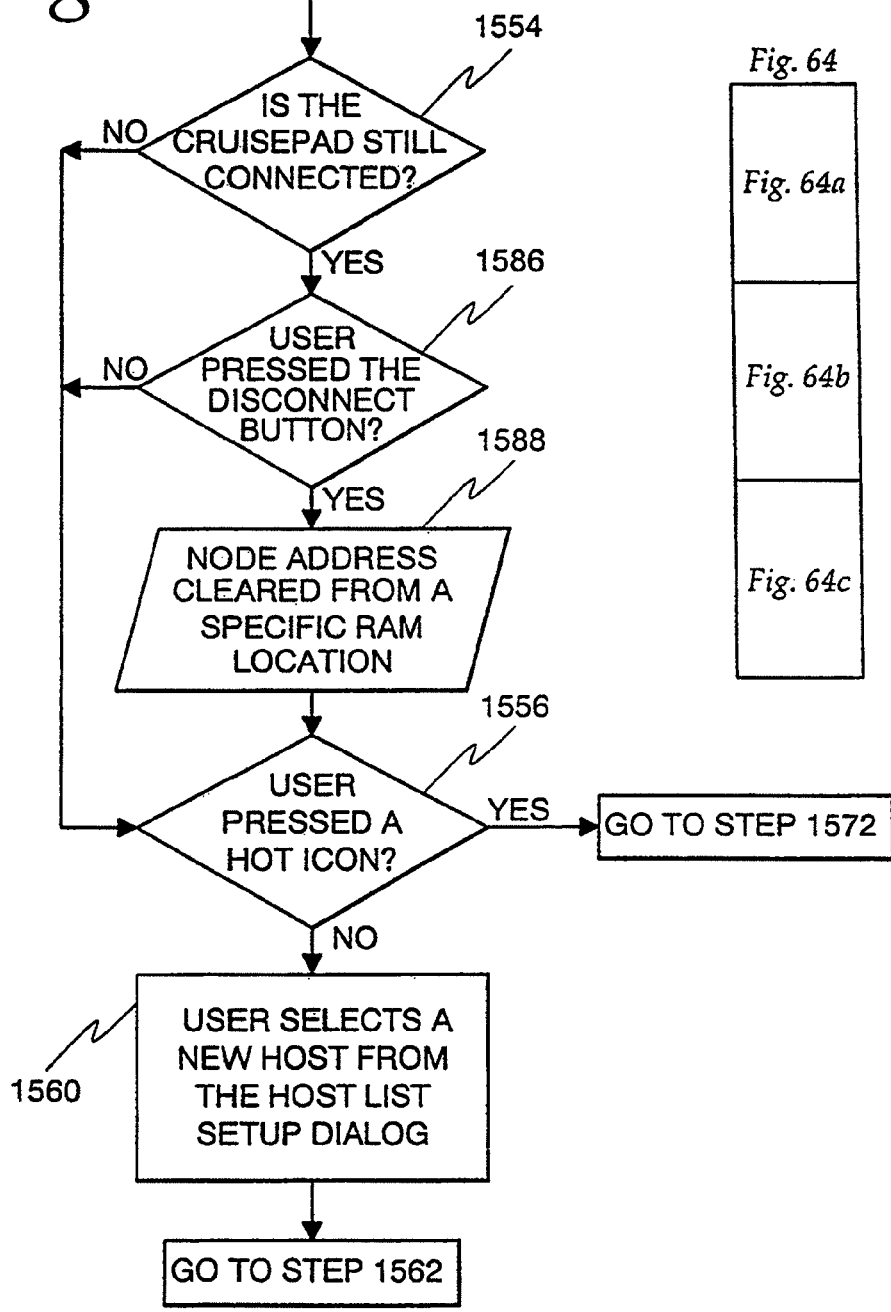

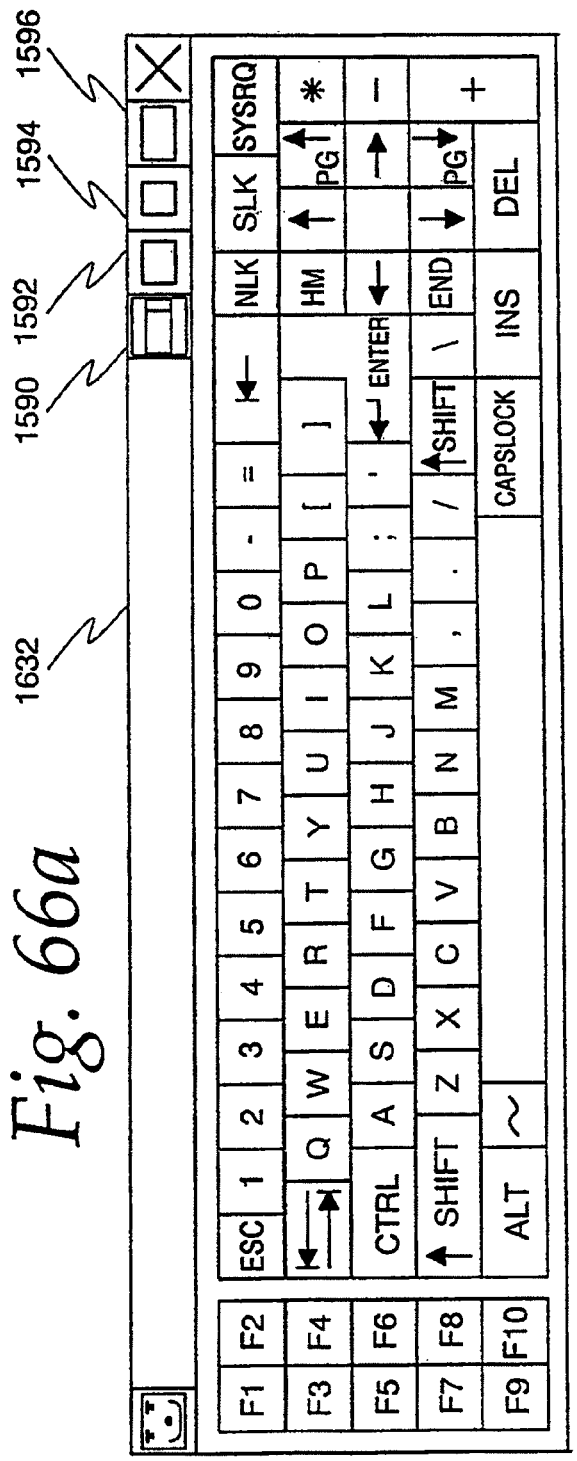

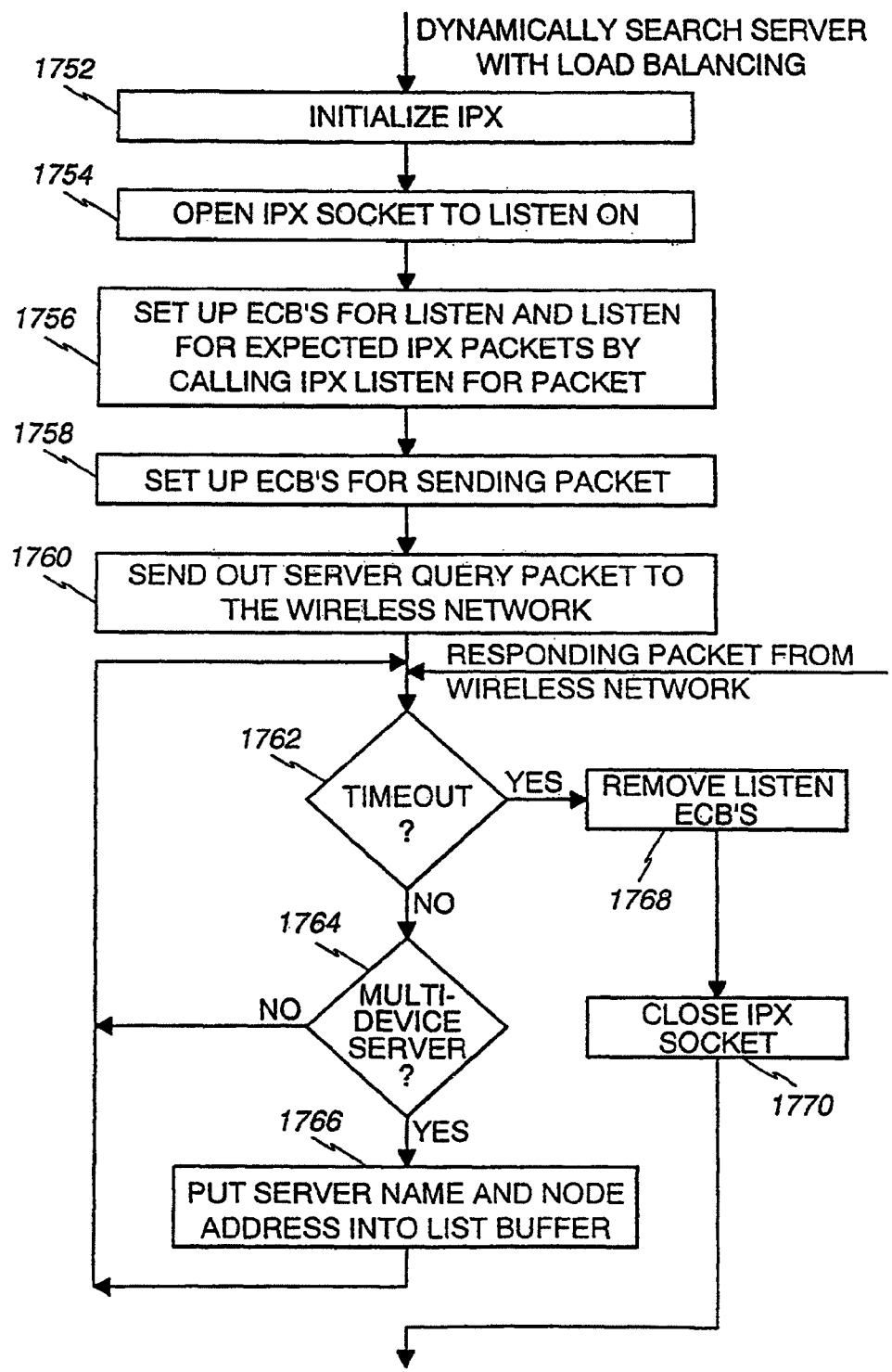

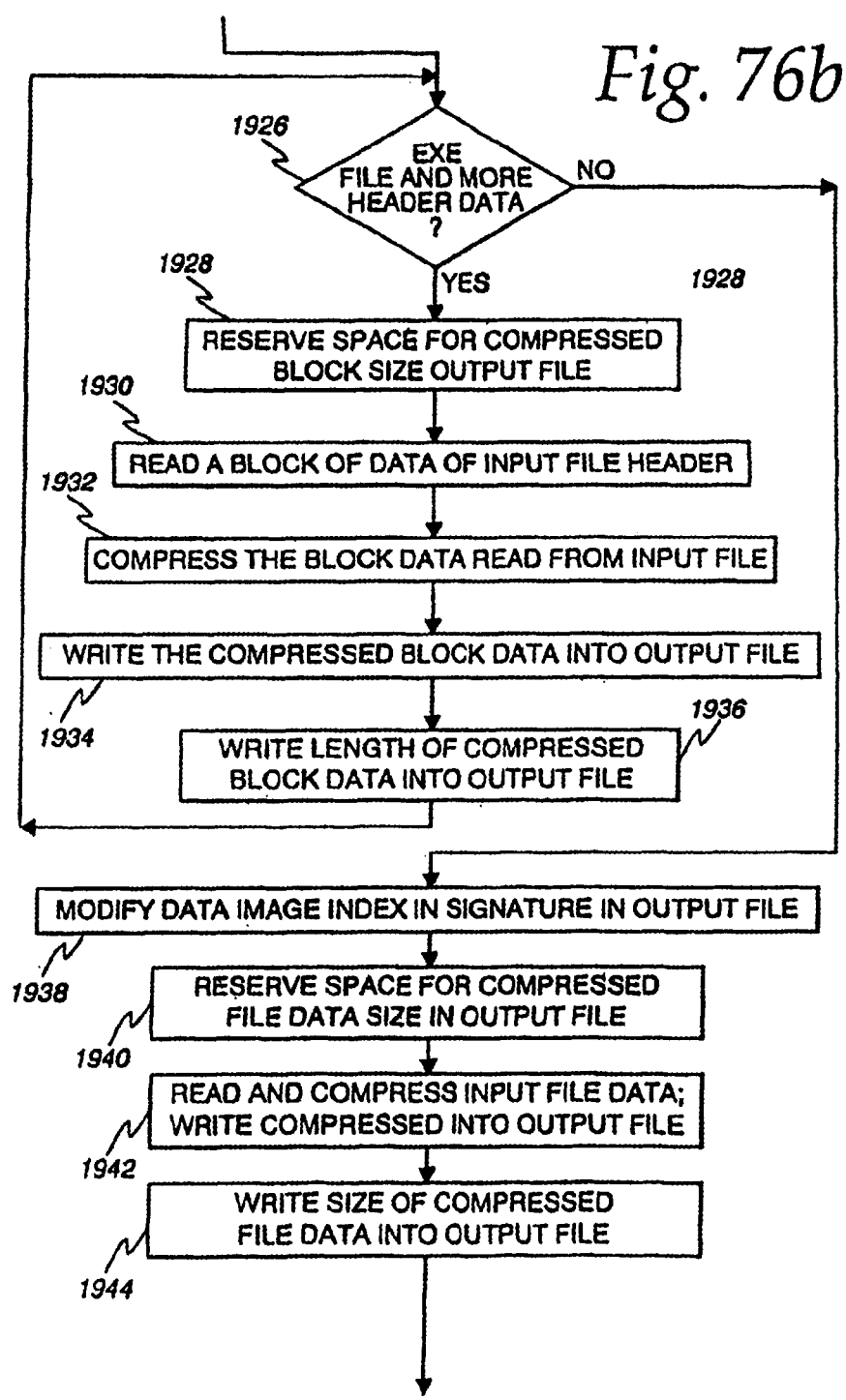

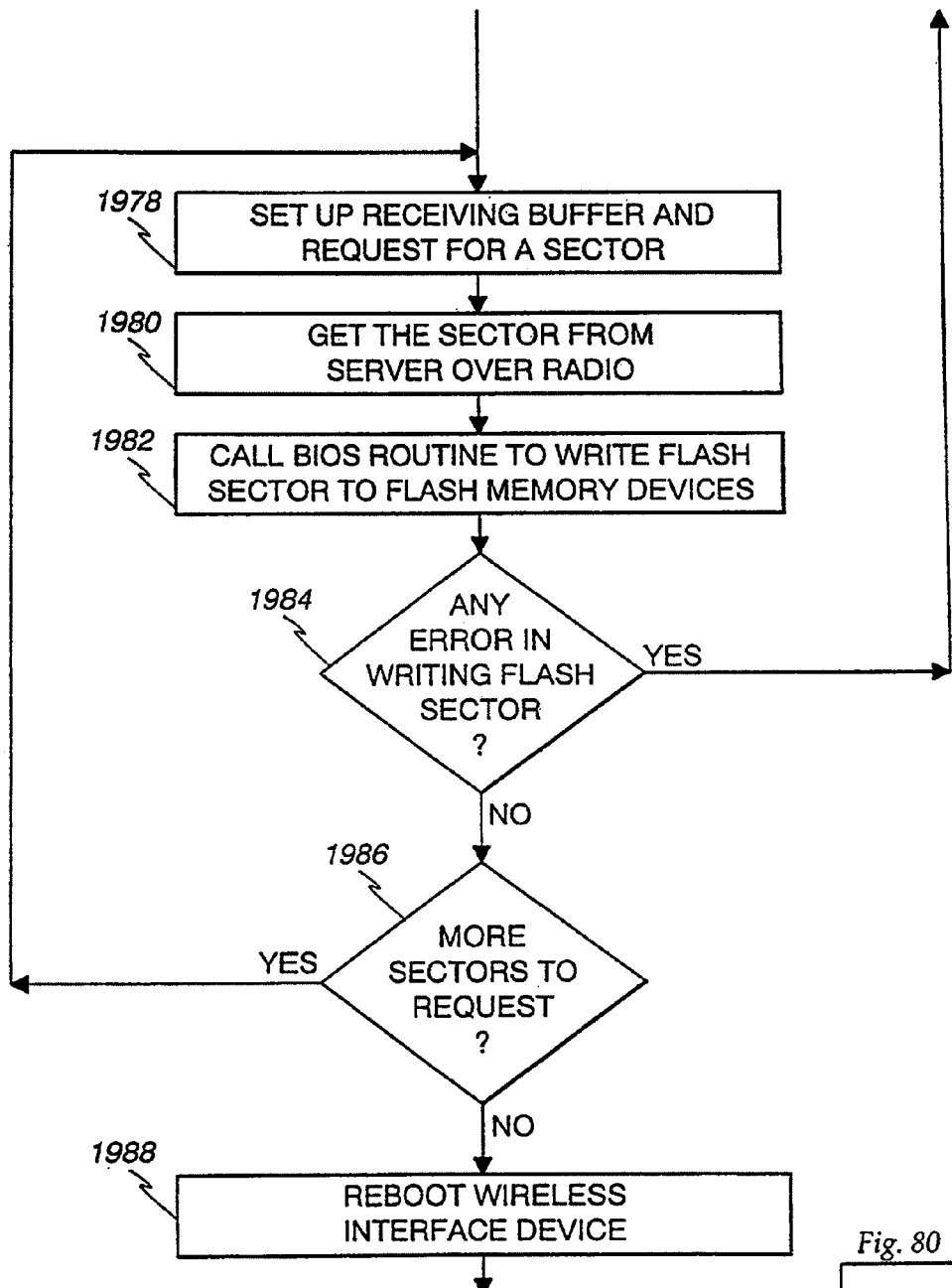

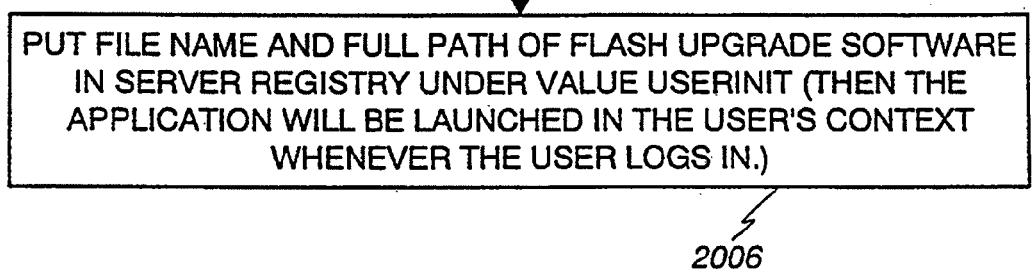
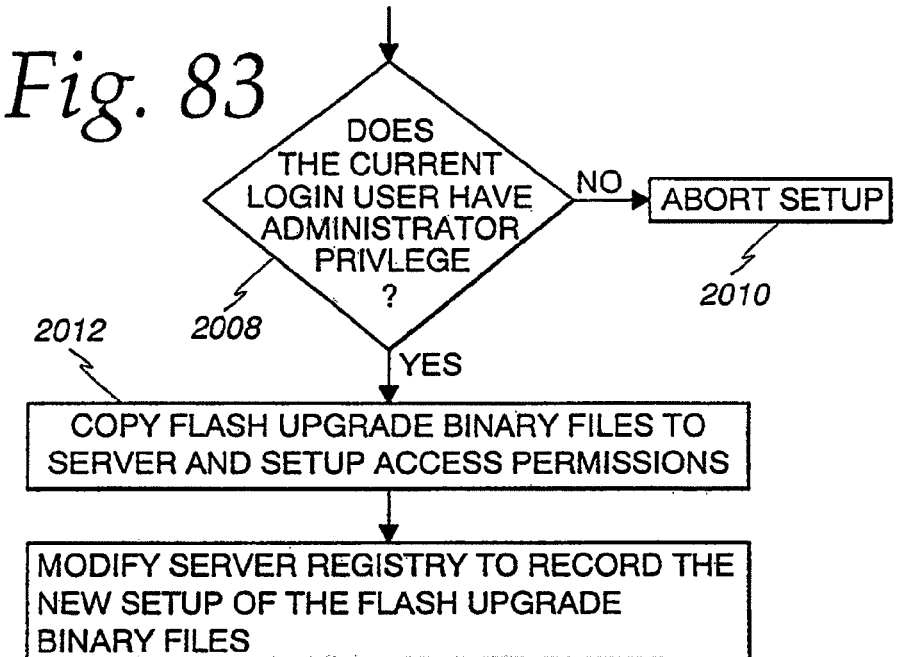
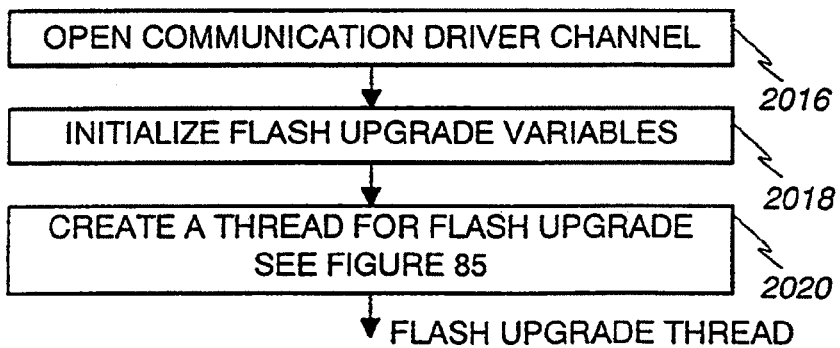

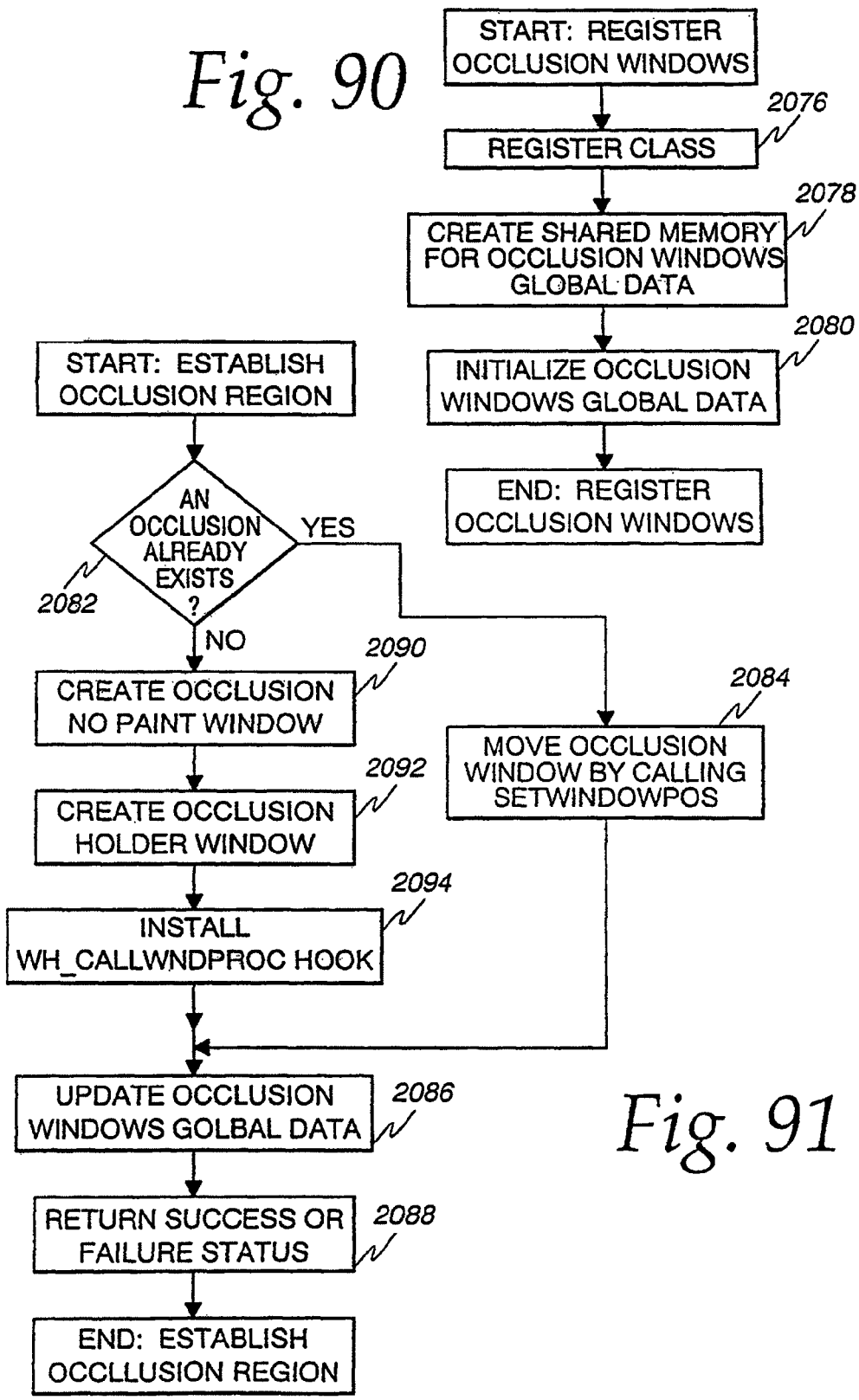

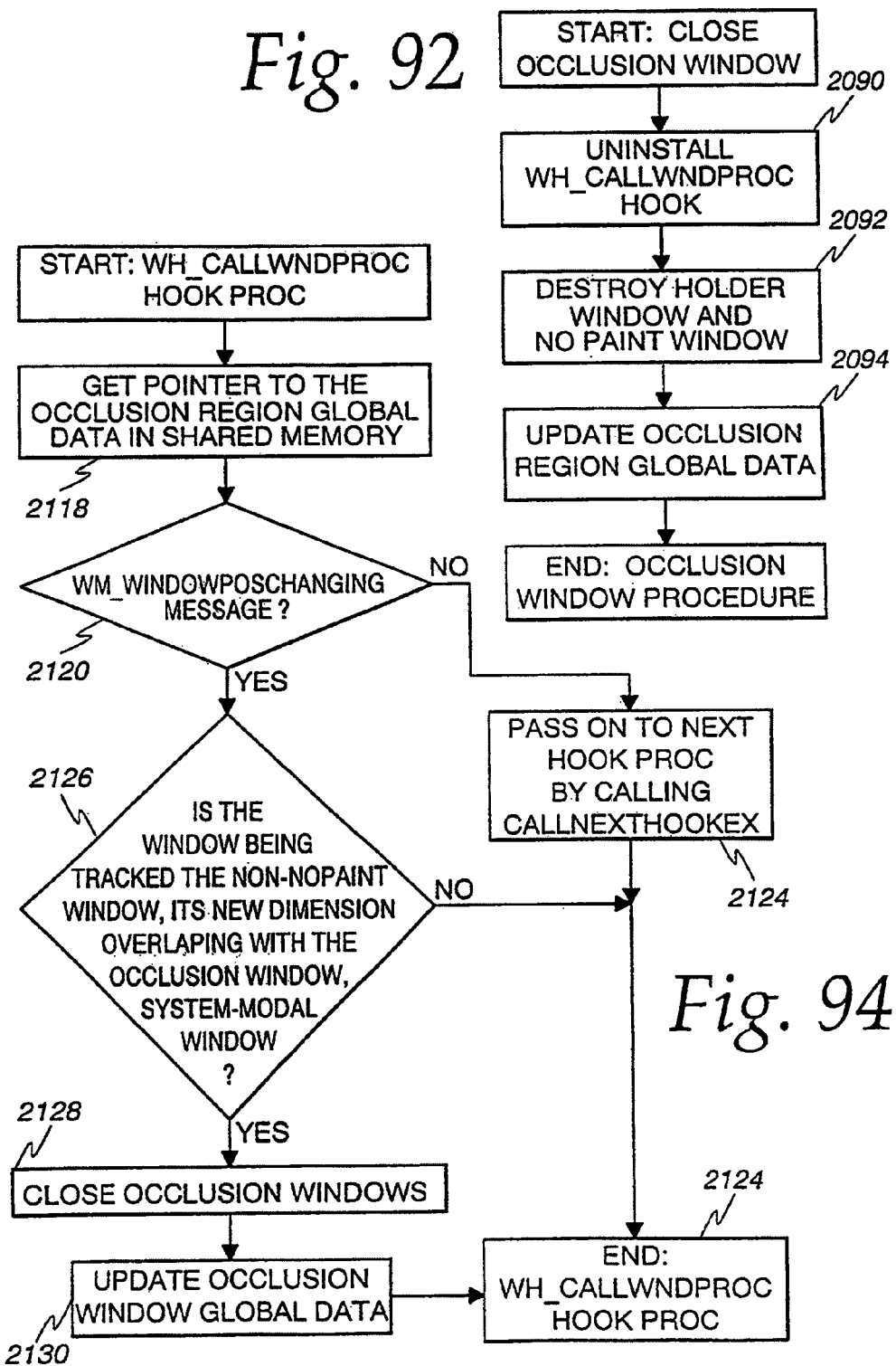

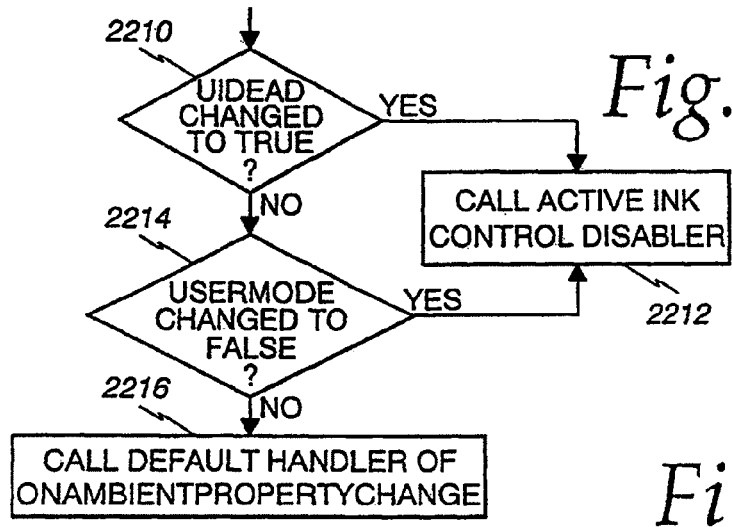
Fig. 102
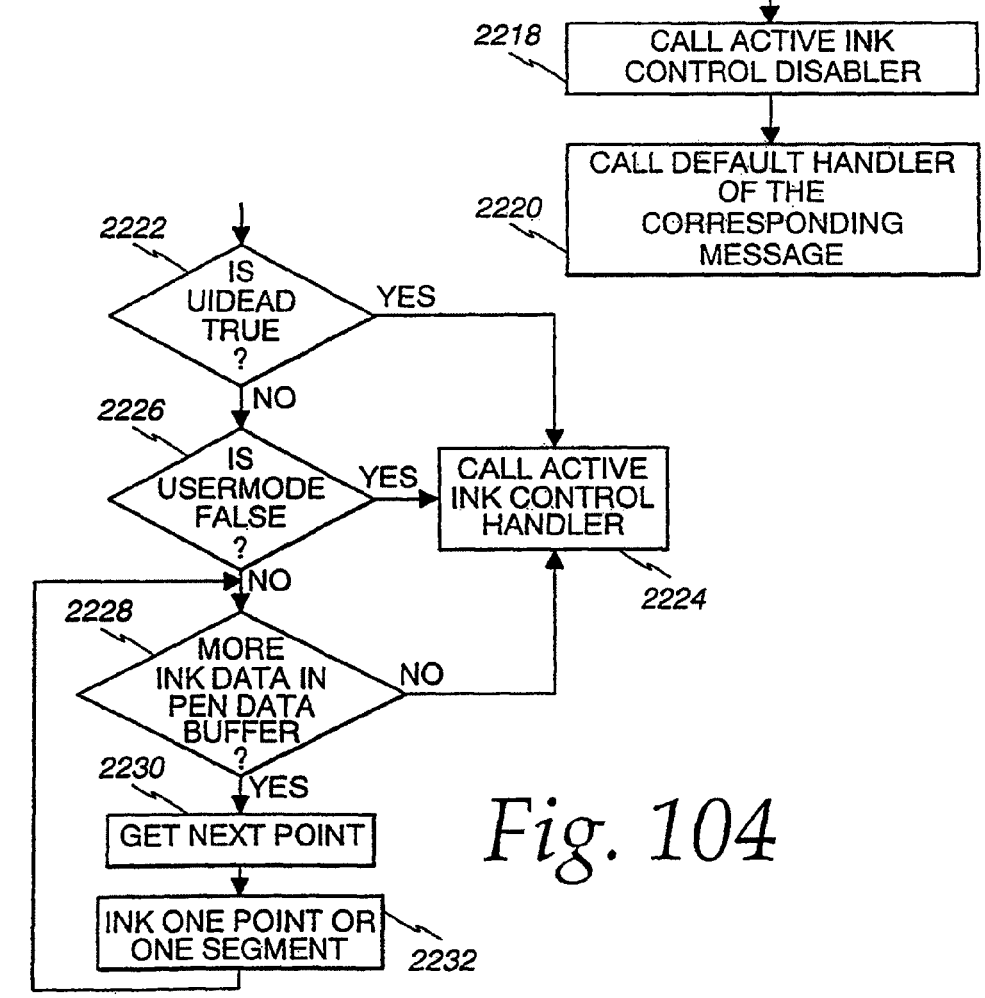
Fig. 103
Fig. 104

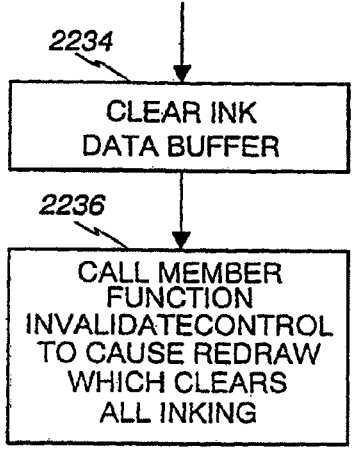
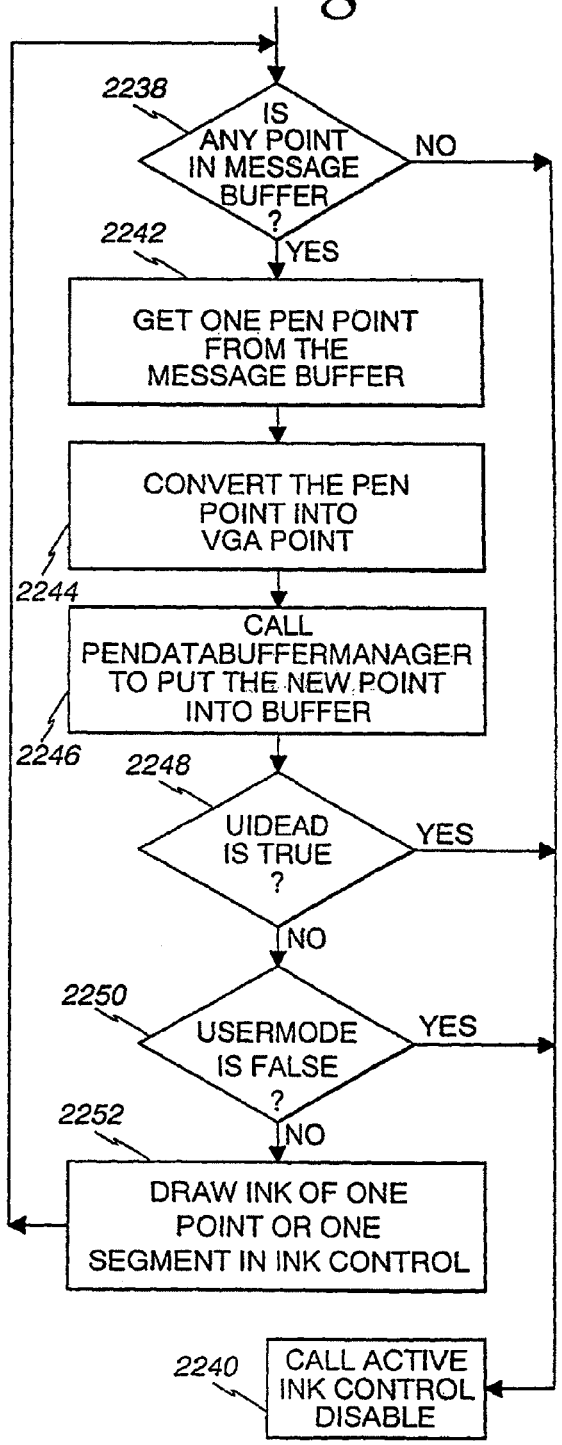

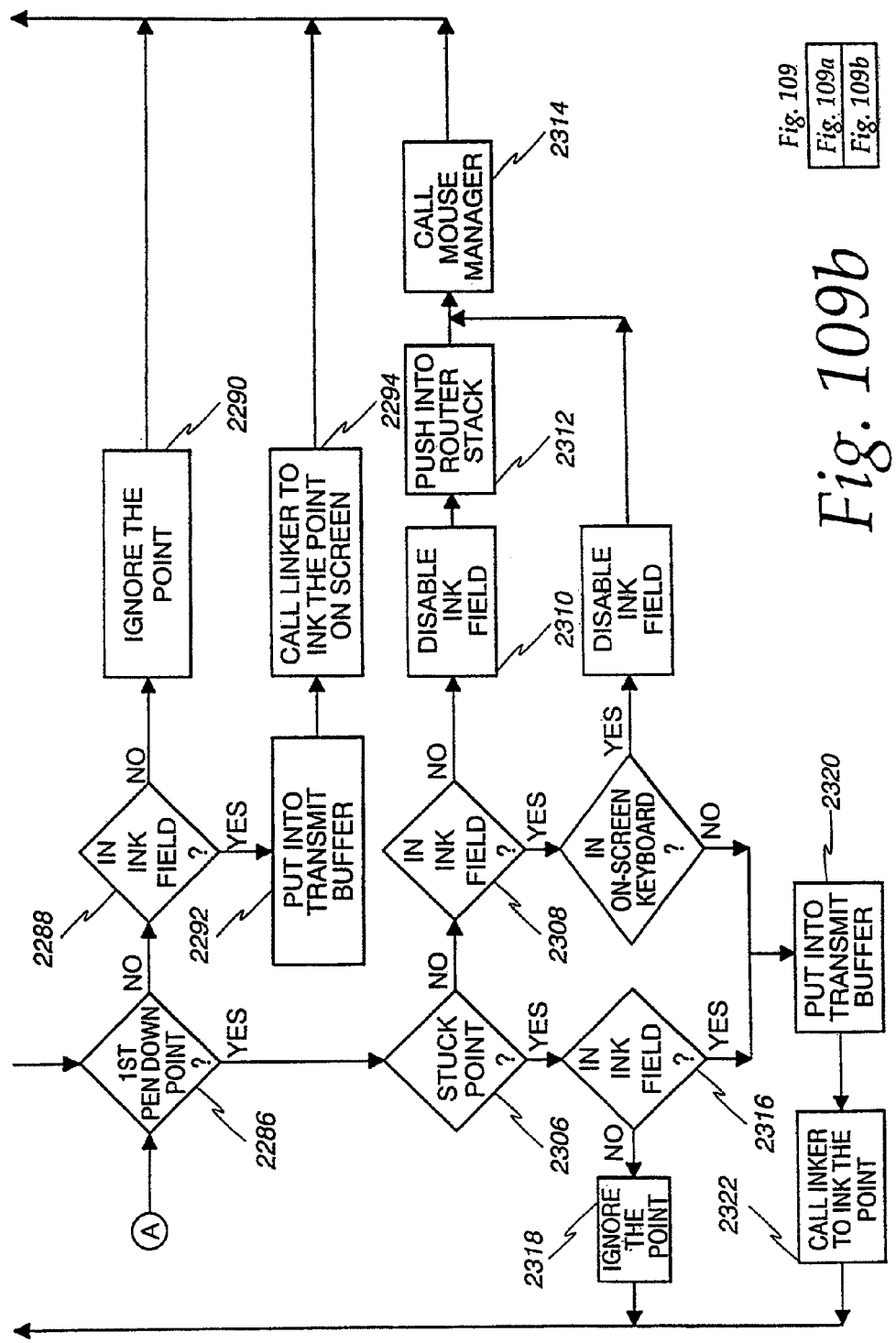

WIRELESS FILE TRANSMISSION

CROSS-REFERENCE TO RELATED CASES

This application is a continuation of U.S. patent application Ser. No. 11/975,312, filed on Oct. 18, 2007 now U.S. Pat. No. 7,889,181, which is a continuation of U.S. patent application Ser. No. 10/199,475, filed Jul. 19, 2002, now U.S. Pat. No. 7,423,637, which is a continuation of U.S. patent application Ser. No. 08/784,688, filed on Jan. 15, 1997, now U.S. Pat. No. 6,724,372, which is a continuation-in-part of the following application: Ser. No. 08/543,786, filed on Oct. 16, 1995, abandoned.

This case is also related to the following applications, all filed on Oct. 16, 1995: REMOTE CONTROL INTERFACE, by B. R. Banerjee, S. C. Gladwin, A. Maskatia and A. Soucy, Ser. No. 08/543,700, now U.S. Pat. No. 6,760,017; RADIO FLASH UPDATE, by D. Bi, H. Hsiung and J. Wilson, Ser. No. 08/543,463, now U.S. Pat. No. 6,126,327; MOUSE EMULATION WITH PASSIVE PEN, by D. Bi, G. Cohen, M. Cortopassi, J. George, S. C. Gladwin, H. Hsiung, P. Lim, J. Parham, A. Soucy, D. Voegeli and J. Wilson, Ser. No. 08/543,786, abandoned; RESUME ON PEN CONTACT, by M. Cortopassi, S. C. Gladwin and D. Voegeli, Ser. No. 08/543,510, now U.S. Pat. No. 5,974,558; SCREEN SAVER DISABLER, by D. Bi, S. C. Gladwin and J. Wilson, Ser. No. 08/543,698, now U.S. Pat. No. 6,683,605; IPX DRIVER FOR MULTIPLE LAN ADAPTERS, by D. Bi, Ser. No. 08/553,808, now U.S. Pat. No. 6,148,344; DISASTER RECOVERY JUMPER, by M. Cortopassi, J. George, J. Parham and D. Voegeli, Ser. No. 08/543,423, now U.S. Pat. No. 6,018,806; SYSTEM AND METHOD FOR DELAYING A WAKEUP SIGNAL, by M. Cortopassi, Ser. No. 08/543,697, now U.S. Pat. No. 5,996,082; DOUBLE PEN UP EVENT, by D. Bi and J. George, Ser. No. 08/543,787, now U.S. Pat. No. 5,990,875; REMOTE OCCLUSION REGION, by J. Wilson, Ser. No. 08/543,701, now U.S. Pat. No. 6,005,533; BROADCAST SEARCH FOR AVAILABLE HOST, by D. Bi, S. C. Gladwin and J. Wilson, Ser. No. 08/543,599, now U.S. Pat. No. 6,141,688; HOST/REMOTE CONTROL MODE, by M. Cortopassi, J. George, S. C. Gladwin, H. Hsiung, P. Lim, J. Parham, D. Voegeli and J. Wilson, Ser. No. 08/551,936, now U.S. Pat. No. 6,137,473; PASSWORD SWITCH TO OVERRIDE REMOTE CONTROL, by D. Bi, S. C. Gladwin and J. Wilson, Ser. No. 08/543,785, now U.S. Pat. No. 5,867,106; AUTOMATIC RECONNECT ON REQUIRED SIGNAL, by S. C. Gladwin and J. Wilson, Ser. No. 08/543,425, now U.S. Pat. No. 6,092,117; and PORTABLE TABLET, by G. Cohen, S. C. Gladwin, P. Lim, J. Smith, A. Soucy, K. Swen, G. Wong, K. Wood and G. Wu, Ser. No. 29/045,319, now U.S. Pat. No. D385,857; REMOTE KEYBOARD MACROS ACTIVATED BY HOT ICONS, by S. C. Gladwin, J. Wilson, Ser. No. 08/543,788, now U.S. Pat. No. 6,209,034.

This case is also related to the following cases, all filed on Jan. 15, 1997: A COMPUTER SYSTEM FOR ENABLING A WIRELESS INTERFACE DEVICE TO SELECTIVELY ESTABLISH A COMMUNICATION LINK WITH A USER SELECTABLE REMOTE COMPUTER, by S. C. Gladwin, A. Soucy and J. Wilson, Ser. No. 08/783,708, now U.S. Pat. No. 7,512,671; WIRELESS ENUMERATION OF AVAILABLE SERVERS, by S. C. Gladwin, D. Bi, A. Gopalan, and J. Wilson, Ser. No. 08/784,275, now U.S. Pat. No. 6,353,599; DYNAMIC SERVER ALLOCATION FOR LOAD BALANCING WIRELESS INTERFACE PROCESSING, by D. Bi, Ser. No. 08/784,276, now U.S. Pat. No. 6,330,231; SYSTEM HAVING WIRELESS INTERFACE DEVICE FOR STORING COMPRESSED PREDETERMINED PROGRAM FILES RECEIVED FROM A REMOTE HOST AND COMMUNICATING WITH THE REMOTE HOST VIA WIRELESS LINK, by D. Boals and J. Wilson, Ser. No. 08/784,211, now U.S. Pat. No. 6,108,727; MULTI-USER RADIO FLASH ROM UPDATE, by D. Bi and J. Wilson, Ser. No. 08/783,080, now U.S. Pat. No. 6,279,153; AUDIO COMPRESSION IN A WIRELESS INTERFACE TABLET, by S. C. Gladwin, D. Bi and D. Voegeli, Ser. No. 08/784,141, now U.S. Pat. No. 6,963,783; MULTI-USER ON-SCREEN KEYBOARD, by D. Bi, Ser. No. 08/784,243, now U.S. Pat. No. 6,664,982; LOCAL HANDWRITING RECOGNITION IN A WIRELESS INTERFACE TABLET DEVICE, by S. C. Gladwin, D. Bi, D. Boats and J. Wilson, Ser. No. 08/784,034, now U.S. Pat. No. 7,113,173; INK TRAILS ON A WIRELESS REMOTE INTERFACE TABLET AND WIRELESS REMOTE INK FIELD OBJECT, by S. C. Gladwin, D. Bi, D. Boals, J. George, S. Merkle and J. Wilson, Ser. No. 08/784,688, now U.S. Pat. No. 6,724,372 and MODE SWITCHING FOR PEN-BASED COMPUTER SYSTEMS, by D. Bi, Ser. No. 08/784,212, now U.S. Pat. No. 6,924,790.

BACKGROUND OF THE INVENTION

1. Field of the Invention

The present invention relates to a computer system, and more particularly, to a computer system which includes a wireless interface device that is adapted to communicate with a remote host by way of a radio link. The remote host processes pen data transmitted by the wireless interface device. Local inking of the pen events is provided at the wireless interface device in order to maintain the pen paradigm in essentially real time.

2. Description of the Prior Art

Pen-based portable personal computer systems are generally known in the art. Such systems typically include a digitizer panel and utilize a stylus as an input device. Both active and passive stylus devices are known. In such pen-based personal computer systems, the path of the stylus is tracked relative to the digitizer panel to maintain the pen paradigm and to provide visual feedback to the user. Such pen-based portable personal computer systems are known to use Microsoft Windows for Pen Computing Systems ("Pen Windows"). With such a system utilizing the Pen Windows operating system, the pen driver can typically deliver stylus tip locations every five to ten milliseconds to achieve a resolution of about 200 dots per inch and to connect the dots in a timely manner. As such, the Pen Windows operating system can provide a real time response to maintain the pen paradigm.

The object of the pen-based portable personal computer system is to provide the user with a tool as familiar as pencil and paper. Unfortunately, the popularity of such pen-based computer systems is a lot less than expected by the industry. As such, application programs for such pen-based systems are limited.

SUMMARY OF THE INVENTION

It is an object of the present invention to solve various problems in the prior art.

It is yet another object of the present invention to provide a computer system which includes a remote wireless interface device which can operate in a pen-based mode.

The present invention relates to a computer system, and more particularly, to a computer system which includes a wireless interface device that is adapted to communicate with a remote host by way of a radio link. The remote host processes pen data transmitted by the wireless interface device and provides for inking of the pen events on the wireless interface device.

Briefly, the present invention relates to a computer system which includes one or more wireless interface devices that are adapted to communicate with a remote host over a radio link. Each of the wireless interface devices is a pen-based device which includes an ink field in which pen events are translated into pen data packets and transmitted to the remote host over the radio link. Local inking is provided at the wireless interface device in order to maintain the pen paradigm in essentially real time.

BRIEF DESCRIPTION OF THE DRAWING

These and other objects of the present invention will be readily understood with reference to the following specification and attached drawing, wherein:

FIG. 1 is a block diagram of the hardware configuration of a wireless interface device in accordance with the present invention and a host computer;

FIG. 2 is a block diagram illustrating the access of the wireless interface device in accordance with the present invention and a wired local area network;

FIG. 3 is a diagram illustrating the software structure for the wireless interface device in accordance with the present invention;

FIG. 10 is a block diagram illustrating the method used in the wireless interface device to anticipate a pen/mouse mode decision;

FIGS. 11-30 are schematic diagrams of the wireless interface device in accordance with the present invention;

FIG. 44 is a configuration diagram illustrating the wireless interface device interfacing with a wired LAN system;

FIG. 45 is a diagram of the software structure of a known network system;

FIG. 46 is a diagram of the software structure of network system which enables the wireless interface device to interface with the wired LAN system, illustrated in FIG. 44;

FIG. 58 is a flow chart relating to the host control mode;

FIGS. 64A, 64B and 64C are flow charts relating to a system for providing automatic reconnection of the host;

FIGS. 66A-66D illustrate the various configurations of an on-screen keyboard available on the wireless interface device.

FIGS. 71A-71C are flowcharts of the software for the wireless interface device for wireless enumeration of servers in accordance with the present invention.

FIGS. 76a-76b are flow charts for compressing .EXE and .COM files in accordance with the present invention.

FIGS. 80-85 are flow charts for enabling the FLASH memory device on multiple wireless interface devices to be updated wirelessly.

FIGS. 90-94 are flow charts for a multi-user on-screen keyboard in accordance with the present invention.

FIGS. 98-109 represent flow charts for the invention illustrated in FIG. 97.

DETAILED DESCRIPTION OF THE INVENTION

1. General

Figure 4:
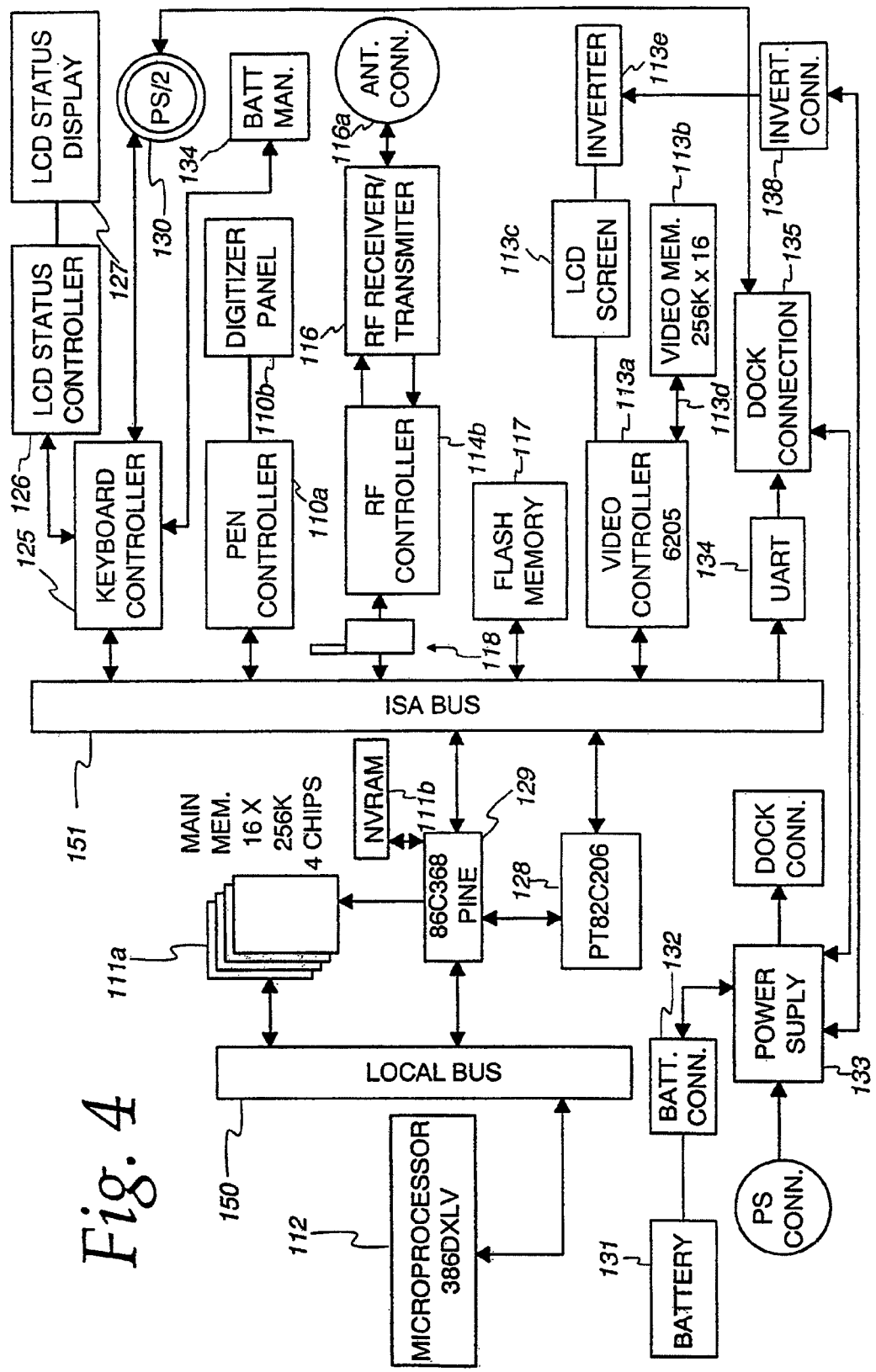
FIG. 4 is a block diagram showing one implementation of the wireless interface device of FIG. 1.

The present invention relates to a system which allows wireless access and control of a remote host computer, which may be either a desktop, tower or portable computer to enable remote access of the various files and programs on the host computer. The system not only allows access to remote host computers that are configured as stand-alone units but also provides access to both wired and wireless local area networks (LAN).

The system includes a wireless interface device which includes a graphical user interface (GUI) which allows various types of input. In particular, input to the wireless interface device is primarily by way of a passive stylus, which can be used in a pen mode or a mouse mode. In a pen mode, a trail of ink tracking the path of the stylus (pen paradigm) provides visual feedback to the user by way of a pen digitizer. In a mouse mode, however, a cursor may be generated which follows the "tip" of the pen, but the path of cursor motion is not inked.

A virtual keyboard is also provided as part of the GUI. Activation of the keys on the virtual keyboard is by way of the stylus or by finger input. In addition, the system also supports a full-size external keyboard.

FIG. 1 illustrates a block diagram of the system in accordance with the present invention. In particular, a wireless interface device 100, in accordance with the present invention, enables wireless access of a remote host computer 101, configured as either a stand-alone unit or as a part of a wired or wireless local area network (LAN). When the remote host computer 101 is in a stand-alone configuration, as illustrated in FIG. 1, communication between the remote host computer 101 and the wireless interface device 100 is by way of a wireless communication link, provided by a communication subsystem 118 in which the remote host computer 101 is provided with a transceiver 115 for radio communication with a transceiver 116 in the wireless interface device 100. For example, the desktop or remote host computer 101 can be provided with a PCMCIA interface which can be used with a wireless transceiver card to communicate with the transceiver 116 in the wireless interface device 100. Alternatively, an Industry Standard Architecture (ISA) card transceiver can be installed in the host computer 101 in a spare ISA expansion slot. In particular, the transceivers 115 and 116 may be implemented as 2.4 GHz radio frequency (RF) transceiver modules with a Wireless Media Access Control function, available from Proxim Inc., Mountain View, Calif., configured with either an ISA or PCMCIA interface.

As mentioned above, the wireless interface device 100 can also be used with a wireless LAN in a peer-to-peer network or a wired LAN. FIG. 2 illustrates the communication between the wireless interface device 100 and a wired LAN 114, which includes a server 108 in a, for example, Novell Netware or Microsoft LAN Manager environment. In this mode, the transceiver 116 in the wireless interface device 100 communicates with an access point 109 by way of a transceiver (not shown), which interfaces the wireless interface device 100 with a wired LAN 114 which includes a server 108. Alternatively, the wireless interface device 100 can be used in a wireless network in a Windows for Workgroups or Personal Netware environment, for example.

The configuration of the radio communication subsystem between the wireless interface device 100 and the remote host computer 101 or access point 109 conforms to the Open System Interconnection (OSI) reference model for data communications and implements the lower two layers of the seven-layer OSI model. In particular, with reference to FIG. 3, the physical layer 107 (WIRELESS PHY) may be a 2.4 GHz spread spectrum frequency hopping radio which replaces the LAN cable normally connected between workstations. The radio operates within the 2.4000-2.4835 GHz band, the unlicensed Industrial Scientific and Medial (ISM) band, and is divided into eighty-two 1 MHz channels. In a spread-spectrum, frequency-hopping radio, data is broadcast on one particular channel for a predetermined time (i.e. 400 msec); and then the system hops to another channel in a predetermined pattern to avoid interference.

The wireless media access control (WIRELESS MAC) 106 is used to interface to higher level software 105 (i.e. NOS SHELL, NOVELL, MICROSOFT) through network drivers 104 (i.e. LINK LEVEL INTERFACE (ODI, NDIS)). The MAC conforms to the industry standard protocol is in accordance with IEEE 802.11.

As shown in FIG. 1, the wireless interface device 100 includes a central processing unit (CPU) 112, a local memory system 111, a pen-based input subsystem (STYLUS) 110, a display subsystem 113 and a transceiver 116. As will be discussed in more detail below, the wireless interface device 100 includes a Viewer Manager software 200 (FIG. 6) which performs three (3) basic functions: (i) collecting and transmitting input positional information from a stylus input subsystem 110 to the host computer 101, (ii) receiving from the host computer 101a video image to be displayed on the display subsystem 113, and (iii) managing the communications link between the wireless interface device 100 and the host computer 101.

The wireless interface device 100 is thus able to control and access various programs such as Windows and Windows application programs and files residing at the host computer 101 and display the results in its display 113.

2. Description of the Block Diagram

FIG. 4 is a block diagram of the wireless interface device 100. As shown in FIG. 4, the wireless interface device 100 has both a processor or "local bus" 150 and an ISA bus 151. The local bus 150 operates at the clock rate of the CPU 112, while the ISA bus 151 operates at the industry standard 8 MHz clock rate. The CPU 112 may be implemented by a microprocessor, which allows suspension and resumption of operation by halting and restarting the system clock to reduce battery consumption. Because power management in a portable device is important, the CPU 112 should preferably support power management functions, such as System Management Mode (SMM) and System Management Interrupt (SMI) techniques known in the industry. One example of a suitable microprocessor is the AMD386DXLV, available from Advanced Micro Devices, Inc., Sunnyvale, Calif., which operates at up to 25 MHz at a 3.0V supply voltage.

The CPU 112 interfaces over local bus 150 with a system controller 129. The system controller 129 manages (i) system operation, including the local and ISA buses 150 and 151, (ii) memory, and (iii) power to the system. The system controller 129 may be, for example, a Model No. 86C368 integrated circuit, available from. PicoPower Technology, Inc., San Jose, Calif.

The present implementation takes advantage of the several levels of power management supported by the system controller 129. Power management in the present implementation is described in further detail below.

The system controller 129 provides a dynamic random access memory (DRAM) controller and a non-volatile random access memory (NVRAM) controller to control the DRAM 111A and a non-volatile RAM, NVRAM 111B, which form a portion of the memory subsystem 111 (FIG. 1) in the wireless interface device 100. As shown in FIG. 4, the DRAM 111A in the wireless interface device 100 may be provided by four 16-bit by 256K DRAM memory chips, to provide a total of 2 megabytes of memory, while the NVRAM 111B, used to store configuration data and passwords, for example, may be implemented using E2PROM technology to provide permanent storage.

All devices on the ISA bus 151 are managed by an integrated peripheral controller (IPC) 128. The IPC 128 provides various functions including direct memory access (DMA) control, interrupt control, a timer, a real time clock (RTC) controller, and a memory mapper for mapping peripheral devices to the system memory space as illustrated in Table 4 below. The IPC 128 may be implemented by a Model No. PT82C206 integrated circuit, also available from the aforementioned PicoPower Technology, Inc.

The stylus input subsystem 110 is implemented by a stylus, a pen controller 110A and a digitizer panel 110B. The pen controller 110A controls the digitizer panel 110B and provides positional information of pen or stylus contact. The pen controller 110A can be implemented, for example by a Model No. MC68HC705J2 microcontroller, available from Motorola, Inc. In this implementation, the digitizer panel 110B can be, for example, an analog-resistive touch screen, so that the stylus is sensed by mechanical pressure. Using a digitizer panel which senses mechanical pressure allows a "dumb" stylus, or even the human finger, to be used as an input device. When using a dumb stylus, switching between mouse and pen modes is accomplished by selecting an icon as discussed below. Alternately, other styli, such as a "light pen" or an electronic stylus with various operating modes, can also be used. In some electronic stylus', switching between pen and mouse modes can be achieved by pushing a "barrel button" (i.e. a switch located on the barrel of the stylus).

As mentioned above, the wireless interface device 100 includes a display subsystem 113 which, in turn, includes a liquid crystal display (LCD) 113C. The LCD 113C is controlled by a video controller 113A, and supported by video memory 113B. The video controller 113A can be implemented by a Model No. CL-GD6205 video controller, available from Cirrus Logic Corporation, Milpitas, Calif. The LCD 113C can be, for example, a monochrome display, such as the Epson EG9015D-NZ (from Epson Corporation), or an active matrix color display. The video memory 113B may be implemented as DRAMs, organized as 0.256K by 16 bits.

The video controller 113A communicates with video memory 113B over a separate 16-bit video bus 113D. In this implementation, the video controller 113A provides "backlighting" support through a backlight control pin BACKLIT-EON that is de-asserted to conserve power under certain power management conditions as discussed below.

As discussed above, the communication subsystem 118 allows communication with a remote host computer 101 in either a stand-alone configuration or connected to either a wired or wireless LAN. The communication system 118 includes the transceiver 116, an antenna 116A, and an RF controller 114A for interfacing with the local ISA, bus 151.

The wireless interface device 100 also includes a keyboard controller 125 which performs, in addition to controlling an optional keyboard by way of a connector, various other functions including battery monitoring and LCD status control. The keyboard controller 125 can be implemented by a Model No. M38802M2 integrated circuit from Mitsubishi Corporation, Tokyo, Japan. Battery power to the wireless interface device 100 may be provided by an intelligent battery pack (IBP) 131, for example, as described in U.S. patent application Ser. No. 07/975,879, filed on Nov. 13, 1992, hereby incorporated by reference, connected to a system power supply module 133 by way of a battery connector 132. The IBP 131 maintains and provides information about the remaining useful battery life of IBP 131, monitored by keyboard controller 125. Upon the occurrence of a significant event relative to the IBP 130, e.g. battery remaining life falling below a preset value, the keyboard controller 125 generates an interrupt signal.

A serial port is provided and implemented by way of a universal asynchronous receiver transmitter (UART) 134, which can be accessed externally via a serial port connector 135. As will be discussed in more detail below, the serial port connector 135 allows for disaster recovery for the flash memory 117, which may be used to store the basic input/output (BIOS) for the CPU 112.

3. Power Management

Figure 5:
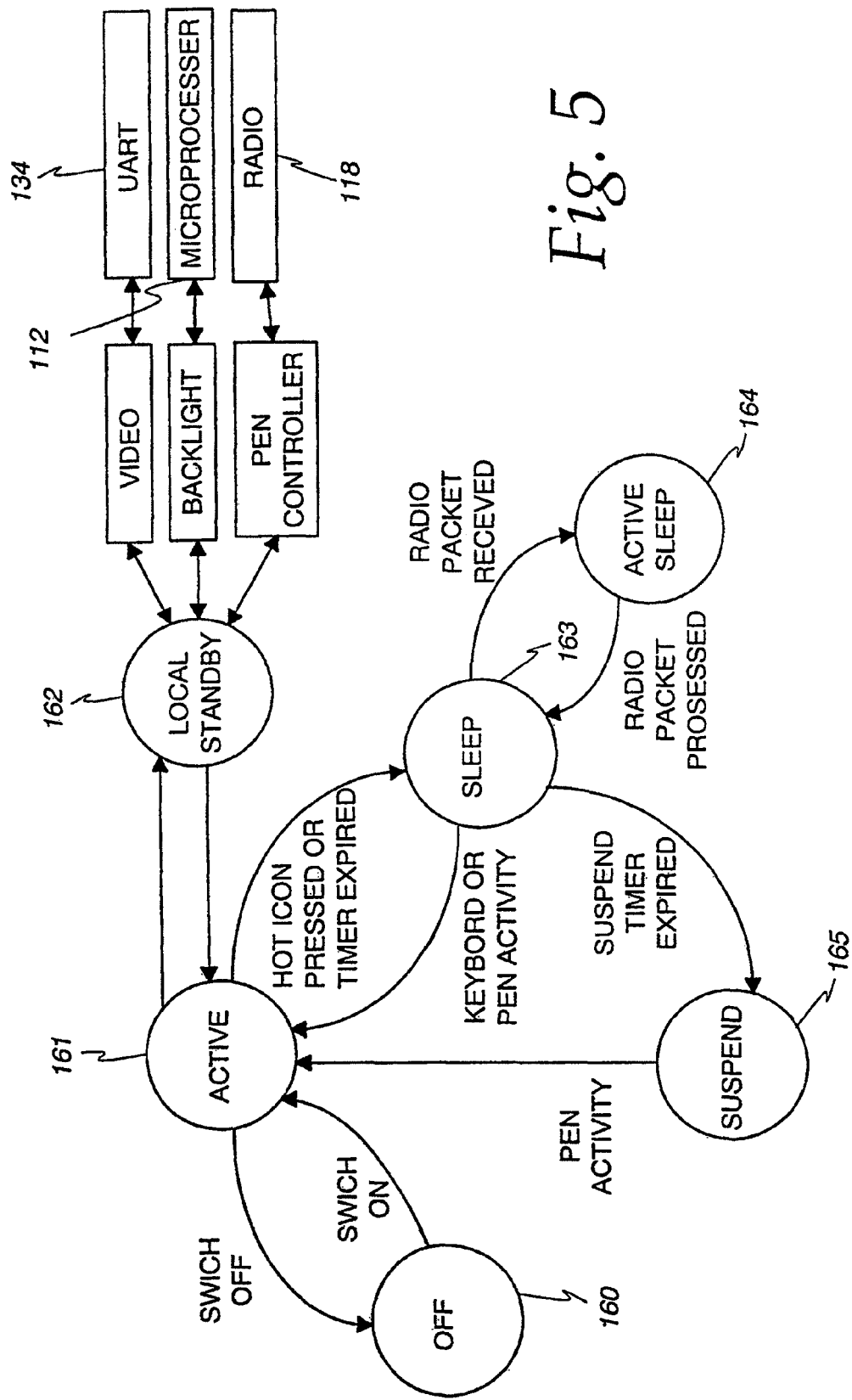
FIG. 5 is a state diagram illustrating the six internal power management states of the wireless interface device.

In order to conserve battery power, the wireless interface device 100 incorporates power management. While a user of the wireless interface device 100 would normally only be aware of four power management states: "off"; "active"; "suspend"; and "sleep" modes, internally six power management states are implemented as shown in FIG. 5. More particularly, with reference to FIG. 5, before the wireless interface device 100 is powered up, the wireless interface device 100 is in an "off" state, indicated by the reference numeral 160. In an "off" state 160, no power is supplied to the system. A state 161 (the "active" state) is entered when the power switch (FIG. 28) to the wireless interface device 100 is turned to the "on" position. In the active state 161, all components of wireless interface device 100 are active. From active state 161, the wireless interface device 100 enters a "local standby" state 162. The local standby state 162 is transparent to the user of the wireless interface device 100. From the user's point of view, in the local standby state 162, the wireless interface device 100 is in active mode. In this state 162, specific inactive devices are each put into a static state after a predetermined time-out period of inactivity for that device. In a static state, each device consumes minimal power. In the local standby state 162, devices that can be put into static states include the CPU 112, the video controller 113A, the pen controller 110A, the UART 134, and the transceiver 116. Backlighting of the LCD video display is also disabled in local standby state 162. If not, input activities are detected by the keyboard controller 125 or pen controller-110A. After the later of their respective present time-out periods, these devices are placed in a static state. These devices emerge from the static state once an activity relevant to its operation is detected, e.g. a pen event is detected.

The user of the wireless interface device 100 can place the wireless interface device 100 in a "sleep" mode 163 by selecting an icon (FIG. 37) labelled "sleep" from the GUI as will be discussed below. Alternatively, the "sleep" mode may be entered from the active state 161 after a preset period of inactivity. In a "sleep" mode, corresponding to either "sleep" state 163 or "active sleep" state 164, the display subsystem 113 is switched off; and most devices are placed in static states. When a keyboard or pen event is detected, the sleep state 163 and active sleep state 164 are exited, and the wireless interface device 100 enters the active state 161. From the sleep state 163, an active sleep state 164 is entered when a communication packet is received from the host computer 101. Although the display subsystem 113 is turned off, the received communication packet can result in an update to an image stored in the video memory 113B. The CPU 112 handles the communication packet from the host computer 101 and activates the video controller 113A to update such an image. The active sleep state 164 is transparent to the user of the wireless interface device 100, since the updated image is not displayed on the LCD screen 113C. When the communication packet is handled, the wireless interface 100 returns to a sleep state 163. The device activities in wireless interface device 100 in "sleep" mode 163 are illustrated in Table 1 below.

TABLE 1

| DEVICE | STATE | CLOCKS DISABLED | COMMENTS | WAKEUP SOURCE |
|---|---|---|---|---|
| Microprocessor | Static Suspend | Clock Stop Control by the system controller | Static Mode entered when clock stopped | Clock Restarted and Controlled by the system controller |
| System Controller | Static Suspend | Clock Stopped/32 KHz Left on | | Activity on EXACT, SWITCH, or RING pins |
| Peripheral Controller | Static | 32 KHz Source | | Any Interrupts |
| Main Memory | Slow, Refresh | System controller 38 KHz | Memory Refreshed at 128 mS | |
| Video | Static | 14 MHz disconnected | Controlled through use of system controller power management pins | When system is resumed |
| Video Memory | Slow Refresh | 32 KHz | Memory Refreshed at 128 mS | Video Controller automatically adjusts refresh rate depending on mode |
| LCD Module | OFF | NA | Power to Module will never be applied in Sleep | Controlled by Video controller power up sequencing |
| LCD Backlight | OFF | NA | Backlight will never be on in Sleep | Controlled by Video controller power up sequencing |
| UART | Static | 1.84 MHz | Part has no direct power management | |
| UART Trans. | Off | NA | Part turned off, until access to UART. Inactivity timer will start, and look for a time-out of two minutes before turning off transceiver | Access to serial port |
| ROM | Static | NA | After ROM is shadowed, the CS and OE line will be driven high to keep these parts in a static mode | |

TABLE 1-continued

| DEVICE | STATE | CLOCKS DISABLED | COMMENTS | WAKEUP SOURCE |
|---|---|---|---|---|
| NVRAM | Static | NA | After NVRAM is read, the CS line will be high which forces part into a static mode | |
| Pen Controller | Sleep | Own 4.0 MHz | Sleeps after each point is processed as long as the pen is not pressing the screen | Pen Down wakes up Pen controller. Pen controller asserts the PEN_ACTIVITY signal which will wake up the entire system. |
| Hook | Active | Own 32 KHz | Keeps the last display as told by the keyboard controller | NA |
| Clock Generator | Active | All Clocks Running | Clocks needed in order to wake system back up | |
| Radio | Sleep | Internal | Radio Handles its own power management | Wakes up on periodic basis in order to keep SYNC. When a packet is ready, the Radio will assert the activity pin to the EXPACT input of the system controller which will wake up the system |

Upon expiration of a timer, the wireless interface device 100 enters into an internal state "suspend" mode 165. In a suspend mode, the wireless interface device 100 is essentially turned off and communication packets from the host computer 101 are not handled. The wireless interface device 100 emerges from suspend state 165 into active state 161 when a pen event is detected.

As mentioned above, the video controller 113A supports various power management modes internal to the display subsystem 113. Power is conserved in display subsystem 113 by entering "standby" and "suspend" modes. In the video controller 113A's "standby" mode, which can be entered by (i) expiration of a timer internal to the video controller 113A, (ii) firmware in the video controller 113A, or (iii) a signal received from system controller 129 on the video controller 113A's "STANDBY" pin. In the video controller 113A's standby mode, the LCD 113C is powered down and the video clock is suspended. The video controller 113A exits the standby mode either under firmware control, or upon system controller 129's de-asserting video controller 113A's STANDBY pin. Upon exiting standby mode, the LCD 113C is powered and the video clock becomes active. In this implementation, the LCD 113C includes multiple power planes ("panels"). For reliability reasons, in a powering up or powering down operation, these panels in the LCD display are preferably powered in a predetermined sequence specified by the manufacturer.

Maximum power is conserved in the display subsystem 113 when video controller 113A enters the "suspend" mode. The suspend mode can be entered either by asserting a signal from the system controller 129 on the SUSPEND pin of video controller 113A, or under firmware control. In this implementation, if the suspend mode is entered from the SUSPEND pin, the CPU 112 is prevented from accessing the video RAM 113B and video bus 113D. In that state, the contents of configuration registers in the video controller 113A are saved, to be restored when suspend mode is exited. In the suspend mode, the video RAM 113B is refreshed using the lowest possible refresh clock rate.

4. General Description of Operation

Figure 6:
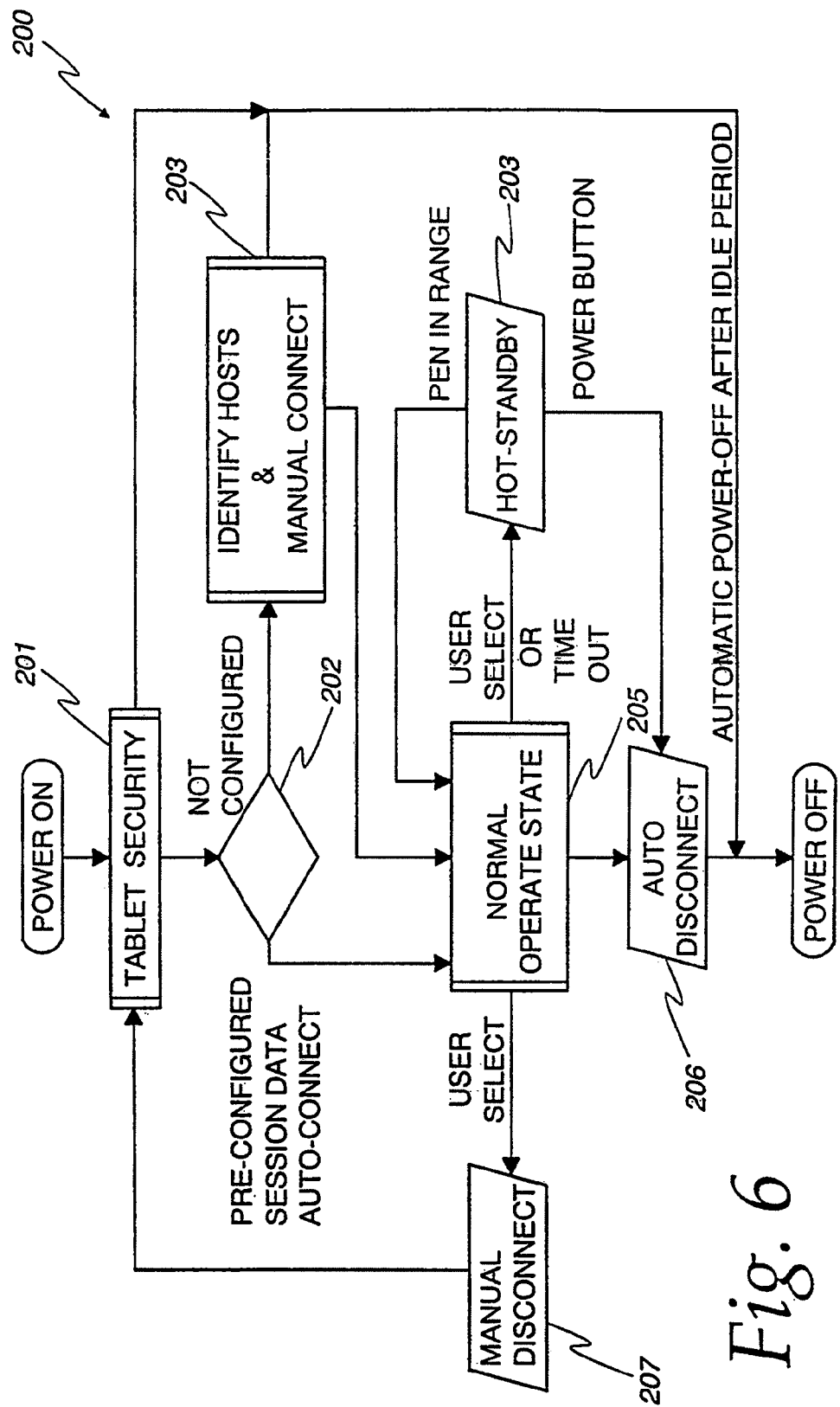
FIG. 6 is a block diagram illustrating the operational states of the wireless interface device under the control of dedicated Viewer Manager software in accordance with the present invention.

FIG. 6 is a block diagram illustrating the operational states of wireless interface device 100 under the control of the Viewer Manager software 200. As shown in FIG. 6, on power up, the wireless interface device 100 enters into a "TABLET SECURITY" state 201, in which an optional security step is performed. In the state 201, either the device 100 automatically shuts off after an idle period or the user performs a "log on" procedure which, as a security measure, identifies and validates the user. Then, at decision point 202, the Viewer Manager software 200 then determines if a procedure to set up a communication link is preconfigured. If so, a communication link is established automatically with the host computer 101 and the Viewer Manager software 200 goes into the normal operation state 205, which is described in further detail below. If a communication link is not preconfigured, a manual procedure is performed in state 203, in which the desired host computer 101 is identified and connected. From state 203, either the device 100 automatically shuts off after an idle period or the user continues on and enters normal operation state 205.

In normal operation state 205, the wireless interface device 100 controls the program running in the host computer 101, in accordance with the input data received from stylus input subsystem 110. The positions of the stylus in stylus input subsystem 110 are delivered to the host computer 101, which generates display commands to the wireless interface device 100. The CPU 112 executes the display commands received, which may result in an update of the LCD 113C. In this embodiment, either a direct user command or inactivity over a predetermined time period causes the wireless interface device 100 to enter a "HOT-STANDBY" minimum power state ("sleep" mode), represented in FIG. 6 by block 204. In the minimum power state 204, to preserve battery power, the various operations of the wireless interface device 100's functional units are placed on standby status. If the status is put in contact with the digitizer panel, the wireless interface device 100 is reactivated, and control of the host computer 101 is resumed by re-entering state 205. Thereupon, wireless interface device 100 enters into a state 206, in which an auto-disconnect procedure is executed, which releases control of the host computer 101 and powers down the wireless interface device 100.

The user may also relinquish control of the host computer 101 from state 205 by selecting a manual disconnect function. When the manual disconnect function is selected, the wireless interface device 100 enters manual disconnect state 207, in which the connection to the host computer 101 is terminated. The wireless interface device 100 is then returned to state 201 to accept the next user validation.

Figure 7:
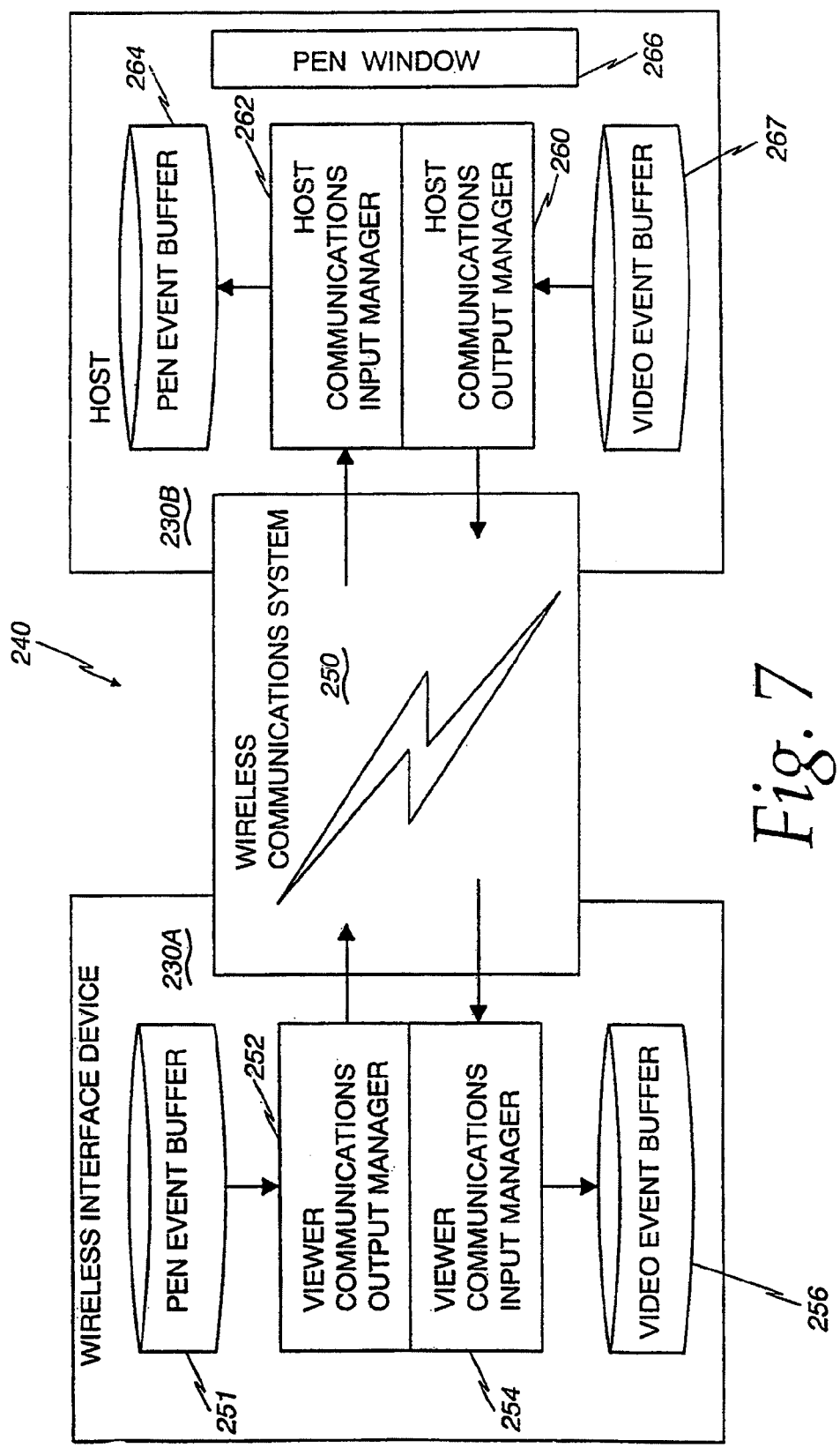
FIG. 7 is a block diagram of the software environment under which the wireless interface device and the host computer operate to provide remote control of the host computer.

FIG. 7 is a block diagram of the software environment 240 in which the wireless interface device 100 and the host computer 101 operate to provide the wireless interface device 100 remote control of the host computer 101. As shown in FIG. 7, a wireless communication system 250 is provided for communication between the host computer 101 and the wireless interface device 100. On the side of the wireless interface device 100, i.e. software environment 230A, a communication output manager software routine 252 controls transmissions of pen events over the wireless communication link 250 to a host communication input manager 262 in the host computer 101 (i.e. software environment 230B). The pen events include the position information of the stylus and tip-up and tip-down information. A pen event buffer 251 queues the pen events for transmission through a communications manager 252. In the software environment 230A, the communications input manager 254 receives from the wireless communication system 250 video events transmitted by host communication output manager 260 in the software environment 230B. These video events include graphical commands for controlling the LCD 113C. In the software environment 230A, the received video commands are queued in the video event buffer 256 to be processed by the CPU 112 as graphical instructions to the LCD 113C.

In the software environment 230B, i.e. in host computer 101, pen events are queued in pen event buffer 264, which may then be provided to the Pen Windows module 266. The Pen Windows module 266 processes the pen events and creates video events in a video event buffer 267, which is then transmitted to the wireless interface device 100 over wireless communication system 250.

Figure 8:
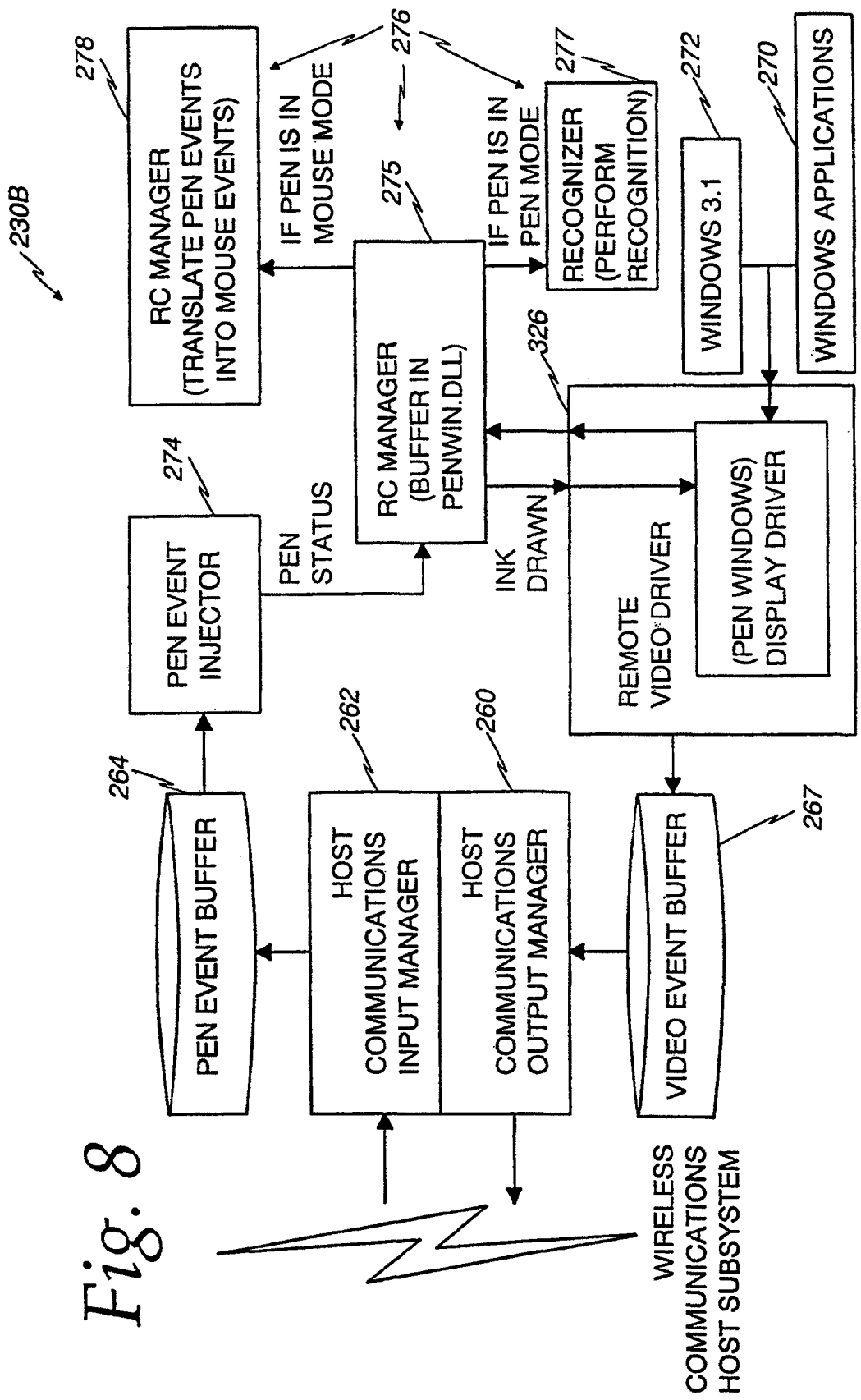
FIG. 8 is a block diagram which shows in further detail the software environment in the host computer, running an application program under a Windows environment.

FIG. 8 is a block diagram which shows in further detail the software environment 230B (FIG. 7) in the host computer 101; running an application program 270 under a Windows operating system 272. As shown in FIG. 8, the pen events queued in the pen event buffer 264 are provided to a pen event injector 274, which provides the pen events from the pen event buffer 264, one pen event at a time, to a buffer ("RC buffer") 275 of the Recognition Context Manager module (the "RC manager") 276 in Pen Windows. The RC buffer 275 holds a maximum of four pen events. The RC Manager 276 assumes that pen events are received at RC buffer 275 as they occur. Thus, if the Pen Windows system is presented with pen events faster than they are retrieved from RC buffer 275 without pen event injector 274, the pen events that arrive at RC buffer 275 when it is full are lost. The pen event injector 274 prevents such data loss. To provide this capability, the pen event injector 274 includes both Windows virtual device (VxD) and device driver (DRV) codes (not shown). The DRV portion removes a single pen event from pen event buffer 264 and delivers it to the RC buffer 275 using the normal Pen Windows add and process pen event mechanisms. Then the VxD portion reactivates the DRV code after a minimum time delay using a virtual machine manager service to retrieve the next pen event from pen event buffer 264. Those of ordinary skill in the art would appreciate that, under the terminology used in Windows, DRV code refers to a dynamically linked library in Windows which interacts with a hardware device (in this case, pen device buffer 264), and VxD code refers to a dynamically lined library which manages a sharable resource (in this case, the DRV code).

The RC Manager 276 examines each pen event in the RC buffer 275, and according to the context of the pen event in its possession, the RC Manager 276 determines whether the stylus is in the pen mode or in the mouse mode. In this embodiment, as will be discussed in more detail below, an icon allows the user to use the stylus as a "mouse" device. The icon, called "mouse button toggle", allows the user to switch between a "left" button and a "right" button as used in an industry standard mouse device. The selected button is deemed depressed when the stylus makes contact with the pressure-sensitive digitizer panel. A rapid succession of two contacts with the display is read by the RC Manager 276 as a "double click", and dragging the stylus along the surface of the display is read by the RC Manager 276 as the familiar operation of dragging the mouse device with the selected button depressed.

If the stylus is in the pen mode, the RC Manager 276 provides the pen event to a recognizer 277 to interpret the "gesture". Alternatively, if the pen event is a mouse event, the RC Manager 276 provides the pen event as a mouse event for further processing in a module 278. The interpreted gestures or mouse events are further processed as input data to the Windows operating system 272 or the application program 270.

The output data from an application program, such as Windows 272 or application program 270, is provided to the video event buffer 267. These video events are transmitted to the host communications output manager 260 for transmission to the wireless interface device 100.

Figure 9:
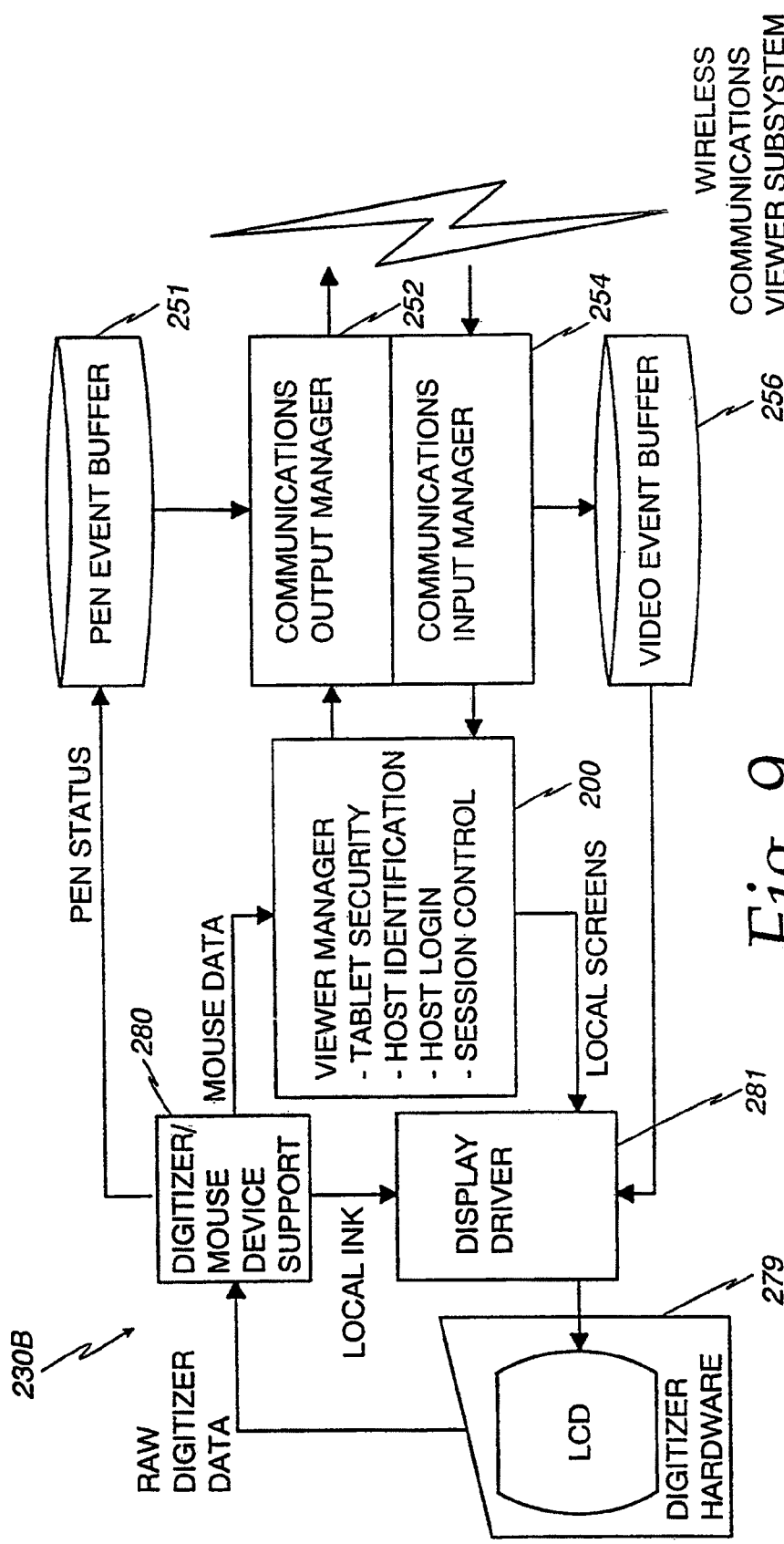
FIG. 9 is a block diagram which shows in further detail the software environment in the wireless interface device, running in a normal operation state.

FIG. 9 is a block diagram which shows in further detail the software environment 230A in the wireless interface device 100 in the normal operation state 205 of the Viewer Manager 200. In FIG. 9, the stylus in the stylus input subsystem 110 and LCD video display 113C in the video display subsystem 113 are shown collectively as a digitizer-display device 279. In a normal operation state 205, the Viewer Manager 200 interacts with the application program 270 in the wireless interface device 100 by way of the Communications Output Manager 252 and the Communications Input Manager software 254. In addition, the Viewer Manager software 200 also receives digitized data from a digitizer 280, which, in turn, receives digitized data from stylus input subsystem 110. The Viewer Manager software 200 uses the digitized data to provide visual feedback to the user, which is discussed in further detail below. The Viewer Manager software 200 generates local video commands to a display driver 281. The display driver 281 also receives from video event buffer 256 video display commands from the host computer system 101.

At the core of the wireless interface device 100's user interface is the stylus's behavior under Pen Windows. Of significance in wireless interface device 100's design is the emulation of the natural "pen-and-shaper" interaction with the user. That is, in a pen mode, the stylus must leave ink as it moves across the surface of the screen in the same way that a pen leaves ink on paper. However, using Pen Windows software, the RC Manager 276, residing in the host computer 101, determines for each pen event whether the mouse or the pen mode is used.

If the wireless interface device 100 simplistically accesses the host computer 101 as a local device access, the wireless link between the host computer 101 and the wireless interface device 100 would be required to carry a minimum of 200 inking messages per second (100 stylus tip locations plus 100 line drawing commands). To maintain the pen-and-paper emulation, the wireless interface device 100 is further required to have a total processing delay (hence response time), including the overhead of the communication protocols, which is near or below the human perception level. In addition, noise in the transmission medium often leads to momentarily interruption of data transmission, or results in data corruption that requires re-transmission, thereby further reducing the throughput of the wireless link. To provide an acceptable level of performance, i.e., a high message-per-second communication rate and an acceptable propagation delay, a technique referred to as "local inking" is developed and applied to the wireless interface device 100's design, in accordance with the present invention. Without local inking, a high bandwidth communication link is required to meet the propagation delay requirement. Such a high bandwidth communication link is impractical, both in terms of cost and its impact on the portability of the resulting wireless access device.

With local inking, the Viewer Manager software 200 provides inking on the LCD 113C locally before the corresponding inking video events are received from the host computer 101. In this manner, visual feedback is provided virtually immediately without requiring either highly complex networking equipment, or very high performance and costly components in both the wireless interface device 100 and the host computer 101. Local inking provides both a real time response and an orderly handling of the stylus's data stream. Since local inking reduces the need for processing at the peak pen event rate of the stylus's data stream, the host computer 101 can thus apply normal buffering techniques, thereby reducing the bandwidth requirement on the communication network.

In one proposed industry standard for a stylus or pen-based system, namely the Microsoft Windows for Pen Computing system ("Pen Windows"), the pen mode requires (i) a pen driver that can deliver stylus tip locations every five to ten milliseconds (100 to 200 times per second), so as to achieve a resolution of two hundred dots per inch (200 dpi), and (ii) a display driver than can connect these dots in a timely manner. By these requirements, Pen Windows attempts to provide a real time response to maintain the pen paradigm. The Windows for Pen Computing system is promoted by Microsoft Corporation, Redmond, Wash. Details of the Pen Windows system are also provided in Windows version 3.1 Software Developer Kit obtainable from Microsoft Corporation. Under one implementation of the Pen Windows, a maximum of four stylus locations can be stored in a buffer of a module called "PENWIN.DLL" (for "Pen Window Dynamically Linked Library"). Consequently, in that implementation, the maximum latency allowed is twenty to forty milliseconds before any queue 15 tip location is written. Each time the system fails to process a pen event within twenty to forty milliseconds of queuing, a stylus tip location is lost and there is a corresponding impact on the accuracy of the line being traced.

As mentioned above, the stylus is used in both pen mode and mouse mode. Since the RC Manager 276, running on the host computer 101, rather than a software module on the wireless interface device 100, determines whether a given pen event is a mouse mode event or a pen mode event, the Viewer Manager software 200 must anticipate which of these modes is applicable for that pen event. Further, should the anticipated mode prove to be incorrect, the Viewer Manager software 200 is required to correct the incorrectly inked image in video display subsystem 113.

FIG. 10 illustrates the method used in the wireless interface device 100 to anticipate the RC Manager 276's mode decision and to correct the image in the video display subsystem 113 when a local inking error occurs. As shown in FIG. 10, when the normal operational state 205 is entered, a pen control program (represented by the state diagram 282) in the Viewer Manager software 200 is initially in the mouse mode in state 283. However, even in the mouse mode, the trajectory of the stylus in contact With the pen digitizer is stored in the pen event buffer 284 until a mode message is received from the host computer 101. The pen event buffer 284 is separate from pen event buffer 251, which is used to transmit the pen events to the host computer 101. If the RC Manager 276 confirms that the stylus 110 is in a mouse mode, the accumulated pen events are discarded and the pen control program 282 waits for the last point, on which the pen tip is in contact with the pen digitizer. Then the pen control program 282 returns to a state 283, in which the trajectory of the pen is again accumulated in the pen event buffer 284 until receipt of a mode message from the host computer 101. In state 283, the control program 282 assumes that the stylus will continue to be in the mouse mode.

Alternatively, while in state 283, if a mode message is received indicating the stylus is in the pen mode, the control program 282 enters state 288, in which the accumulated pen events are drawn locally onto the LCD screen of the video display subsystem 113 in accordance with the line style and color specified in the mode message. After all accumulated pen events in the pen event buffer 284 are drawn, the control program 282 enters a state 289, in which control program 282 continues to ink the trajectory of the tip of the stylus for as long as contact with the pen digitizer is maintained. Once the tip of the stylus breaks contact with the pen digitizer, the control program 282 enters state 287.

In state 287 the control program 282 assumes that the stylus will continue to be in the pen mode. Thus, local ink will follow the trajectory of the stylus while the top of the stylus remains in contact with the pen digitizer, or until a mode message is received from the host computer 101, whichever arrives earlier. Since the initial policy decision is a guess, the local inking is drawn using a single pixel-wide style and an XOR ("exclusive OR") operation, in which the pixels along the trajectory of the stylus are inverted. While in state 287, the pen events associated with the trajectory of the stylus are accumulated in the pen event buffer 284.

If the mode message received in state 287 indicates that the stylus is in mouse mode, i.e. the policy decision was wrong, the control program 282 then enters a state 290, in which the accumulated pen events in pen event buffer 284 are used to erase the stylus stroke. Since the initial draw is accomplished by a bit XOR ("exclusive OR") operation at the appropriate positions of the frame buffer, erasure is simply provided by the same XOR operation at the same positions of the frame buffer. The control program 282 then enters state 286. However, if the mode message received in state 287 confirms that the stylus is in pen mode, the accumulated pen events of pen event buffer 284 are used to redraw on the LCD 113C, using the line style and color specified on the mode message.

Under a convention of the Pen Windows software, starting a stroke of the stylus with the barrel button depressed (for active stylus systems) indicates an erase ink operation in pen mode. The control program 282 recognizes this convention and refrains from inking during this stroke without waiting for confirmation from the host computer 101. In addition, the control program 282 does not change modes across an erasing stroke: i.e., if the stylus is in the pen mode prior to the erase stroke, the stylus remains in the pen mode after the erase stroke; conversely, if the stylus is in the mouse mode prior to the erase stroke, the stylus remains in the mouse mode after the erase stroke.

Since all the pen events used in local inking on the wireless interface device 100 are also processed in the host computer 101, the trajectory of local inking must coincide identically with the line drawn at the host computer 101. Because of local inking, processing by the host computer 101 within the human perceptual response time is rendered unnecessary. Thus, in the host computer 101, the pen events can be queued at pen event buffer 264, to be retrieved one at a time by pen event injector 274. Hence, when pen event buffer 264 is suitably sized, data loss due to overflow by RC buffer 275 is prevented.

Alternatively, 'the control program 282 can also be implemented to follow a "retractable ball-point pen" paradigm. Under this paradigm, the user controls a local stylus mode of the stylus, such that inking occurs when the stylus is set to be in the local pen mode, and no inking occurs when the stylus is in the local mouse mode. If the local stylus mode conforms with the mode expected by Pen Windows, the image seen on the LCD display of the video display subsystem 113 is the same as described above with respect to state 287 of the control program 282. If the local stylus mode is the mouse mode, and Pen Windows software expects stylus 110 to be in the pen mode, the 20 subsequent video events from host computer 101 would provide the required inking. Finally, if the local stylus mode is the pen mode and Pen Windows software expects the stylus to be in the mouse mode, inking would be left on the screen of video display subsystem 113. Under this paradigm, the user would eliminate the erroneous inking by issuing a redraw command to Pen Windows.

5. Detailed Description of the Schematic Diagrams

Figure 11B:
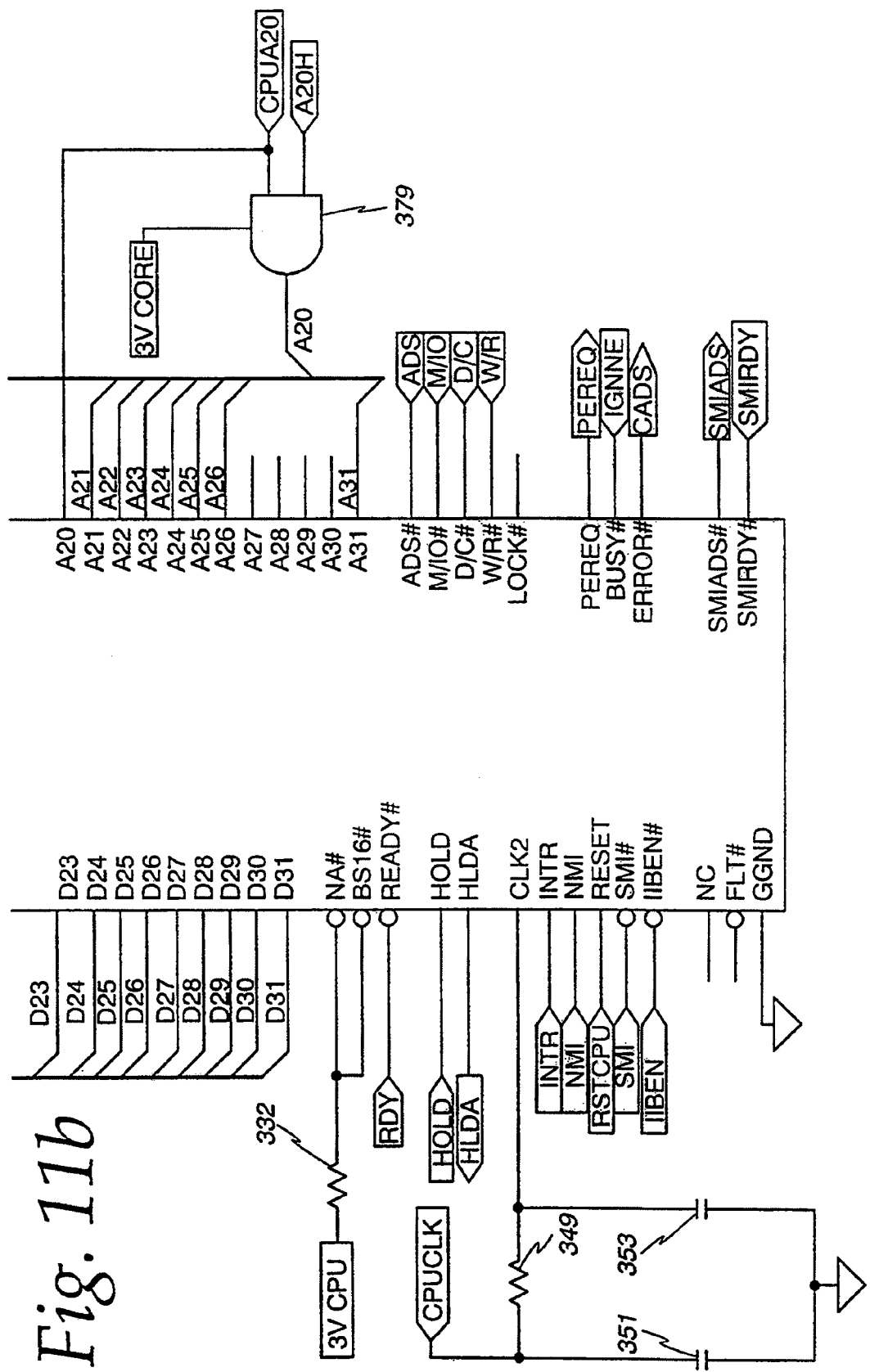
Figure 12A:
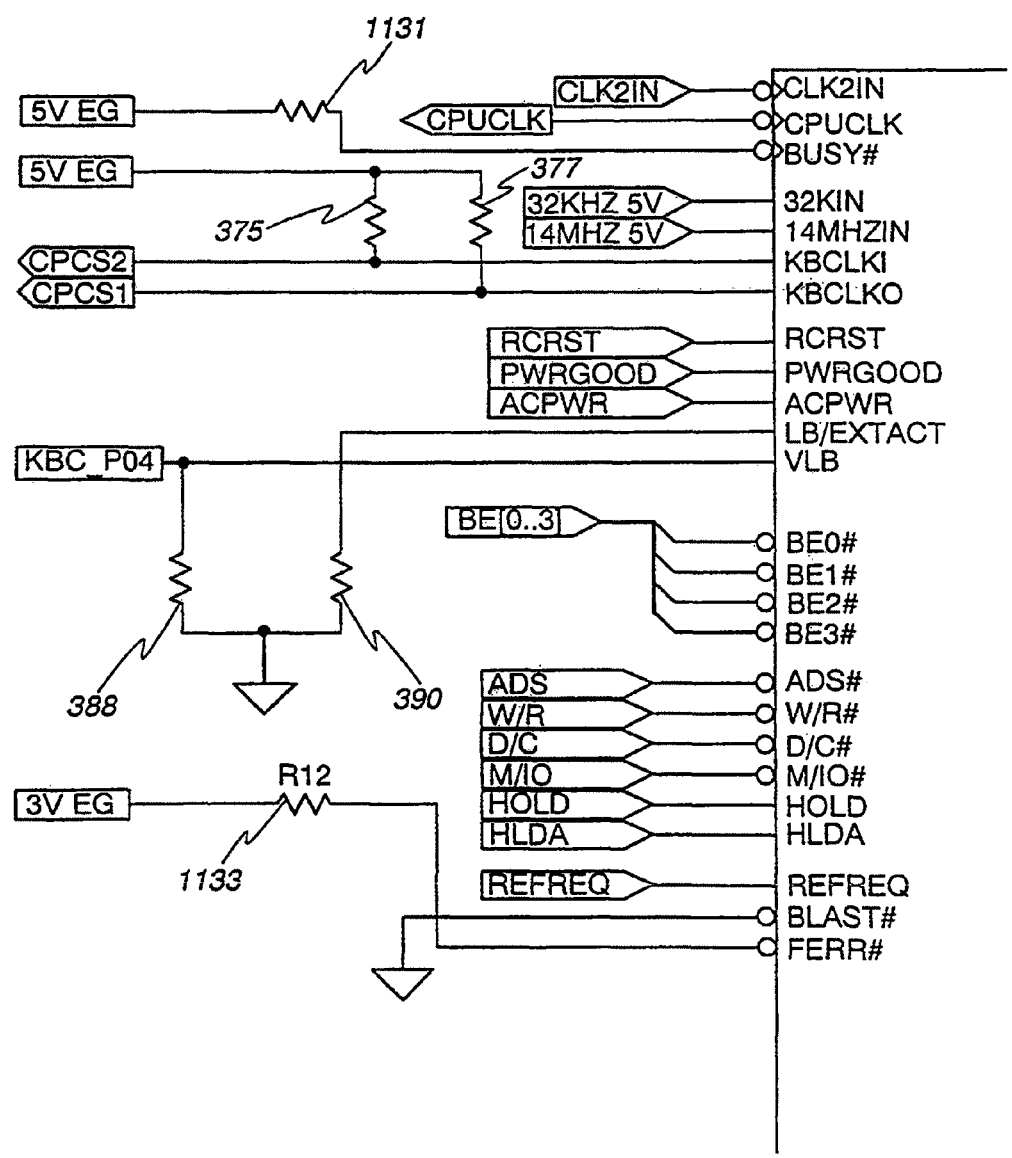
Figure 12B:
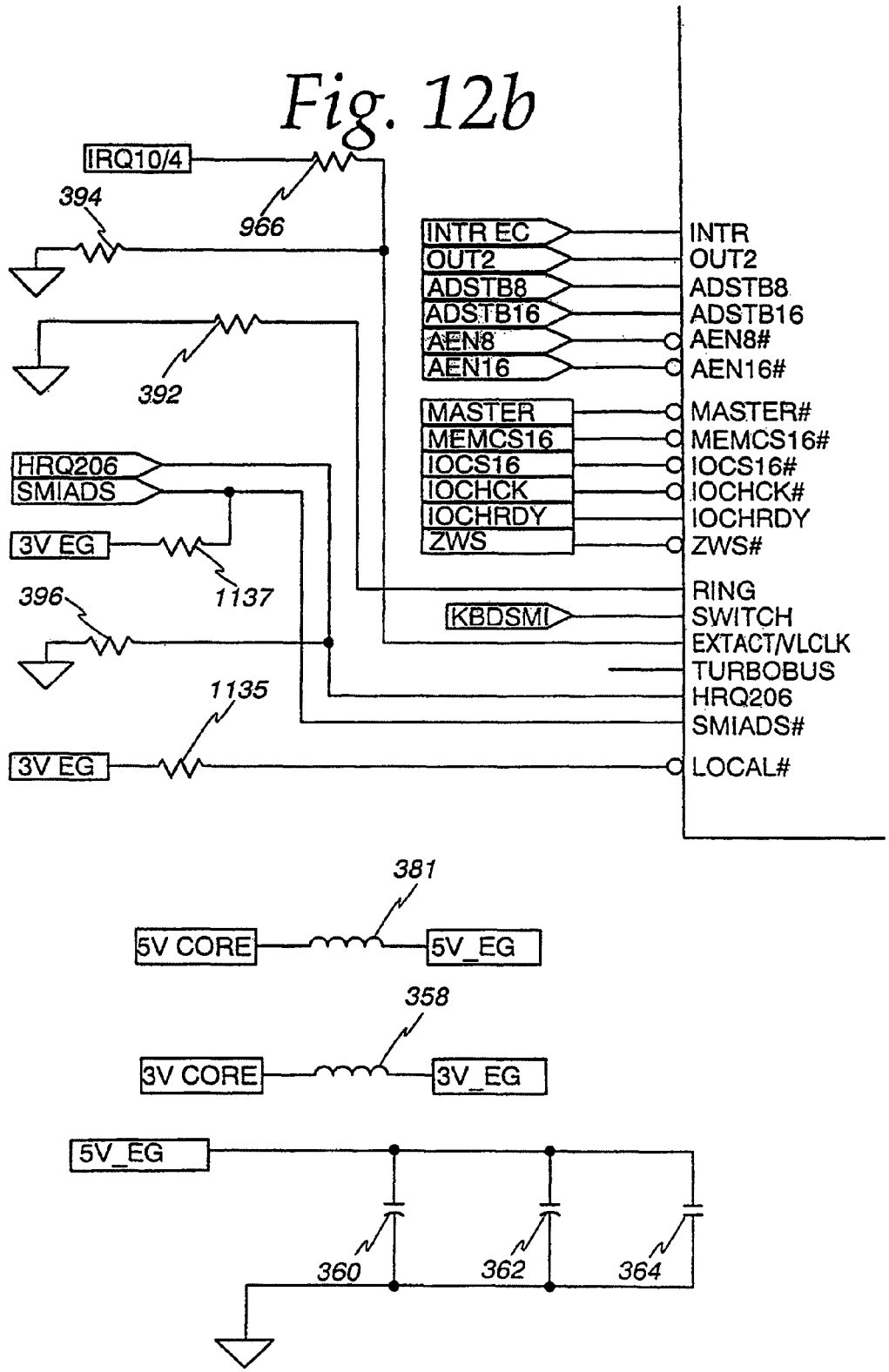
Figure 12C:
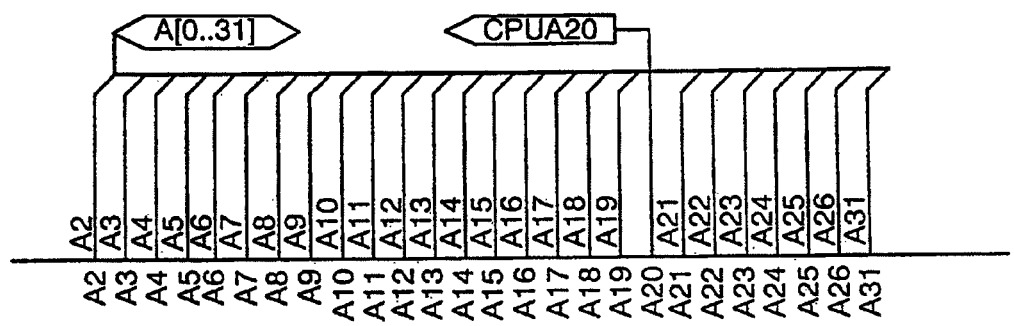
Figure 12D:
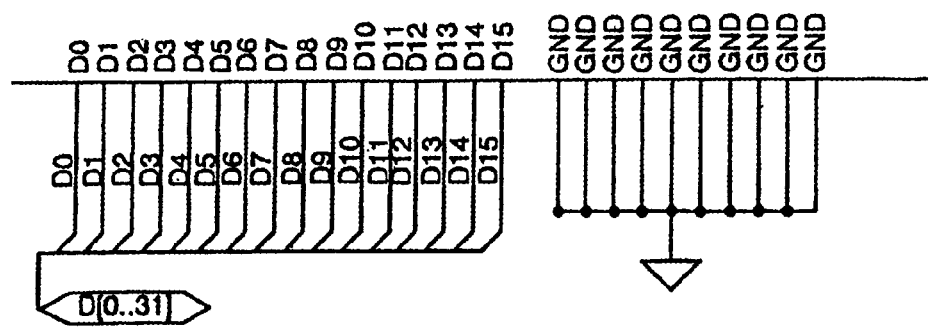
Figure 12E:
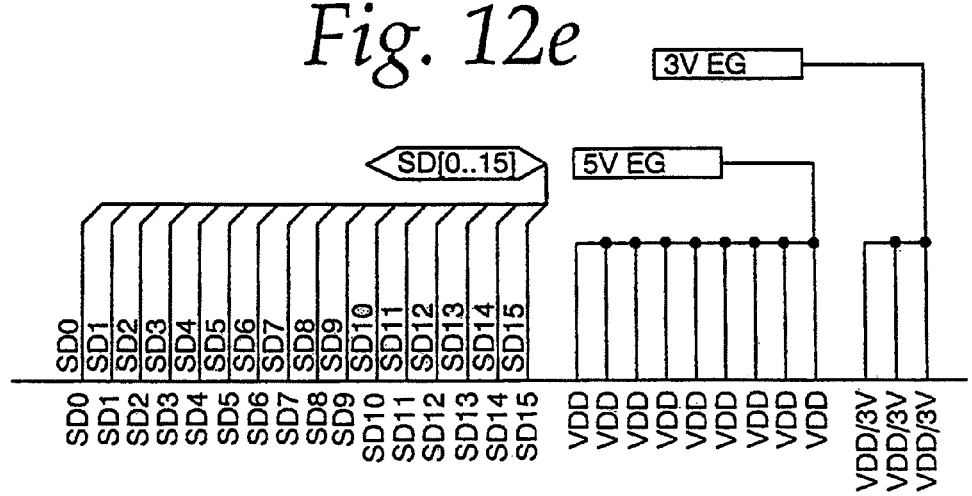
Figure 12F:
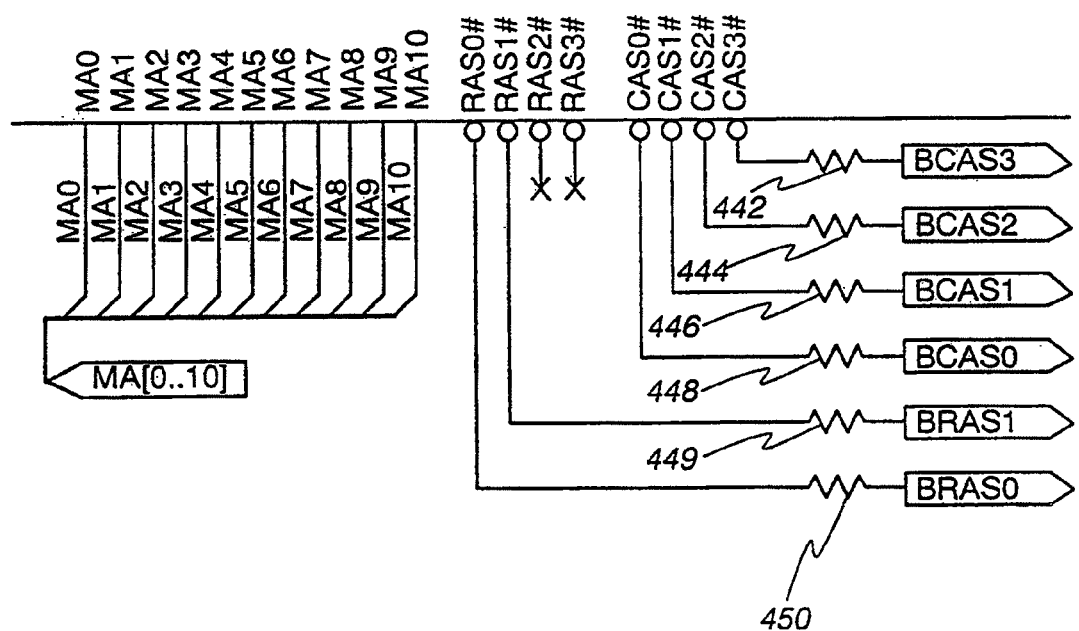
Figure 12G:
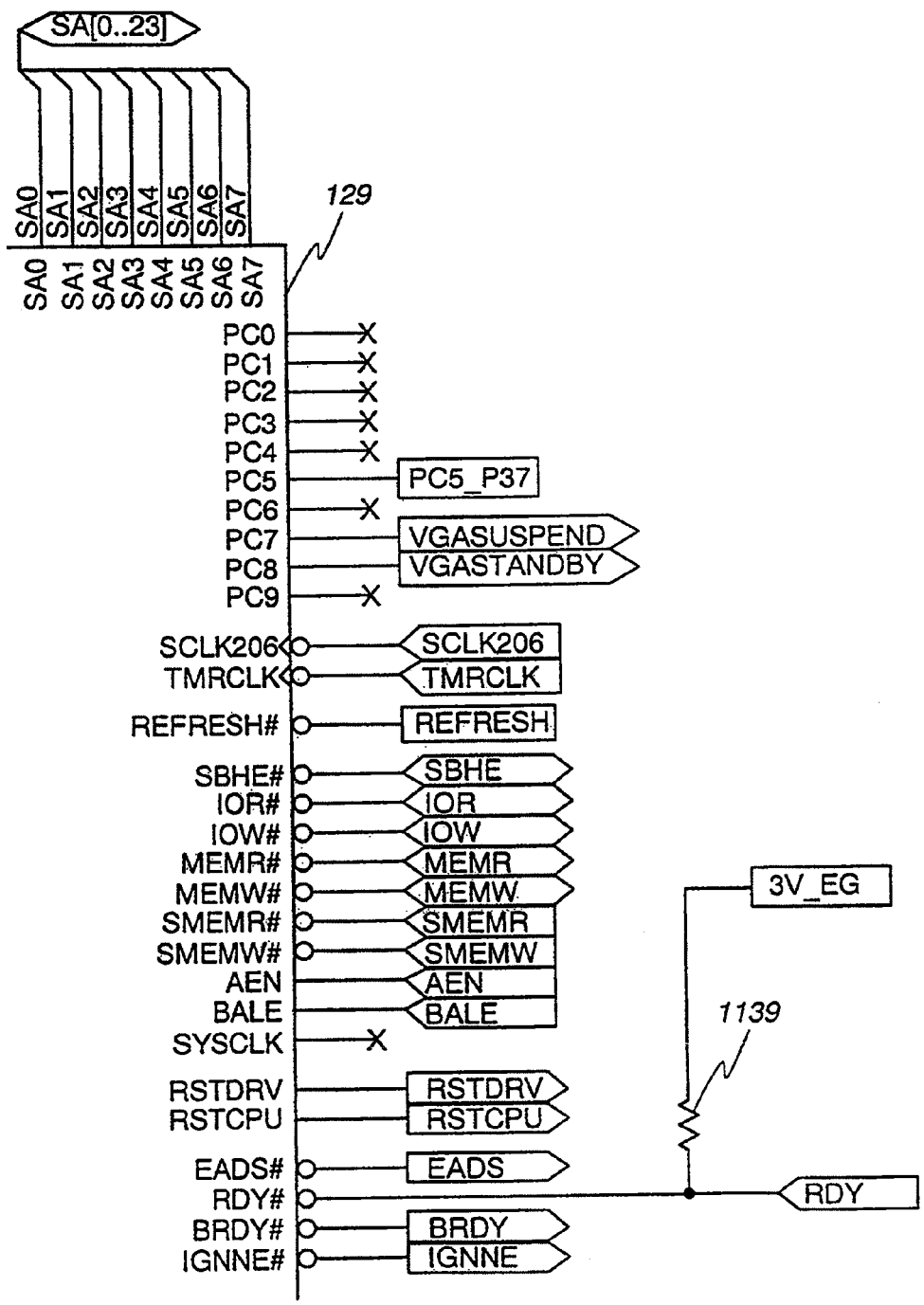
Figure 12H:
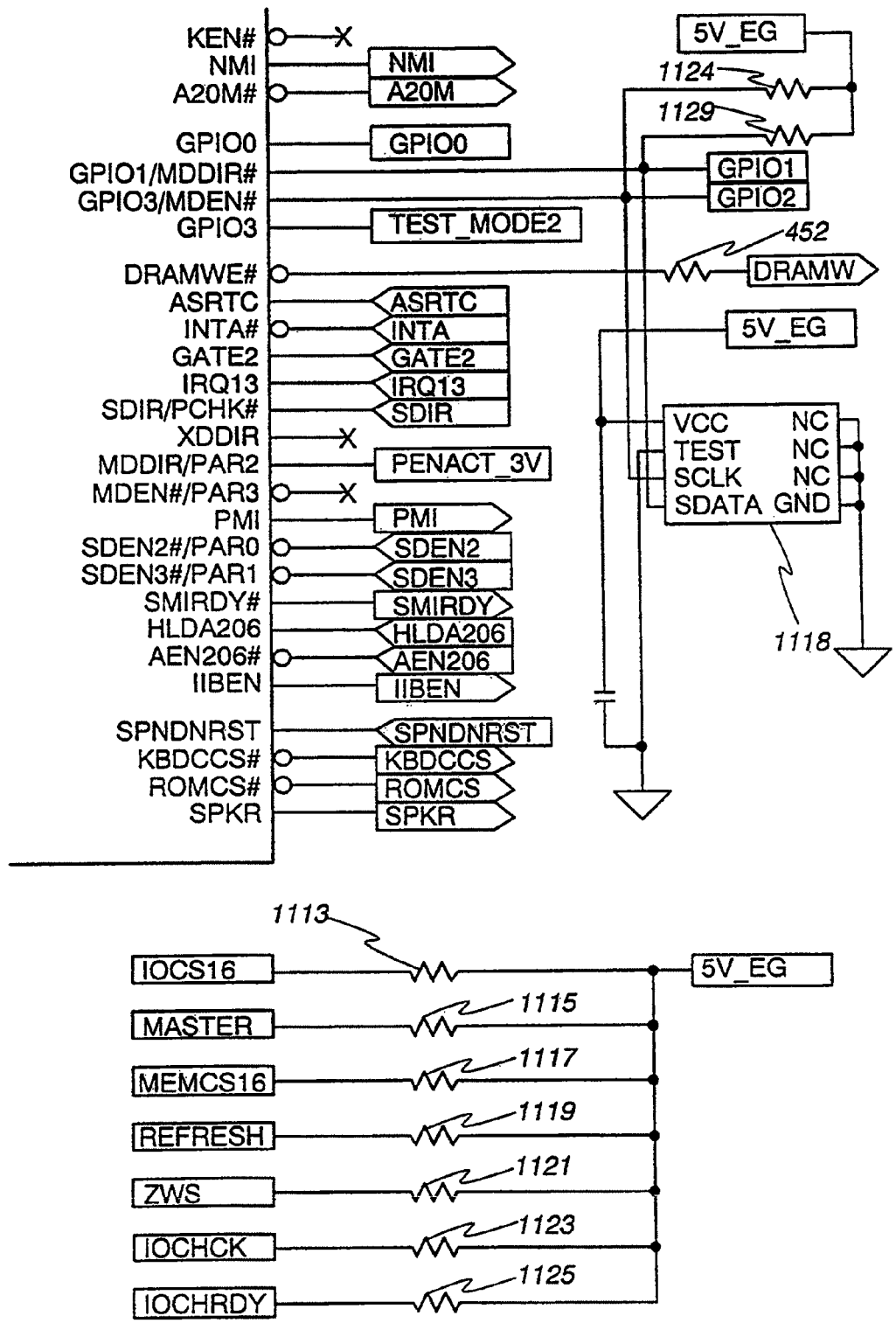

One embodiment of the invention is illustrated in the schematic drawings, FIGS. 11-30. Referring to FIG. 11, the system may include a CPU 112, such as an AMD Model No. AM386DXLV microprocessor. The CPU 112 includes a 32-bit data bus D[0 . . . 31] as well as a 32-bit address bus A [2 . . . 31]. Both the data bus D[0 . . . 31] as well as the address bus A[2 . . . 31] are connected to the processor bus 150 (FIG. 4), for example, an AT bus. As will be discussed in more detail below, the system controller 129 (FIG. 4) performs various functions including management of the processor bus 150. In order to conserve power, a 3-volt microprocessor may be used for the CPU 112. As such, a 3-volt supply 3V CPU is applied to the power supply VCC pins on the CPU 112. The 3-volt supply 3V_CPU is available from a DC-to-DC converter 300 (FIG. 26) by way of a ferrite bead inductor 302. In particular, the DC-to-DC converter 300 includes a 3-volt output, 3V_CORE. This output, 3V_CORE, is applied to the ferrite bead inductor 302 and, in turn, to the power supply pins VCC of the CPU 112. In order to prevent noise and fluctuations in the power supply voltage from affecting the operation of the CPU 112, the power supply voltage 3V CPU is filtered by a plurality of bypass capacitors 304 through 330.

The 3-volt supply 3V_CPU is also used to disable unused inputs as well as to pull various control pins high for proper operation. For example, the 3-volt power supply 3V_CPU is applied to the active low N/A and BS16 pins of the CPU 112 by way of a pull-up resistor 332. In addition, the signals BE [0 . . . 3], W/R, D/C, M/IO and ADS are pulled up by a plurality of pull-up resistors 334 through 348.

The CPU 112 is adapted to operate at 25 megahertz (MHz) at 3.0 volts. A 25 MHz clock signal, identified as CPU CLK, available from a clock generator 398 (FIG. 13), is applied to a clock input CLK2 on the CPU 112 by way of a resistor 349 and a pair of capacitors 351 and 353. The AMD Model No. AMD386DXLV microprocessor supports a static state, which enables the clock to be halted and restarted at any time.

Figure 15A:
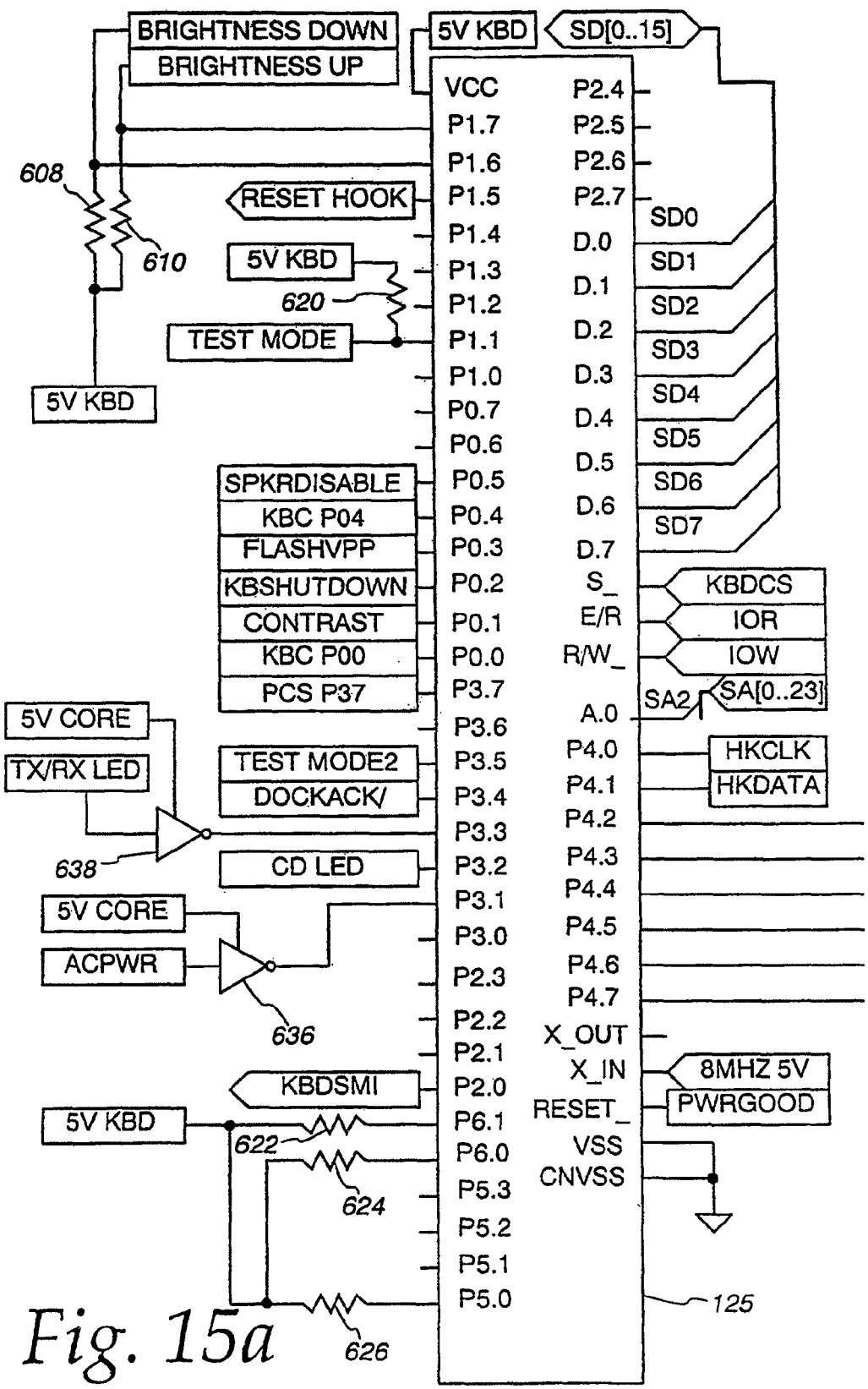

The wireless interface device 100 includes a speaker 355. The speaker 355 is under the control of the system controller 129 (FIG. 12). In particular, a speaker control signal SPKR from the system controller 129 is applied to a source terminal of a field-effect transistor (FET) 357 for direct control of the speaker 355. The drain terminal is connected to the speaker 355 by way of a current-limiting resistor 359 and a bypass capacitor 371. Normally, the speaker 355 is active all the time. In particular, the gate terminal of the FET 357 is connected to the system ground by way of a resistor 373. The gate terminal of the FET 357 is also under the control of a speaker disable signal SPKRDISABLE, available from the keyboard controller 125 (FIG. 15). The speaker disable signal SPKRDISABLE is active high. Thus, when the speaker disable signal SPKRDISABLE signal is low, the FET 357 is turned on to enable the speaker signal SPKR from the system controller 129 to control the speaker 355. When the speaker disable signal SPKRDISABLE is high, the FET 357 is turned off to disable the speaker 355.

Referring to FIG. 12, the system controller 129 is connected between the local processor or AT bus 150 and the system ISA bus 151. The system controller 129 performs a variety of functions including that of system controller, DRAM controller, power management, battery management and management of the local AT bus 150. The system controller 129, preferably a PicoPower Pine Evergreen 3, Model No. 86C368 system controller, is a 208-pin device that operates at 33 MHz with a full 5-volt input or a hybrid 5-volt/3.3-volt input. At 3.3 volts the system controller 129 is adapted to reliably operate at 20 Mhz and perhaps up to 25 Mhz.

The system controller 129 includes several system features including support of several clock speeds from 16 to 33 MHz. In addition, the system controller 129 includes two programmable non-cacheable regions and two programmable chip selects, used for universal asynchronous receiver transmitter (UART) interface 134 and the radio interface 114B as discussed below.

The system controller 129 supports both fast GATE A20 and a fast reset control of the CPU 112. In particular, the system controller 129 includes a 32-bit address bus A[0 . . . 31] that is connected to the local AT bus 150. The address line A[20] is used to develop a signal CPUA20, which is applied to the A20 pin on the CPU 112 and also applied to an AND gate 379 (FIG. 11) to support a port 92H for a fast GATE A20 signal. A fast reset signal RSTCPU is also generated by the system controller 129. The fast reset signal RSTCPU is applied to the reset pin RESET of the CPU 112 for fast reset control.

The system controller 129 also provides various other system level functions. For example, the system controller 129 includes a register at address 300H. By setting bit 12 of this register, a ROM chip select signal ROMCS is generated, which enables writes to the flash memory system 117 (FIG. 25), which will be discussed below. A keyboard controller chip select signal KBDCS for the keyboard controller 125 (FIG. 15), as well as general purpose chip select signals GPCS1 and GPCS2 for selecting between the RF controller 114A, the UART 134 (FIG. 16) or the pen controller 110A (FIG. 21), are generated by the system controller 129.

The system controller 129 is connected to the system ISA bus 151 by way of a 16-bit system data bus SD[0 . . . 15] and a 24-bit system address bus SA[0 . . . 23] of which only 8-bits SA[0 . . . 7] are used. The system controller 129 is also connected to the 32-bit local processor data bus D[0 . . . 31], as well as the local processor address bus A[0 . . . 31].

All of the ground pins GND on the system controller 129 are tied to the system ground. Both 3-volt and 5-volt power supplies are applied to the system controller 129. In particular, a 5-volt supply 5V_EG is applied to the power supply pins VDD of the system controller 129. The 5-volt supply 5V_EG is available from DC-to-DC converter 300 (FIG. 26) by way of a ferrite bead inductor 381 (FIG. 12). More particularly, a 5-volt supply signal 5V_CORE from the DC-to-DC converter is applied to the ferrite bead inductor 381, which, in turn, is used to generate the 5-volt supply signal 5V_EG. In order to stabilize the 5-volt supply signal 5V_EG, a plurality of bypass capacitors 1101-1111 (FIG. 13) are connected between the 5-volt supply 5V_EG and system ground.

A 3-volt power supply 3V_EG is also applied to the system controller 129 and, in particular, to the power supply pins VDD/3V. This 3-volt supply 3V_EG is also obtained from the DC-to-DC converter 300 (FIG. 26) by way of a ferrite bead inductor 358. More particularly, 3-volt supply 3V CORE, available at the DC-to-DC converter 300, is applied to the ferrite bead inductor 358, which, in turn, is used to generate the 3-volt power supply signal 3V-EG. A plurality of bypass capacitors 360, 362 and 364 are connected between the 3-volt supply 3V_EG and system ground for stabilizing.

The system controller 129 is reset by a reset signal RCRST (FIG. 20) on power up. The reset signal RCRST is developed by the 3-volt power supply 3V_EG, available from the DC-to-DC converter 300 (FIG. 26) and circuitry which includes a resistor 359, a capacitor 361 and a diode 363. Initially on power up, the capacitor 361 begins charging up from the 3-volt supply 3V_EG through the resistor 359. During this state, the diode 363 is non-conducting. As the capacitor charges, the level of the reset signal RCRST rises to reset the system controller 129. Should the system be turned off or the 3-volt supply 3V_EG be lost, the diode 363 provides a discharge path for the capacitor 361.

In order to assure proper operation of the system controller 129, a number of signals are pulled up to either five volts or three volts or pulled down by way of various pull-down resistors. More specifically, the signals IOCS16, MASTER, MEMCS16, REFRESH, ZWS, IOCHCK, GPI01/MDDIR and GPIO2/MDEN are pulled up to the 5-volt supply 5V_EG by way of a plurality of pull-up resistors 1113-1129, respectively. Similarly, the signals BUSY, FERR, LOCAL, SMI-ADS and RDY are pulled up by a plurality of pull-up resistors 1131 through 1139. In addition, the general purpose chip select signals GPCS1 and GPCS2 are pulled up to the 5-volt power supply signal 5V_EG by way of a pair of pull-up resistors 375 and 377. Certain signals are pulled low by way of pull-down resistors in order to assure their operating state. In particular, the signals KBC-PO4, LB/EXTACT, RING, EXTACT/VLCLK and HRQ206 are pulled down by the pull-down resistors 388 to 396. The signal BLAST is tied directly to the system ground.

As mentioned above, the system controller 129 is capable of running at different clock frequencies, depending upon the voltage applied, while supplying a clock signal to the CPU 112. Even though the system controller 129 can supply either a 1× or a 2× clock signal to the CPU 112, the system controller 129 requires a 2× clock for proper operation. Thus, a 2× clock signal CLK2IN, available from a clock generator circuit 398 (FIG. 13), is applied to the clock 2× pin CLK2IN of the system controller 129. In addition, 32 kilohertz (KHz) and 14 megahertz (MHz) clock signals are also applied to the system controller 129, available from the clock generator circuit 398, for proper operation. The system controller 129, in turn, provides a CPU clock signal CPUCLK to the CPU 112 and in particular to its clock 2-pin CLK2 by way of a resistor 1141 and the capacitors 1143 and 1145.

Figure 17B:
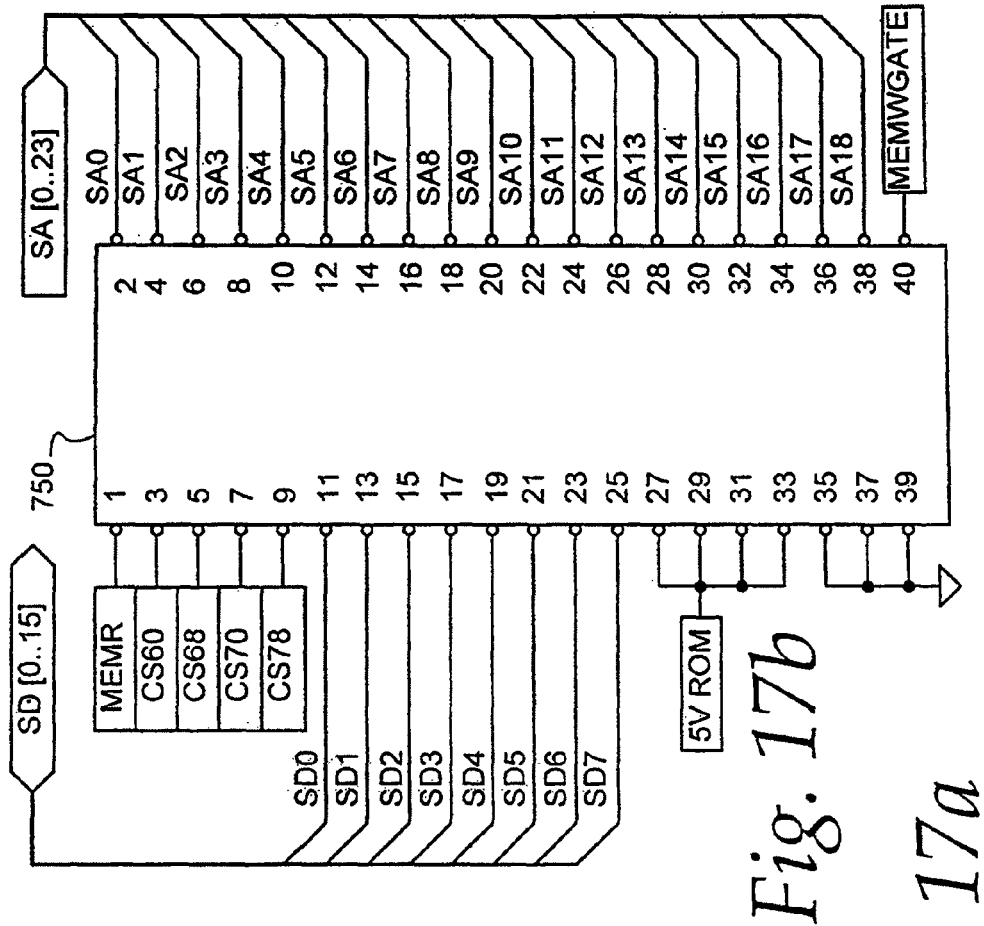
Figure 17A:
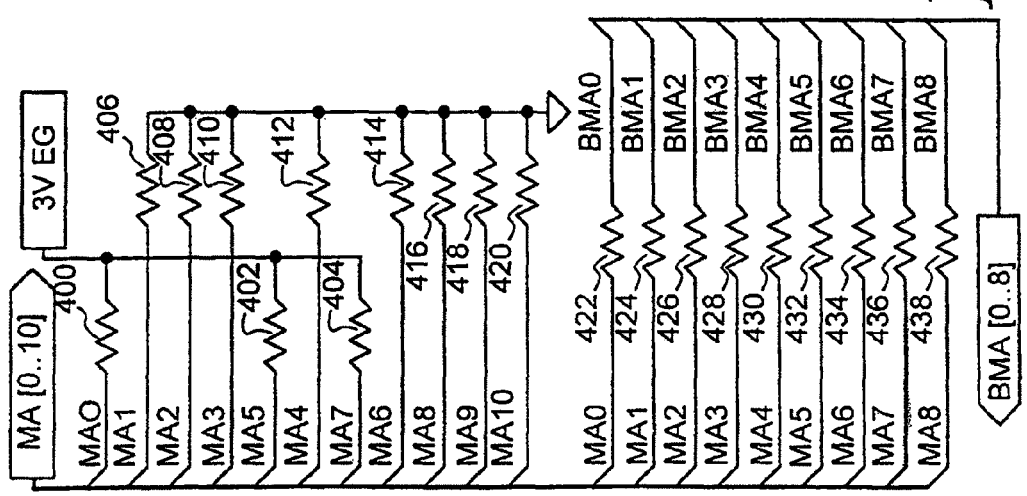

The system controller 129 is adapted to be configured during an RC-RESET mode. In particular, the DRAM memory address lines MA[0 . . . 10], normally used for addressing the DRAM 111A (FIGS. 18 and 24), are pulled high or low in order to configure the system controller 129. More particularly, the DRAM memory address lines MA [0 . . . 10] are applied to either pull-up or pull-down resistors for configuration as illustrated in FIG. 17. Table 2 below illustrates the configuration shown.

TABLE 2

System Controller Configuration Table

| NAME | FUNCTION | DEFAULT STATE |
|---|---|---|
| MA0 | 386 Select (Low = 46) | High |
| MA1 | Low Power Select (High Selects Intel LP CPU, Low For Other) | Low |
| MA2 | 1X CPU Clock Select Low = 2X CPU CLK | Low |
| MA3 | Not Used | Low |
| MA4 | Not Used | Low |
| MA5 | 368 Pin Select (Low = pin compatible with 268) | High |
| MA6 | Miscellaneous Configuration - 0 | Low |
| MA7 | Not Used | High |
| MA8 | Not Used | Low |
| MA9 | Not Used | Low |
| MA10 | Not Used | Low |

As shown, the DRAM memory address lines MA[0 . . . 10] are shown with bits MA0, MA5 and MA7 pulled high to the 3-volt power supply voltage 3V_EG by way of a plurality of pull-up resistors 400, 402 and 404. The remaining DRAM address line bits MA1, MA2, MA3, MA4, MA6, MA8, MA9 and MA10 are pulled low by a plurality of pull-down resistors 406 through 420, respectively. The DRAM memory address lines MA[0 . . . 8] are also coupled to a plurality of coupling resistors 422 to 438 form a 9-bit DRAM address bus BMA [0 . . . 8].

Figure 18A:
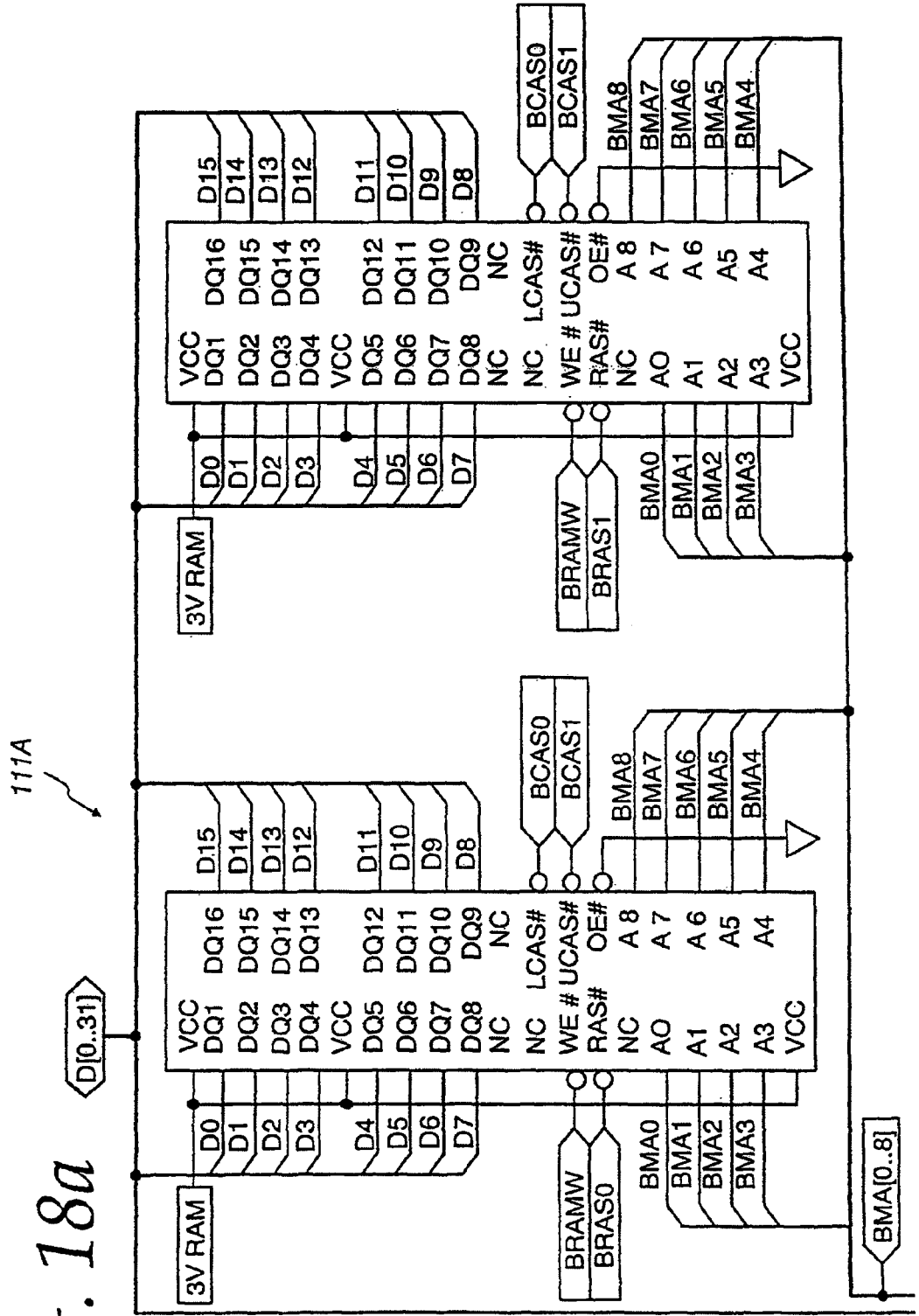
Figures 19P, 19Q:
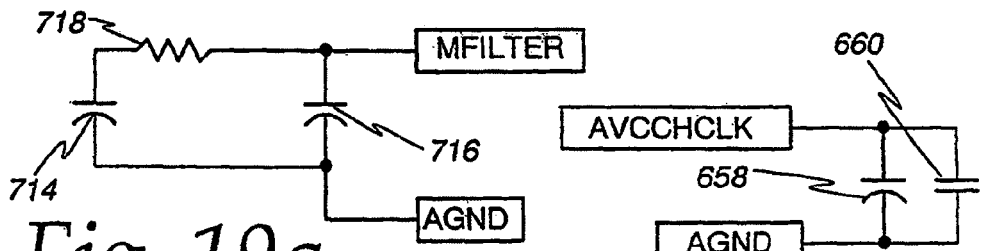
Figure 19R:
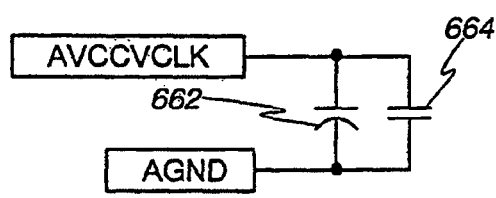
Figure 19A:
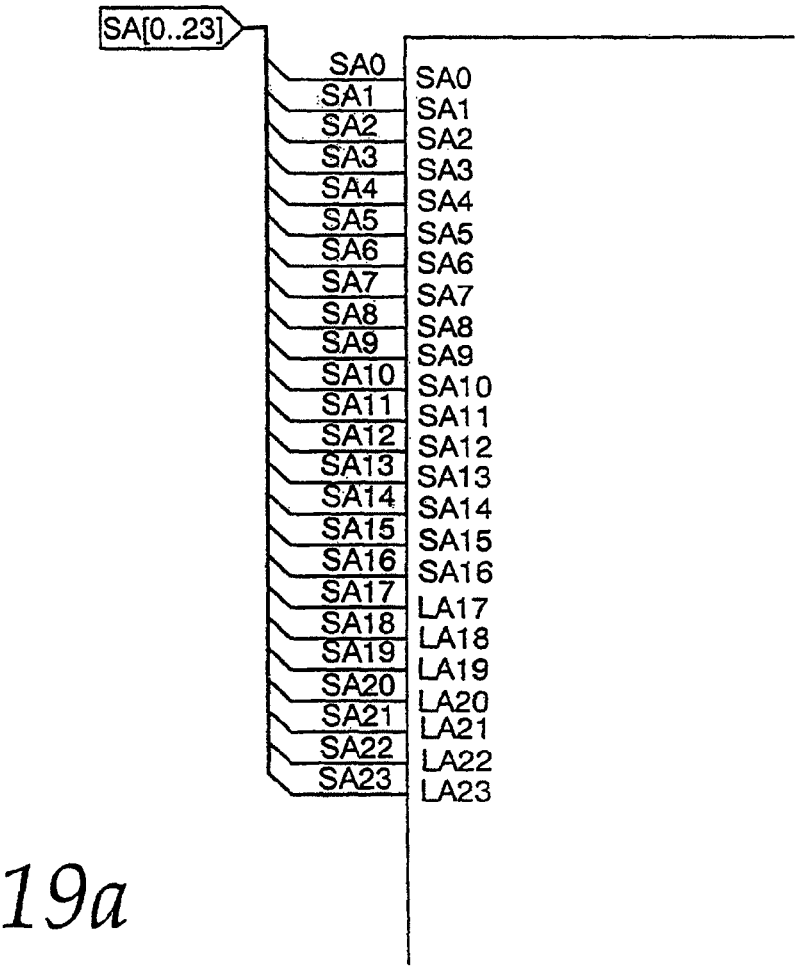
Figure 19C:
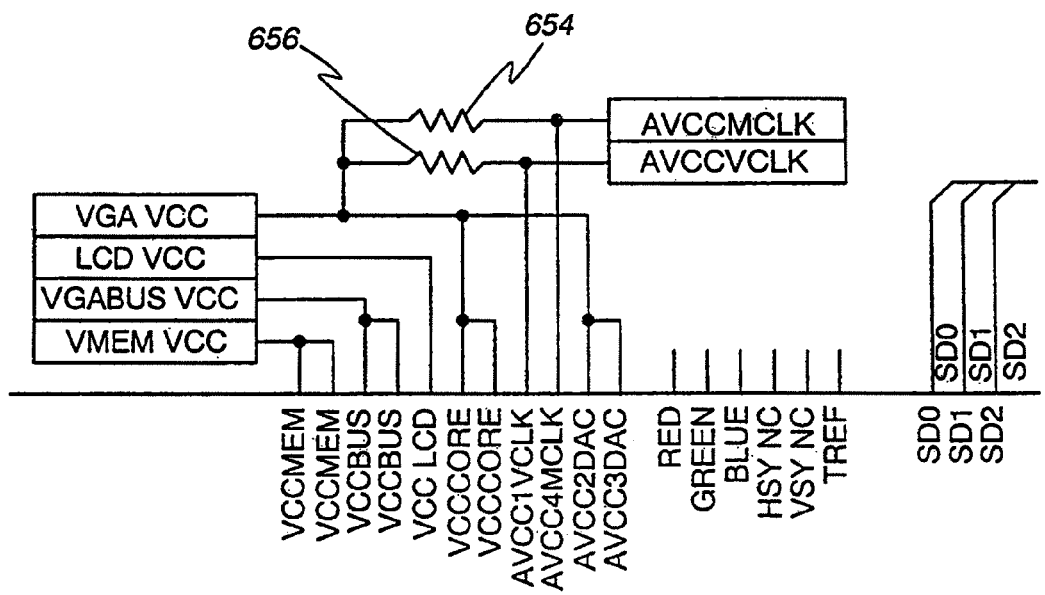
Figure 19D:
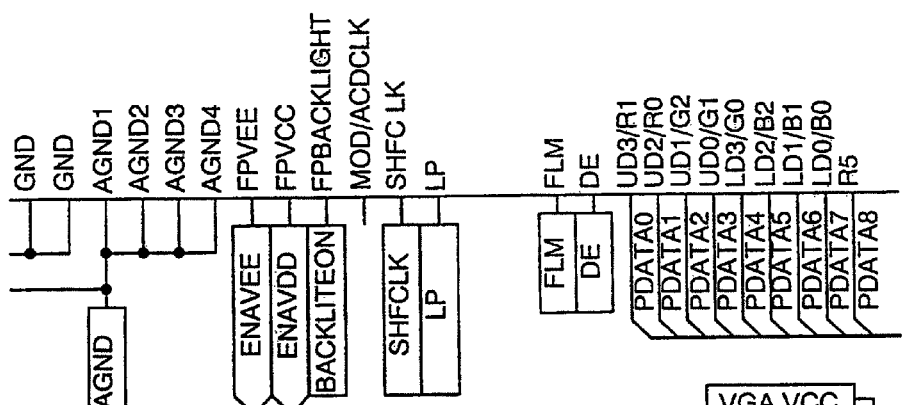
Figures 19K, 19L:
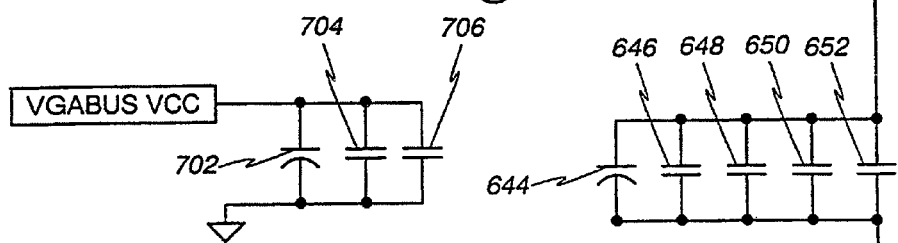
Figure 19O:
Figure 19N:
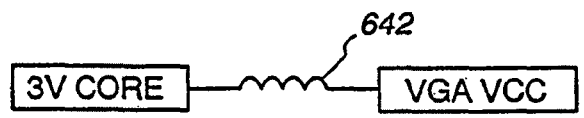
Figure 19E:
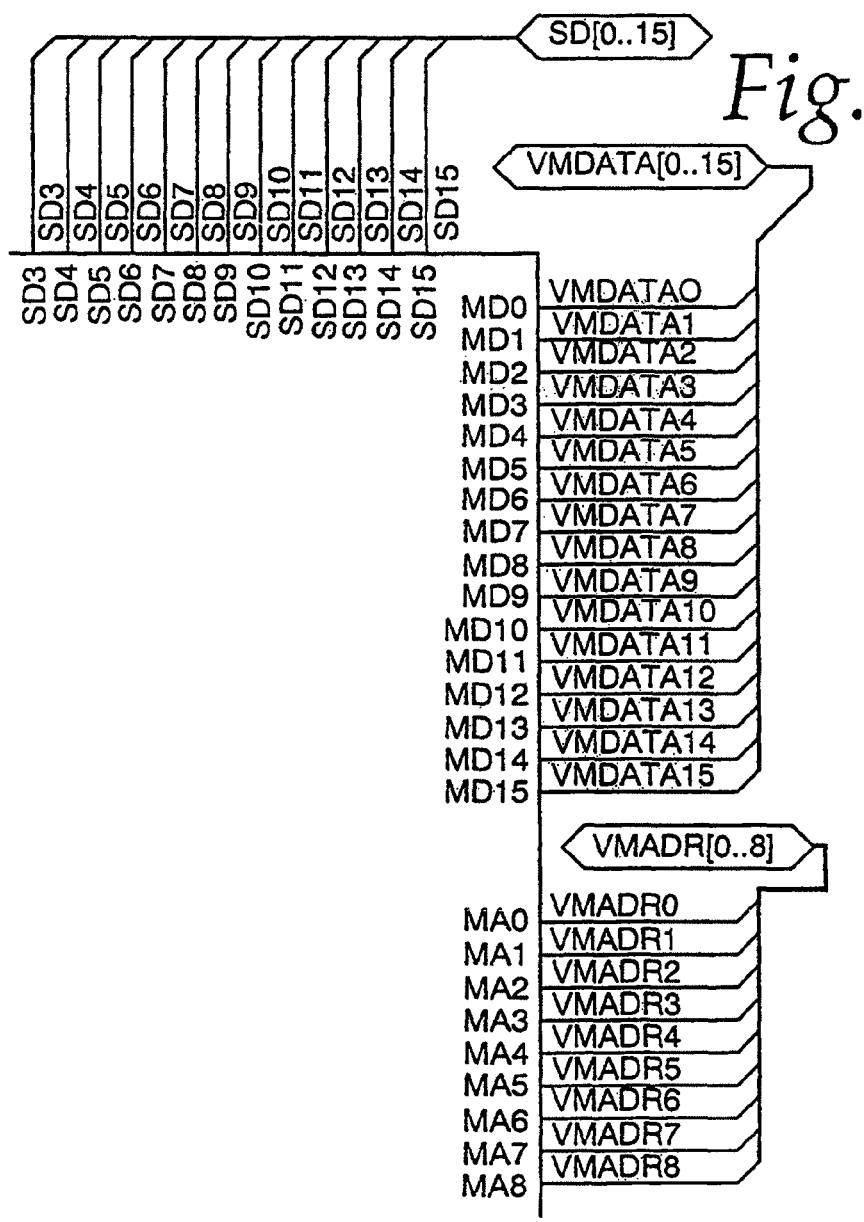
Figure 20A:
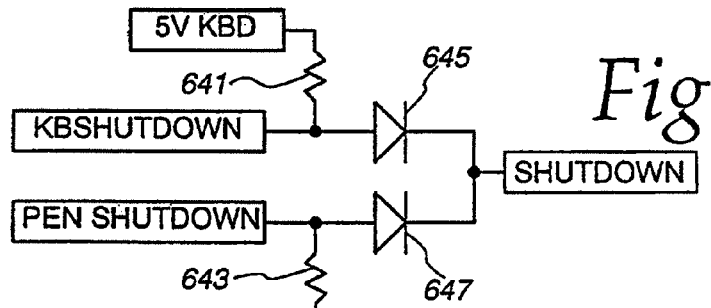
Figure 20B:
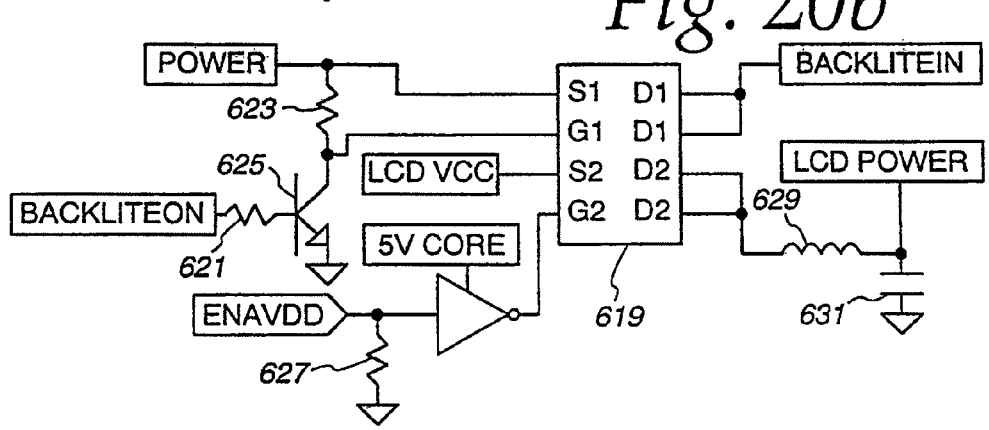
Figure 20C:
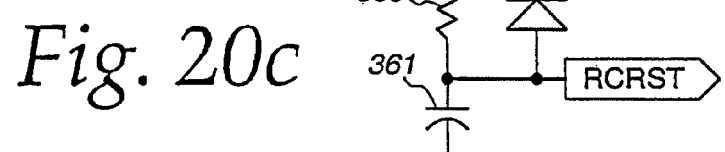
Figure 20D:
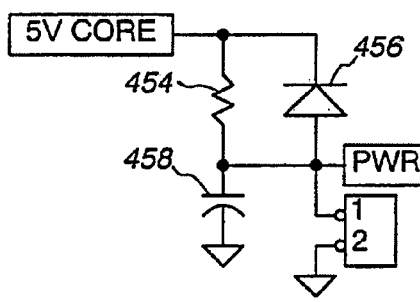
Figure 20E:
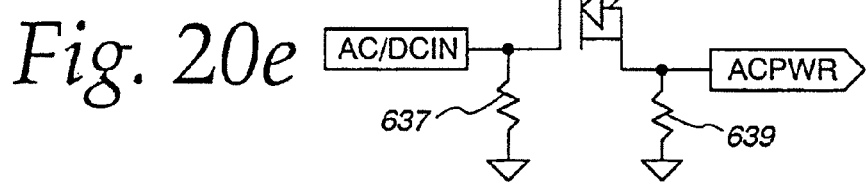
Figure 21E:
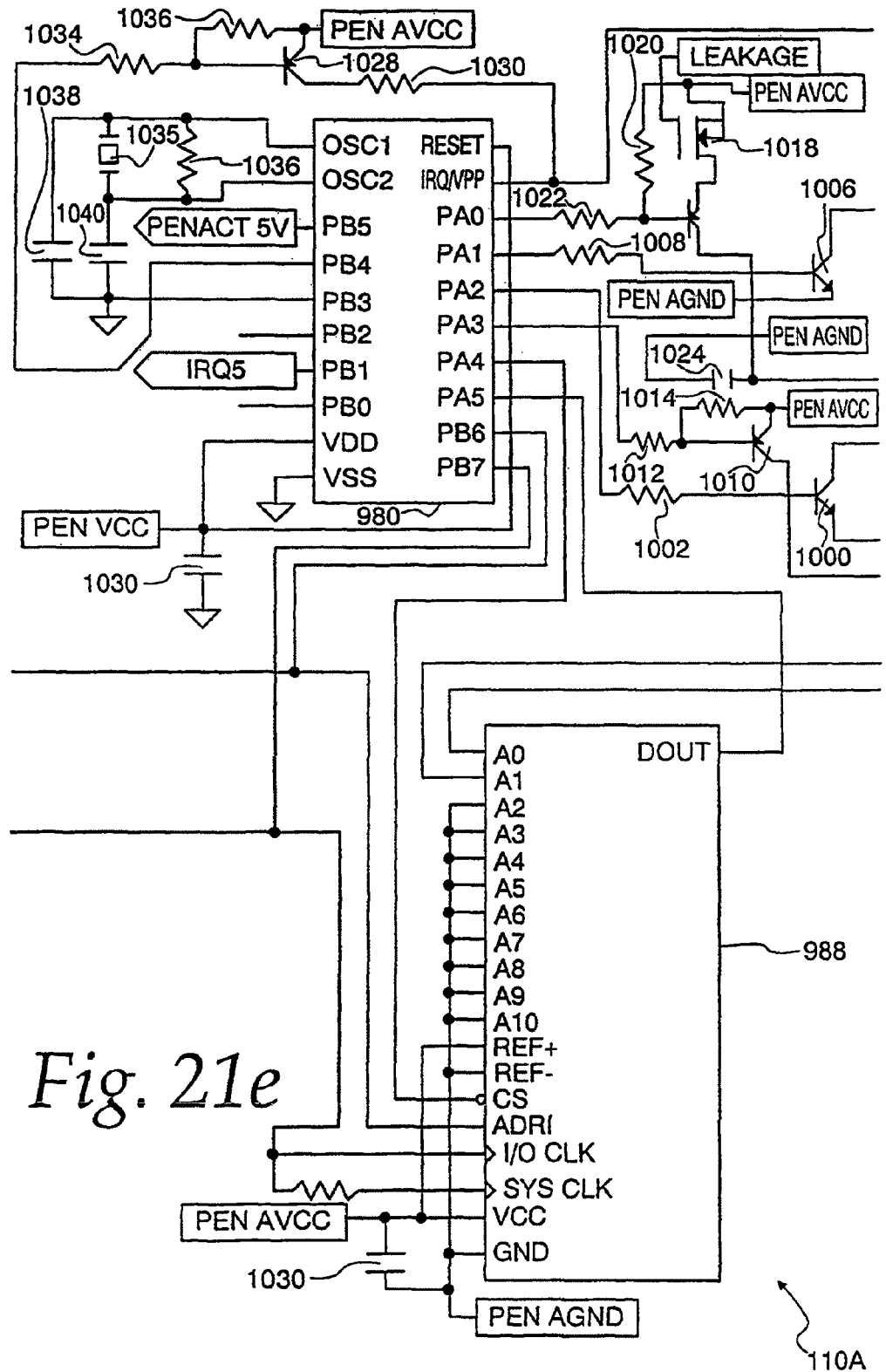
Figure 21I:
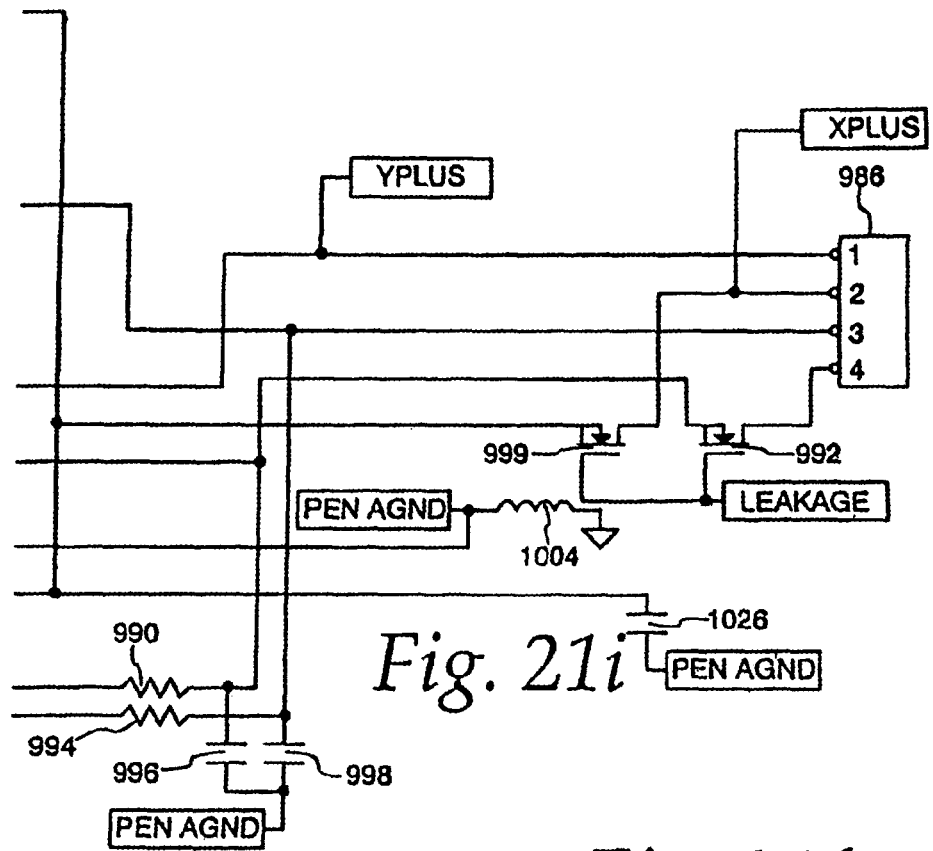
Figure 21F:
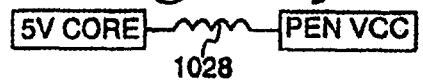
Figure 21H:
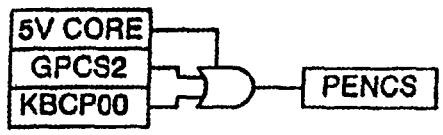
Figure 21G:
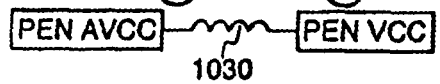
Figure 24A:
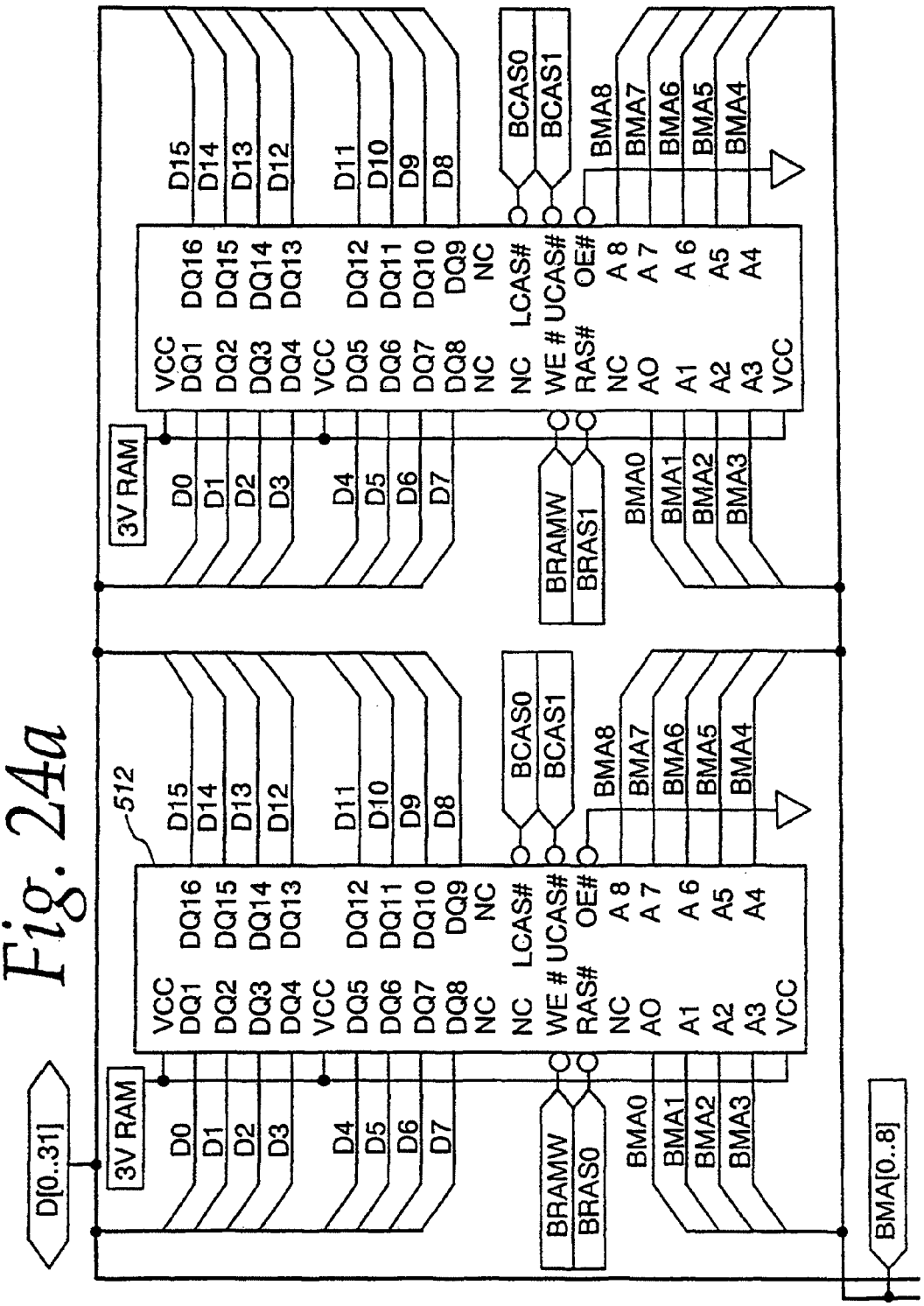

The system controller 129 functions as a DRAM controller and is capable of supporting up to 64 megabytes of memory, divided among one of four banks and can support 256K, 512K, 1M, 2M and 4M of memory in any width. The system controller 129 includes a pair of registers associated with each bank of DRAM. The first register stores the total amount of DRAM connected to the system while the second identifies the starting address for each bank. Referring to FIGS. 18 and 24, two 1 Mbyte banks are connected to the DRAM memory address bus BMA[0 ... 8) and to the processor data bus 150, D[0 ... 31].

In order to conserve power, 3-volt DRAM 111A is used. The 3-volt power supply 3V_RAM is applied to the VCC terminals of each of the DRAMS 111A. The 3-volt power supply 3V_RAM is available from the DC-to-DC converter 300 (FIG. 26) by way of a ferrite bead inductor 440 (FIG. 18). In particular, a 3-volt supply 3V CORE available at the DC-to-DC converter 300 is applied to the ferrite bead inductor 440 to generate the 3-volt DRAM supply 3V_RAM. A plurality of bypass capacitors 425-439 (FIG. 18) are connected between the DRAM supply voltage 3V RAM and system ground.

The system controller 129 generates the appropriate row address strobes (RAS) and column address strobes for the DRAM 111A. In particular, the column address strobe lines CAS0 [0 ... 3] are applied to the upper and lower column address strobe pins (UCAS and LCAS) on the DRAM 111A by way of a plurality of coupling resistors 442 to 450 (FIG. 12). Similarly, the row address signals RASO and RAS1 are applied to the row address strobe pins on the DRAM 111A by way of a plurality of coupling resistors 448 and 450. Writing to the DRAMS 111A is under the control of a DRAM write enable signal BRAMW, applied to the write enable pin WE on the DRAM 111A. The DRAM write enable signal BRAMW is generated by the system controller 129 by way of a coupling resistor 452.

An EEPROM or NVRAM 111B (FIG. 12) may be used to maintain system configuration parameters when the system is powered off. All user changeable parameters are stored in the EEPROM 111B. For example, pen calibration data and passwords, used during boot up, may be used in the EEPROM 452. The contents of the EEPROM 111B may be shadowed into a CMOS memory when the system is active. Communication 5 with the EEPROM 111B is under the control of the system controller 129 and in particular, a pair of programmable input/output pins GPIO1 and GPIO2. The GPIO1 provides a clock signal to the EEPROM 111B while the pin GPIO2 is used for data transfer.

As discussed above, the wireless interface device 100 also includes the flash memory 117 (FIG. 25), which is used for storing the BIOS. The system controller 129 allows for direct shadowing of the BIOS by enabling the appropriate address space to read the FLASH/DRAM write mode which allows all reads to come from the flash device with writes to the DRAM 111A memory devices.

A main memory map as well as an I/O memory map are provided in Tables 3 and 4.

TABLE 3

| | |
|---|---|
| 000000 Main System Memory 0A0000-OBFFFF 000000-ODFFFF 0E0000-OFFFFF | 512K of Video Memory |
| 100000 Expansion 1 Meg DRAM 1FFFFF | 128K for BIOS ROM |
| 200000 NOT USED 5FFFFF 600000 | 1-¾ Meg of Application ROM |

TABLE 3-continued

| | |
|---|---|
| | 2 Meg of Application and BIOS ROM 7FFFFF |

TABLE 4

I/O MEMORY MAP

| Memory Space Description | Memory Locations (HEX) |
|---|---|
| DMA Controller #1 | 00-0F |
| Not Used | 10-1F |
| Interrupt Controller #1 | 20-21 |
| Not Used | 22-23 |
| Evergreen Configuration Address | 24 |
| Not Used | 25 |
| Evergreen Configuration Data | 26 |
| Not Used | 27-3F |
| Counter/Timer | 40-43 |
| Not Used | 44-5F |
| Keyboard Controller | 60 |
| Port B | 61 |
| Not Used | 62-63 |
| Keyboard Controller | 64 |
| Not Used | 65-6F |
| NMI Enable, Real-Time Clock | 70, 71 |
| Not Used | 72-7F |
| DMA Page Registers | 80-8F |
| Not Used | 90-91 |
| Port A | 92 |
| Not Used | 93-9F |
| Interrupt Controller #2 | A0-A1 |
| Not Used | A2-CF |
| DMA Controller #2 | DO-DE |
| Not Used | DF-2FF |
| Pen Controller | 300 |
| Not Used | 301-3AF |
| Graphics Controller | 3B0-3DF |
| RF Controller | 3E0-3E7 |
| UART COM1 | 3E8-3EF |
| Not Used | 3F0-3FF |

In addition to system control features and DRAM control, the system controller 129 provides various other functions. The power management function and NVRAM n controller have been discussed above. The system controller 129 also controls all operations on the local AT bus 150. The AT bus clock is derived from the clock CLK2IN pin that is divided to achieve an 8 MHz bus rate.

The system controller 129 also includes a number of programmable pins which enhance its flexibility. For example, four general purpose input/output pins GPIO[0 ... 3] are provided; each of which may be independently set for input or output. The GPIO1 and GPIO2 pins are used for the EEPROM 111B as discussed above. The GPIO0 pin and GPIO3 pin may be used for various purposes. In addition to the programmable input/output pins, the system controller 129 includes two general purpose chip select pins GPCS1 and GPCS2 as well as a plurality of programmable output pins PC[0 ... 9]. The programmable chip selects GPCS1 and GPCS2 25 are used for the pen controller 110A, UART 134 and the radio interface 114B.

Peripheral devices connected to the system ISA bus 151 are controlled by an integrated peripheral controller 128 as discussed above. The integrated 30 peripheral controller 128 may be a PicoPower Model No. PT82C206F which can be operated at either 3.3 or 5 volts. As will be discussed in more detail below, the integrated peripheral controller 128 includes several subsystems such as: DMA Control; Interrupt Control; Timer Counter; RTC Controller; CMOS RAM and Memory Mapper.

The IPC 128 includes two type 8259A compatible interrupt controllers which provide 16 channels of interrupt levels, one of which is used for cascading. The interrupt controller processes all incoming interrupts in order as set forth in Table 5.

TABLE 5

INTERRUPT TABLE

| INTERRUPT | DESCRIPTION |
|---|---|
| Level 0 | Timer Channel 0 |
| Level 1 | Keyboard Controller 2 Cascade |
| Level 2 | Second Interrupt Controller |
| Level 3 | Not Used |
| Level 4 | COM1 |
| Level 5 | Pen Controller |
| Level 6 | Not Used |
| Level 7 | Not Used |
| Level 8 | RTC Controller |
| Level 9 | Not Used |
| Level 10 | Radio Controller |
| Level 11 | Not Used |
| Level 12 | Not Used |
| Level 13 | Not Used |
| Level 14 | Not Used |
| Level 15 | Not Used |

The integrated peripheral controller (IPC) 128 (FIG. 14) is connected to the system data bus SD[0 . . . 15]. Addressing of the IPC 128 is accomplished by two bits SA0 and SA1 from the system address bus SA[0 . . . 23] and eight 5 bits A[2 . . . 9] from the local address bus A[0 . . . 31]. The address bits from the local address bus A[2 . . . 8] are converted to 5 volts by way of a 3- to 5-volt signal converter 453 (FIG. 14) to develop the 5-volt address signals KA[2 . . . 8]. A 32-kilohertz clock signal 32-KHz from the clock generator 398 (FIG. 13) is applied to the clock input OSC1 of the IPC 128.

Referring to FIG. 20, in order to prevent spurious operation of the IPC 128 before the system power supply is stabilized, a power good signal PWRGOOD is applied to a power good pin PWRGD. The power good signal PWRGOOD is a delayed signal which assures that the 5-volt power supply has stabilized before the IPC 128 is activated. In particular, a 5-volt power supply 5V_CORE is applied to a delay circuit which includes a resistor 454, a diode 456 and a capacitor 458. Initially, the 5-volt power supply signal 5V_CORE is dropped across the resistor 454. While the capacitor 458 is charging, the diode 456 is in a non-conducting state. As the capacitor 458 begins to charge, the voltage at the anode of the diode 456 increases as a function of the RC time constant. When the capacitor 458 is fully charged, it approaches the value of the power supply voltage 5V_CORE. When the capacitor 458 becomes fully charged, the power good signal PWRGOOD is applied to a power good pin PWRGD at the IPC 128 for enabling the IPC 128 after the power supply has stabilized. The diode 456 provides a discharge path for the capacitor 458 when the power supply is shut off. The power good signal PWRGOOD is also used to reset the keyboard controller 125.

A 5-volt power supply 5V_CORE from the DC-to-DC converter 300 (FIG. 26) is applied to a ferrite bead inductor 460 (FIG. 13) to develop a 5-volt power supply 5V_206, which, in turn, is applied to the power supply pins VCC of the IPC 128. In order to delay application of the 5-volt power supply 5V_206 as discussed below, a charging circuit which includes a serially coupled resistor 462 and a capacitor 464 are connected between the power supply voltage 5V_206 and the system ground. A power supply reset signal PSRSTB, an active low signal, is applied to the junction between the resistor 462 and the capacitor 464 to discharge the capacitor 464 when the power supply is reset. Moreover, in order to stabilize the voltage of the power supply 5V_206, a plurality of bypass capacitors 466 and 468 are connected between the power supply 5V_206 and system ground.

In order to assure proper operation of the 15 circuit, various pins of the IPC 128 are pulled low while various other pins are pulled high. In particular, the input/output read and write signals IOR and IOW are pulled up to the power supply voltage 5V_206 by a pair of pull-up resistors 470 and 472. In addition, the interrupt request pin IRQ10 is pulled up to the power supply voltage 5V_CORE by a pull-up resistor 474. The signals OUT2, REFREQ, AEN16 and AEN8 are pulled low by pull-down resistors 455-461 while the signal TEST MODE2 is pulled up to the supply voltage 5V_CORE by a pull-up resistor 463.

Even though the IPC 128 includes a direct memory access (DMA) controller, this function is not required by the system. As such, the direct memory access request pins DREQ[0 . . . 7] are pulled low by a pull-down resistor 476 to system ground. In addition, as set forth in Table 5 above, 30 various interrupt levels are unused. For example, as shown in Table 5, interrupt levels IRQ3, IRQ6, IRQ7, IRQ9, IRQ11, IRQ12, IRQ14, and IRQ15 are not used. Thus, these interrupt levels are pulled low by a pull-down resistor 478.

As illustrated in Table 5, interrupt levels IRQ4 and IRQ5 are used for the COM1 and pen controller interrupt levels, IRQ4 and IRQ5. To assure that these levels are proper, the IRQ4 and IRQ5, which are active high, are pulled low by pull-down resistors 480 and 482.

Interrupts by the system controller 129 and IPC 128 INTR_EG and INTR206 are applied to the CPU 112 by way of a diode 479 and pull-up resistor 481 (FIG. 14). In particular, the interrupt signals INTR_EG and INTR206 from the system controller 129 and IPC 128, respectively, are applied to the cathode of the diode 479 while the anode is pulled up to the power supply voltage 3V_CORE by the pull-up resistor 481. The logic level of the anode is set by the interrupt signal INTR, which is applied to the CPU 112. When the interrupt signals INTR206 and INTR_EG are high, the diode 479 does not conduct and the CPU 112 interrupt signal INTR will be high. When either of the interrupt signals INTR_EG or INTR206 are low, the diode 479 conducts, forcing the CPU 112 interrupt signal INTR low.

The IPC 128 also includes a type 8254 compatible counter/timer which, in turn, contains three 16-bit counters that can be programmed to count in either binary or binary-coded decimal. The zero counter output is tied internally to the highest interrupt request level IRQO so that the CPU 112 is interrupted at regular intervals. The outputs of the timers 1 and 2 are available for external 25 connection. In particular, internal timer 1 generates one signal, OUT1, which is used to generate a DRAM refresh request signal REFREQ to the CPU 112. The internal timer generates an output signal OUT2 that is used to generate speaker timing. All three internal timers are clocked from a timer clock input TMRCLK at 1.2 megahertz from the system controller 129.

As mentioned above, the IPC 128 includes a real time clock (RTC) controller which maintains the real time. The real operational time is maintained in a CMOS RAM that can be accessed through registers 70H and 71H. The memory map for the CMOS memory is provided in Table 6 as shown below:

TABLE 6

CMOS MEMORY MAP

| INDEX | FUNCTION |
| --- | --- |
| 00H | Seconds |
| 01H | Seconds Alarm |
| 02H | Minutes |
| 03H | Minutes Alarm |
| 04H | Hours |
| 05H | Hours Alarm |
| 06H | Day of Week |
| 07H | Day of Month |
| 08H | Month |
| 09H | Year |
| 0AH | Registry |
| 0BH | Register B |
| 0CH | Register C |
| 0DH | Register D |
| 0EH-7EH | User RAM |

The area designated as User RAM is used by the system BIOS to save the status of the system configuration registers. The alarm bytes may be used to set and generate an interrupt at a specific time. When periodic interrupt is required, the two most significant bits in the alarm register can be set high.

Figure 13A:
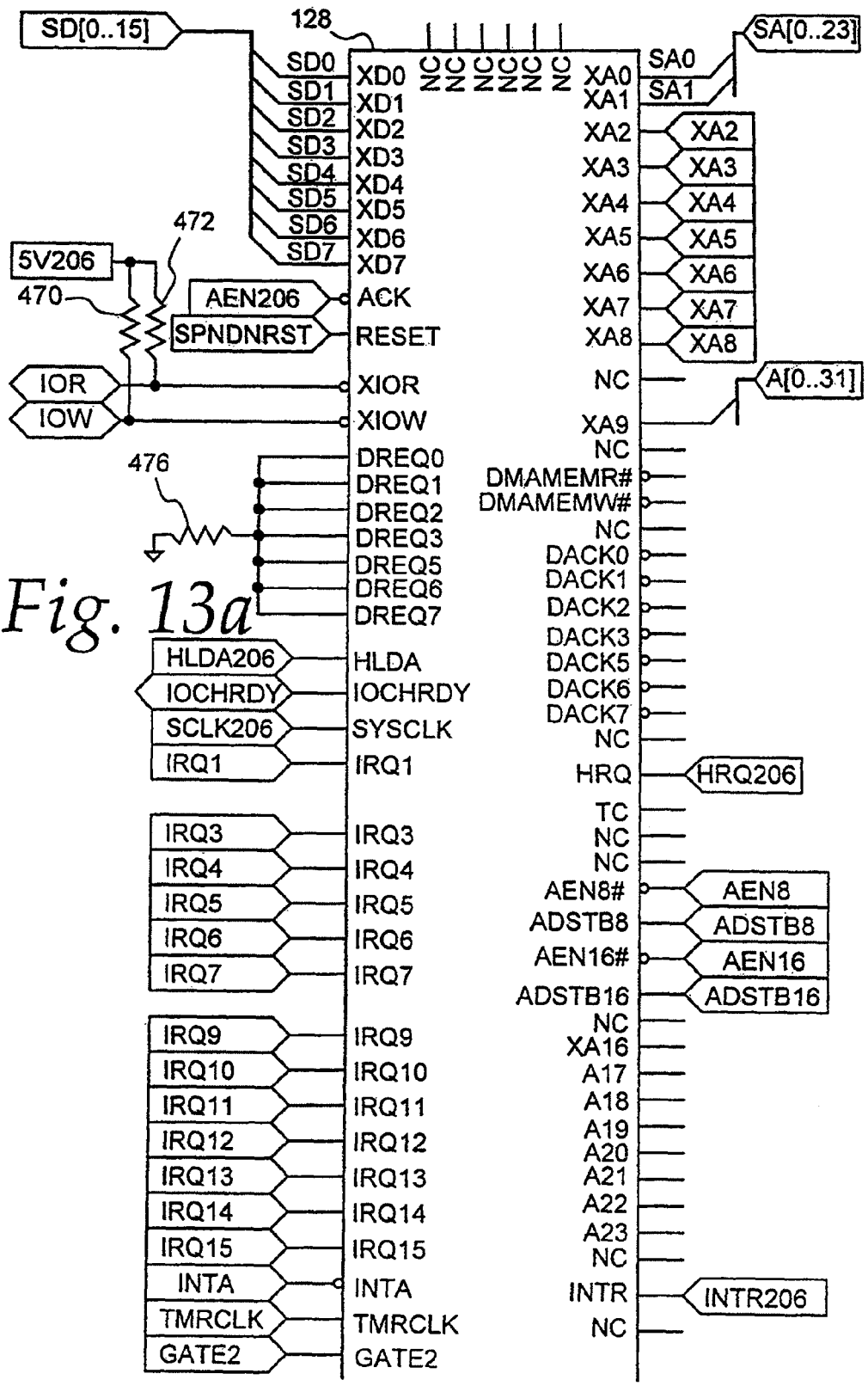
Figure 13D:
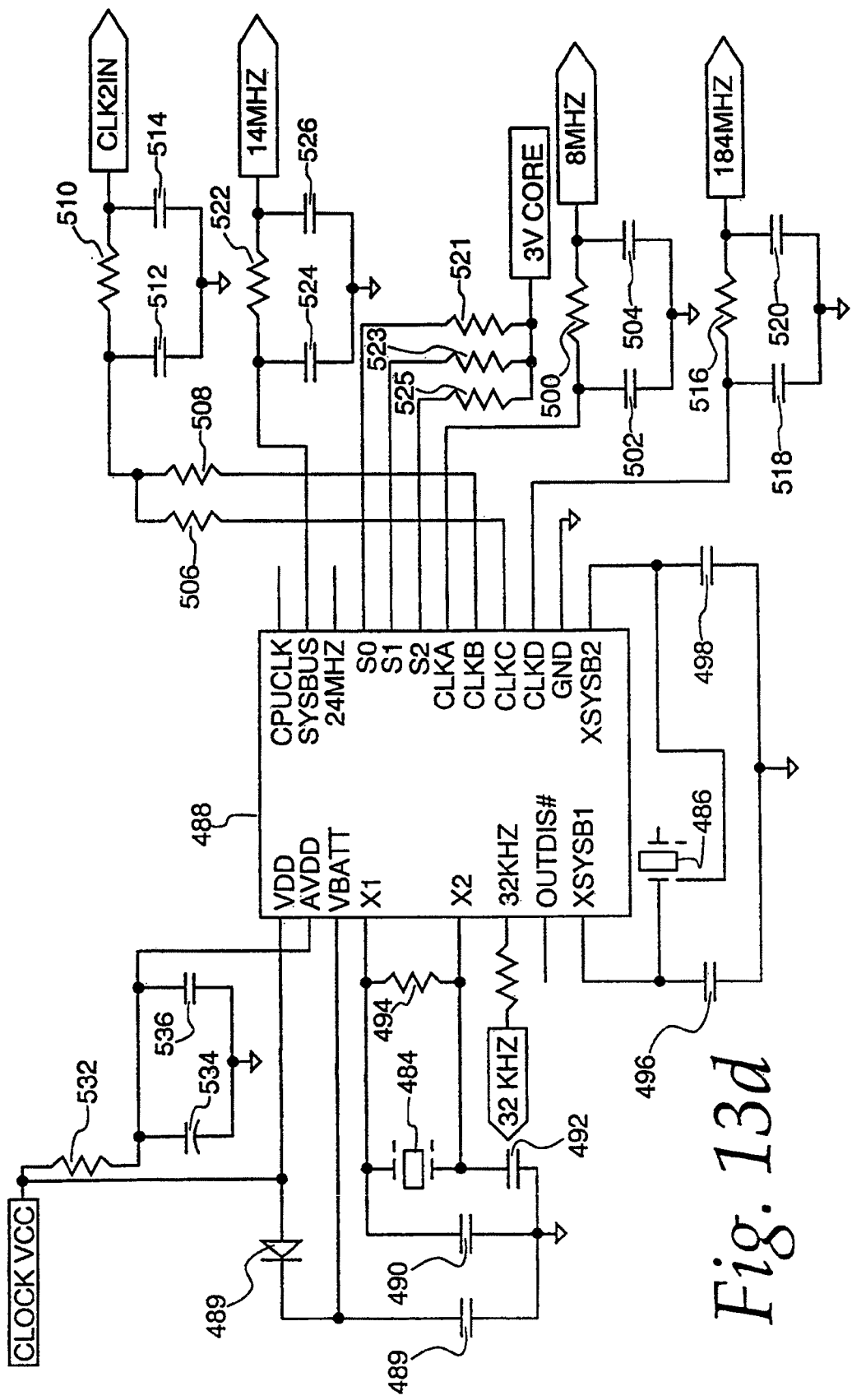
Figure 14A:
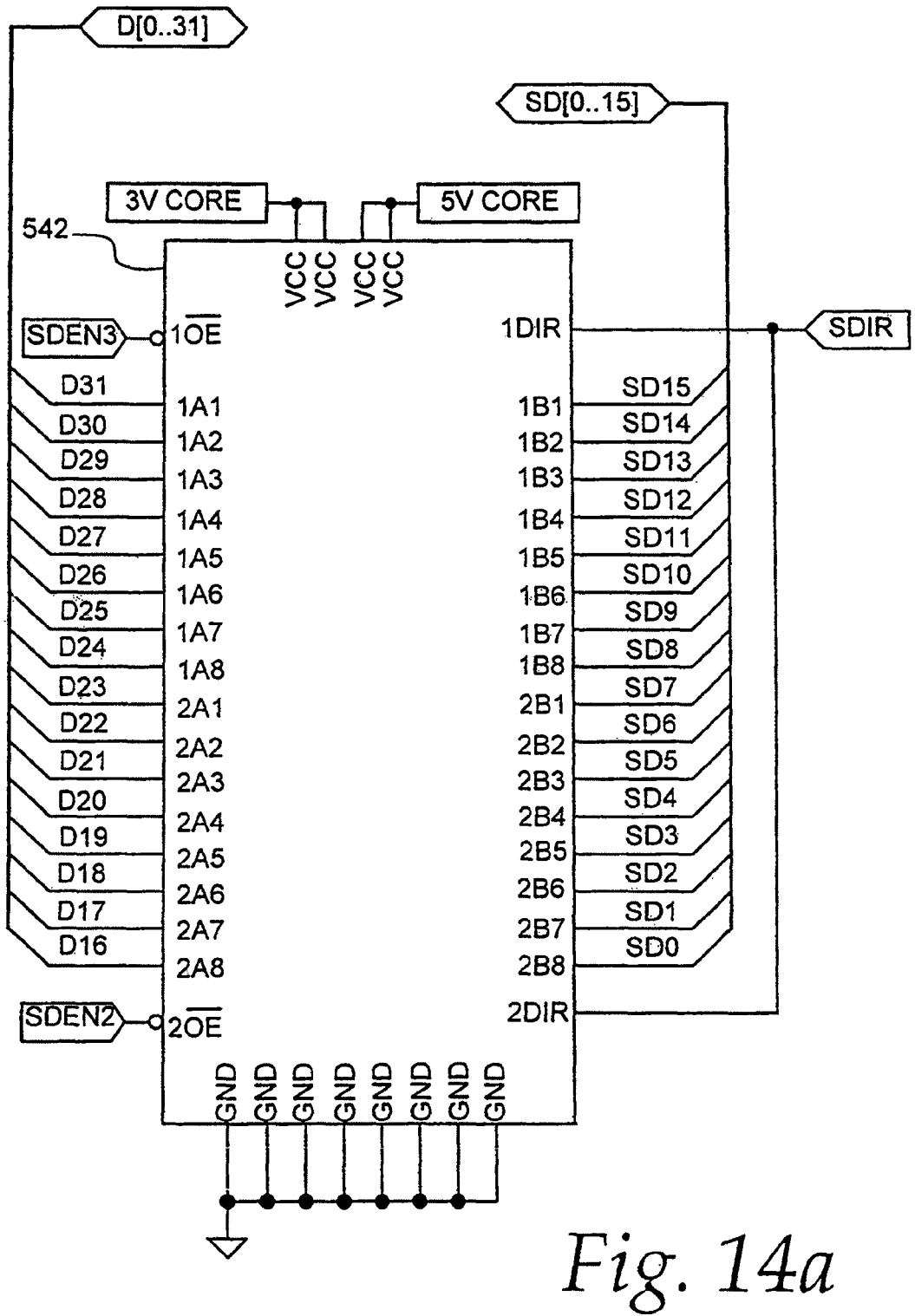
Figure 14B:
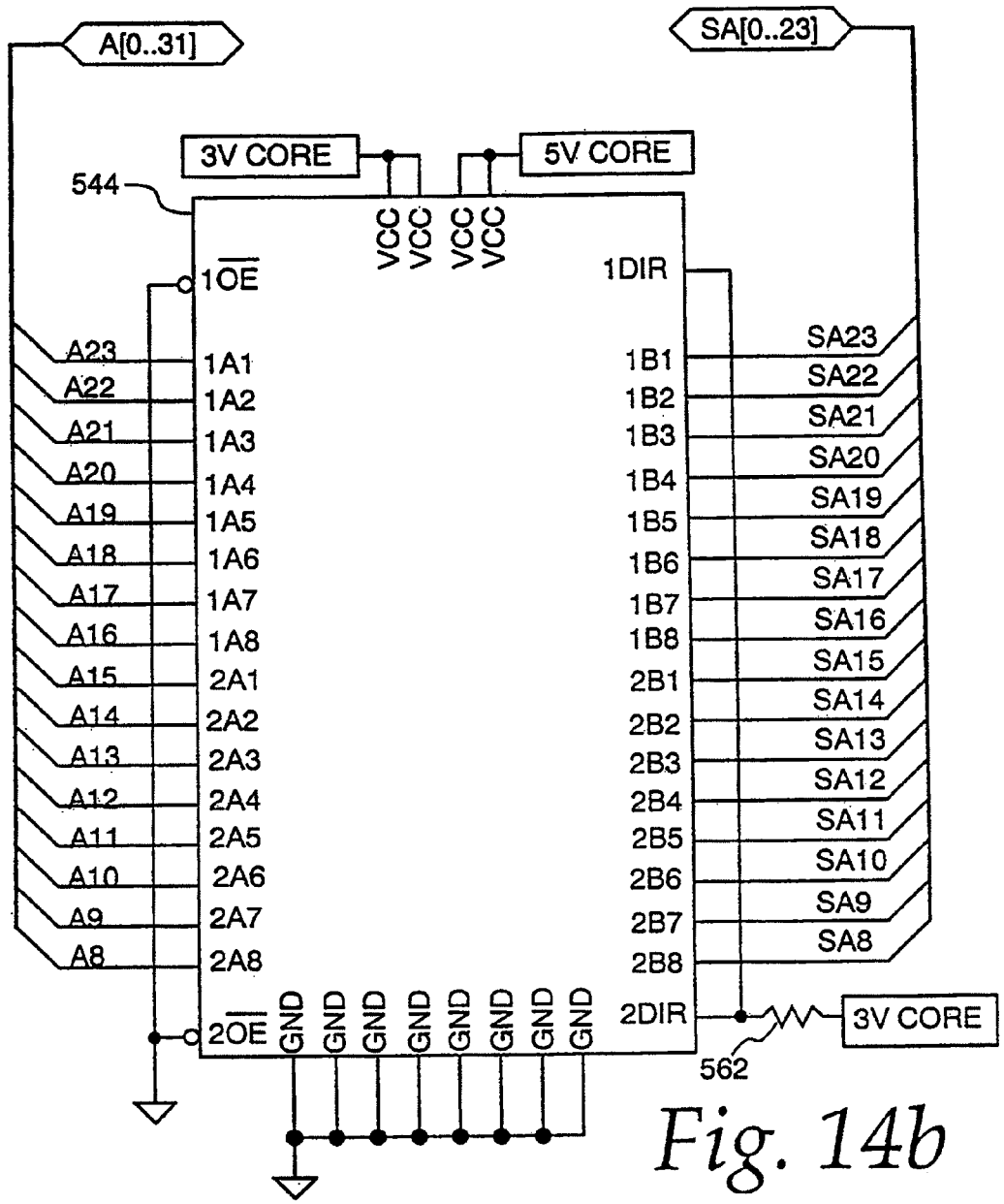
Figure 14C:
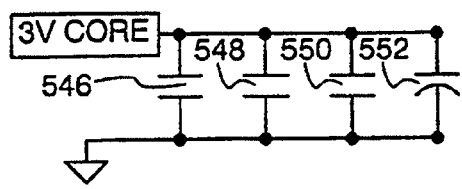
Figure 14D:
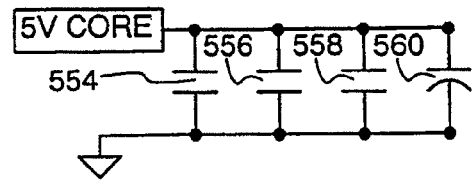
Figure 14E:
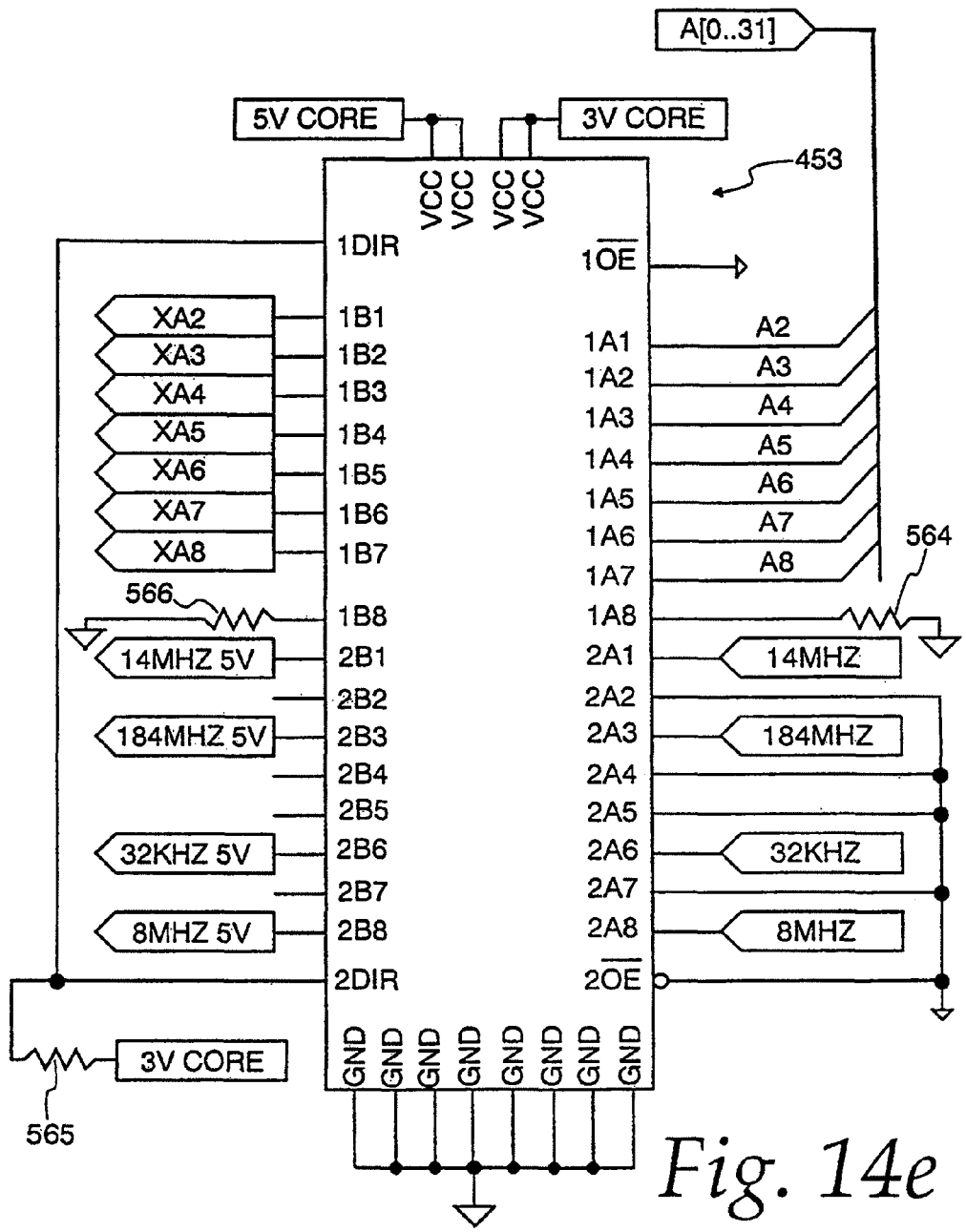
Figure 14F:
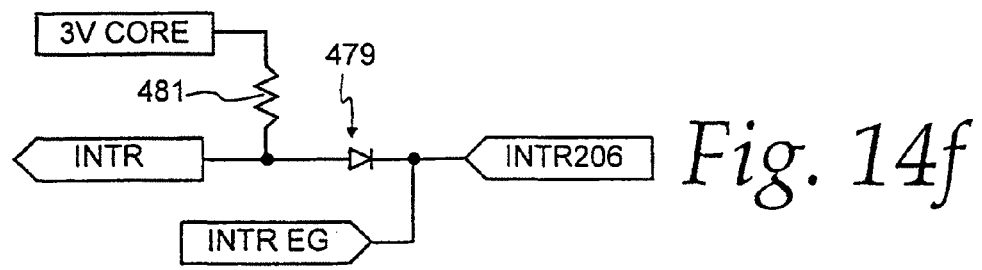

The various clock signals used for the system are provided by the clock generator circuit 398 (FIG. 13). The clock circuit 398 includes a clock generator, for example, an Integrated Circuit Designs Model No. ICD2028. A 14.318 MHz crystal 484 and a 32.768 KHz crystal 486 are applied to the clock generator 488. In particular, the crystal 484 is applied to a pair of X1 and X2 input pins along with a plurality of capacitors 489, 490, 492 and an input resistor 494. Similarly, the crystal 486 is applied to input pins 5 XSYSB1 and XSYSB2. A pair of capacitors 496 and 498 are connected across the crystal 486.

The clock generator IC 488 provides three clock outputs CLKA, CLKB and CLKD. The clock A output CLKA is used to develop an 8-MHz clock signal for the keyboard controller 125 by way of a resistor 500 and capacitors 502 and 504. The clock B output CLKB is used to develop a clock 2× output signal CLK2IN for the system controller 129 by way the resistors 506, 508 and 510 and a pair of capacitors 512 and 514. The clock D output signal CLKD is used to generate a 1.84 MHz signal for use by the Universal Asynchronous Receiver Transmitter (UART) 134 by way of a resistor 516 and capacitors 518 and 520. As mentioned above, the system controller 129 also requires a 14 MHz clock signal. This clock signal is developed by way of a system bus output pin SYSBUS, a resistor 522 and a pair of capacitors 524 and 526.

Selection of the various clock output signals is available by way of the select pins S0, S1 and S2. These pins S0, S1 and S2 are pulled up to the 3-volt power supply 3V_CORE by way of pull-up resistors 521, 523 and 525. The 3-volt power supply signal 3V_CORE is available from the DC-DC converter 300 (FIG. 26).

The clock generator 488 utilizes a 3-volt power supply CLOCK_VCC (FIG. 13). The 3-volt power supply CLOCK_VCC is available from the DC-to-DC converter 300 (FIG. 26) by way of an in-line ferrite bead inductor 530. In particular, the 3-volt power supply 3V_CORE is applied to the ferrite bead inductor 530 to generate the power supply for the CLOCK_VCC for the clock generator 488. This power supply CLOCK_VCC is applied to the power supply pin VDD. The power supply signal CLOCK_VCC is also used as analog supply AVDD to the clock generator IC 488 and is applied to the analog supply AVDD by way of the resistor 532 and a pair of capacitors 534 and 536. The power supply signal CLOCK-VCC is also applied to the battery pin VBATT of the clock generator IC 488 by way of a diode 537 to prevent any back feeding.

A number of the circuits in the system operate at either 3.3 volts or 5 volts. Thus, a plurality of bi-directional signal level translators 542 and 544 (FIG. 14) are provided, as well as the translator 453 previously discussed. The signal level translators 453, 542 and 544 may be as supplied by Integrated Circuit Technology, Model No. FCT164245T. Each of the signal level translators 453, 542 and 544 includes a 3-volt supply 3V_CORE and a 5-volt supply 5V_CORE, available from the DC-to-DC converter 300 (FIG. 26). In order to stabilize the voltage of the 3- and 5-volt power supplies, 3V_CORE and 5V_CORE, a plurality of bypass capacitors are utilized. In particular, the bypass capacitors 546 through 552 are connected between the 3-volt supply 3V_CORE and system ground. Similarly, the bypass capacitors 554 through 560 are connected between the 5-volt supply 5V_CORE and system ground. The ground terminals of each of the signal level translators 542, 544 and 453 are also tied to system ground.

Each of the signal level translators 542, 544 and 453 includes two 8-bit programmable input/output pins. More particularly, the first 8-bit group 1A/1B[1 . . . 8] is under the control of an operate/enable pin 1OE, which is active low, while the second bank 2A/2B[1 . . . 8] is under the control of an output/enable pin 2OE, also active low. The direction of the input pins and output pins (i.e., A relative to B) is under the control of direction pins 1DIR and 2DIR. The direction pin 1DIR controls the direction of the pins 1A/1B[1 . . . 8], while the pin 2DIR controls the direction of the pins 2A/2B[1 . . . 8].

The signal level translator 453 is used to convert the local data bus bits D[16 . . . 31] and the system data bus bits SD [0 . . . 15]. Both the local data bus D[16 . . . 31] as well as the system data bus SD[0 . . . 15] are bi-directional. In this application the processor bus 150 data bits D[31-16) are being mapped to the system data bus bits SD[15-0].

The direction of the signal level translator 542 is under the control of a signal direction signal SDIR, available at the system controller 129. The signal direction signal SDIR is applied to both the direction control pins 1DIR and 2DIR of the signal level translator 542. The operate/enable inputs 1OE and 2OE are under the control of system data enable inputs signals, SDEN3 and SDEN2, respectively; also under the control of the system controller 129.

The signal level translator 544 is used to map the signal levels of the local address bus bits A[23 . . . 8] to the system address bus bits SA[23 . . . 8]. More particularly, the local address bits A[23 . . . 16] are applied to pins 1A[1 . . . 8] while the local address bits A[15 . . . 8] are applied to the' pins 2A [1 . . . 8]. Similarly, the system address bits SA[23 . . . 16] are connected to the pins 1B[1 . . . ], while the system address bits SA[15 . . . 8] are applied to the pins 2B[1 . . . 8]. In this case, the operate/enable pins 1OE and 2OE, both active low, are connected to system ground in order to permanently enable the signal level translator 544. The direction control pins 1DIR and 2DIR are permanently set such that the data always flows from A to B. In particular, the directional pins 1DIR and 2DIR are connected to the 3-volt power supply 3V CORE by way of a pull-up resistor 562.

The signal level translator 542 is used to convert the signal levels of the 3-volt clock output signals 14 Mhz, 1.84 Mhz, 32 Khz and 8 Mhz to 5-volt levels, as well as to convert the 3-volt local address bits A[2 . . . 8] to 5-volt address bits XA[2 . . . 8] for use by the IPC 128, as discussed above. More particularly, the system address bits, A[2 . . . 8] are applied to the pins 1A [1 . . . 8]. The clock signals 14 MHz, 1.84 MHz, 32 KHz and 8 MHz are applied to the pins 2A1, 2A3, 2A6 and 2A8, respectively, to produce corresponding 5-volt level signals 14 MHz_5V, 1.84 MHz_5V, 32 KHz_5V and 8 MHz_5V signals at pins 2B1, 2B3, 2B6 and 2B8, respectively. The unused pins 1A8 and 2B8 are pulled low by way of pull-down resistors 564 and 565, respectively. The operate/enable pins 1OE and 2OE are tied to system ground to permanently enable the signal level translator 542. The directional pins 1DIR and 2DIR are pulled up to the 3-volt power supply voltage 3V_CORE by way of a pull-up resistor 566 to permanently force the 15 direction from A to B.

Referring to FIG. 15, the system includes a keyboard controller 125, which performs several functions, including battery monitoring, LCD status control, brightness and contrast control, as well as keyboard control. In addition, the system also maintains the status of the remaining battery life, and also provides information to the system controller 129 when the battery voltage is low or other critical battery condition has occurred. In operation, the keyboard controller 125 will maintain the current status of the battery level until data is requested. When a critical battery condition event occurs, the keyboard controller 125 generates an SMI interrupt. As discussed above, the intelligent battery pack (IBP) 130 provides an indication of the percentage of remaining battery capacity. Communication between the IBP 130 and the keyboard controller 125 is by way of a bi-directional serial data bus, which includes a clock line BATCLK and a data line BATDATA. The data line BATDATA is a bi-directional line, which allows for bi-directional communication with the IBP 130. The clock line BATCLK is driven by the IBP 130, but may be pulled low by the keyboard controller 125.

The bi-directional serial data bus is connected to the port pins P4.2 and P4.3 on the keyboard controller 125. In particular, the port pin P4.2 is used for the serial battery data BATTDATA. An NPN transistor 570 is connected to the port pin P4.2 to disconnect the keyboard controller 125 from the IBP 130 during power down. In particular, the collector terminal of the NPN transistor 570 is connected to the port pin P4.2, while the emitter terminal forms a battery data signal BATTDATA. The base of the NPN transistor 570 is biased on by way of a biasing resistor 572 that is connected to a 5-volt power supply 5VKBD. The collector is pulled high by way of a pull-up resistor 574 connected to the 5-volt power supply 5V_KBD.

Similarly, the battery clock signal BATTCLK is connected to the port 4.3 on the keyboard controller 125 by way of an NPN transistor 576. The collector terminal of the NPN transistor 576 is connected to the port 4.3 as well as to a pull-up resistor 578 and the 5-volt power supply 5V_KBD. The NPN transistor 576 is turned on anytime the power supply to the keyboard 5V_KBD is powered up by way of a biasing resistor 580. The emitter of the NPN transistor 576 forms the battery clock signal BATTCLK.

In addition to battery management, the keyboard controller 125 also supports an external PS/2-type keyboard, as well as a PS/2-type bar code reader, connected to a keyboard connector 140 (FIG. 29). Communication between the keyboard or bar code reader (not shown) is by way of a standard type PS-2 two-wire bus connected to serial ports P4.6 and P4.7. In particular, the keyboard data KDATA is pulled up to the 5-volt voltage supply 5V_CORE by way of a pull-up resistor 582 while the keyboard clock signal KCLK is pulled up the 5-volt supply 5V_CORE by way of a pull-up resistor 584.

Referring to FIG. 29, the keyboard connector 140 may be a 6-pin MINI-DIN connector or a DB-8 connector as shown. Pins 6-9 are connected to system ground. Pin 4 of the connector 140 is pulled up to the power supply voltage 5V_CORE by way of a fuse 579 and is filtered by a capacitor 581 and an inductor 583. The data signal KDATA is applied to pin 1 by way of a current-limiting resistor 585, while the clock signal KCLK is applied to pin 5 by way of a current-limiting resistor 587 and a pair of capacitors 589 and 591. These clock and data signals KCLK and KDATA are connected to the ports P4.6 and P4.7, respectively, for serial communication with an external keyboard or, bar code reader.

Additionally, the keyboard controller 125 may be used to control the brightness level as well as the contrast level of the LCD display. More particularly, referring to FIG. 27, a contrast signal CONTRAST, available at port 0, pin 1 of the keyboard controller 125 (FIG. 15) is used to adjust the contrast level of the LCD display. The contrast signal CONTRAST is applied to an adjustment terminal ADJ of a negative 24-volt DC voltage supply, which can be incrementally adjusted in steps by a 24-volt DC supply 586 (FIG. 27), for example, a Maxim Model No. 749, which provides for 64-step adjustment. Thus, each high pulse will increment the contrast of the LCD display by one step. With a 64-step device, sixty-three pulses rolls the counter over and decreases the contrast by 1. The 24-volt DC supply 586 is under the control of an enable signal ENAVEE, available from the video controller 113A (FIG. 19).

In order to assure proper operation, the 24-volt supply 586 is connected in a circuit as shown in FIG. 27, which includes a plurality of capacitors 588, 590, 592, 594; a plurality of resistors 596, 598, 600 an inductor 602; a PNP transistor 604; and a zener diode 606. The output of the circuitry is a nominal negative 24-volt signal LCDVEE, which is adjustable in 64 increments by way of the CONTRAST signal, as discussed above, to vary the contrast level of the LCD display.

The keyboard controller 125 also controls the brightness of the LCD display. In particular, brightness adjustment signals BRIGHTNESS_UP, BRIGHTNESS_DOWN (FIG. 15) are available at port 1, pins 6 and 7. These signals BRIGHTNESS UP and BRIGHTNESS_DOWN are normally pulled up to the 5-volt supply 5V_KBD by way of a pair of pull-up resistors 608 and 610. These signals BRIGHTNESS_UP and BRIGHTNESS_DOWN are applied to a digital output potentiometer 612 (FIG. 27), for example a Dallas Semiconductor Model No. DS1669-50. The digital output potentiometer 612 is powered by a 5-volt power supply 5V_CORE, which is also used to pull up an unused output terminal, RH.

The brightness control signals BRIGHTNESS_UP and BRIGHTNESS_DOWN are applied to the increment and decrement terminals, UC and DC of the digital output potentiometer 612. The output of the digital output potentiometer 612 is a variable resistance signal, which forms the brightness control signal BRIGHTNESS. This brightness control signal BRIGHTNESS is pulled down by a pull-down resistor 614.

The brightness control signal BRIGHTNESS from the digital output potentiometer 612, as well as a backlight control signal BACKLITEON and a backlight power signal BACKLITEPOWER are connected to the system by way of a 6-pin connector 615 (FIG. 27). The backlight control signal BACKLITEON is connected to pin 4 of the connector 615 and pulled low by way of a pull-down resistor 617. The power control signal BACKLITEPOWER is applied to pins 1 and 2 while the backlight brightness control signal BRIGHTNESS is applied to pin 3. The backlight control signal BACKLITEON is available from the video controller 113A (FIG. 19) and is used to power the backlight on the LCD. The backlight power signal BACKLITEPOWER, available from an FET 619 (FIG. 20), is under the control of the backlight power control signal BACKLITEON, available from the video controller 113A (FIG. 19).

The FET 619 (FIG. 20) is used to control power to both the LCD as well as the backlight. In particular, referring to FIG. 20, the backlight power control BACKLITEON, is used to control an NPN transistor 617 by way of a current-limiting resistor 621. The NPN transistor 621, in turn, is used to control the FET 619 to generate the backlight power signal BACKLITEPOWER at the drain terminal D1. The main power signal POWER (FIG. 28) is connected to the collector of the NPN, transistor 617 by way of a resistor 623. The main power signal POWER is also applied to a source terminal 51 of the FET 615. A gate terminal G1 of the FET 615 is connected between the resistor 623 and the collector of the NPN transistor 625. The backlight power control signal BACKLITEON is used to conserve power under certain power management conditions discussed above. This signal BACKLITEON controls the NPN transistor 625. In particular, in a normal state, the backlight power control signal BACKLITEON is high, which turns ON the NPN transistor 625. When the NPN transistor 625 is ON, the gate terminal G1 of the FET 619 is connected to system ground, which turns the FET 619 ON, thereby connecting the main power signal POWER to the drain terminal D1 of the FET 619 to provide a power signal BACKLITEIN, which is filtered by a ferrite bead inductor 625 (FIG. 28) to provide the backlight power signal BACKLITEPOWER, that is applied to the LCD by way of the connector 615 (FIG. 27). When the backlight power control signal is low, for example, during a power management mode, the NPN transistor 625 turns OFF, thereby connecting the gate G1 of the FET 619 to the main power signal POWER by way of the resistor 623, thereby turning the FET 619 OFF, disconnecting power to the LCD.

Figure 22A:
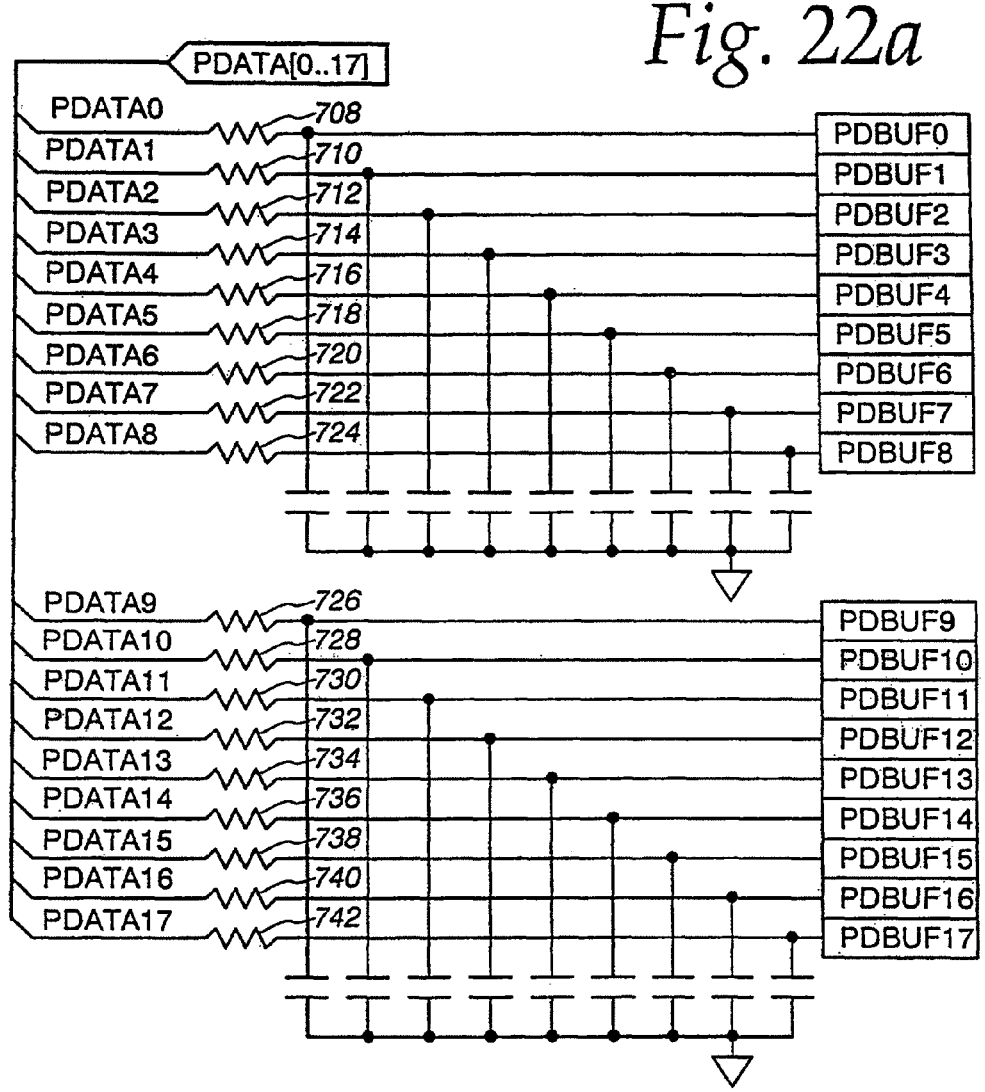
Figure 22B:
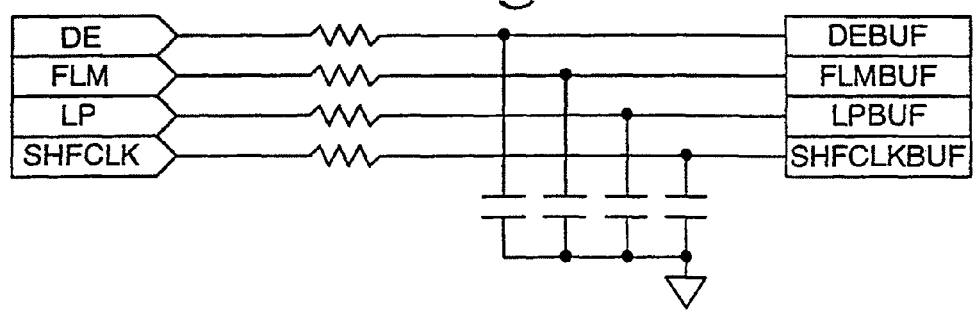
Figure 23A:
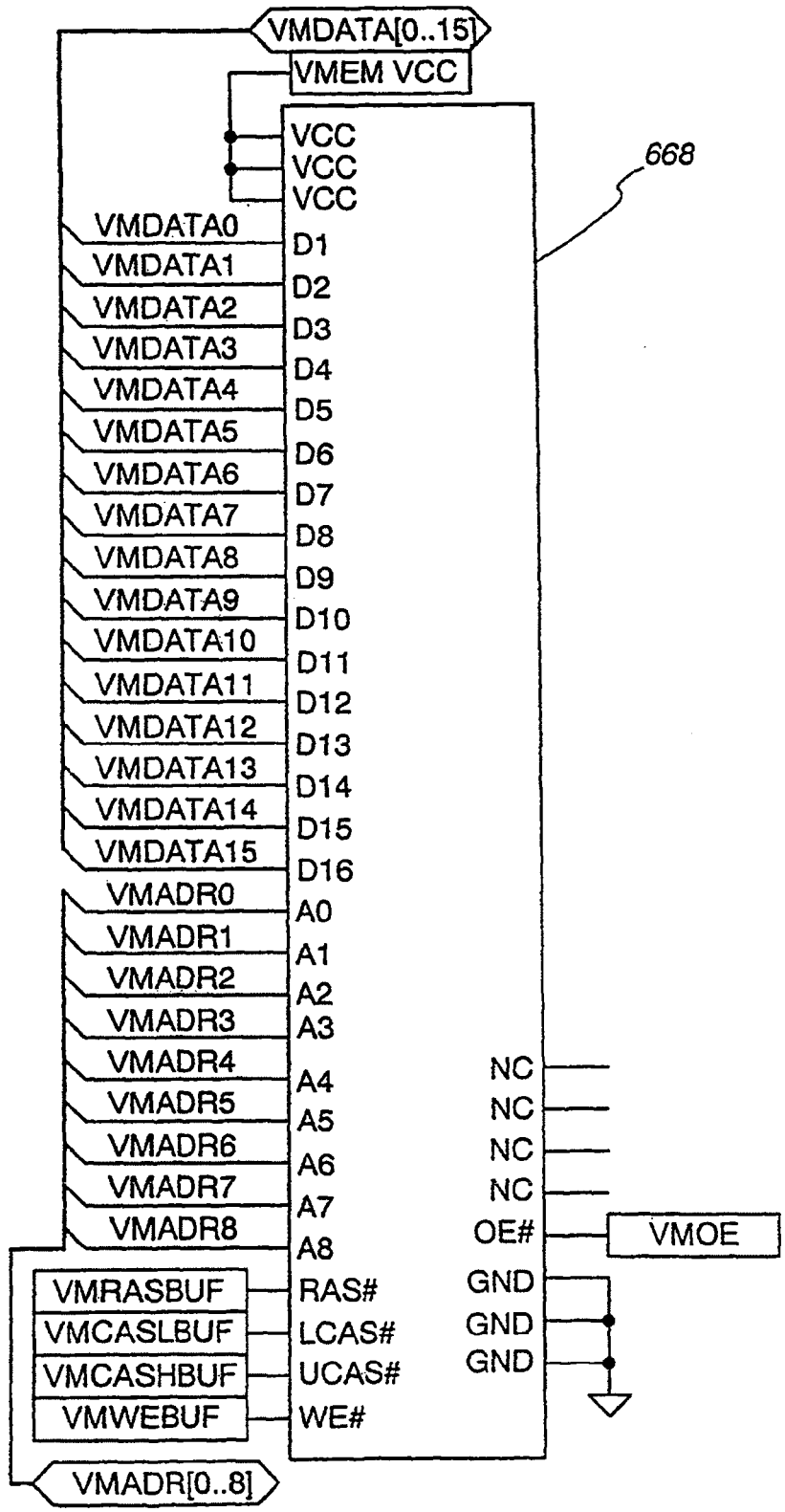
Figure 23B:
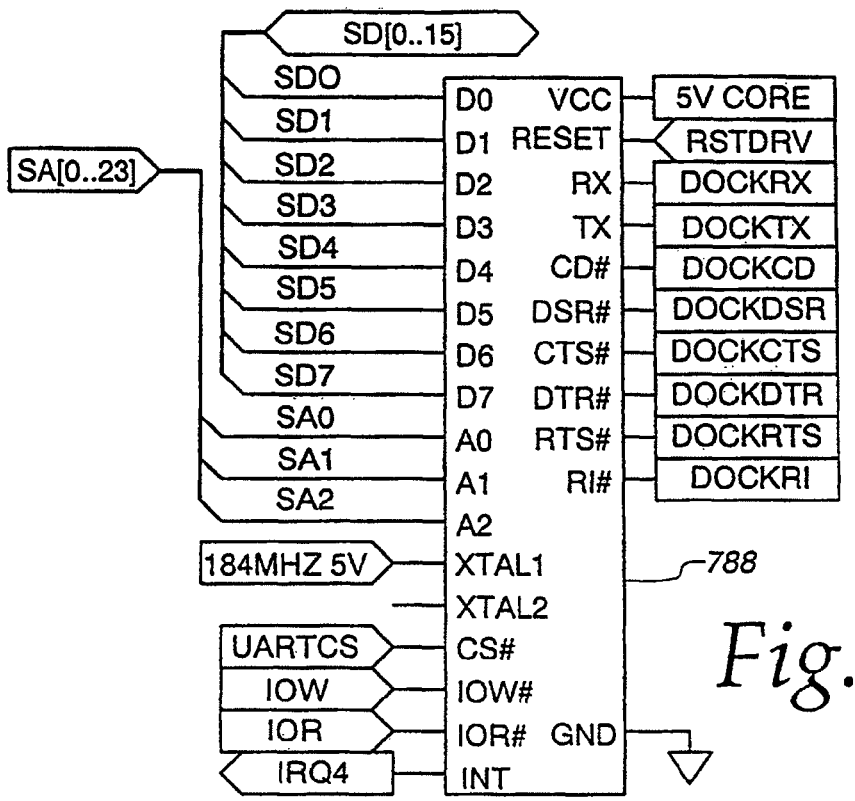
Figure 23C:
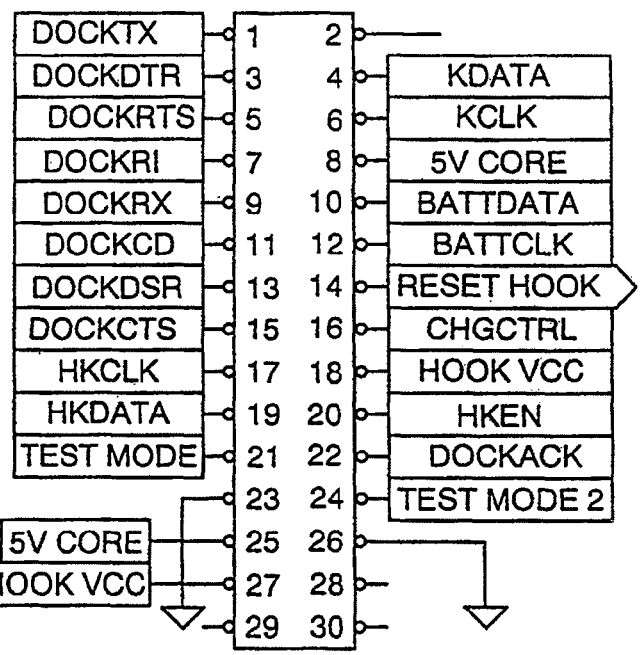
Figure 23D:
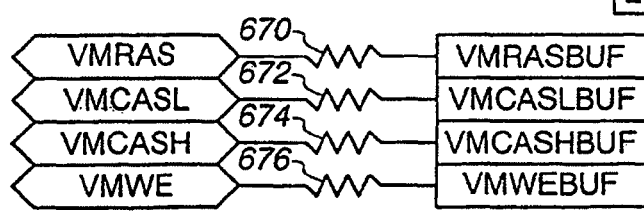
Figure 23E:
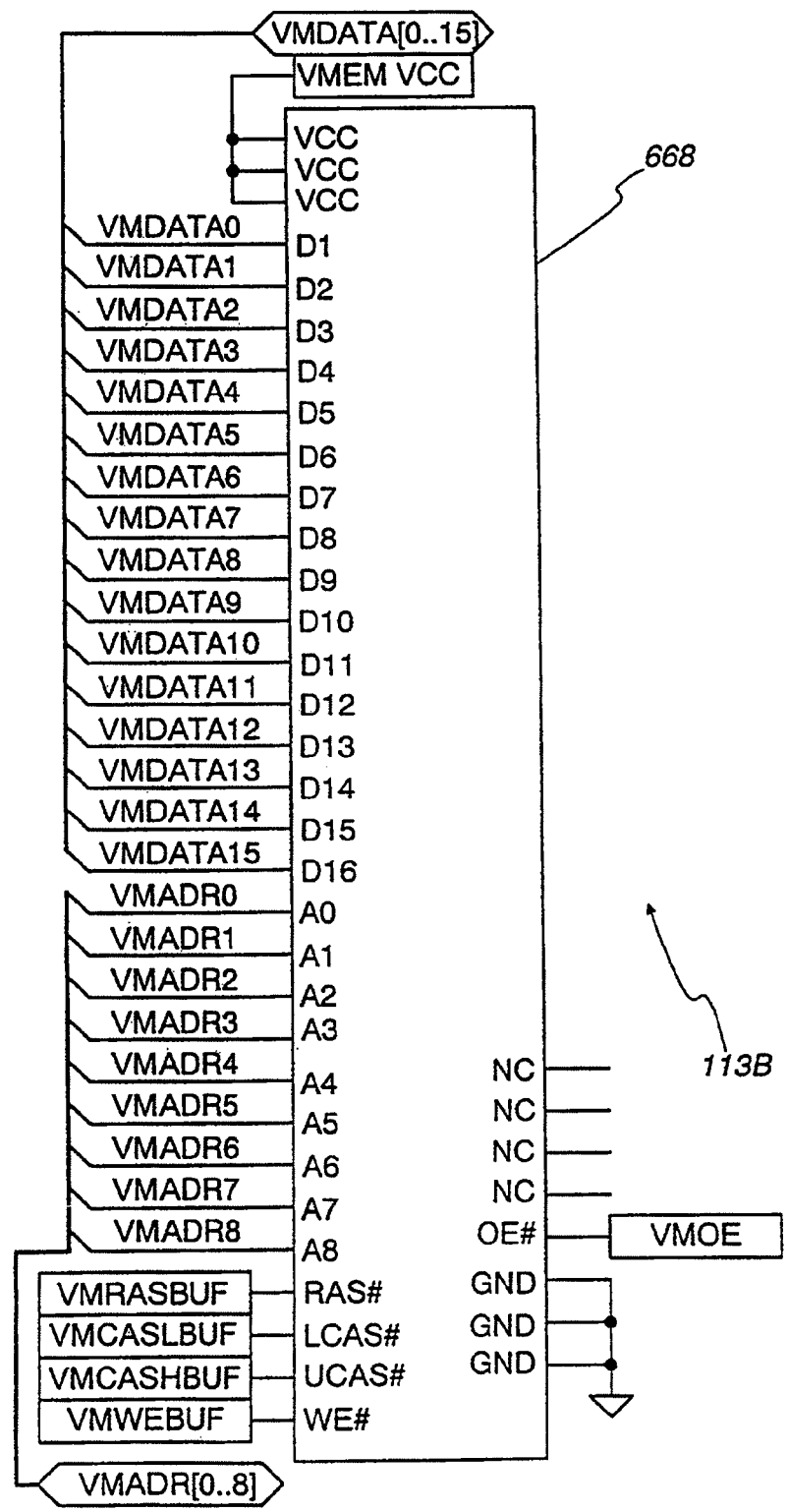

The FET 619 may be supplied as a dual element with two FETs in a single package. As shown in FIG. 20, the gate G2, source S2 and drain D2 terminals of the FET 619 are used to control power to the LCD, under the control of an LCD enable signal ENAVDD, available from the video controller 113A (FIG. 19). In particular, the LCD enable signal ENAVDD is normally high and is de-asserted to disable the LCD power supply LCD_POWER. This LCD enable signal ENAVDD is pulled low by a pull-down resistor 627 and applied to an inverter 629, whose output is connected to the gate terminal G2 of the FET 619. The LCD power supply signal LCD_VCC (FIG. 19) is applied to the source terminal S2 of the FET 619, while the drain terminal D2 represents the LCD power signal LCD_POWER, filtered by an inductor 629 and a capacitor 631. The LCD power signal LCD_POWER is connected to the LCD by way of the connectors 732 or 734 (FIG. 22). In operation, the LCD power enable signal ENAVDD is high, which turns on the FET 619 to enable the LCD power supply LCD_POWER. When the LCD power enable signal ENAVDD is de-asserted, the FET 619 is turned OFF.

The keyboard controller 125 (FIG. 15) is connected to the system data bus SD[0 . . . 7]. The system address bit SA2 is used for addressing the keyboard controller 125. In particular, the address terminal of the keyboard controller 125 is connected to bit SA2 of the system address bus SA[0 . . . 23].

Power to the keyboard controller 125 is provided by way of a 5-volt supply 5V_KBD, supplied to the power supply terminal VCC. The 5-volt supply 5V_KBD, provided by the DC-to-DC converter 300 (FIG. 26) by way of an in-line ferrite bead inductor 618. In addition to supplying power to the keyboard controller 125, the 5-volt supply 5V_KBD is used to pull-up various pins by way of pull-up resistors 620, 622, 624, 626, 628, 630, 632 and 634. In order to stabilize the 5-volt power supply 5V_KBD, a plurality of bypass capacitors 636 and 638 are connected between the power supply 5V_KBD and system ground.

As mentioned above, the keyboard controller 125 has various functions. One of those functions is to monitor when AC power is plugged into the machine from an AC adapter plug 633 (FIG. 29), connected to the external power supply signal AC/DCIN by way of a pair of EM1 filters 641 and 643, and a connector 645. In particular, an AC power signal ACPWR, available from an FET 635 (FIG. 20), is applied to port 3, pin 1 (FIG. 15) by way of an inverter 636. The external power supply signal AC/DCIN, available from the AC plug 633, is used to control the gate terminal of the FET 635, normally pulled down a pull-down resistor 637. A 5-volt supply 5V_CORE is connected to the drain terminal while the source terminal is used for the AC power signal ACPWR, pulled down by a pull-down resistor 639. When an external power source is not connected to the FET 635, the signal ACPWR will be low. Once external power is connected to the connector 633, the signal AC/DCIN from the IBP 130 goes low, which, in turn, turns on the FET 635 to cause the signal ACPWR to go high.

The keyboard controller 125 also monitors the status of the radio. As such, an output from the radio TX/RX_LED pin is applied to pin 2 of port 3 of the keyboard controller 125 by way of an inverter 638. When pin 1 of port 3 is high, the keyboard controller 125 interprets that the radio is in a transmit mode. Another signal from the radio CD_LED is used to provide an indication to the keyboard controller 125 that that radio is in a receive mode. This signal CD_LED is applied to pin 2 of port 3.

An 8 MHz clock signal 8 MHz_5V is used to drive the keyboard controller 125. The clock signal 8 MHz_5V is developed by the clock generator 398 and converted to a 5-volt level by way of the translator signal level translator 452.

The video controller 113A (FIG. 19) controls the video functions. The video controller 113A, for example, a model number CL-GD 6205 from Cirrus Logic, can support various video modes including a mono STN and a color TFT panel with up to 640×480 with 64 shades of gray. In addition, the video controller 113A will support 1024 by 768 resolution with 16 colors on a CRT through the aid of its on-board digital to analog converter.

The video controller 113A utilizes two clock sources for timing, generated by an internal clock generator to produce the required frequencies for the display and memory timing. Two separate analog power supply sources AVCCMCLK and AVCCVCLK are provided to the analog power supply inputs AVCC1VCLK and AVCC4MCOK on the video controller 113A. These analog power supply sources AVCCMCLK and AVCCVCLK are derived from the 3-volt power supply 3V_CORE, available at the DC-to-DC converter 300 (FIG. 26). In particular, the 3-volt power supply 3V_CORE is used to develop a 3-volt power supply VGA_VCC by way of an in-line ferrite bead inductor 642. The power supply VGA_VCC, in turn, is filtered by a plurality of bypass capacitors 644-642, connected between the power supply VGA_VCC and system ground. The 3-volt power supply VGA_VCC is used to develop the analog power supplies AVCCMCLK and AVCCVCLK by way of a plurality of resistors 654 and 656 as well as a plurality of by pass capacitors 658 to 664, connected to an analog ground AGND. The analog ground AGND is tied to the digital ground GND by way of a ferrite bead conductor 664.

The keyboard controller 125 also provides various miscellaneous system functions by way of its I/O ports 0, 1, and 3. Five port bits P0.0-P0.5 of port 0 are used for system control. Bit 0 is used to generate a signal KBC-P00, an active high signal, which disables the general purpose chip select signals GPCS1 and GPCS2, available at the system controller 129 (FIG. 12) during boot-up, until the signals GPCS1 and GPCS2 are properly configured. As discussed above, the general purpose chip select signals GPCS1 and GPCS2 are used for selecting the pen controller 110A (FIG. 21), the radio interface 114B (FIG. 16) and the UART (134). Bit P0.1 is used to generate a contrast signal CONTRAST, normally pulled low down by a pull-down resistor 639 (FIG. 5) for contrast control of the LCD as discussed above. Briefly, the contrast signal CONTRAST is used to step the 24-volt supply 586 (FIG. 27). Bit P0.2 is used to generate a keyboard shutdown signal KBSHUTDOWN. This signal KBSHUTDOWN, discussed below, is active low, and in conjunction a pen shutdown signal PEN_SHUTDOWN, available at the pen controller 110A (FIG. 21), is used to generate a shutdown signal SHUTDOWN to shutdown the AC-to-DC converter 300 (FIG. 26) during low power conditions. More particularly, the keyboard shutdown signal KBSHUTDOWN, pulled up by a pull-up resistor 641, and the pen shutdown signal PEN_SHUTDOWN, pulled low by a pull-down resistor 643, are diode ORed by a pair of diodes 645 and 647. The cathodes of the diodes 645 and 647 are joined to form the active low shutdown signal SHUTDOWN. If the keyboard shutdown signal KBSHUTDOWN is asserted, the shutdown signal SHUTDOWN will be forced low, which, in turn, is used to disable the DC-to-DC converter 300 (FIG. 26). Bit P0.3 is used to generate a signal FLASHVPP to enable the flash memory devices 742-748 (FIG. 25) to be programmed. In particular, when the signal FLASHVPP is low, the flash memory devices 742-748 can be programmed. Bit P0.4 is used to generate a signal KBC_PO4. The signal KBC_PO4 is an active high signal and is used to indicate to the system controller 129 (FIG. 12) that a low battery condition has occurred. Bit P0.5 is used for speaker control as discussed above. The pen P0.5 is used to generate the speaker disable signal SPKRDISABLE, an active high signal.

Port 1, bits P1.1, P1.5, P1.6, and P1.7 of the keyboard controller 125 are used for system functions. Bit P1.1 is configured as an input and is used to indicate to the keyboard controller 125 that the system is in a test mode. As discussed above, the test mode signal TEST_MODE is used to enable the flash memory device 742 (FIG. 25) to be programmed. In particular, as discussed above, the test mode signal TEST_MODE is used to generate a decode signal FLIP SA18 (FIG. 17) for decoding of the flash memory device 742. Port 1, bits P1.5, P1.6, and P1.7 are used for LCD control. In particular, the pen P1.5 may be used for LCD status control. the pens P1.6 and P1.7 are used for brightness control of the LCD as discussed above.

Port 3, bits P3.1, P3.2, P3.3, P3.4, P3.5, and P3.7 are configured as inputs. As discussed above, a signal ACPWR, available from the source of the FET 635 (FIG. 20), is applied to the pin P3.1. This signal ACPWR notifies the keyboard controller 125 that an external power source is connected to the system. The signal CD_LED is applied to the pin P3.2. This signal, CD_LED, available from the radio interface (FIG. 16), indicates that the radio is receiving a signal. A signal TX/RX_LED, also available from the radio interface, is applied to the pin P3.3. This signal TX/RX_LED indicates that the radio is in a transmit mode. A signal DOCKACK/: may be applied to the pin P3.4. This signal may be used to indicate to the keyboard controller 125 that a device is docked to the UART 134. The development of the signal DOCKACK/: does not form a part of the present invention. A second test mode signal TEST MODE_2 may be applied to the pin P3.5 for added functions. A signal PC5_P37 is applied to the pen P3.7. This signal PC5_P37 is available from the system controller 129 (FIG. 12) and indicates that the system is in a sleep state as discussed above.

The video controller 113A is connected to the system database SD[0 . . . 15] as well as the system address bus SA [0 . . . 23] and is adapted to support the video memory 113B of either 256K by 16-bit or 256K by 4-bit video memory chips 666 or 668. These video memory chips 666 and 668, for example 256K by 16 dram memory chips, as manufactured by Toshiba Model No. NE4244170-70, are connected to a 16-bit video memory databus VMDATA[0 . . . 15] and the 9-bit video memory address bus VMADR[0 . . . 8]. The video memory chips 666 and 668 are accessed in the range from A000H-BFFFFH and are switched to allow access to a full 512 kilobyte range. The video memory chips 666 and 668 are provided with dual column address strobe (CAS) pins to allow byte selection. The video memory column address strobes LCAS and UCAS are under the control of the high and low video memory column address strobe low and high signals, VMCASL and VMCASH, which are applied to the LCAS and UCAS pins by way of a pair of current-limiting resistors 670 and 672 to generate the buffered CAS the lower and high CAS signals VMCISLBUF and VMCASHBUF. The row address strobe signal VMRAS from the video controller 113A, as well as the write/enable signal VMWE, are also applied to the video memory 666 and 668 by way of current limiting resistors 674 and 676 respectively. The output/enable pin on the video memory chips 666 and 668 is under the control of a video memory operate/enable signal VMOE. This video memory operate enable signal VMOE is generated by the video controller 113 and is applied directly to the video memory chip 666 and 668.

Various power supply signals VGA_VCC, LCD_VCC, VGABUS_VCC and VMEM_VCC are applied to the video controller 113A. The power supply VMEM_VCC is applied to the VMEM_VCC pins on the video controller 113A and is also used as the power supply for the video memory chips 666 and 668. The video memory power supply VMEM_VCC may be supplied as either a 3-volt or 5-volt power supply. More particularly, both a 3-volt and 5-volt power supply 3V_CORE and 5V_CORE. Depending on whether 3-volt or 5-volt operation is selected, only one of the component positions illustrated as ferrite bead inductors 680 or 682 will be populated to produce the power supply VMEM_VCC.

As will be discussed in more detail below, the system also includes an LCD controller to control the LCD screen 113C. The power supply for the LCD controller LCD_VCC can likewise be supplied as either three volt or five volt by way of the 3- and 5-volt power supply voltages 3V_CORE and 5V_CORE, available at the DC-to-DC converter 320 (FIG. 26). Depending on the voltage selected, only one of the component locations 684 and 686 will be populated to provide the LCD power supply voltage LCD_VCC. In addition, a power supply voltage VGABUS_VCC is used for the VGA bus. This power supply voltage VGABUS_VCC is generated by the DC-to-DC converter 320 by way of a ferrite bead inductor 688.

In order to filter noise out of the power supply signals, various bypass capacitors are connected between the power supply signals and system ground. For example, a plurality bypass capacitors 690-696 are coupled between the power supply signal VMEM_VCC and the system ground. Similarly, a pair of bypass capacitors 698 and 700 are connected between the power supply signal LCD_VCC and the system ground. Lastly, a plurality of bypass capacitors 702 to 706 is connected between the power supply signal VGABUS_VCC and the system ground.

Additional filtering is provided for the analog subsystem. In particular, a filter consisting of a pair of capacitors 708 and 710 and a resistor 712 is connected to a filter terminal VFILTER and analog ground AGND. Similarly, another pair of capacitors 714 and 716 and a resistor 718 are connected between a signal MFILTER and analog ground AGND.

The video controller 113A requires two separate clock signals: 14 MHz; and 32 KHz. The 14 MHz clock signal is used for most timing including the LCD panel memory and the bus cycle while the 32 KHz clock signal is used for video memory refreshing when the system is suspended. These clock signals are supplied by the clock generator 398 (FIG. 13) by way of the signal level translator 452 (FIG. 14). More particularly, 32 KHz and 14 MHz clock signals 32 KHz and 14 MHz from the clock generator 398, respectively, are applied to the signal level translator 452 to transform these respective signals into 5-volt signals 32 KHz__5V an 14 MHz__5V to provide a suitable clock signal voltage for the video controller 113A.

RGB data from the video controller 113A (FIG. 19) is supplied to the LCD screen 113C by way of a data bus PDATA[0 . . . 17]. This data bus PDATA[0 . . . 17] is applied to a plurality of current limiting resistors 708-742, respectively, to generate the buffer signals PDBUF[0 . . . 17]. These buffer signals PDBUF[0 . . . 17] are connected to the LCD panel 113 along with various control signals by way of a pair of connectors 732 and 734.

Figure 25A:
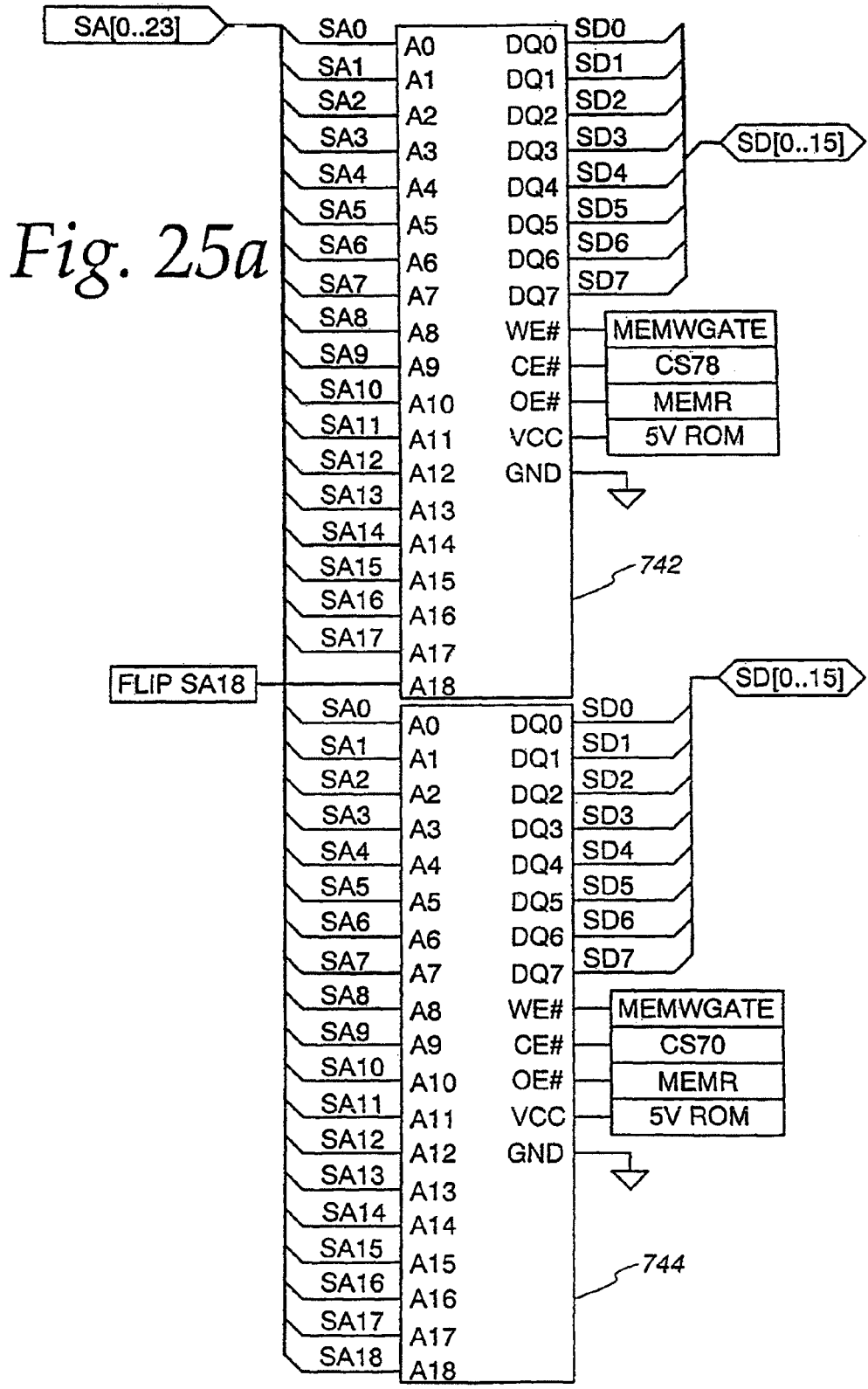
Figure 25B:
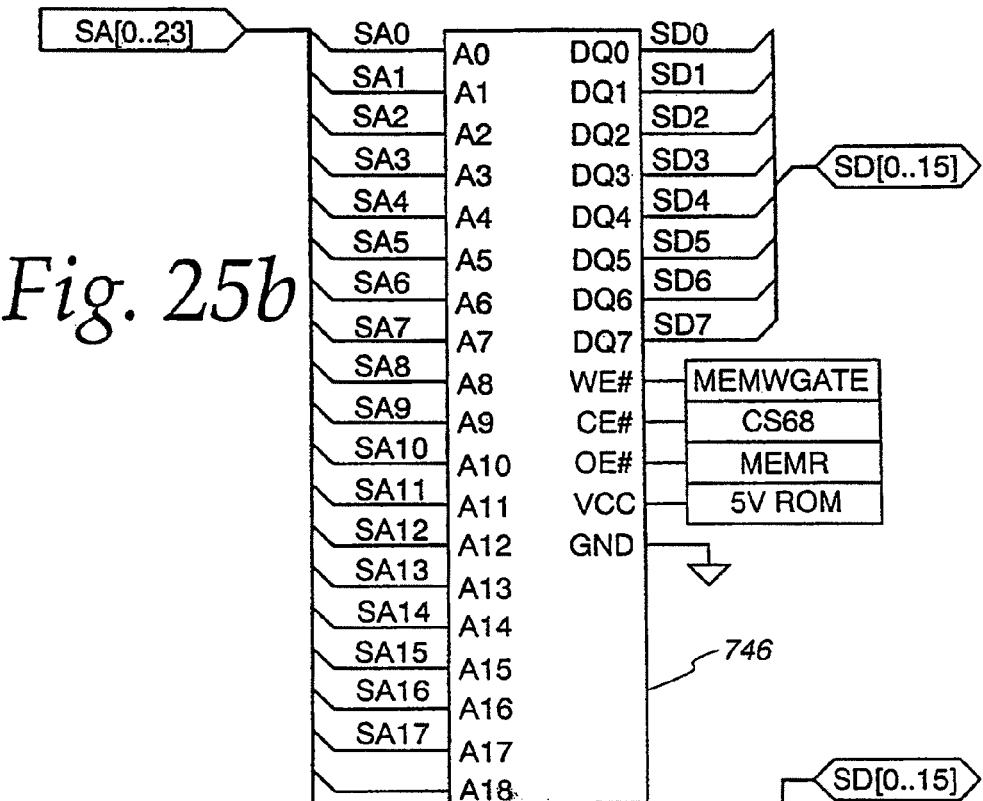
Figure 25C:
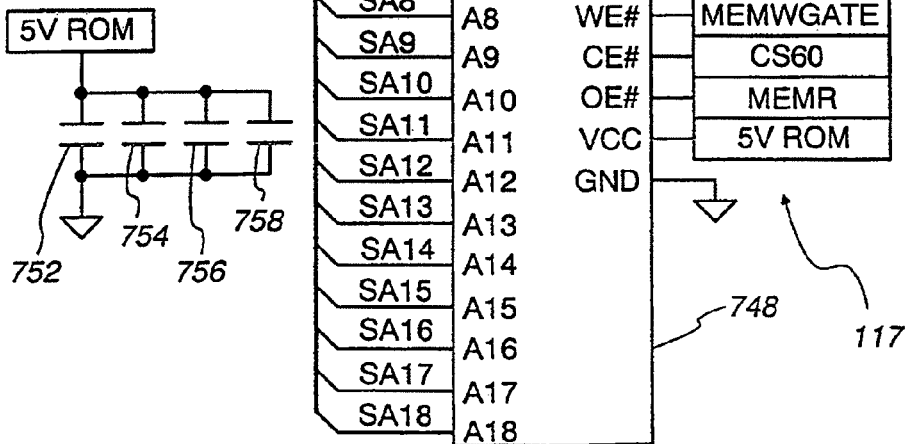
Figure 26A:
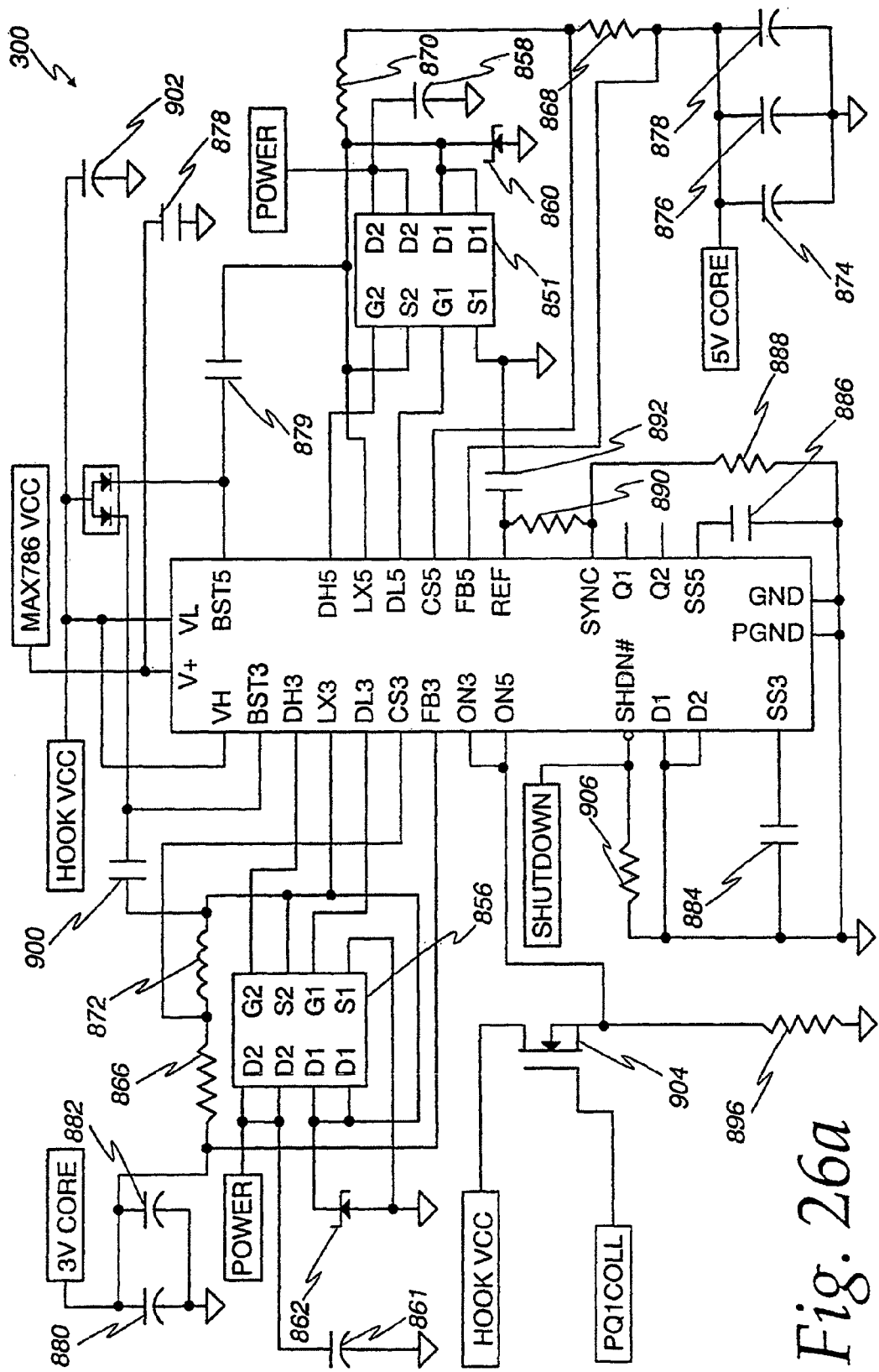
Figure 26D:
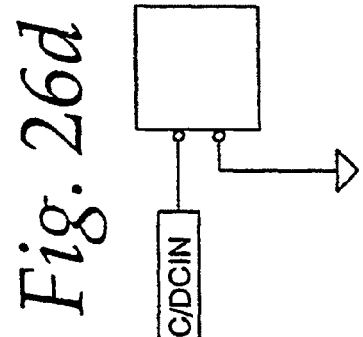
Figure 26B:
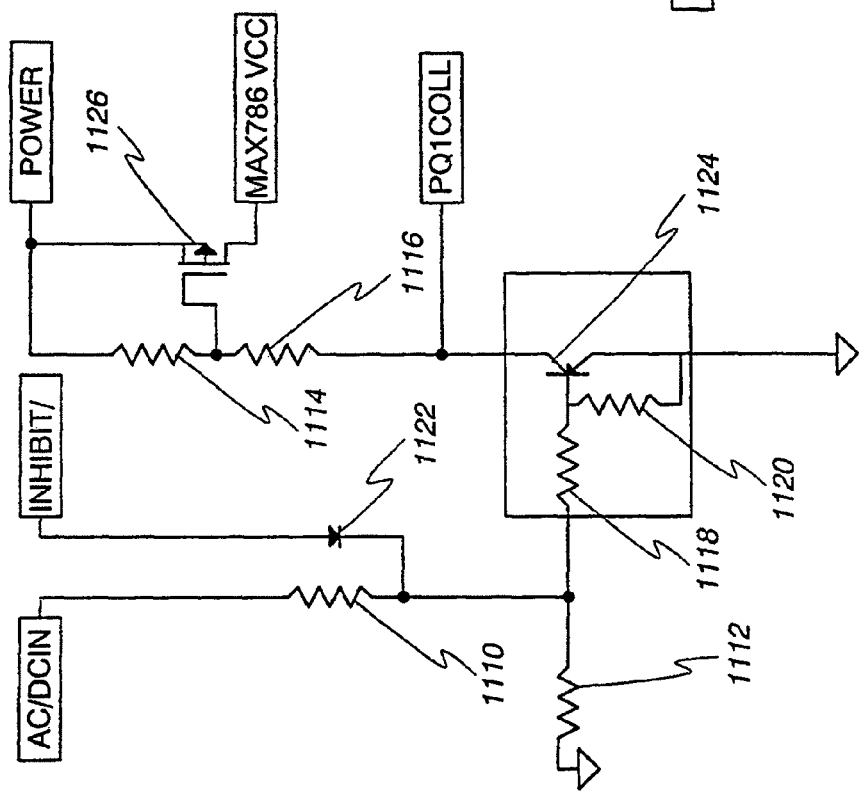
Figure 26C:
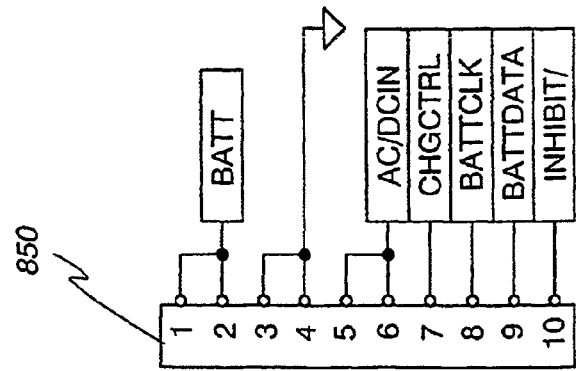
Figure 29E:
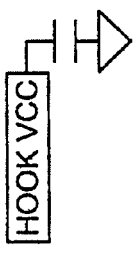
Figure 29D:
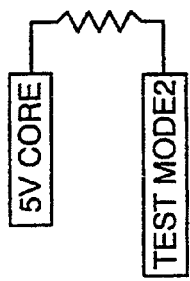
Figure 29F:
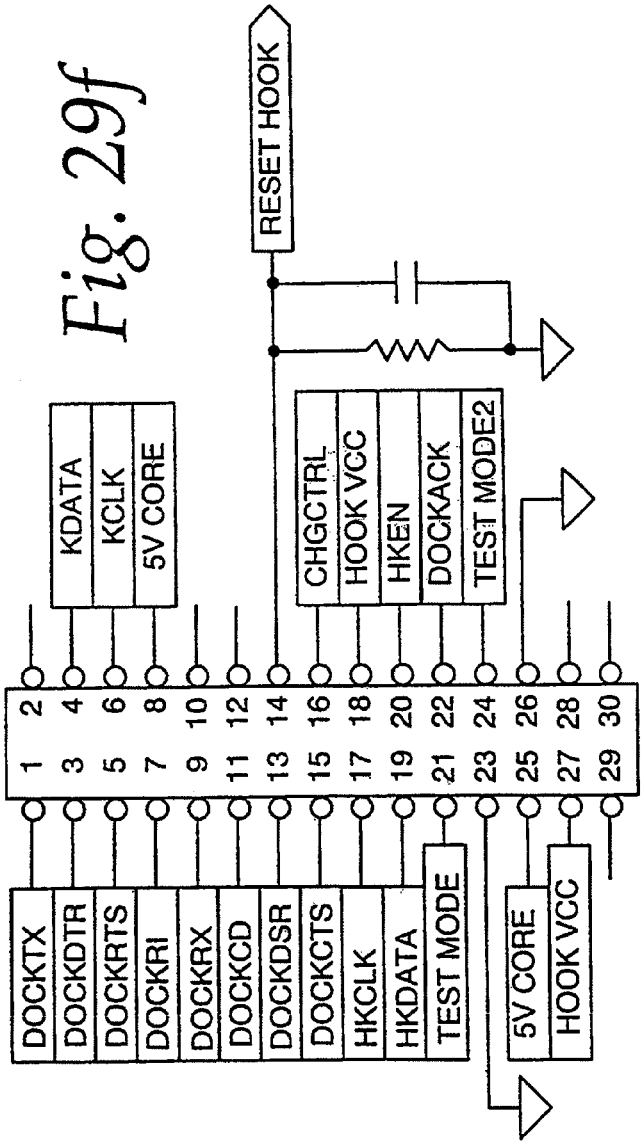
Figure 29G:
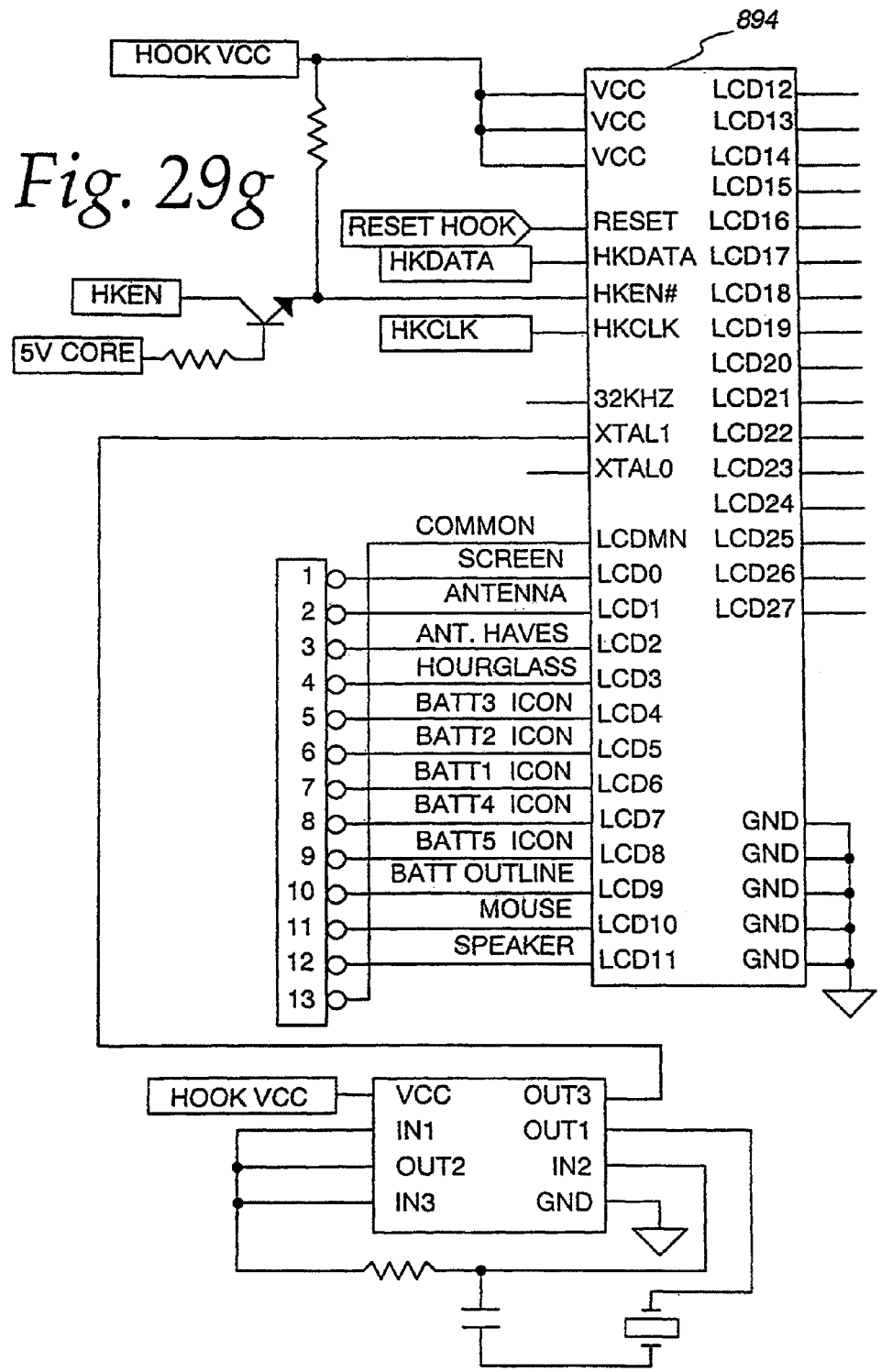
Figure 30A:
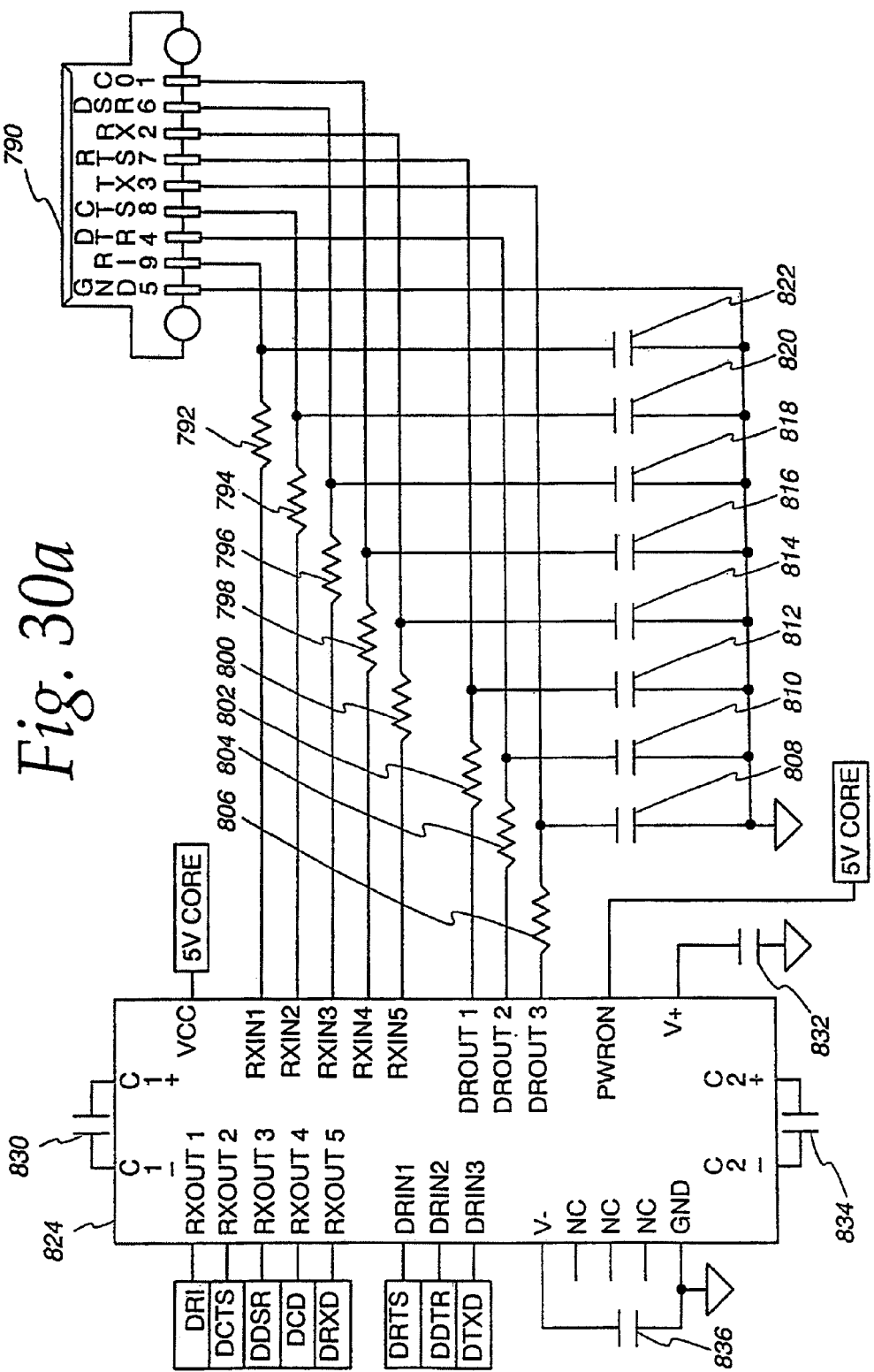
Figure 30C:
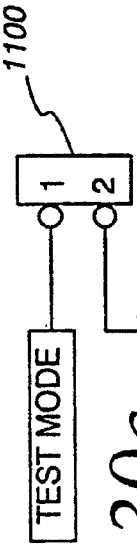
Figure 30D:
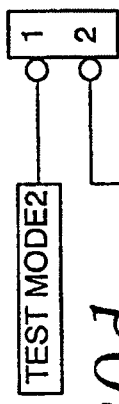
Figure 30E:
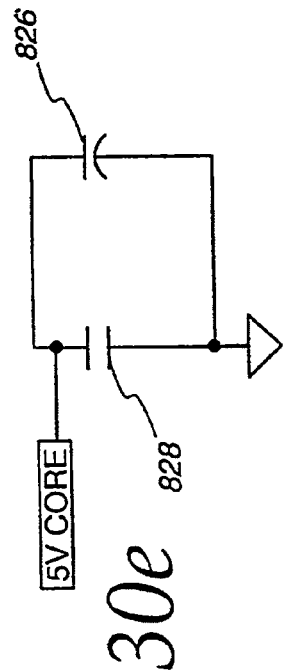
Figure 30B:
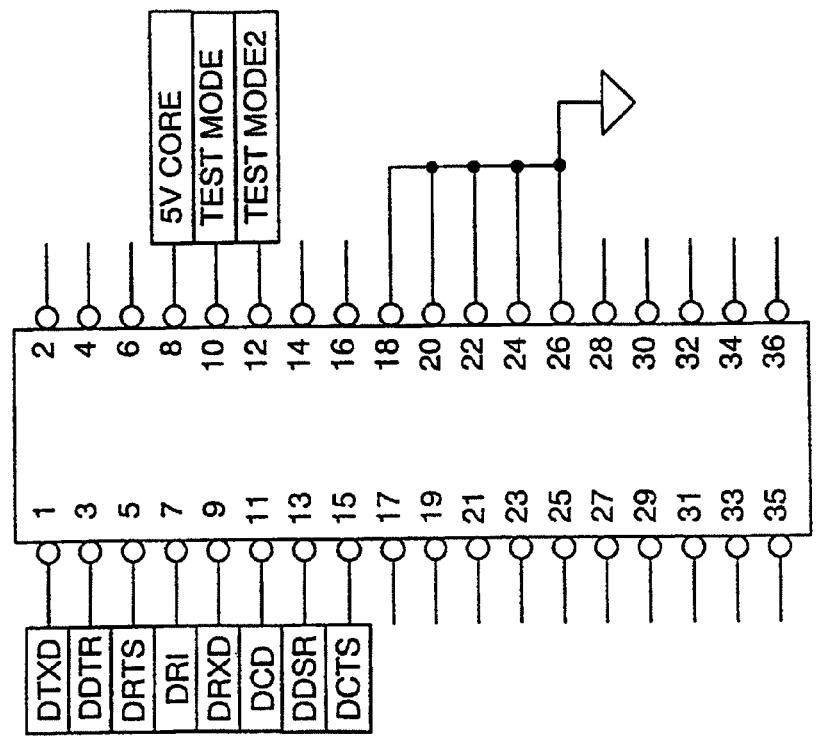

The BIOS as well as other data is stored in flash memory, for example, 512K by 8-bit memory devices 742-748 (FIG. 25). These flash memory devices 742-748 are connected to the local ISA bus 150 by way of the system address bus SA [0 . . . 23] and the system data bus SD[0 . . . 15]. The chip enable pins CE of the flash memory devices 742-748 are selected by a decoder circuit (FIG. 17), as will be discussed in more detail below. The output enable pins OE on the flash memory devices 742-748 are under the control of a memory read signal MEMR. The memory read signal MEMR is under the control of the system controller 129. The write/enable pins WE, which are active low, are under the control of a memory right gate signal MEMWGATE. This signal MEMWGATE is only enabled when the flash memory devices 742-748 are being programmed. As discussed above, programming of the flash memory devices 742-748 is under the control of a flash program signal FLASHVPP, available at port 0.3 of the keyboard controller 125 (FIG. 15). This programming signal FLASHVPP, normally pulled high by a pull-up resistor 749 (FIG. 17), is ORed with a memory write signal MEMW by way of an OR gate 751 to generate a signal MEMGATE, an active low signal.

The power supply for the flash memory devices 742-748 is developed by a 5-volt power supply signal 5V_ROM. The 5-volt power supply signal 5V_ROM is available from the DC converter 300 (FIG. 20) by way of a ferrite bead inductor 751. This power supply signal 5V_ROM is also connected to a plurality of by-pass capacitors 752-758, for stabilization.

Decoding of the flash memory devices 742-748 is provided by the circuitry that includes the buffers 760, 762, the inverters, 764, 766, and 768 and OR 770 and a 3- to 8-bit multiplexer, Model No. 74HCT138, for example, as manufactured by Motorola and a pair of resistors 772 and 774 (FIG. 17). In particular, the system address bits SA[19 . . . 21] are applied to a 3- to 8-bit multiplexer 776. The system address bit SA18 is applied to the inverter 760 to develop a FLIP_SA18 signal that is pulled down by the pull-down resistor 774. During a normal boot-up, the FLIP_SA18 signal will be same as the system address bit SA18. However, during a test mode boot-up, the FLIP_SA18 signal will be low until a control signal available at the control signal GPIOO, available at the system controller 129, goes low in order to enable the system to boot from the BIOS in the flash memory device 742 as will be discussed in more detail below. Once the GPIOO signal goes low, the FLIP_SA18 signal will be the same as the system address bit SA18.

The multiplexer 776 is under the control of a flash memory rewrite signal MRW. This signal MRW and the system address bit SA[23]. The flash memory read write signal MRW is under the control of an OR gate 780. The OR gate 780, in turn, is under the control of memory read and write signals MEMW and MER, which are applied to a pair of inverters 782 and 784, respectively, and, in turn, to the OR gate 780. The memory read MEMR and memory write MEMW signals are available from the system controller 129.

The output of the multiplexer 776 is used to generate the chip select signals CS60, CS68 and CS70. In order to provide the ability of the flash memory device 742 to be addressed during a test mode, the chip select signal CS78 is under the control of an OR gate 770 and a plurality of inverters 764-768. During a normal mode of operation, the chip select signal CS78 will be under the control of the multiplexer 776. During a normal boot up, the chip select signal CS78 for the flash memory device 742 will be under the control of a ROM chip select signal ROMCS, available at the system controller 129 in order to enable the system BIOS to be shadowed into the DRAM 111A.

In order to provide the ability of the system to update the BIOS in the flash memory device 742 and to recover from a corruption of the BIOS data in the flash memory device 742, a uniform asynchronous receiver transmitter (UART) 788 (FIG. 23) is provided. The UART 788 is connected to the system data bus SD[0 . . . 15] and the system address bus bits SA[0 . . . 2]. The UART 788 is powered by the 5-volt power signal 5V_CORE, available at the DC-to-DC converter 320 (FIG. 26). A 1.84 MHz clock signal, 1.84 MHz__5V, available at the signal level translator 452, is used to drive the UART 788.

A serial interface 790 (FIG. 30), consisting of a standard DB-9 connector, enables external serial data to be received by the UART 788 (FIG. 23). The UART signals are filtered by way of a plurality of resistors 792-806 and bypass capacitors 802-822 and applied to an optional disaster recovery adapter 824, an RS-232 interface, connected to the rear of the DB-9 connector 790 and permits the flash memory devices 742-748 (FIG. 25) to be updated by an external source in the event of a flash disaster. The flash recovery adapter 824 may be implemented as a DB-9 connector and is connected to the 5-volt power supply 5V_CORE, which, in turn, is connected to a plurality of bypass capacitors 826 and 828. An additional four capacitors 830-836 are connected to the module 824 as shown.

The power supply for the system includes the DC-to-DC converter 300 which has the ability to provide both 3-volt and 5-volt power supplies signals to the various subsystems as discussed. The DC-to-DC converter includes a switching power supply 850, for example, a Maxim type 786. One source of power to the DC-to-DC converter 300 is the IBP 130, for example, 7.2 volts nominal, as well as from an external source of AC power connected to the plug 633 (FIG. 29).

Input power to the DC-to-DC converter 300 may be from an AC/DC converter (not shown) connected to the plug 633, which has a DC output voltage between 5.5-15 volts DC, applied to a power supply terminal AC/DCIN (FIG. 28) as well as internal batteries, for example, the IBP 130, connected to the system by way of a connector 850 (FIG. 26). The battery supply voltage from the IBP 130 is connected to the battery positive terminal BATT (FIG. 28). The two supplies BATT and AC/DCIN are alternatively used to develop a main power signal POWER (FIG. 28), that is applied to a switching power supply 851, for example, a Maxim type 786 by way of a pair of FETS 854 and 856 (IL. 26), under the control of a main power switch 855 (FIG. 28). The main power signal POWER is applied to a drain input D2 on each of the FETS 854 and 856. A bypass capacitor 860 is connected to the drain terminal D2 of the FET 856 and system ground. The source terminals S2 of each of the FETS 854 and 856 is connected to the switching power supply 851 to provide 5- and 3-volt references by way of the zener diodes 860 and 862, respectively. The gate terminals G1 and G2 of the FETS 854 and 856 are under the control of the switching power supply 851.

The switching power supply 851 provides both a 3-volt and 5-volt output voltages 3V-CORE and 5V-CORE by way of filters which include a plurality of resistors 866 and 868, a plurality of inductors 870 and 872, and a plurality of capacitors 874-882 as well as a capacitor 879. For proper operation, the D1 and D2 terminals on the switching power supply 851 are connected to the system ground along with the ground pins PGND and GND. The SS3 and SS5 pins are connected to system ground by way of a pair of capacitors 884 and 886.

The frequency of the switching power supply 851 is under the control of a pair resistors 888 and 890 and a capacitor 892, connected to the SYNC and reference terminals on the switching power supply 851. A HOOK-VCC signal is applied to the VH and VL pins of the switching power supply 851. This signal HOOK-VCC is available from the module 894 (FIG. 29), discussed above. The signal HOOK-VCC signal is connected to the switching power supply 851 by way of a resistor 896 (FIG. 26); a plurality of capacitors 898, 900 and 902; and an FET 904.

As mentioned above, both the pen controller 110A (FIG. 21) and keyboard controller 125 (FIG. 15) are used to develop a shutdown signal SHUTDOWN. The shutdown signal SHUTDOWN is pulled low by a pull-down resistor 906 and applied to an active low shutdown pen SHDN* on the switching power supply 851. The shutdown signal SHUTDOWN (FIG. 20) is indicative of a shutdown by the keyboard controller 125 (FIG. 15).

As mentioned above, one source of power for the system is the IBP 130 which accounts for temperature and discharge rates and sends it to the keyboard controller 125 (FIG. 15). Two predefined levels are set in the IBP 130 to indicate low battery and critical battery. The IBP 130 will inform the keyboard controller 125 of a low battery when there is approximately five minutes left. When the battery charge is between 5 minutes to 2 minutes, the IBP 130 will report a battery critical condition. Within the final thirty seconds the IBP 130 will force an immediate shutdown. The IBP 130 will report the battery status approximately once every 2.5 seconds. If the system is changing to a power savings mode, a command will be sent to the IBP 130 to put the IBP 130 into a power-saving state. The IBP 130 will tri-state its communication lines and discontinue reporting battery status to the system.

A charge control signal CHGCTRL from the IBP 130 is used to control charging. Referring to FIG. 28, the charge control signal CHGCTRL is applied to a zener diode 910, for example, a 5.1V zener diode. The zener diode 910 controls whether the IBP 130 is fast charged or trickle charged as a function of the magnitude of the charge control signal CHGCTRL.

In particular, if the magnitude of the charge control signal CHGCRL is less than the zener breakdown voltage (i.e., less than 5.1 volts), the IBP 130 is trickle-charged by way of series pass transistor 912, a pair of resistors 914 and 916 from the external power signal POWER by way of a diode 918, a fuse 920 and a filter consisting of an inductor 922 and a capacitor 924.

Should the charge control signal CHGCTRL be greater than the zener breakdown voltage of the zener diode 910, the IBP 130 will be fast charged by way of an FET 928 whose source terminal is connected to the AC/DC converter by way of the diode 918 and drain terminal, connected to the battery positive terminal BATT by way of the fuse 920 and the inductor 922.

The series pass transistor 912 that controls trickle charging is under the control of an FET 930. The drain terminal of the FET 930 is connected to the system ground while the source terminal is connected to the base terminal of the PNP series pass transistor 912. Normally, the series pass transistor 912 is turned off with its base terminal being high by way of its connection to a pair of biasing resistors 932 and 934, which, in turn, are connected to the main power signal POWER by way of the diode 918. When the charge control signal CHGCTRL is less than the breakdown voltage of the zener diode 910, the charge control signal CHGCTRL turns on the FET 930 by way of the biasing resistors 936 and 938 a coupling capacitor, connected to its gate terminal. Once the FET 930 is turned on, it, turns on the series pass transistor 912 to provide a charging path between the main power signal POWER and the battery positive terminal BATT.

As mentioned above, fast charging of the battery is under the control of the FET 928. The FET 928, in turn, is under the control of a PNP transistor 926. The PNP transistor 926, which includes a pair of biasing resistors 940 and 942, is connected to the collector terminal of an NPN transistor 942. The base of the NPN transistor 942 is connected to a pair of biasing resistors 944 and 946 and, in turn, to a collector terminal of another NPN transistor 948 and the main power signal POWER. The NPN transistor 948 is biased by way of a pair of biasing resistors 950 and 952 and, in turn, to the anode of the zener diode 910.

In operation, when the charge control signal CHGCTRL exceeds the breakdown voltage of the zener diode 910, the zener diode 910 conducts thereby biasing the NPN transistors 942 and 948, turning them ON. Once the NPN transistor 942 is turned ON, the base terminal of the PNP transistor 926 is connected to ground, thereby turning the PNP transistor 926 ON. The PNP transistor 926, in turn, connects the main power signals POWER to the gate terminal of the FET 928 by way of the diode 918, thereby turning the FET 928 ON to enable the battery positive terminal BATT to be fast charged from the AC-to-DC converter.

As mentioned above, the wireless interface device 100 includes a radio system which allows for wireless interfacing with a host computer and also wireless interfacing to both a wired local area network (LAN) and a wireless LAN. The radio subsystem has been discussed above. It is implemented by way of an interface 960 (FIG. 16), implemented by way of a 25×2 header, which connects the radio subsystem to the balance of the circuitry in the wireless interface device 100. In particular, the system data bus SD[0 . . . 15], as well as the system address bus bits SA[0 . . . 2] are connected to the interface 960. The radio interface 960 is under the control of the system controller 129 (FIG. 12), such as I/O write (IOW), I/O read (IOR) and an address enable signal (AEN).

Output signals from the radio interface 960 include the signals CD_LED, TX/RX_LED, IRQ10 and IOCS16. As discussed above, the signal CD_LED indicates a connection has been made with a host computer 101. The signal TX/RX- LED indicates that a signal is either being sent or received through the radio interface 960. As mentioned above, the peripheral controller 128 (FIG. 13) is responsible for interrupt control. Thus, the radio subsystem interrupt IRQ10 is applied to the peripheral controller 128. Power supply for the radio interface 960 is by way of a 5-volt power supply signal 5V_CORE, available at the DC-to-DC converter 300 (FIG. 26), which is filtered by a pair of bypass capacitors 962 and 964.

The interrupts for both the radio interface 960 IRQ10, as well as the UART 788 (FIG. 23) IRQ4, are formed into a common signal IRQ10/4 and applied to the system controller 129 by way of a resistor 966. In particular, the radio interface interrupt signal IRQ10 is applied to an inverter 962, whose output is ORed by way of the OR gate 964 with the UART 788 interrupt signal IRQ4. The output of the OR gate 964 forms the combined interrupt signal IRQ10/4.

The radio interface 960, as well as the UART 788 (FIG. 23), are selected by the chip select signals RADIOCS and URTCS. These signals are available at the output of a pair of the OR gates 968 and 970, respectively. The system address bit SA3 is inverted by way of an inverter 972 and ORed with a general purpose chip select gate signal GPCS1GATE by way of the OR gate 970 to generate the UART chip select signal UARTCS. The system address bit SA3 is applied directly to the OR gate 968 and ORed with the general purpose chip select gate signal GPCS1GATE to generate the radio chip select signal RADIOCS. The general purpose chip select signal gate signal GPCS1GATE is available at the output of an OR gate 974. In particular, a general purpose chip select signal GPCS1, available from the system controller 129 (FIG. 12), is ORed with an output from pin 0 of port 0 of the keyboard controller 125 (FIG. 15) to cause the radio interface 960 to be addressed at addressed 3E0-3E7 and the UART 788 to be addressed at address 3EA-3EF. The signal KBC_P00 is normally pulled up to the 5-volt power supply voltage 5V_CORE by way of a pull-up resistor 976.

The pen controller 110A is illustrated in FIG. 21 and is adapted to cooperate with an analog-resistive type digitizer 106. The pen controller 110A includes a controller 980, for example a Motorola type MC68HC705J2 microcontroller, with the firmware being programmed within the part. The controller 980 communicates with the system by way of the system data bus SD[0 . . . 15]. In particular, serial data from a port PB6 on the controller 980 is applied to a shift register 982, which, in turn, is connected to an 8-bit parallel buffer 984, which, in turn, is connected to the serial data bus SD [0 . . . 15]. The controller 980 is adapted to be used with an analog-resistive touch screen digitizer, for example a drawing No. 8313-34 Rev. C4, as manufactured by Dynapro. XY information from the digitizer 106 is received by the controller 980 by way of a connector 986. The X and Y information from the digitizer is connected to a 12-bit analog-to-digital (A/D) converter and also applied to port PA5 of the microcontroller 980. In particular, the X-data from the digitizer is applied to the A1 terminal of the A/D converter 988 by way of a pull-up resistor 990 and an FET 992. The FET 992 is under the control of a charge pump 994, for example a Linear Technology Model No. LTC1157C58. The Y-data from the digitizer is applied to the terminal A1 of the A/D converter 988 by way of a current-limiting resistor 994. A pair of bypass capacitors 996 and 998 are tied between the terminals A0 and A1 of the A/D converter 988 and an analog ground PEN AGND. The X+, Y+, X−, Y− inputs from the digitizer are also applied to the controller ports PA[0 . . . 4] by way of a plurality of transistors 1000, 1006, 1010, 1016 and 1018; a plurality of resistors 1002, 1008, 1012, 1014, 1020, 1022, 1028, 1032 and 1034; an inductor 1004; and a plurality of capacitors 1024 and 1026. The transistor 1018, as well as the transistors 992 and 998, are used to prevent leakage in a suspend state.

Power from both analog and digital power supply and grounds are supplied to the system. In particular, a 5-volt digital power supply PEN_VCC, developed from the 5-volt supply 5V_CORE, is available from the DC-to-DC converter 300 (FIG. 26) by way of an in-line ferrite bead inductor 1028. An analog power supply PEN_AVCC is developed from the digital supply PEN_VCC by way of an in-line ferrite bead inductor 1030. The digital power supply PEN_VCC is applied to the microcontroller 980 and filtered by a bypass capacitor 1030. The analog supply PEN_AVC is utilized by the 12-bit analog-to-digital converter 988 and filtered by way of a bypass capacitor 1032.

A separate clock supply is used for the microcontroller 980. This clock supply includes a 4.0 MHz crystal 1034, a resistor 1036 and a pair of parallel coupled capacitors 1038 and 1040. The clock supply is applied to the oscillator terminals OSC1 and OSC2 of the microcontroller 980.

A 5-volt signal PENACT_5V, available at the port P5V pin of the microcontroller is converted to a 3-volt signal PEN-ACT_3V by way of a pair of voltage dividing resistors 1042 and 1044. This signal PENACT_3V is applied to a 3-volt terminal of the system controller 129 (FIG. 12). As discussed above, the power supply for the FETs 992 and 1018 is provided by the charge pump 994. The power supply for the charge pump 994 is a 5-volt power supply signal 5V_CORE, available at the DC-to-DC converter 300 (FIG. 26). A ground terminal of the charge pump 994 is connected to system ground by way of a pull-down resistor 1050. The 5-volt power supply PEN_VCC is also utilized by the shift register 982 and the data buffer 984 and buffered by way of a pair of bypass capacitors 985 and 987.

The chip select signal PENCS for the data buffer 984 is generated by an OR gate 1052. The general purpose chip select signal GPCS2 is available from the system controller 129 (FIG. 12), as well as a signal KBC_P00, available from the keyboard controller 125 (FIG. 15) are applied to the inputs of the OR gate 1052.

A pen shut-down signal PEN_SHUTDOWN is used to develop a shut-down signal SHUTDOWN as discussed above for turning on the switching power supply 851 (FIG. 26). The pen shutdown signal PEN_SHUTDOWN is developed by the circuit that includes the transistors 1060, 1062 and 1064; a plurality of resistors 1066, 1068, 1069, 1070 and 1072; and a capacitor 1074. In particular, a 5-volt power supply signal 5V_CORE is applied to a pair of voltage-dividing resistors 1070 and 1072, which, in turn, is used to bias the transistor 1064 on. The base-emitter voltage is held fairly constant by the capacitor 1074. Once the transistor 1064 is turned on, it is used to control the FET 1062. A main power supply signal POWER is applied to the gate of the FET 1062 by way of the resistor 1069. Wake up of the system by way of the pen subsystem is discussed below.

6. Flash Disaster Recovery

As mentioned above, the wireless interface device 100 includes the flash memory devices 742-748 (FIG. 25). As will be discussed in more detail below, the flash memory devices enable user software upgrades by way of the radio interface 960 (FIG. 16). Should power be lost during the programming, the data within the flash memory devices 742-748 will be corrupted, which could result in the system failing to boot.

In order to enable recovery from such a condition, recovery BIOS is stored in a protected sector of the flash memory device 742, which will be unaffected during reprogramming. In addition, a serial port interface 790 (FIG. 30) is provided to enable the flash memory devices 742-748 to be programmed in such a condition by an alternative wired source following a normal boot-up. Unfortunately, the configuration of the flash memory device 742 may result in the system failing to boot. More particularly, disaster recovery BIOS is not stored at the uppermost address of the flash memory device 742. Each flash memory device 742-748 are 512K×8-bit devices. With reference to Table 5 above, the flash memory device 742 is mapped to the address range $0C0000-$0FFFFF. The recovery BIOS is contained in the lower half of that range (i.e. $0E0000-$0FFFF).

On a normal boot-up, the system begins executing code at the top of the address range (i.e. $000000-0DFFFF) flash memory device 742 by way of the system address bit SA18. More particularly, on a normal boot-up a test mode signal TEST_MODE, available at port 1.1 of the keyboard controller 125 (FIG. 15) is pulled high by the keyboard controller 125 during boot-up, which enables the buffer 762 (FIG. 17) which, in turn, enables another buffer 760 to enable the system address bit SA18 during boot-up. When the system address bit SA18 is enabled, the system begins executing code at the top of the address range ($000000) of the flash memory device 742. However, during a condition when the data in the top half of the address range ($0C00000-0DFFFFF) becomes corrupt as a result of a problem occurring during reprogramming, the system may not boot during such a condition.

In order to solve this problem, the system address bit SA18 is forced low. By forcing the system address bit SA18 low, the system will begin executing code from the protected area of the flash device 742 in the address range ($0E0000-$0FFFF) during such a condition where the disaster recovery BIOS resides in a protected sector. In particular, the system address bit SA18 is applied to the buffer 760 (FIG. 17), which is under the control of the test mode signal TEST_MODE by way of the buffer 762. The output of the buffer 760 is a signal FLIP_SA18, which is applied to the address pin A18 (FIG. 25) on the flash memory device 742.

During a normal boot-up, the test mode signal TEST_MODE will enable the buffer 762 (FIG. 17) and, in turn, the buffer 760 to cause the system address bit SA18 to drive the signal FLIP_SA18. During a condition when the code in the flash memory device 742 becomes corrupt, the test mode signal TEST_MODE is forced low, which, in turn, forces the signal FLIP_SA18 low, resulting in the system executing code from the protected area (i.e. $0E0000-OFFFF) of the flash memory device 742 during such a condition to enable the flash memory device 742 (FIG. 25) to be reprogrammed by way of the serial interface 790 (FIG. 30).

There are various ways in which to force the test mode signal TEST_MODE low during reprogramming of the flash memory device 742 by way of the serial interface 790. One way is to externally ground the test mode signal TEST_MODE during such a condition. In particular, the test mode signal TEST_MODE may be connected to one pin of a two-pin header 1100 (FIG. 30). The other pin of the header 1100 is connected to system ground. During reprogramming of the flash memory device 742, an external jumper (not shown) is inserted into the header 1100 to shunt the test mode signal TEST_MODE to system ground to enable the system to execute code from the protected or boot block area of the flash memory device 742 in order to enable the system to be booted. Once the system is booted, the flash memory device 742 is reprogrammed by way of the serial interface 894 (FIG. 29). Once reprogramming is complete, the shunt is removed from the header 1100 (FIG. 30) and the adapter plug 790 is removed, restoring the system to normal operation.

7. Resume on Pen Contact

In order to conserve battery power, the wireless interface device 100 goes into a suspend mode when the system is not in use. As discussed above, a shut down signal SHUTDOWN (FIGS. 20 and 26) is used to shut down the power supply 851 (FIG. 26) during such a condition, which essentially disables the power to all but the circuitry required to detect a pen down event by way of the main power signal POWER (FIG. 28).

Three sources control the shut down signal SHUTDOWN: the keyboard controller 125 (FIG. 15); the pen controller 110A (FIG. 21) and a signal HOOK_VCC, connected to the switching power supply 851 (FIG. 26) by way of the FET 904. These sources are diode ORed to the shut down signal SHUTDOWN by way of the diodes 645 and 647 (FIG. 20) and a diode 1102 (FIG. 28). During a normal state, the shut down signal SHUTDOWN is high, which enables the power supply 851 (FIG. 26). When the shut down signal SHUTDOWN goes low, the power supply 851 goes into an inactive state. During the inactive state, minimum power is supplied to the pen detection circuitry as discussed above.

As will be discussed in more detail below, once the system is turned on by the main power switch 855 (FIG. 28), the shut down signal SHUTDOWN will be under the control of the pen shutdown signal PEN_SHUTDOWN, available from the pen controller 110A (FIG. 21) and the keyboard controller shut down signal KBSHUTDOWN (FIG. 20).

The keyboard controller 125 (FIG. 15) can place the system in a suspend state by way of a command, which, in turn, causes the keyboard controller shut down signal KBSHUTDOWN, available at port P0.2, to go low. More particularly, during normal operation, only the keyboard shutdown signal KBSHUTDOWN is high, placing control of the suspend state solely in the keyboard controller 125. The keyboard controller 125 can then force the system into a suspend state by forcing port P0.2 low, which, in turn, places the power supply 851 (FIG. 26) in an inactive state.

The pen shut down control signal PEN_SHUTDOWN is used to wake the system from a suspend state. More particularly, as mentioned above, during a suspend state, power from the main power supply POWER (FIG. 28) is applied to the collector of the transistor 1064 (FIG. 21) and to the drain of the FET 1062. Since the 5-volt power supply 5V_CORE is unavailable during a suspend state, the transistor 1064 will be OFF, allowing power to appear at the gate of the FET 1062, thus turning the FET 1062ON. Once the FET 1062 is turned ON, the main power signal POWER is applied to the XPLUS terminal of the digitizer panel. Thus, a pen (or finger) down event will result in the YPLUS terminal being connected to the XPLUS terminal by way of a finite resistance (i.e. 500-1500 Ohms) to apply power to the YPLUS terminal, which, in turn, is connected to the drain of the P-channel FET 1060 while its source is used as the pen shutdown signal PEN_SHUTDOWN. The FET 1060 is under the control of a leakage signal LEAKAGE, available at the output of the charge pump 994. Since the leakage signal LEAKAGE will be low during a suspend state, the FET 1060 will turn on in response to the pen down event, thereby connecting the YPLUS terminal to the pen shut down signal PEN_SHUTDOWN. As mentioned above, the YPLUS terminal will be high in response to a pen down event following a suspend state. As such, the pen shut down signal PEN_SHUTDOWN will go high. Since the pen shut down signal PEN_SHUTDOWN is diode ORed with the shut down signal SHUTDOWN, the shut down signal SHUTDOWN will thus be forced high in response to a pen down event following a suspend state, which, in turn, will wake up the power supply 851 FIG. 26). Once the system is wakened, the keyboard controller shutdown line KB_SHUTDOWN goes high, latching the system ON. The resistors 1070, 1072 and the capacitor 1074 are used to delay turning ON the transistor 1064 and the turning OFF of the FET 1062 before the keyboard shutdown signal KB_SHUTDOWN is pulled high which would cause the pen shut down signal PEN_SHUTDOWN to go low before the keyboard shutdown signal KB_SHUTDOWN goes high.

The FETs 992, 998 and 1018 are used to prevent current leakage in a suspend state. In particular, these FETs 992, 998 and 1018 are under the control of the leakage control signal LEAKAGE, available at the charge pump 994, which turns the FETs 992, 998 and 10180N in normal operate and OFF in a suspend state.

The sensing of suspend state is done by the charge pump 994, which monitors the 5-volt power supply signal 5V_CORE. When the 5-volt power supply signal 5V_CORE goes low, indicating a suspend state, the leakage control signal LEAKAGE goes high, turning off the FETs 992, 998 and 1018, blocking leakage into the pen circuitry from the XPLUS terminal.

8. RC Time Constant

The system ON/OFF switch 855 (FIG. 28) enables the system to be completely shut off. When the switch 855 is closed, power from either the IBP 130 or the external AC-to-DC converter supplies power to the system. In order to wake up the system from an OFF state, a shutdown line SHUTDOWN must be held high until the keyboard controller 125 pulls its shutdown pin KB_SHUTDOWN high. As discussed above, the keyboard shutdown signal KB_SHUTDOWN is diode ORed relative to the shutdown signal SHUTDOWN, which controls the power supply 851 (FIG. 26). Until the time when the keyboard shutdown signal KB_SHUTDOWN is pulled high, a signal HOOK_VCC is used to force the shut down signal SHUTDOWN high. As mentioned above, the HOOK_VCC signal is also diode ORed relative to the shutdown signal SHUTDOWN by way of the diode 1102 (FIG. 28). However, for proper operation of the system, the shutdown signal SHUTDOWN will be under the control of the keyboard controller 125 (FIG. 15) after the system is turned on. Thus, a 5-volt power supply signal HOOK_VCC, available at the power supply 851 (FIG. 26), forces the shut down signal SHUTDOWN high until the keyboard controller 125 (FIG. 15) has time to pull its keyboard shutdown signal KB_SHUTDOWN high. The 5-volt power supply signal HOOK_VCC is always high when the main power switch 855 is turned on. On power-up, the 5-volt power supply signal HOOK_VCC forces the shutdown signal SHUTDOWN (FIG. 28) high by way of an FET 1104 and the diode 1102, which, in turn, wakes up the power supply 851 (FIG. 26). Once the power supply 851 is enabled, a power supply signal MAX 786_VCC is used to turn off the FET 1104 to place the control of the shut down signal SHUTDOWN under the control of the keyboard controller 125 as discussed above. In order to provide sufficient time for the keyboard controller 125 to pull its keyboard shutdown signal KB_SHUTDOWN high, the turn OFF of the FET 1104 is delayed by way of a resistor 1106 and a capacitor 1108. In particular, once the main power switch 855 is closed, the power supply signal MAX786_VCC will be low, thereby causing the FET 1104 to be turned ON, which connects the power supply signal HOOK_VCC to the shutdown signal SHUTDOWN by way of the diode 1107. Once the power supply 851 is enabled, the signal MAX786_VCC, applied to the gate of the FET 1104, turns off the FET 1104, placing the shutdown signal SHUTDOWN under the control of the keyboard controller shutdown signal KB_SHUTDOWN as discussed above. The resistor 1106 and capacitor 1108 delay the turning off of the FET 1104 after the signal MAX786_VCC goes high for a sufficient time to allow the keyboard controller 125 to pull its keyboard shut down signal KB_SHUTDOWN high.

An inhibit circuit (FIG. 26), which includes a plurality of resistors 1110-1120, a diode 1122, a transistor 1124 and an FET 1126, is used to prevent the system from being turned ON during low battery conditions when the system is being supplied solely by the IBP 130. During a normal condition (i.e, when the system is being supplied power by the AC/DC converter or by the battery, the signal MAX786_VCC is connected to the main power signal POWER by way of the FET 1126. The FET 1126 is under the control of the transistor 1124. During conditions when the AC/DC converter is supplying power to the system, a signal AC/DCIN will be high, thereby turning ON the transistor 1124, which, in turn, turns ON the FET 1126, connecting the main power signal POWER to the signal MAX786_VCC. The collector of the transistor 1124, in turn, controls the FET 904, which connects the power supply signal HOOK_VCC to the enable terminals ON3 and ON5 on the power supply 851. When AC power is not available, the AC/DCIN goes low, leaving the control of the transistor 1124 under the control of an inhibit signal INHIBIT, available from the IBP 130 by way of the connector 850. During a normal battery condition, the inhibit signal is high, keeping the transistor 1124 turned ON, thereby enabling the power supply 851 by way of the FET 904. Should a low battery condition occur, the inhibit signal goes low, turning OFF the transistors 904, 1124, as well as the FET 1126, to prevent the system from being turned ON.

9. Mouse Emulation with Passive Pen

As mentioned above, the wireless interface device 100 includes a digitizer 110B and utilizes a passive pen as an input device. FIGS. 31-35 illustrate a method for emulating the functions of a mouse, for example a two-button mouse, to provide standard mouse functions with the passive pen.

There are three aspects of the mouse emulation. One aspect relates to emulation of a double click of a mouse button, required by some application programs. Another aspect relates to emulating both the left and right buttons of a two-button mouse. The third aspect relates to emulating both the movement of the mouse (MOVE MODE) and the clicking of a mouse button (TOUCH MODE) with a passive pen as an input device.

Figure 31:
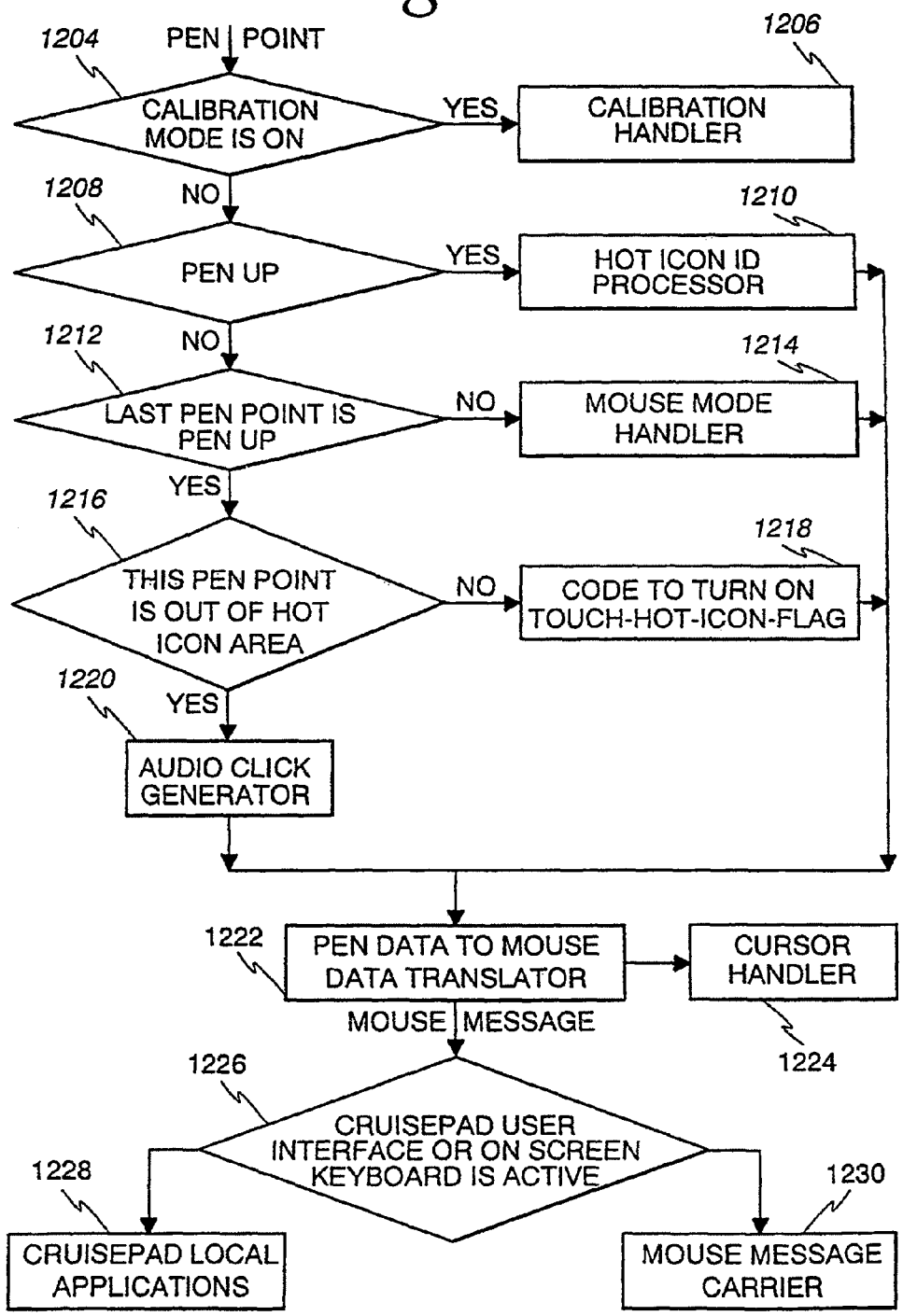
FIGS. 31-35 are flow charts relating to mouse emulation with a passive pen.

Referring first to FIG. 31, the mouse emulation system is event-driven by the passive pen. Initially the system checks to see if the passive pen has touched anywhere on the LCD 113C (FIG. 36), which includes a display area 1200 and a hot icon area 1202. If a pen-down event has been detected, the system checks in step 1204 if the wireless interface device 100 has been placed in a calibration mode. If so, a calibration handler is called in step 1206. The calibration handler does not form part of the present invention. If the wireless interface device 100 is not in the calibration mode, the system then checks to determine if the pen has been lifted from the LCD 113C in step 1208. If a pen-up event occurs subsequent to a pen-down event, control is passed to a hot icon identification (ID) processor (FIG. 32) in step 1210, which, as will be discussed below, processes the pen position to determine which of the hot icons in the hot icon area 1202 of the LCD screen 113C was selected. If the pen was not lifted from the LCD 113C, the system checks in step 1212 if the previous event in a previous cycle was a pen-up event. If the previous pen event in the previous cycle was a pen-down event, the current pen event is processed by a mouse mode handler (FIG. 33) in step 1214, which, as will be discussed in more detail below, determines if the pen is being used in a mouse MOVE or mouse TOUCH MODE. In step 1216, the coordinates of the current pen-down event are processed to determine if the current pen-down event occurred in the hot icon area 1202 of the LCD 113C. If the pen-down event occurred in the hot icon area 1202 (FIG. 36), a flag is turned on indicating the hot icon area 1202 was selected in step 1218. If the system determines the current pen-down event occurred in the display area 1200 (FIG. 36) of the LCD screen 113C, an audio click is generated in step 1220; different from the hot icon audio click.

Steps 1204-1220 are driven by each pen event in order to determine the location of the pen-down event (i.e. hot icon area 1202 or display area 1200). Once the system determines where the pen event occurred, the pen data is converted to mouse data in step 1222 and a cursor is displayed in the viewing area 1200, corresponding to the location of the pen touch in step 1224. After the cursor is displayed, the system determines in step 1226 whether the mouse data is to be used locally by the wireless interface device 100 for local applications or the application running on the host computer 101. As mentioned above, the wireless interface device 100, through its graphical user interface, provides a virtual or on-screen keyboard (OSK). Thus, if the OSK has been activated and the pen event occurs in the OSK area, the mouse data is used locally by the wireless interface device 100 in step 1228. If the wireless interface device 100 is running a host application, the mouse data is sent to the host computer 101 application over the wireless interface as discussed above in step 1230.

Figure 37:
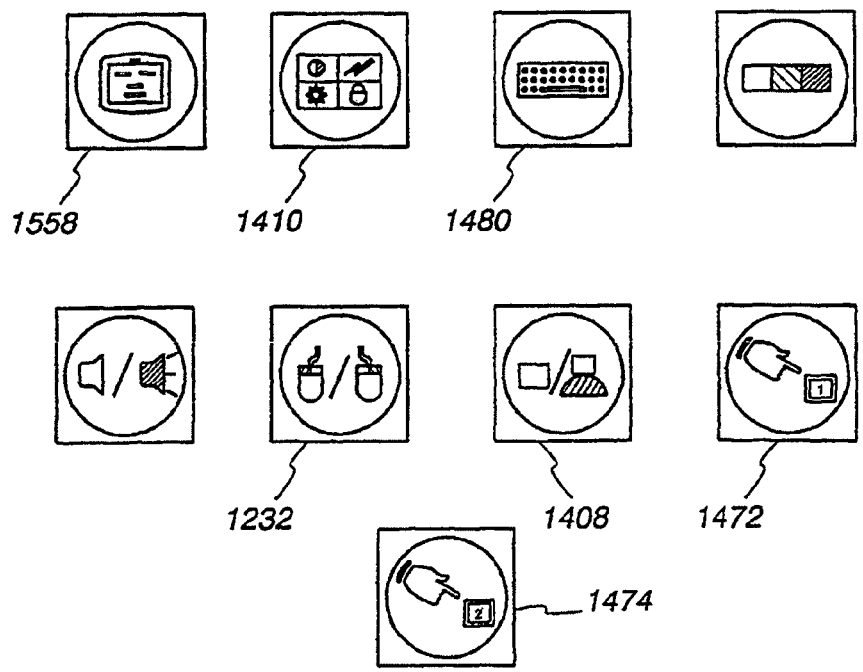
FIG. 37 illustrates the hot icons in the hot icon area of the display.

As mentioned above, the system is able to emulate both left and right mouse buttons. This emulation is accomplished by way of left/right mouse button hot icon 1232 (FIG. 37). A left mouse button is configured to be the default setting. This hot icon 1232 is set up as a toggle. Thus, when the system is first turned on, the pen events from the mouse mode handler are translated to be left mouse button events. Anytime the left/right mouse button hot icon 1232 is selected, the system will toggle and translate subsequent pen events to be right mouse button events. A subsequent pen-down event on the hot icon 1232 causes subsequent pen events from the mouse mode handler to be translated as left mouse button events and so on.

The hot icons in the hot icon area 1202 (FIG. 36) are triggered by a pen-down event followed by a pen-up event. As discussed above, such a sequence of pen events is processed by hot icon ID processor 1210, illustrated in FIG. 32. The hot icon ID processor 1210 first determines if the pen event occurred in the viewing area 1200 (FIG. 36) of the LCD 113C by determining from the mouse mode handler 1214 (FIG. 33) whether the system is in the TOUCH in step 1234, since this mode only occurs for pen events in the viewing area 1200 of the LCD display 113C. If the system is not in a TOUCH mode, the system checks in step 1236 whether the system is in the MOVE mode. If the pen event (i.e. pen-down followed by a pen-up event) did not occur in the viewing area 1200 of the LCD display 113C, the system compares the coordinates of the pen-down event with the locations of the various hot icons displayed in FIG. 37 in step 1238. In step 1240 (FIG. 32), the system determines if the left/right mouse button hot icon 1232 was selected. If not, the system proceeds directly to step 1242 to uplevel software for processing. If the system determines that the left/right mouse hot icon 1232 was selected, the system emulates a left or right mouse button in step 1244, depending on the last status of the left/right mouse button emulation and utilizes the emulated left or right mouse button status in the uplevel software in step 1242.

Figure 32:
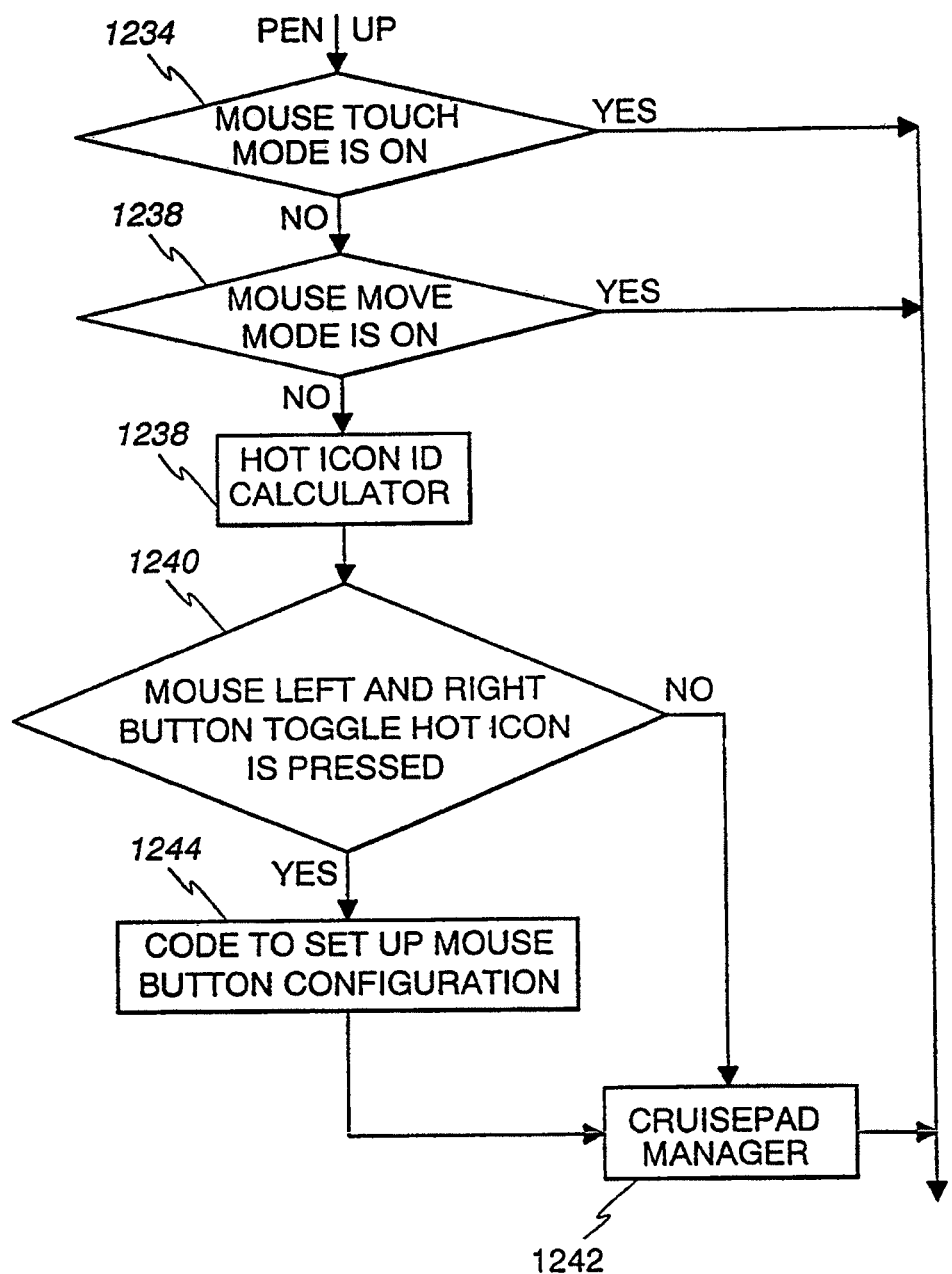
Figure 33:
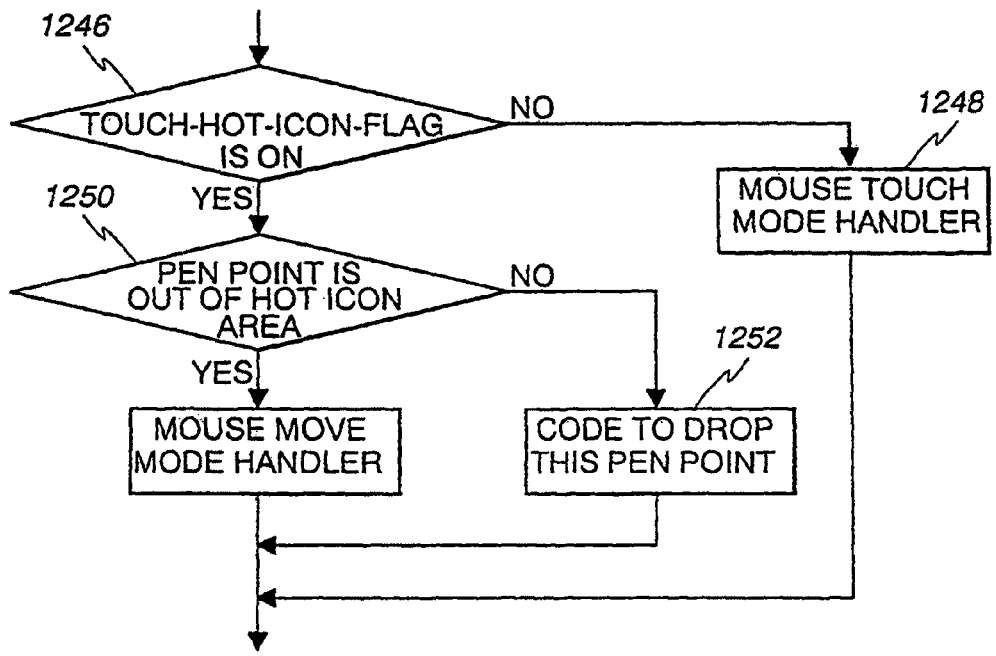
Figure 34:
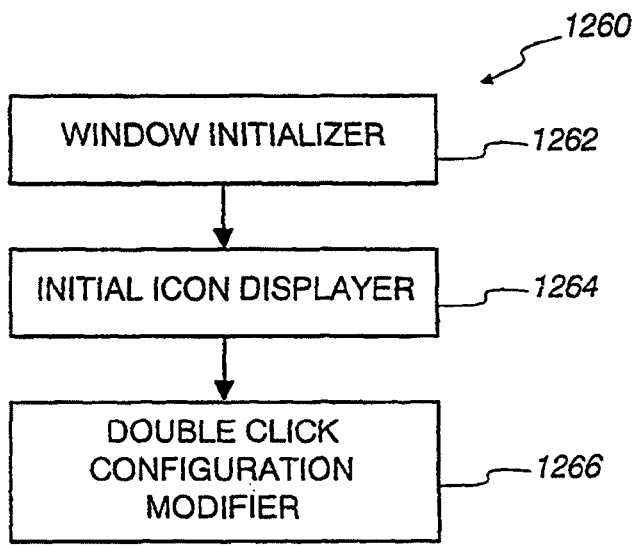
Figure 35:
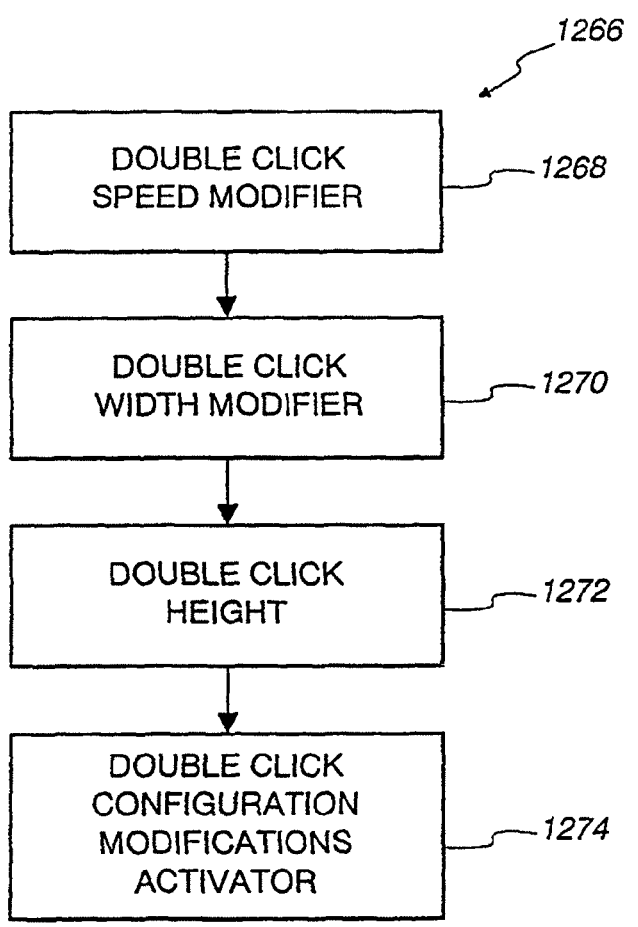

Pen events in the hot icon area 1202 of the LCD display 113C are handled by the hot icon ID processor 1210 (FIG. 32), while pen events in the viewing area 1200 are handled by the mouse mode handler 1214 (FIG. 33). The mouse mode handler 1214 emulates two mouse actions: moving without either button being depressed and released (MOVE); and button depression and release events (TOUCH). As discussed above, both left and right mouse button events can be emulated in the TOUCH.

As discussed above, the current pen-down event preceded by a pen-down event activates the mouse mode handler 1214 (FIG. 33). In step 1246, the system first determines if the hot icon flag is on. As discussed above, the hot icon flag is turned on anytime a pen-down event occurs in the hot icon area 1202 (FIG. 36) of the LCD display 113C. If the hot icon flag is not on, the pen-down event is translated to a mouse button down event by a mouse TOUCH handler in step 1248. If the hot icon flag is on, the system determines in step 1250 whether the coordinates of the current pen-down event to determine if the current pen-down event occurred in the hot icon area 1202. If so, the pen coordinate data is dropped in step 1252 since such data will be processed by the hot icon ID processor 1210 (FIG. 32), discussed above. If the current pen event occurred in the viewing area 1200, the pen coordinate data is translated to mouse move data.

A mouse button double click is emulated by two pen-down events separated by a pen-up event in the viewing area 1200 of the LCD 113C. In particular, when the host computer 101 is running a Windows application, a pen driver translates the two pen-down events separated by a pen-up event and passes four mouse messages: mouse button down; mouse button release, mouse button down and mouse button release to the host Windows application.

As will be discussed in more detail below, the host manager Windows module 1260 modifies a Windows configuration file. (WIN.INI) and, in particular, the distance and time limitations for a mouse button double click. In particular, the Windows system checks the Windows configuration file WIN.INI in order to compare the distance between the mouse locations for each of the clicks as well as the time between clicks. More particularly, the Windows systems will only pass double click data to a Windows application program if the distance (i.e. height and width) between mouse locations for the two clicks is less than 16 for both height and width and the time between the clicks is less than 1.0 seconds.

With a pen-based system two pen-down events separated by a pen-up event normally take longer and occur at greater distances between pen-down events than allowed by the Windows system to generate a double click. Thus, the host manager Windows module 1260 modifies the time and distance parameters to enable two pen-down events separated by a pen-up event to enable Windows to emulate a mouse double click that can be passed on to the Windows application program running in the host computer 101. In particular, the host manager Windows module 1260 includes an initializer 1262 which loads the host manager Windows module 1260, and an initial icon displayer 1264, which displays that the host manager Windows module 1264 has been loaded. The host manager Windows module 1260 also includes a double click configuration modifier 1266. The double click configuration modifier 1266 modifies the configuration of the Windows systems file WIN.INI by modifying the time or speed in step 1268. The distance, broken down into width and length, between the successive pen-down events, is modified by a double click width modifier and a double click height modifier in steps 1270 and 1272. The modified speed, width and height parameters are set in the Windows system file WIN.INI running in the host computer 101 in step 1274 to enable a mouse button double click to be emulated by two successive pen-down events.

Normally, the Window system file WIN.INI is in cache. The host manager Windows manager disables the in cache copy of the Windows system file WIN.INI, which allows the Windows system to go to the modified configuration file with the modified parameters.

10. Disable Screen Saver to Reduce LAN Traffic

As mentioned above, the wireless interface device 100 connects to a host computer 101 and displays whatever is being displayed on the host computer 101. In particular, after a connection is made, all of the screen images on the host computer 101 are passed on to the LCD display 113C on the wireless interface device 100. Whenever the host computer 101 is running a screen saver, the host display will continually change, passing on all of the images to the LCD 113C on the wireless interface 100, which creates a lot of unnecessary traffic on the LAN. In order to reduce this unnecessary LAN traffic, a host manager Windows module 1278 (FIG. 39) disables the screen saver on the host computer 101 anytime a connection is made between the host computer 101 and the wireless interface device 100. Anytime the connection between the host computer 101 and the wireless interface device 100 is broken, the host manager Windows module re-enables the screen saver on the host computer 101.

Figure 38:
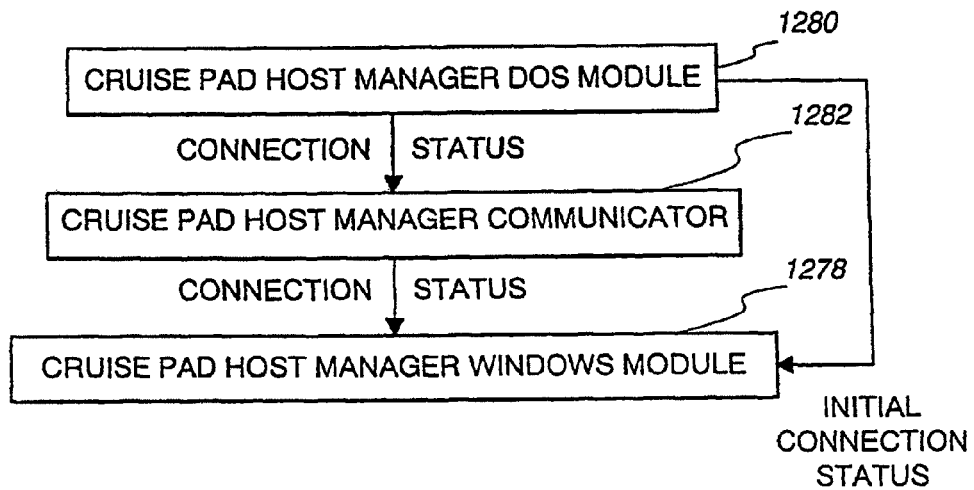
FIGS. 38, 39 and 40 are flow charts relating to a system for disabling the screen saver to reduce LAN traffic.

The connection status between the host computer 101 and the wireless interface device 100 is under the control of a host manager DOS module 1280 (FIG. 38), a terminate and stay resident program. The host manager DOS module 1280 is driven by a timer tick interrupt and checks the connection status at each timer tick interrupt. If the connection status has changed, the host manager DOS module 1280 calls a host manager communicator 1282, which passes the new status to the host manager Windows module 1278.

Figure 39:
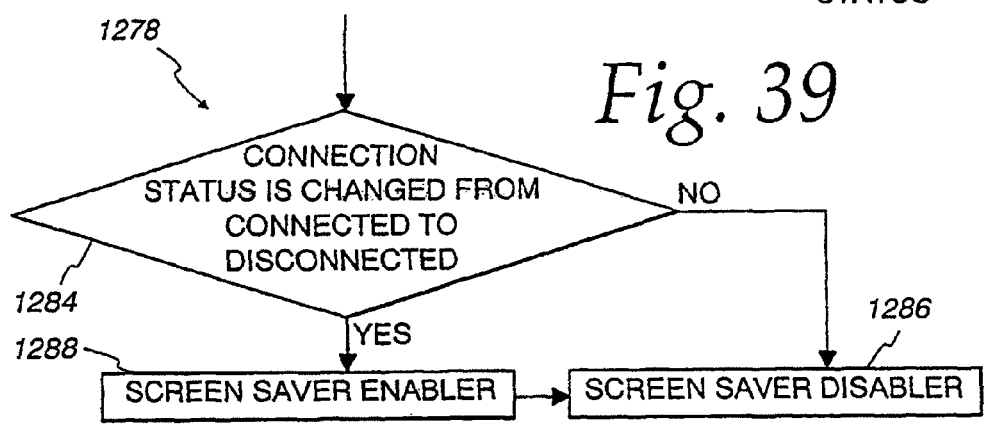

Referring to FIG. 39, anytime the connection status between the host computer 101 and the wireless interface device 100 changes, the host manager Windows module 1278 checks the new status in step 1284. If the connection has been lost, a screen saver disable module 1286 is called, which, in turn, calls several Windows modules: Windows Software Development kit functions; SystemParametersInfo; and WritePrivateProfileString to disable the screen saver. Should the current status indicate that the wireless interface device 100 is connected to the host computer 101, the system proceeds to step 1288, which calls the various Windows module.

Figure 40:
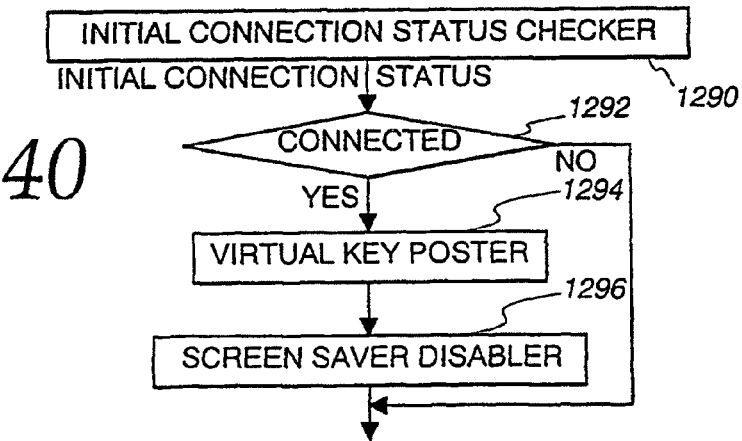

Referring to FIG. 40, anytime the host manager DOS module 1280 is loaded, an initial connection status checker 1290 calls the host manager DOS module 1280 to obtain the current connection status between the wireless interface device 100 and the host computer 101. Next, the system checks in step 1292 whether a connection exists between the host computer 101 and the wireless interface device 100. If not, the system returns. If there is a connection, a virtual key poster 1294 posts a virtual key V_TAB into the Windows Systems queue to force the Windows program to disable the current active screen saver automatically, which, in essence, simulates the press of a key on a keyboard. Once the current active screen saver is disabled, the screen saver on/off flag in a Windows configuration file is turned off in step 1296 to disable the screen saver until there is a change in the connection status.

11. Host Access Protection Password

Whenever a connection is made between wireless interface device 100 and the host computer 101, the user can optionally blank the screen on the host computer 101 and disable the keyboard and mouse inputs connected to the host computer 101. These features prevent the host computer 101 from being accessed while the host computer 101 is under the control of the wireless interface device 100 at a remote location. Once the connection between the host computer 101 and the wireless interface device 100 is lost, the keyboard and mouse inputs on the host computer 101 are re-enabled under the control of the host manager program residing in the host computer 101.

Figure 40A:
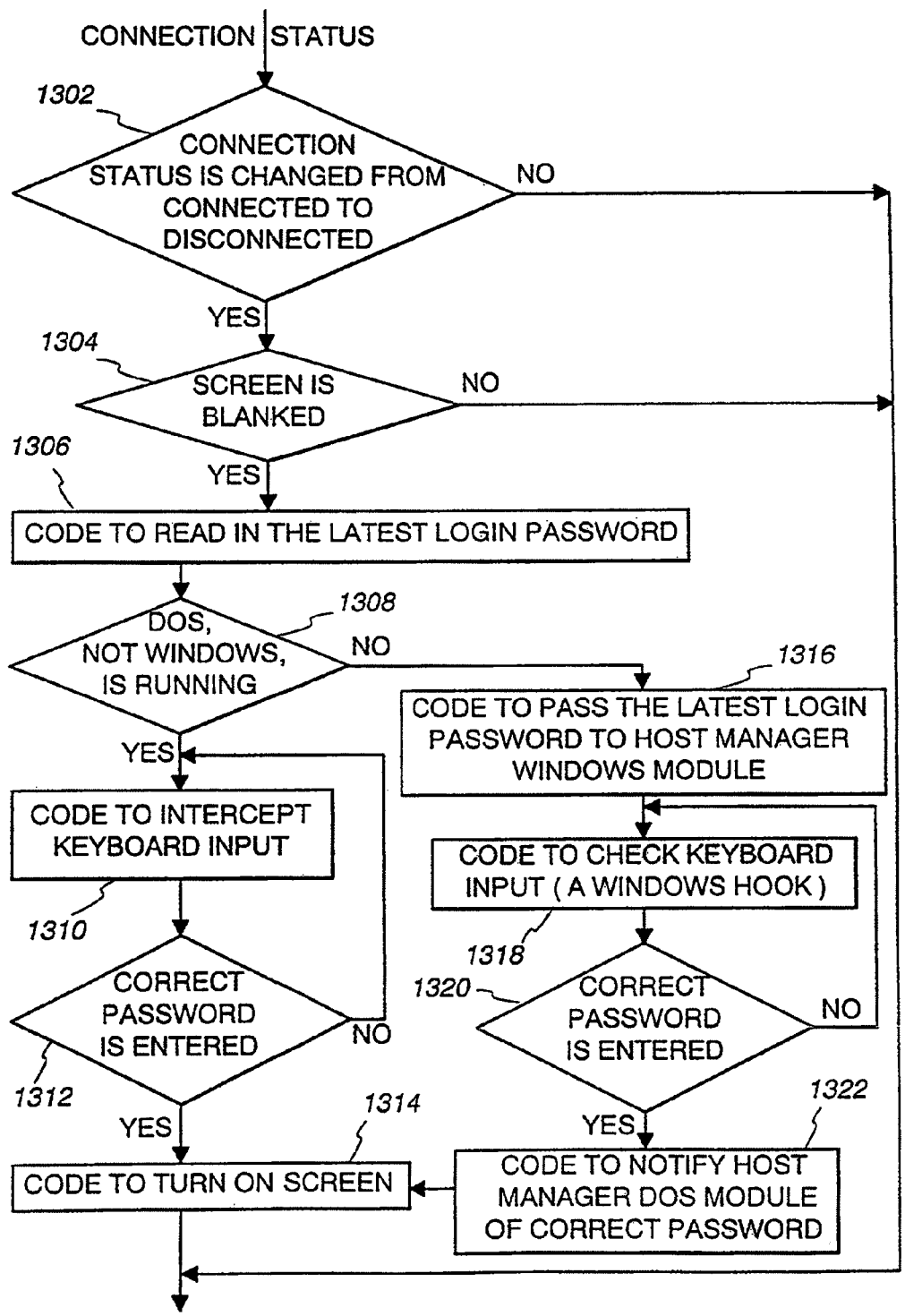
FIG. 40A is a flow chart relating to a host access protection password system.

There are certain situations where the screen to the host computer 101 may not be enabled on disconnection, for example, when the disconnection occurs because the wireless interface device 100 is either out of power or out of range. In order to enable the user to access the host computer 101 in such a situation, a host manager 1300 (FIG. 40A) first checks whether the connection status has changed in step 1302 in the manner as discussed above. If the system is connected, no action is required. However, if the connection has been broken, the system checks in step 1304 whether the screen is enabled. If not, the user will have normal access to the host computer 101. If so, the latest log-in password by the user is stored in by the system in step 1306. Since the host manager DOS module controls the screen, the system checks in step 1308 to determine whether Windows is running in the host computer 101. If DOS is running, the system compares the password entered on the keyboard with the latest log-in password in steps 1310 and 1312. If the password entered does not match the correct password, the system returns to step 1310 and awaits another keyboard input. If the correct password is entered, the screen is turned on in step 1314.

Should the host computer 101 be running Windows, as determined in step 1308, the latest log-in password is passed to a host manager Windows module in step 1316. The system next checks in steps 1318 and 1320 whether the correct password was entered in a similar manner as discussed above. If so, since DOS handles the enabling of the screen on the host computer 101, the host manager DOS module is notified that the correct password was entered in step 1322, which, in turn, enables the screen in step 1314.

12. Double Pen-Up Events

The pen controller 110A (FIG. 21) normally generates a series of interrupts and, in turn, a series of pen packets whenever the pen touches the LCD 113C (a pen-down event) and is lifted from the LCD 113C (a pen-up event) and generates an interrupt. For each interrupt, a single packet is generated. The format of the possible packets is illustrated in Table 7 below, where x0 is bit 0 of the x coordinate of the pen location and y0 is bit 0 of the y coordinate of the pen location, etc.

TABLE 7

| PACKET NAME | BIT 7 | BIT 6 | BIT 5 | BIT 4 | BIT 3 | BIT 2 | BIT 1 | BIT 0 |
|---|---|---|---|---|---|---|---|---|
| P1 | 1 | 1 | 0 | x11 | x10 | x9 | x8 | x7 |
| P2 | 0 | x6 | x5 | x4 | x3 | x2 | x1 | x0 |
| P3 | 0 | 0 | 0 | y11 | y10 | y9 | y8 | y7 |
| P4 | 0 | y6 | y5 | y4 | y3 | y2 | y1 | y0 |
| P5 | 1 | 0 | 0 | 0 | 0 | 0 | 0 | 0 |

The packets are generated in the following sequence (p1, p2, p3, p4), (p1, p2, p3, p4) (p1, p2, p3, p4), (p5). The packets p1, p2, p3, p4 relate to pen-down events (a pen point); each group of packets (p1, p3, p3, p4) relating to one x-y coordinate of the pen. The packet p5 relates to a pen-up event. Thus, anytime the pen is lifted from the digitizer, one packet p5 is generated. Thus, when the pen first touches the digitizer panel and is moved across the digitizer, a plurality of pen points (p1, p2, p3, p4) are generated which correspond to the x, y locations of the points touched by the pen. Normally 110 pen points per second are generated by the pen controller 110A.

Whenever a 12-bit serial pen packet is generated by the pen controller 110A and read by a firmware module in step 1330

(FIG. 41), an interrupt is generated in step 1332. A pen packet assembler assembles the packets into pen points (p1, p2, p3, p4). These pen points (p1, p2, p3, p4) are processed and passed to the applications program. In order to process each pen point (p1, p2, p3, p4), the interrupts must be disabled. During the time when the interrupts are disabled, the pen point packets (p1, p2, p3, p4) and the pen-up packets p5 are generated by the pen controller 110A but not processed and thus are garbled or lost. Lost or garbled pen point packets (p1, p2, p3, p4) do not affect mouse emulation. However, since mouse emulation is based on both pen-down and pen-up events, lost pen-up packets p5 can result in the mouse emulation being hampered, possibly resulting in the system being stuck in the state preceding the pen-up event.

Figure 41:
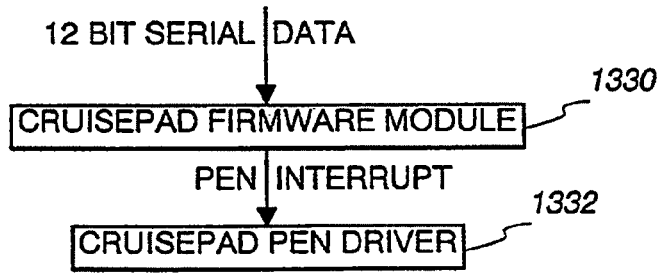
FIGS. 41-43 are flow charts relating to a system for handling pen-up events.
Figure 42:
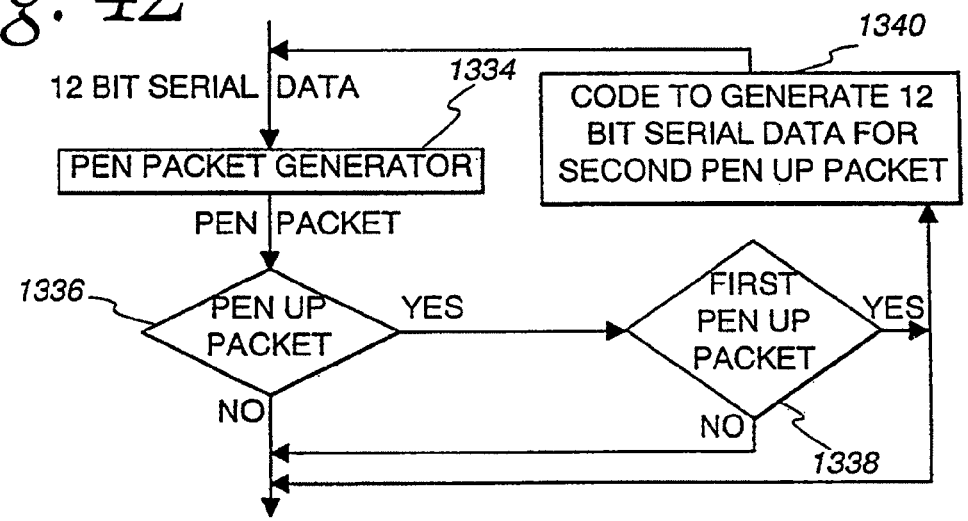

In order to solve this problem, a firmware module 1330 generates two pen-up packets p5. More particularly, with reference to FIG. 42, the firmware module 1330 reads in the 12-bit serial data from the pen controller 110A into packets in step 1334. Next, the system checks in step 1336 whether the packet was a pen-up packet p5. If not, the system proceeds to the pen driver in step 1332 (FIG. 41). If the packet is a pen-up packet p5, the system checks to determine if the pen-up packet p5 is the first pen-up packet in step 1338. If not, the system passes the packet to the pen driver in step 1332 as discussed above. If the system determines in step 1338 that the pen-up packet p5 is the first pen-up packet p5, the serial data for second pen-up packet p5 is generated in step 1340 and assembled in step 1334. In addition, the first pen-up packet p5 is passed to the pen driver.

Figure 43:
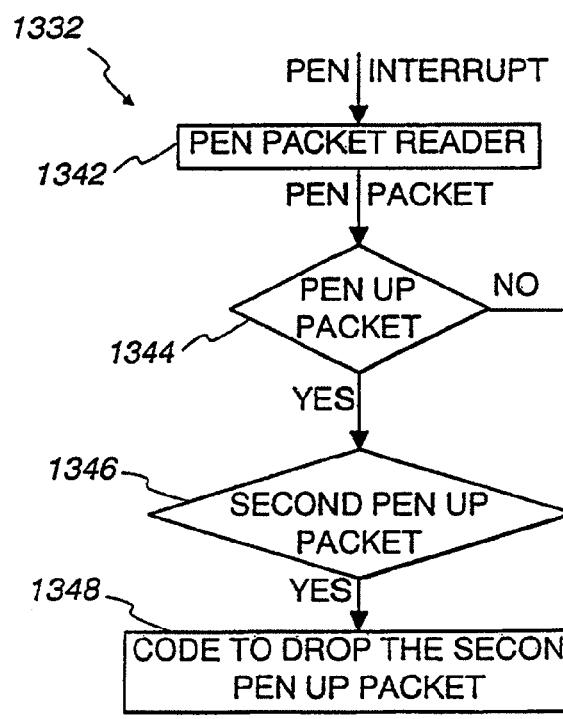

The pen driver 1332 (FIG. 43) is responsive to an interrupt that is generated each time a packet is assembled. In response to an interrupt, the pen driver reads the packet in step 1342. In step 1344, the pen driver determines whether the packet is a pen-up packet p5. If not, the pen packet assembler processes the packet in step 1346. If the system determines in step 1344 that the packet is a pen-up packet, it next checks in step 1346 whether the packet is the second pen-up packet. If so, indicating that the first pen-up packet was processed, the second pen-up packet is dropped in step 1348. If not, the packet is determined to be a first pen packet, which is processed by the pen packet assembler in step 1346.

13. Seamless Integration of Wired and Wireless LANS

The wireless interface device 100 may be connected to host computer 101 by way of a wireless LAN. The wireless LAN protocol is Novell open data link interface IPXODI protocol. Since the IPXODI protocol is also used for wired LAN's, it would be desirable to connect the wireless interface device 100 to a wired LAN system and utilize the Novell IPXODI protocol. Unfortunately, the IPXODI protocol can only communicate with a single LAN card at a time, either a wired LAN card or a wireless LAN card at one time.

The standard Novell LAN stack configuration is illustrated in FIG. 45. The LAN card is identified with the reference numeral 1352. Communication between the LAN card 1352 and the IPXODI protocol is by way of a driver 1354. The driver 1354 communicates with the IPXODI protocol (IPXODI.COM) 1355 by way of a link support layer LSL.COM 1356. The Novell IPXODI protocol passes data between the applications programs 1358 and the link support layer LSL.COM 1356. Even though the link support layer LSL.COM can support multiple LAN cards, the IPXODI protocol only supports a single LAN card.

In order to enable the Novell IPXODI protocol to support a configuration as illustrated in FIG. 44 to enable the wireless interface device 100 to connect to both a wired LAN card 1352 and a wireless LAN card 1360, an additional layer IPXMUX.COM (FIG. 46) is provided for multiplexing incoming and outgoing packets to and from the wired LAN card 1352 and the wireless LAN card 1360. The multiplexer IPXMUX.COM manipulates the data packet source and destination addresses to simulate a single LAN card so as to be compatible with the IPXODI protocol. By providing the additional layer IPXMUX.COM, the host computer 101, as well as the wireless interface device 100, will be able to access all of the LAN resources 1350 (FIG. 44).

Referring to FIG. 46, the additional layer IPXMUX.COM is stacked between the Novell IPXODI protocol IPXODI.COM 1355 and the link support layer LSL.COM 1356. As mentioned above, the link support layer LSL.COM 1356 can support two LAN cards. Thus, a wireless LAN card 1360 and a corresponding wireless LAN card driver 1362, which communicates with the link support layer LSL.COM 1356 along with the wired LAN card 1352 and its corresponding driver 1354, can communicate with IPXODI.COM by way of the driver.

The multiplexer IPXMUX.COM 1364 multiplexes or interleaves the data from both the wireless LAN card driver 1354 and the wired LAN card driver 1362 to the IPXODI protocol by manipulating the source and destination addresses of incoming and outgoing packets, so that as far as the Novell IPXODI protocol is concerned, it is only communicating with a single LAN card. Similarly, communication from the host computer 101, as well as applications 1358, which may be running on the wireless interface device 100, to both the wired LAN card 1352 and the wireless LAN card is formatted by the IPXODI.COM and multiplexed to either the wireless LAN card 1360 or wired LAN card 1352 by the multiplexer IPXMUX.COM by way of the link support layer. The multiplexer IPXMUX.COM 1364 is loaded after the wired LAN card driver 1354 and the wireless LAN card driver 1362 are loaded and before IPXODI.COM 1355.

Figure 47:
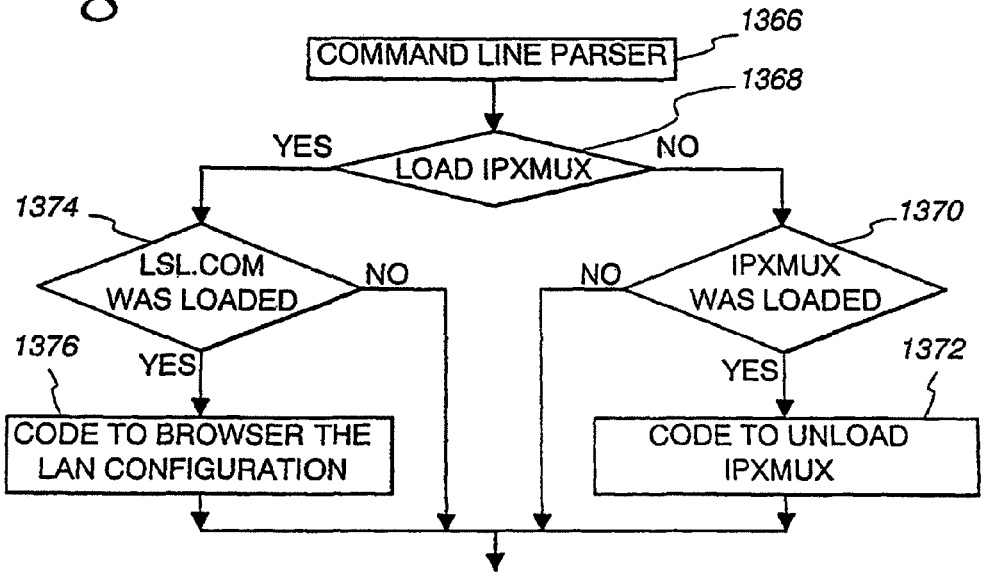
FIGS. 47-52 are flow charts relating to the seamless integration of wired and wireless LANS.
Figure 48:
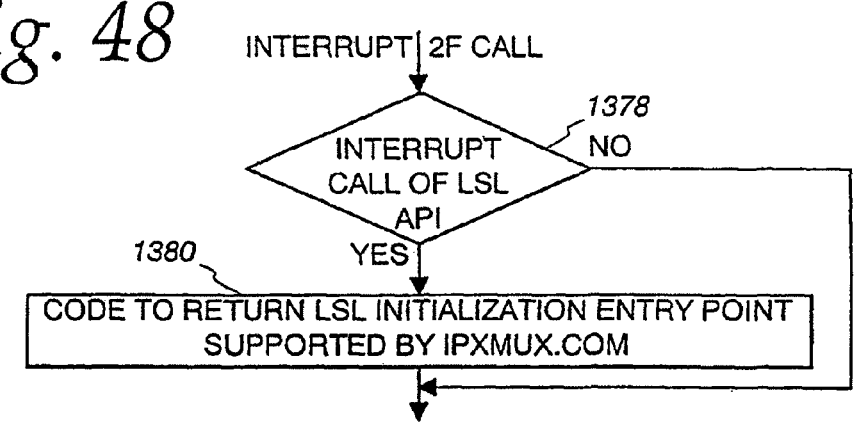

The Novell LAN software includes a configuration file which checks the particular LAN cards 1352 being run by the LAN card driver 1354. The system is initialized by the routine illustrated in FIG. 47, which is run each time the multiplexer IPXMUX.COM 1364 is loaded. Initially, a command line parser 1366 is used to determine whether the user has issued commands to either load or unload IPXMUX.COM command in step 1368. If the command is an unload command, the system checks whether IPXMUX.COM 1364 has already been loaded in step 1370. If so, the system unloads IPXMUX.COM 1364 in step 1372. If IPXMUX.COM 1364 has not been loaded, the system exits the initialization routine.

If the command was to load IPXMUX, the system checks in step 1374 to determine if the link support layer LSL.COM 1356 has been loaded. If not, the system exits the initialization routine since IPXMUX.COM cannot be loaded until the link support layer LSL.COM has been loaded. If the link support layer LSL.COM 1356 was loaded, control is passed to a LAN configuration browser in step 1376 to browse the LAN configuration for the number of LAN cards and the frame types of the cards and the number of frame types (i.e. IEEE 802.2, 802.3, etc.) to find out which LAN card drivers are running. In addition, the browser finds and saves all relevant application program interface entry points to the link support layer LSL.COM and sets to those supported by IPXMUX.COM. The browser also sets the LSL interrupt vector to the interrupt vector supported by IPXMUX.COM, as well as finds and saves all logical board numbers.

In order to interleave the data from the wired LAN card 1352 (FIG. 46) and the wireless LAN card 1360 to IPXODI.COM to emulate a single LAN card, 2F interrupt calls from the application program by way of IPXODI.COM are trapped and handled by a separate routine. In particular, 2F interrupt calls are checked in step 1378 to determine if such calls are interrupt calls to LSL.COM. If not, the system exits. If so, the address of the LSL protocol support API handler supported by IPXMUX.COM is returned. Interrupt calls to LSL.COM from an application program are handled by a special interrupt handler. If the interrupt call is to LSL.COM, a LSL initialization entry point, supported by IPXMUX.COM is returned in step 1380. The LSL initialization entry point represents an address of the protocol initialization routine into LSL.COM.

Figure 49:
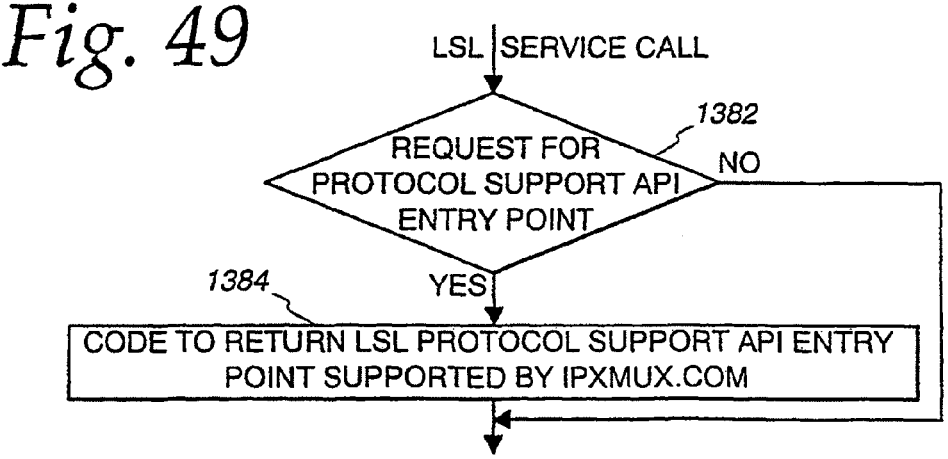

Once the address of the LSL initialization entry point is known by the IPXODI protocol, the IPXODI protocol will call that address for service. Thus, all LSL service calls are checked in step 1382 (FIG. 49) to determine if the call is a request for protocol support API entry point. If not, the multiplexer IPXMUX.COM will direct that call into LSL.COM. If so, an address of a special 2F interrupt handler (LSL Protocol Support API Handler) supported by IPXMUX.COM is returned to IPXODI.COM in step 1384.

Figure 50:
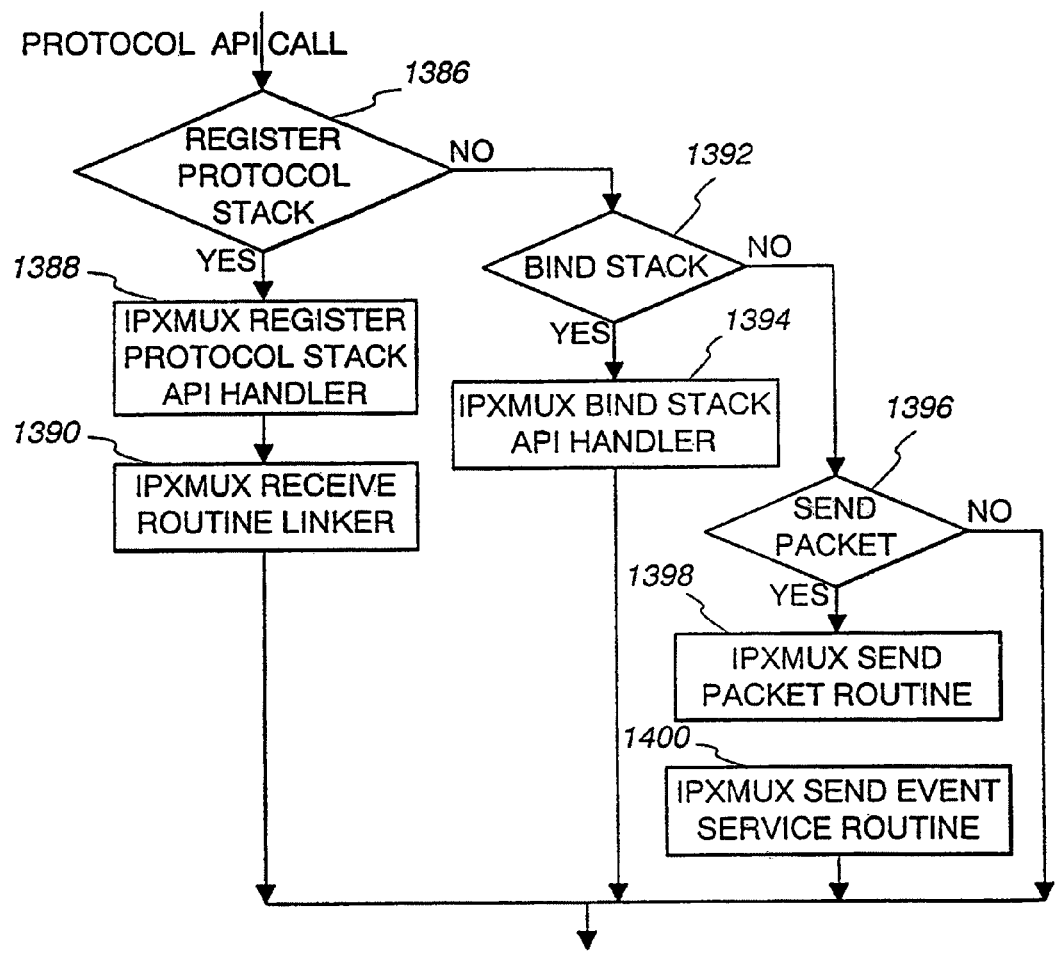

The special interrupt handler, LSL Protocol Support API Handler, which forms a part of IPXMUX.COM, is illustrated in FIG. 50. Three services are handled by the LSL Protocol Support Handler, which is supported by the multiplexer IPXMUX.COM to set up an address for communication with a host on the network. These services are register protocol stack, bind stack and send a packet. The balance of the services are handled by LSL.COM.

The entry point of the LSL Protocol Support API Handler in IPMMUX.COM from the standpoint of IPXODI.COM is the protocol support API within the link support layer LSL. Since the link support layer LSL.COM supports various protocols, such as IPXODI and TCPIP, registration of the IPXODI.COM protocol is checked in step 1386. If the call to the link support layer LSL is to register a protocol stack, an IPXMUX register protocol stack application program interface (API) handler in step 1388 checks whether the protocol stack is IPXODI. If the protocol stack is IPXODI, the protocol stack handler sets a packet receive handler, supported by IPXMUX.COM and calls LSL.COM's protocol stack API to register the protocol. The protocol stack handler also saves the stack ID. Subsequently, in step 1390, an IPXMUX Receive Routine Linker sets the protocol stack IPXODI's receive routine address to the packet receive address supported by IPXMUX.COM.

If the protocol API call is not to register the protocol stack, the system then checks in step 1392 whether a special registration service, a bind stack service, is requested. A bind stack service, normally done before registration, is used to set up a protocol for communication, i.e. packet length, etc. If bind stack service is requested, an IPXMUX Bind Stack API handler in step 1394 is called, which forces IPXODI to bind to the wired LAN card 1352 to which IPXODI is bound before the wireless LAN card 1360 was installed in order to be compatible with the IPXODI protocol. The IPXMUX bind stack handler also saves the process ID of the binding for sending and receiving packets.

Figure 51:
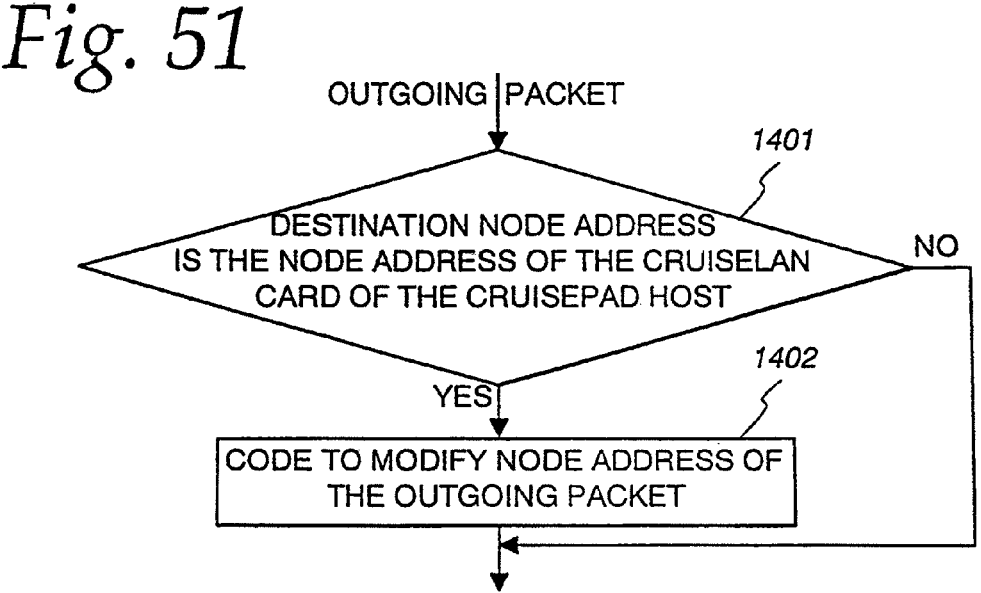
Figure 52:
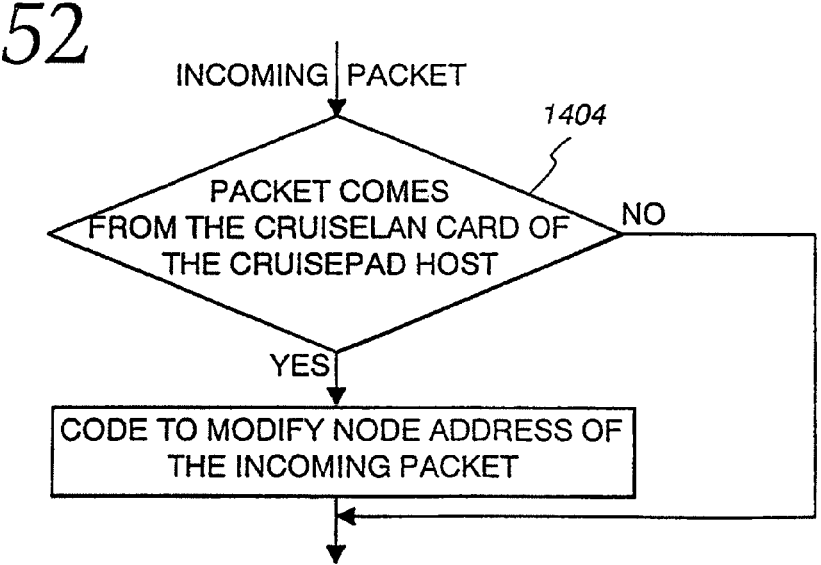

If the protocol API call is not a register protocol stack or a bind stack service, the system checks in step 1396 whether send packet service is requested. If not, the system exits and the service call is handled by LSL.COM. If so, an IPXMUX send packet routine is called in step 1398 and 1400 (FIG. 51), which sets the address of the wireless LAN card 1360 as the source node address in step 1402. The packet modifier also sets the node address of the wireless interface device 100 as the packet's destination mode address in step 1400 (FIG. 51).

The send event service routine address is set to the address of the send event service routine in IPXMUX.COM before it returns.

Incoming packets are handled by an incoming packet handler illustrated in FIG. 32. In particular, incoming packets are checked in step 1404 whether the source address of the packet is from the wireless LAN card 1360. If not, the system returns. If so, the packet's source mode address is saved and set to the mode address of the wireless LAN card 1360 while the pocket destination address is set to the address of the wired LAN card 1352 to which IPDXDI is bound.

14. Host Control Mode

Figure 53:
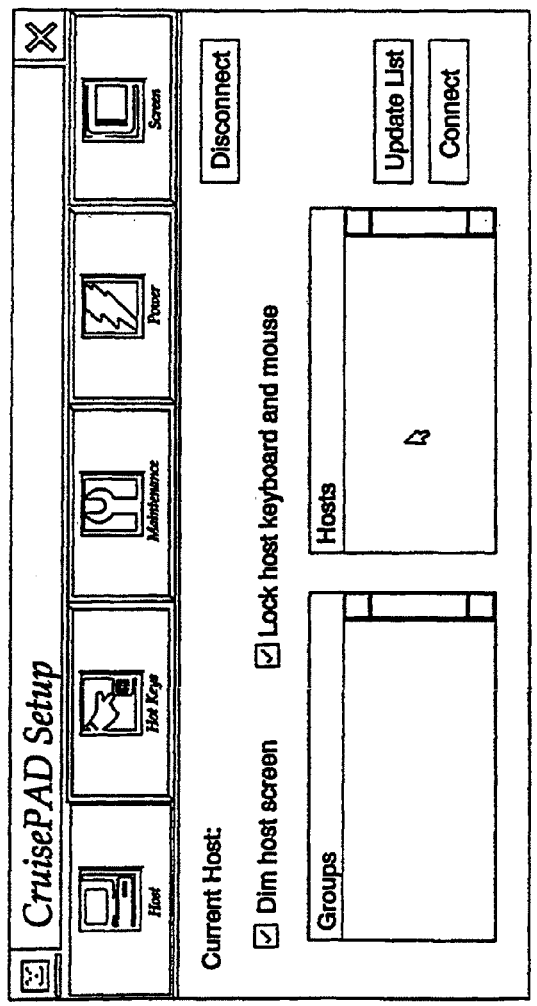
FIGS. 53-57 are illustrations of various set-up dialog boxes available on the wireless interface device.
Figure 54:
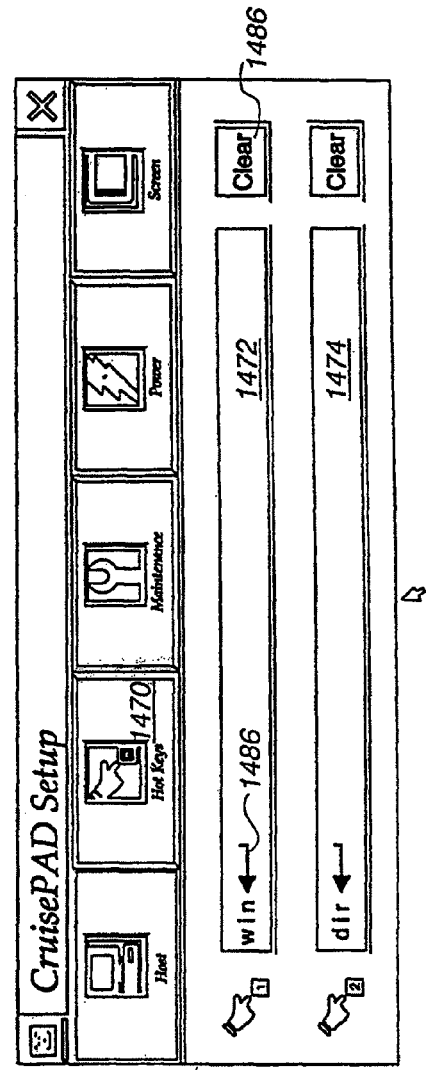
Figure 55:
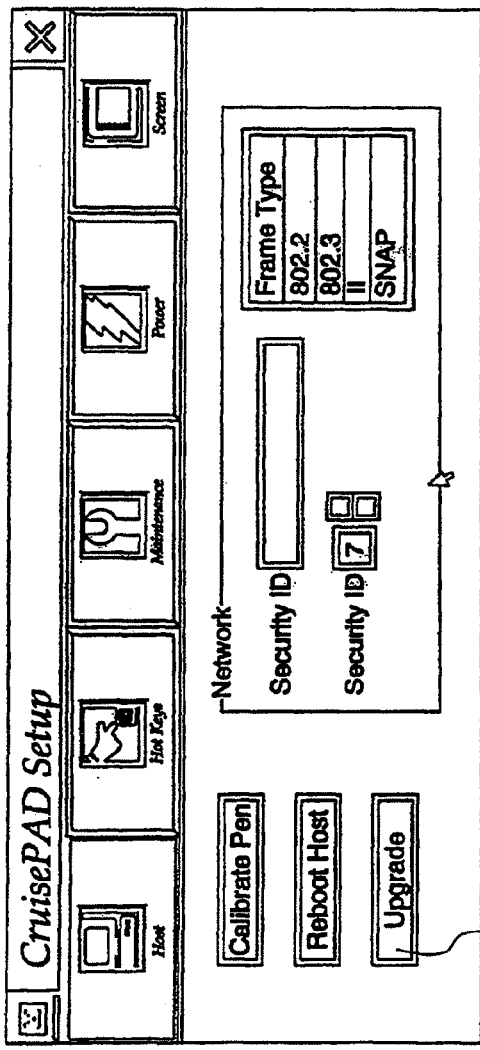
Figure 56:
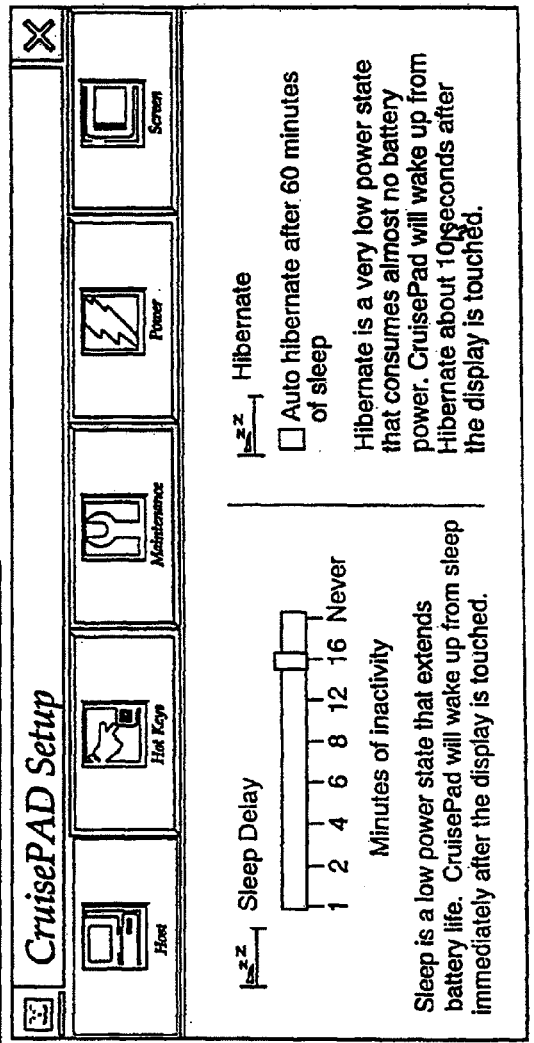
Figure 57:
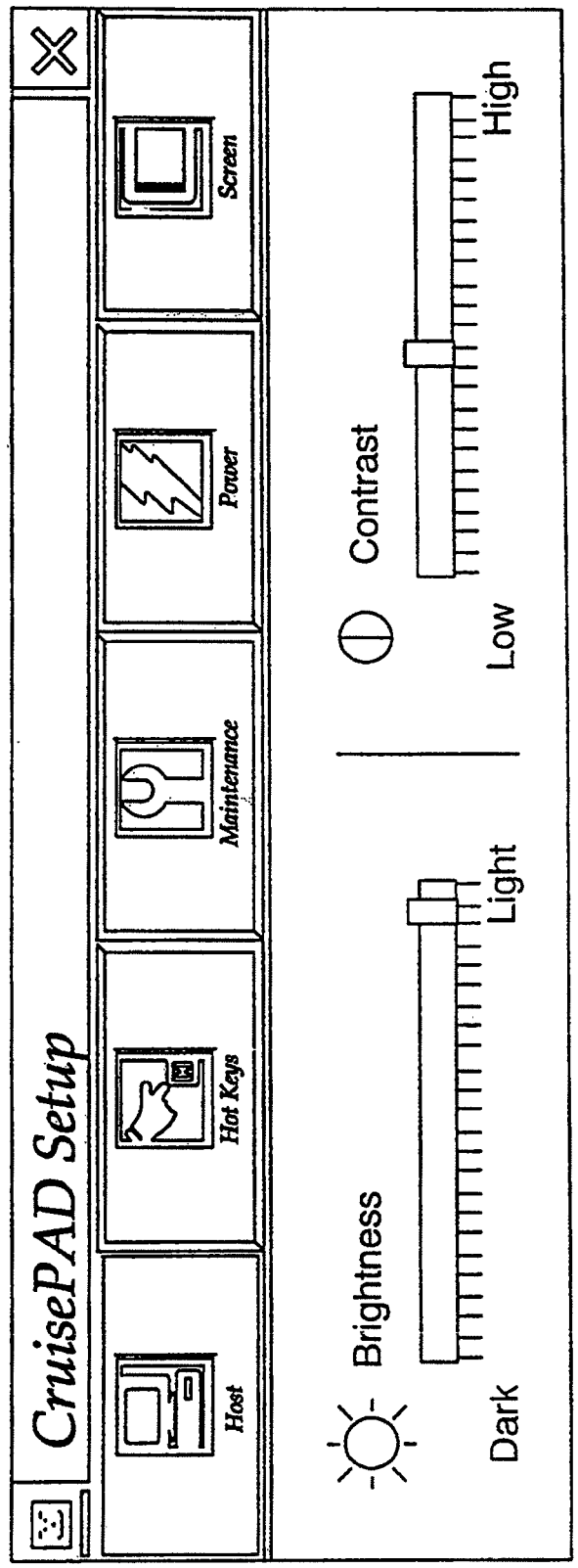

The wireless interface device 100 includes a hot icon 1408 (FIG. 37) in the hot icon area 1202 (FIG. 36) of the LCD 113C for switching control of the host computer 101 from the wireless interface device 100 and the host computer 101. While the wireless interface device 100 has control of the host computer 101, the user has the option to dim the screen of the host computer 101, as well as lock out the keyboard and mouse inputs. In particular, with reference to FIG. 37, a set-up window hot icon 1410 may be selected. Activation of the set-up window icon causes one of five selectable set-up dialog boxes to be displayed in the viewing area 1200 (FIG. 36) of the LCD 113C on the wireless interface device 100. These dialog boxes are illustrated in FIGS. 53-57, which can be selected by a graphical button bar 1412 (FIG. 53). When the "host" button is selected, a list of host computer groups that are accessible by the wireless interface device 100 as well as the specific host to which the wireless interface device 100 is connected are displayed. When the wireless interface device 100 has control of the host computer 101, the host computer screen can be dimmed and the host keyboard and mouse can be locked out by placing the pen down in the box next to those functions in the dialog box illustrated in FIG. 53. FIG. 54 relates to setting up remote keyboard macros. FIG. 55 is a maintenance dialog box which enables various maintenance functions, such as calibration of the pen, rebooting of the host, and the like. FIG. 56 relates to power settings, and in particular includes an inactivity timer for timing periods of inactivity in order to place the wireless interface device 100 in a low-power state. FIG. 57 is selectable by the screen button and enables the brightness and contrast of the LCD 113C on the wireless interface device 100 to be adjusted.

FIG. 58 illustrates a method for disconnecting the host computer 101 from the wireless interface device 100 and automatically returning control of host screen, keyboard and mouse to the host computer 101. In addition, any configuration settings of the wireless interface device, such as contrast and brightness adjustment, are also saved in order to obviate the need to readjust the wireless interface device 100, the next time it is connected.

Initially in step 1414 (FIG. 58), the system determines if the hot icon area 1202 of the LCD 113C on the wireless interface device 100 was pressed. As illustrated in FIG. 37, the hot icon area 1202 includes several hot icons. Thus, the system checks in step 1416 whether the host control mode hot icon 1408 (FIG. 37) was selected. If not, the system loops back to step 1414 and waits for the hot icon area to be pressed. If the host control mode hot icon 1408 was selected, the wireless interface device 100 sends a private message (i.e. pocket) to the host computer 101 in step 1418, requesting host control mode.

The system then checks in step 1420 whether the host computer 101 returned an acknowledgement that the private message was received. If an acknowledgement of the private message is not received by the wireless interface device 100, the attempt to enter the host control mode is aborted in step 1422. If an acknowledgement is received, the system checks in step 1424 if the mouse keyboard and mouse had been previously locked out by the wireless interface device 100 as discussed above. If so, the host keyboard and mouse are unlocked. Subsequently in step 1426, an internal flag is set indicating a request for termination of the connection with the host computer 101 in step 1428. The request for termination initiates a timer, which, when timed out, disconnects the wireless interface device 100 from the host computer 101. Thus, the system checks to determine if the host computer 101 is still connected to the wireless interface device 100 in step 1430. If so, the system determines if the request for termination has timed out in step 1432. If not, the system waits for the timer to time out and disconnects the wireless interface device 100 from the host computer 100. Once the wireless interface device 100 is disconnected, control of the host computer 101 is returned to the host computer 101.

In order to obviate the need to reconfigure the wireless interface device 100 the next time the wireless interface device 100 is connected to the host computer 101, the system checks in step 1434 whether any of the configuration data (i.e. contrast, brightness (FIG. 57) was changed. If not, the wireless interface device 100 is placed in a suspend mode in step 1436. If the configuration data did change, the new configuration data is saved in the EEPROM 111B (FIG. 12) in step 1438.

15. Broadcast for Available Hosts

The wireless interface device 100 can determine the available hosts within range for wireless connection. The user can then select a host by way of a dialog box (FIG. 53), which will be discussed in more detail below. An important aspect of the wireless interface device 100 is that it can be connected to virtually any available hosts without any physical connections and without knowing the host address or node address beforehand, unlike known wireless and wired LAN systems where the node addresses of each of the personal computers in the network have a preassigned node address and are therefore known prior to any communications being established.

Figure 59A:
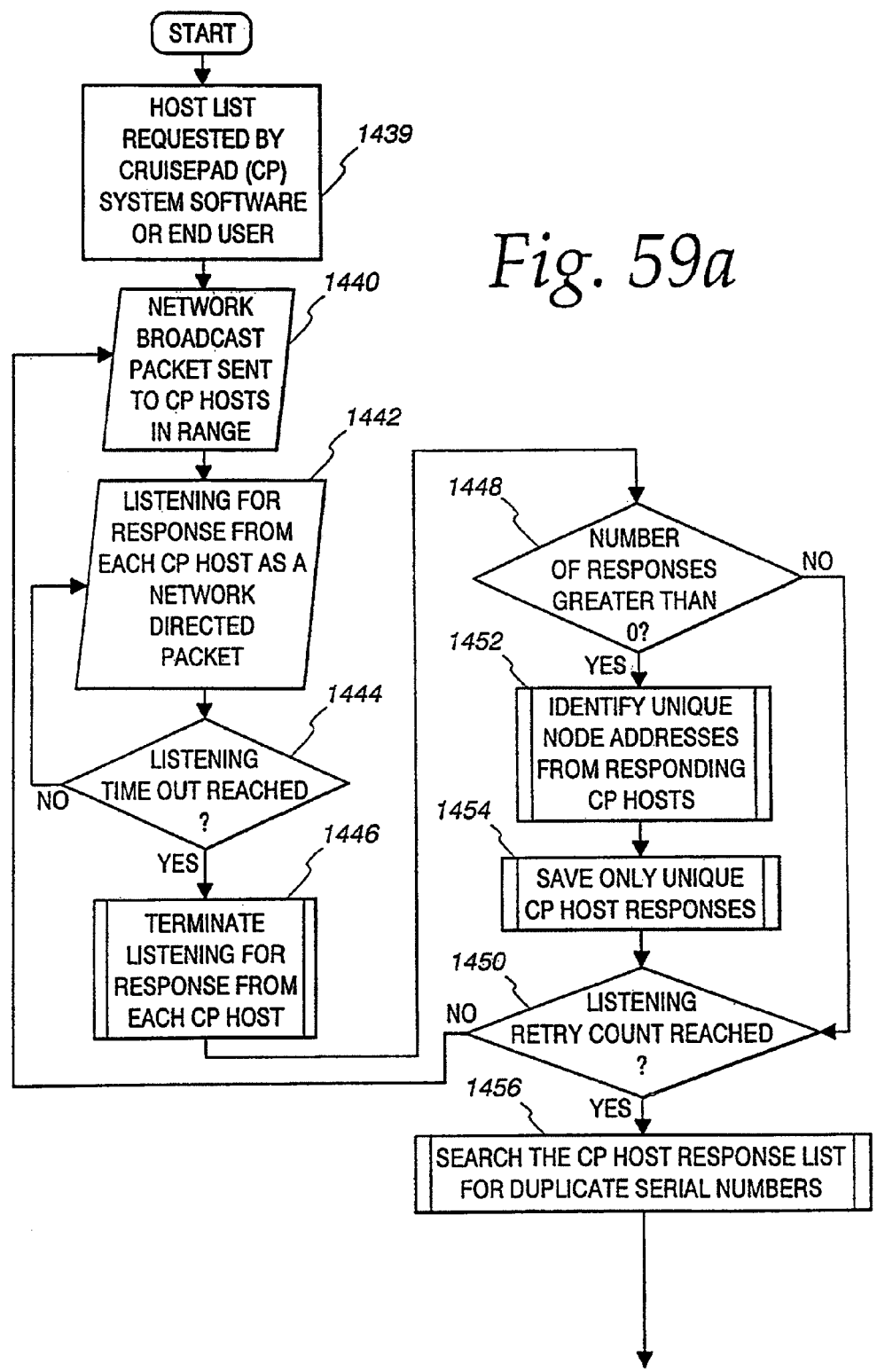
FIG. 59 is a flow chart relating to a system for broadcasting for available hosts.
Figure 59B:
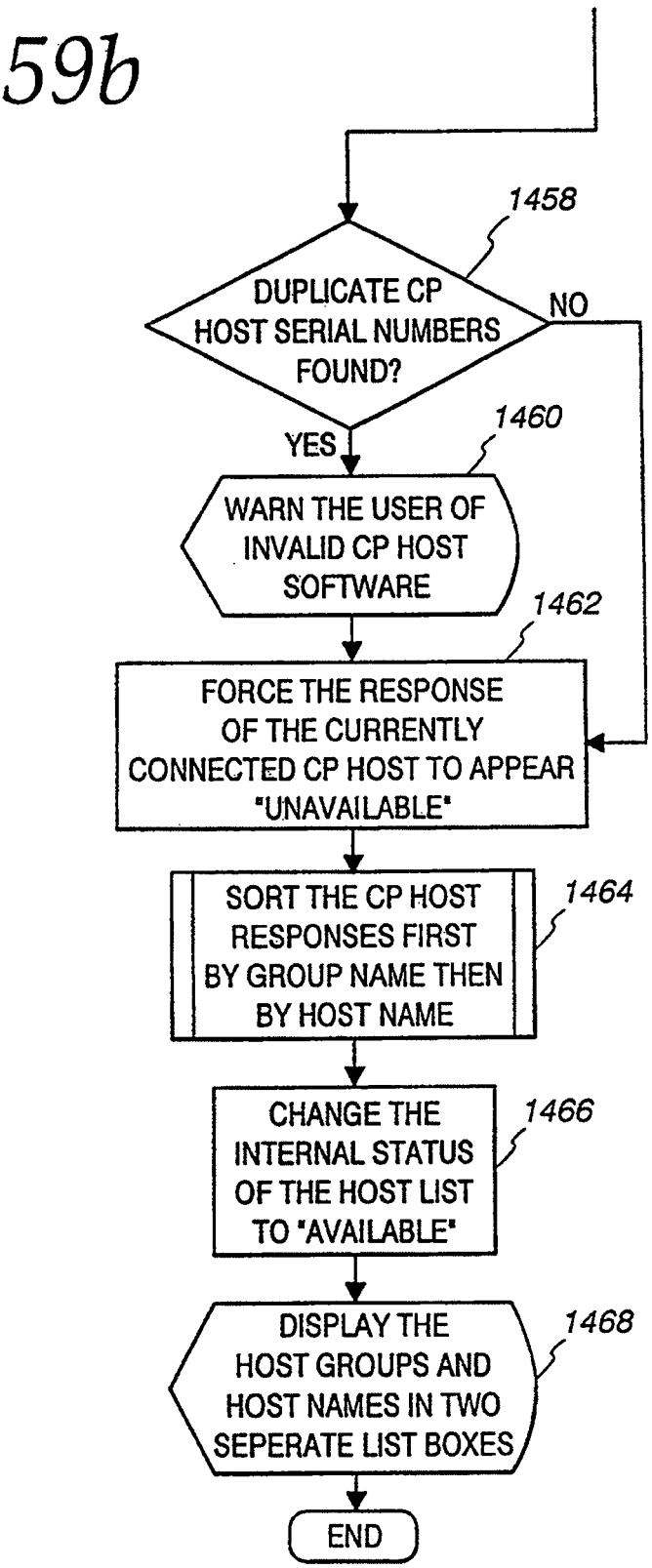

In order to initiate connection of the wireless interface device 100 to an available host 101, the set-up hot icon 1410 (FIG. 37) is selected in step 1439 (FIG. 59) which causes a set-up dialog box, as illustrated in FIG. 53 to be displayed in the viewing area 1202 (FIG. 36) of the LCD 1130. Subsequently, in step 1440, the wireless interface device 100 broadcasts network packets to be received by all available hosts 101 in range that are on the same channel and domain as the wireless interface device 100. After the network packets are broadcast, the wireless interface device 100 listens for a predetermined time period in steps 1442 and 1444 for return acknowledgement packets from the available hosts 101, which contain, among other things, the node addresses of the available hosts 101. After the time-out period the wireless interface device 100 terminates listening for responses from the available hosts 101 in step 1446. After listening is terminated, the system checks the number of responses received in step 1448. If no responses are received, the wireless interface device 100 repeats the cycle (i.e. returns to step 1440) for a predetermined number of retries as determined in step 1450.

If a response is received, the system identifies the unique node address from the responding hosts 101 in step 1452 and saves the unique host node addresses in step 1454. The list of available hosts 101 is searched in step 1456 for duplicate serial numbers. Should duplicate serial numbers be found in step 1458, a warning is generated in step 1460, warning the user that a duplicate copy of software is running on one of the responding hosts 101. In step 1462, the currently connected host is forced to appear as unavailable on the dialog box illustrated in FIG. 53.

The responding hosts 101 are sorted first by group name and then by host name in step 1464. After the sorting, an internal status list of the available hosts 101 in designated as available in step 1466. Subsequently, the available hosts and groups are displayed in the dialog box illustrated in FIG. 53 in step 1468. Movement of the cursor (by a pen-down event) to the desired host 101 selects that host 101. A "connect" button on the dialog box is then selected to connect the wireless interface device 100 to the selected host 101.

16. Remote Keyboard Macros

Figures 60, 61:
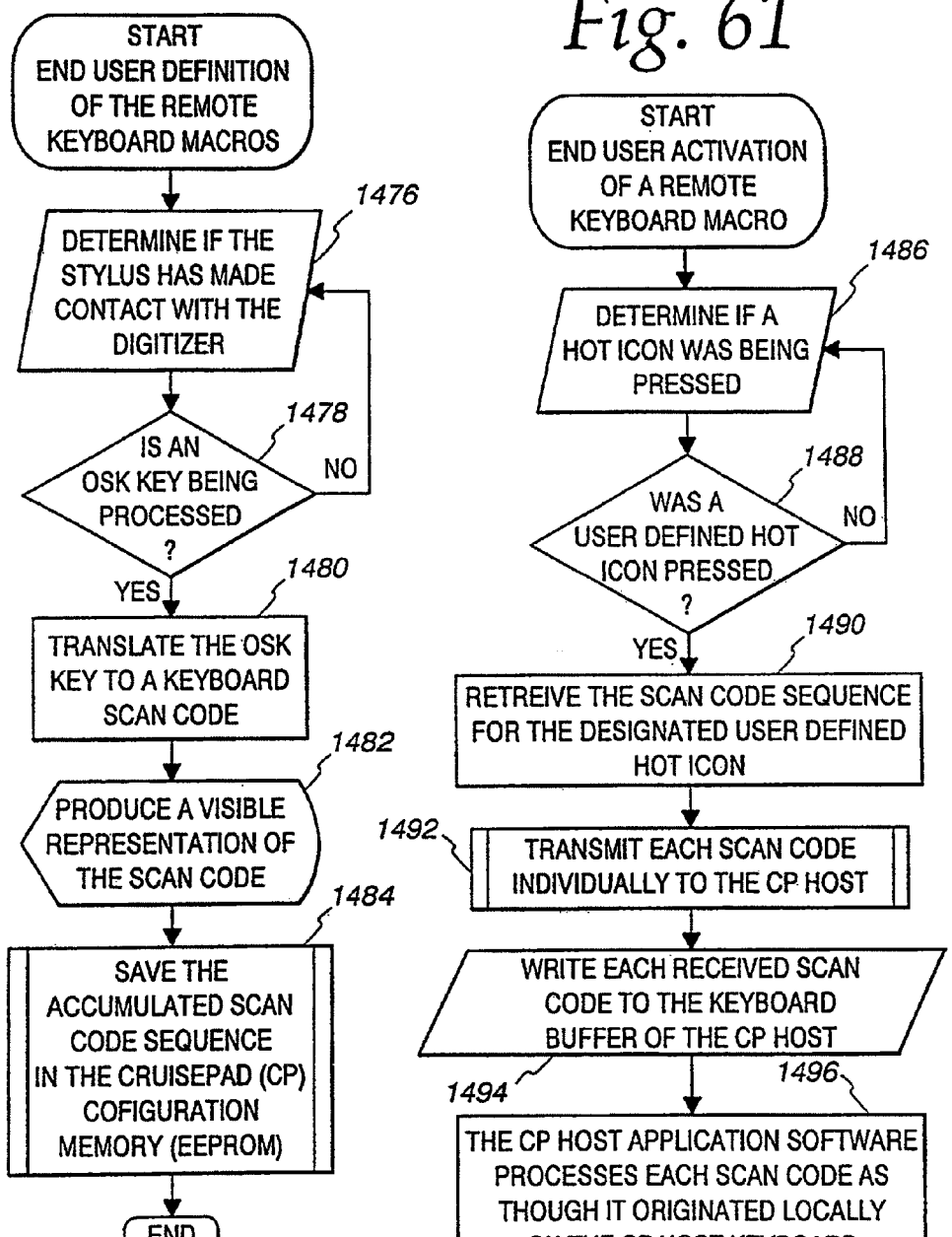
FIGS. 60 and 61 are flow charts relating to a system for providing remote keyboard macros on the wireless interface device.

FIGS. 60 and 61 relate to remote keyboard macros on the wireless interface device 100. An important aspect of the wireless interface device 100 is that the remote keyboard macros are provided by way of a wireless connection. FIG. 60 relates to developing the macros while FIG. 61 is directed to using the macro.

Referring to FIG. 37, the wireless interface device 100 includes two user-defined hot icons 1472 and 1474, located in the hot icon area 1202 (FIG. 36) of the LCD 113C, that can be used for the macros. These hot icons 1472 and 1474 are configurable in a set-up mode, which, as discussed above, is under the control of the set-up hot icon 1410 (FIG. 37). Once the set-up hot icon 1410 is selected, a hot key button 1470 on the dialog box illustrated in FIG. 54 is selected. As noted in FIG. 54, the dialog box includes two configurable macros. These macros are configured by way of the two edit fields 1472 and 1474 (FIG. 54). In order to configure the macros, the icon for the desired edit field 1472 or 1474 is selected. These edit fields 1472 and 1474 are configurable by way of a virtual on-screen keyboard (OSK), selectable by way of a hot icon 1480 (FIG. 37).

Referring to FIG. 60, the system checks in step 1476 whether there has been a pen-down event in the viewing area 1202 (FIG. 36) of the LCD 113C and, in step 1478, whether the OSK hot icon 1480 (FIG. 37) was selected. If not, the system loops back to step 1476. If so, the selected key on the OSK is translated into a keyboard scan code in step 1480 and a visual indication of the key selected in the edit field 1472 or 1474 in step 1482. The process is repeated until the macro (i.e. WIN, DIR), followed by a carriage return 1486, is complete and the macro is saved in the EEPROM 111B (FIG. 12) in step 1484. A clear button 1486 is provided in the dialog box illustrated in FIG. 54 for each edit field 1472 and 1474. These clear buttons 1486 enable the edit fields to be cleared in the EEPROM 111B (FIG. 12).

Activation of the remote keyboard macros is accomplished by pressing down on the user-defined hot icons 1472 or 1474, located in the hot icon area 1202 (FIG. 36) of the LCD 113C. The system checks in steps 1486 and 1488, whether the user defined hot icons 1472 or 1474 are selected. If the user-defined hot icons 1472 or 1474 are not selected, the system returns to step 1486. Once one of the user-defined hot icons 1472 or 1474 is selected, the keyboard scan code sequence, stored in the EEPROM 111B (FIG. 12), is retrieved for the selected hot icon 1472 or 1474 in step 1490, which are then individually, transmitted to the host 101 in step 1492. These scan codes are then written to the keyboard buffer on the host 101 in step 1494. Subsequently, in step 1496, the host 101 processes the scan codes as though they originated from the host keyboard.

17. Wireless Flash Programmer

As mentioned above, the wireless interface device 100 includes several flash memory devices 742-748 (FIG. 25). The flash memory device 742 includes a protected area which contains the system BIOS, and a sufficient amount of functionality to enable the wireless interface device 100 to be rebooted to enable reprogramming of the flash memory devices 742-748 by way of the serial port 788 (FIG. 23) in the event of a flash disaster.

Figure 62A:
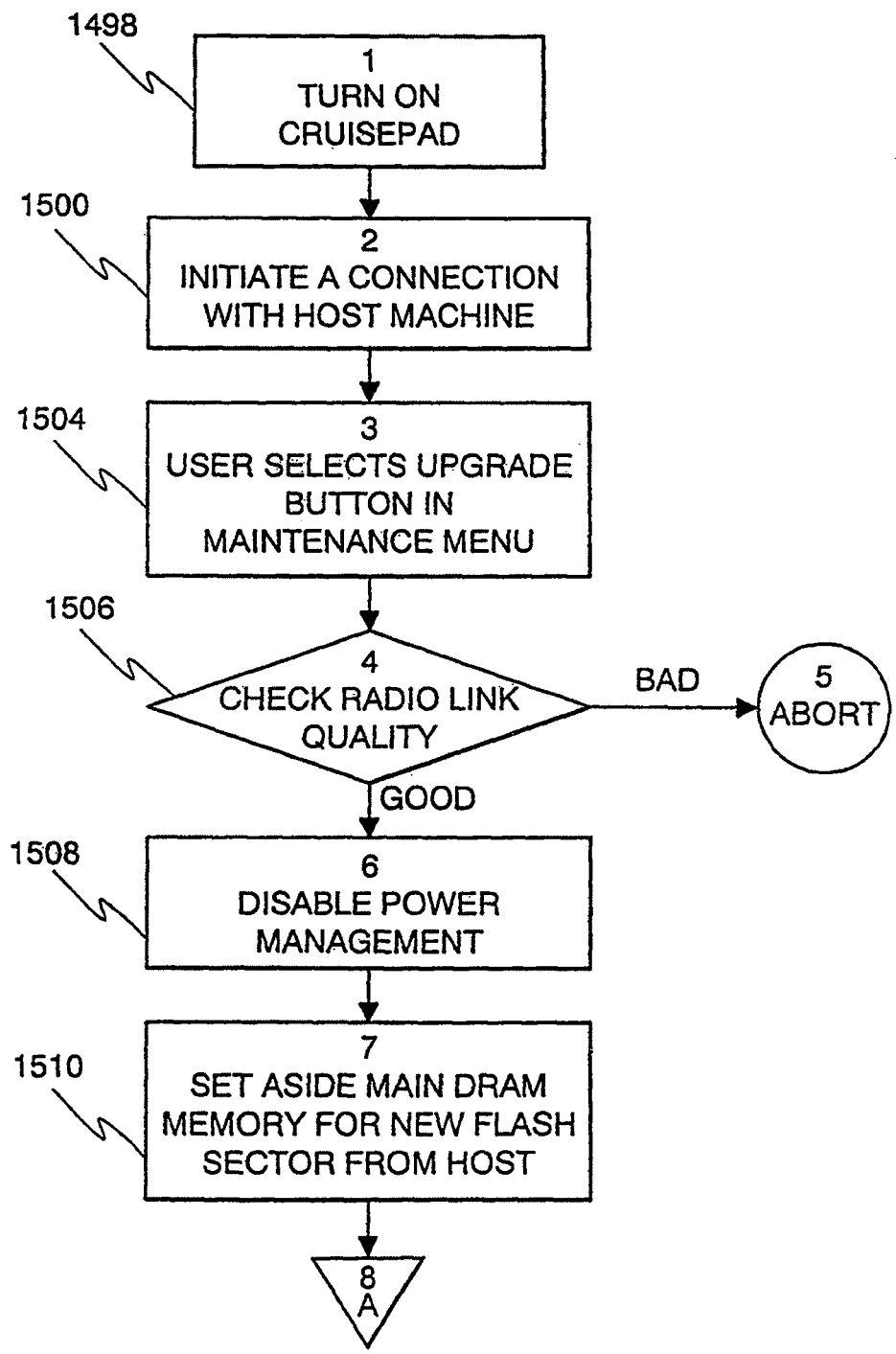
FIGS. 62A-62C and 63 are flow charts relating to a wireless flash memory device programmer.
Figure 62B:
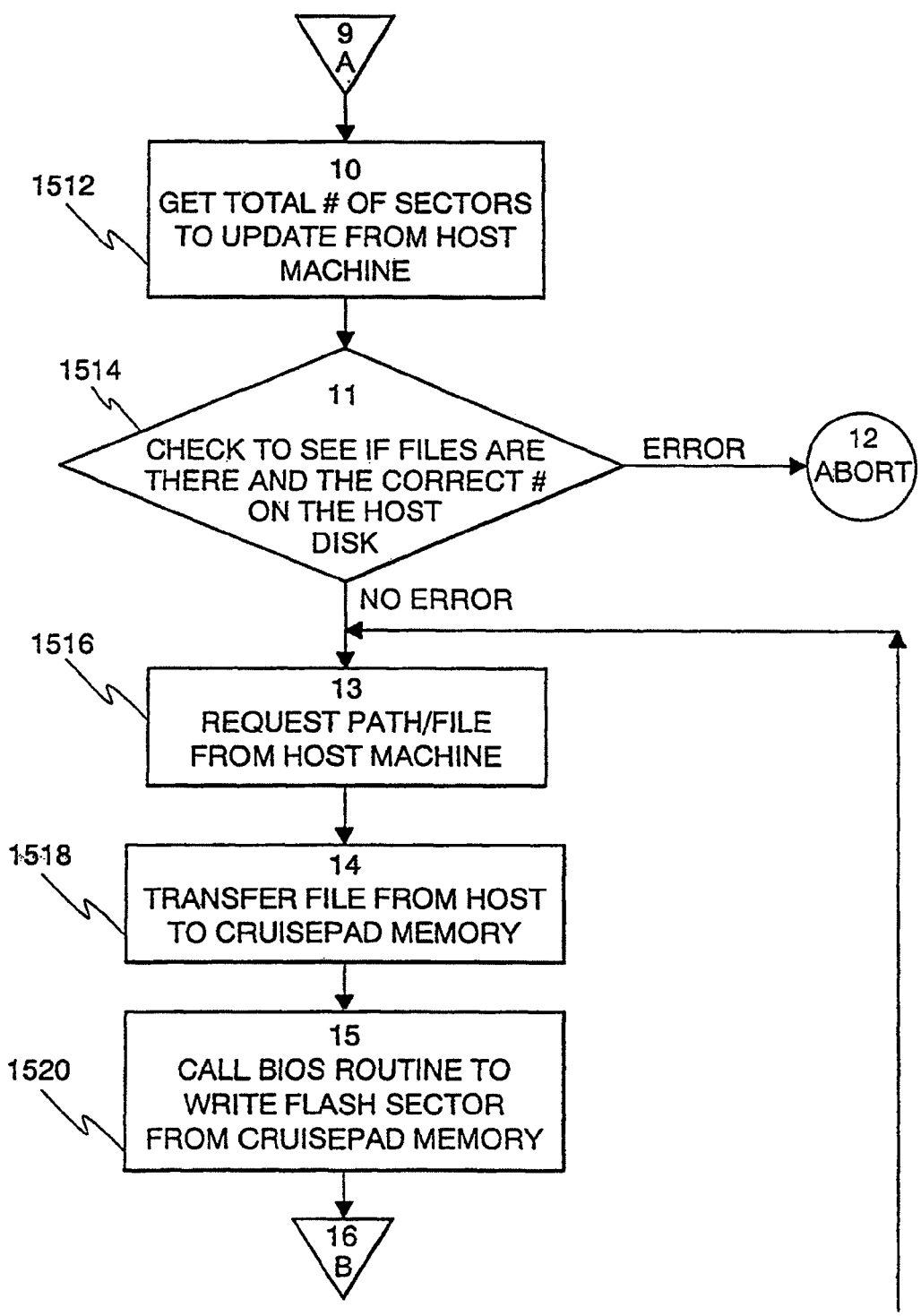
Figure 62C:
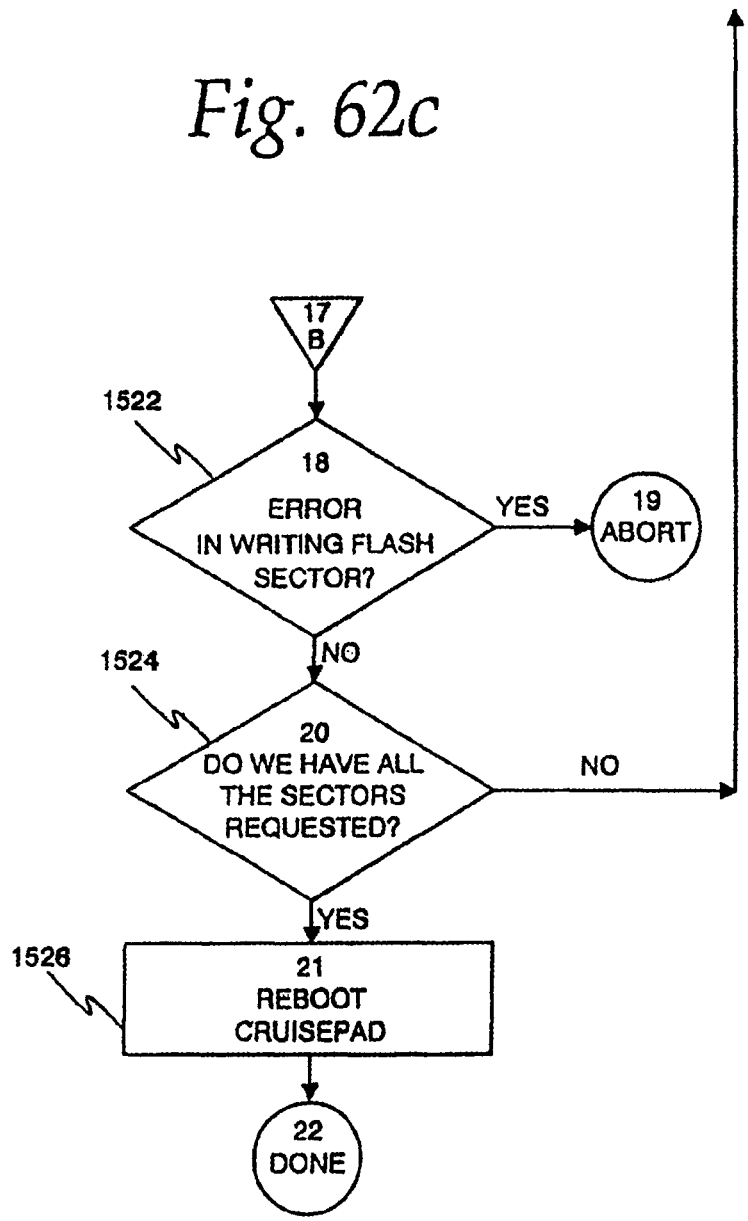

In order to upgrade the flash memory devices 742-748, the upgrade disks are installed in an available host computer 101. In particular, the flash upgrade software is written to a predetermined directory on the host's 101 hard disk. After the flash upgrade disks are installed, the wireless interface device 100 is turned on in step 1498 (FIG. 62A) by way of the main power switch 855 (FIG. 28). Subsequently, in step 1500, a connection between the host computer 101 and wireless interface device 100 is initiated in step 1500 by first selecting the configuration hot icon 1410 (FIG. 37).

Subsequently, the maintenance button on the dialog box is selected to get to the dialog box illustrated in FIG. 55. An upgrade button 1502 on the dialog box illustrated in FIG. 55 is selected in step 1504. In order to prevent programming errors, the radio quality is checked in step 1506 before proceeding. If the radio quality is poor, the upgrade is aborted. If the radio quality is adequate, power management is disabled in step 1508 to prevent the wireless interface device 100 from going into a reduced power state as discussed above during programming of the flash memory devices 742-748. After the power management is disabled, a portion of the DRAM memory 111A (FIGS. 18 and 24) in the wireless interface device 100 is set aside to receive a flash sector from the host computer 101 in step 1510. Subsequently, the wireless interface device 100 polls the host computer 101 to determine the correct numbers of sectors in the flash update and whether the sectors are available on the hard disk of the host computer 101 in steps 1512 and 1514. If the flash update files are not on the host hard drive or an incorrect number of sectors are available on the host hard disk, the update is aborted. Otherwise, the system requests the path/file data from the host computer 101 in step 1516. Subsequently, each sector (file) in the flash update is read by the host computer 101 and uploaded over the radio to the DRAM 111A in the wireless interface device 100 in step 1518. After the sectors are written to the DRAM 111A in the wireless interface device 100, a BIOS call is made to write the sectors in the DRAM 111A to the flash memory devices 742-748 in step 1520.

In step 1522 the system checks for errors in writing to the flash memory devices 742-748. Should any errors be detected, the update is aborted. If no errors are detected, the system checks in step 1524 whether all of the sectors from the DRAM 111A have been written to the flash memory devices 742-748 in the wireless interface device 100. If not, the system loops back to step 1516. Once all of the files have been transferred to the flash memory devices 742-748, the wireless interface device 100 is rebooted in step 1526. Once the wireless interface device is rebooted, the system will be able to utilize the updated software in the flash memory devices 742-748.

Figure 63:
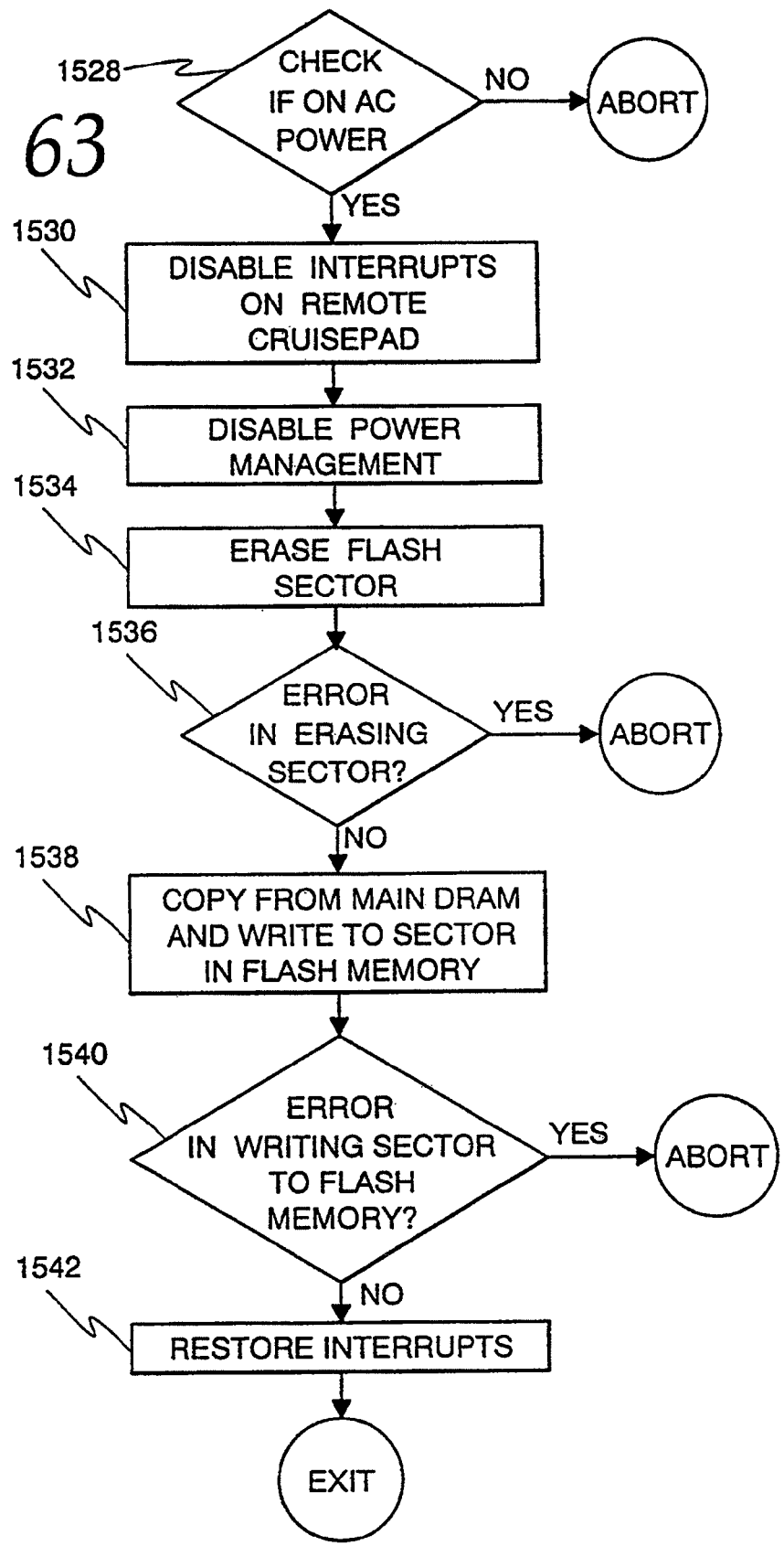

FIG. 63 illustrates the routine for writing the flash update sectors from the DRAM 111A to the flash memory devices 742-748. Since the flash updates are stored in the DRAM memory 111A, the programming is aborted if the AC power is turned off as determined in step 1528 since the flash update data in the DRAM 111A will be lost when the battery is exhausted. In order to prevent errors during programming, interrupts, as well as the power management, are disabled on the wireless interface device 100 in steps 1530 and 1532. After the interrupts and the power management are disabled, the flash memory device is erased in step 1534. If errors occur during erasure, as determined in step 1536, updating of the particular flash memory device 742-748 is aborted. If not, a sector from the DRAM 111A is written to the flash memory devices 742-748 in step 1538. After the sector is written to the flash memory devices 742-748, the system checks in step 1540 whether any errors occurred. If so, the update is aborted. If not, the interrupts, as well as the power management, are enabled in step 1542 when all sectors have been reflashed.

18. Automatic Reconnect

Figure 64A:
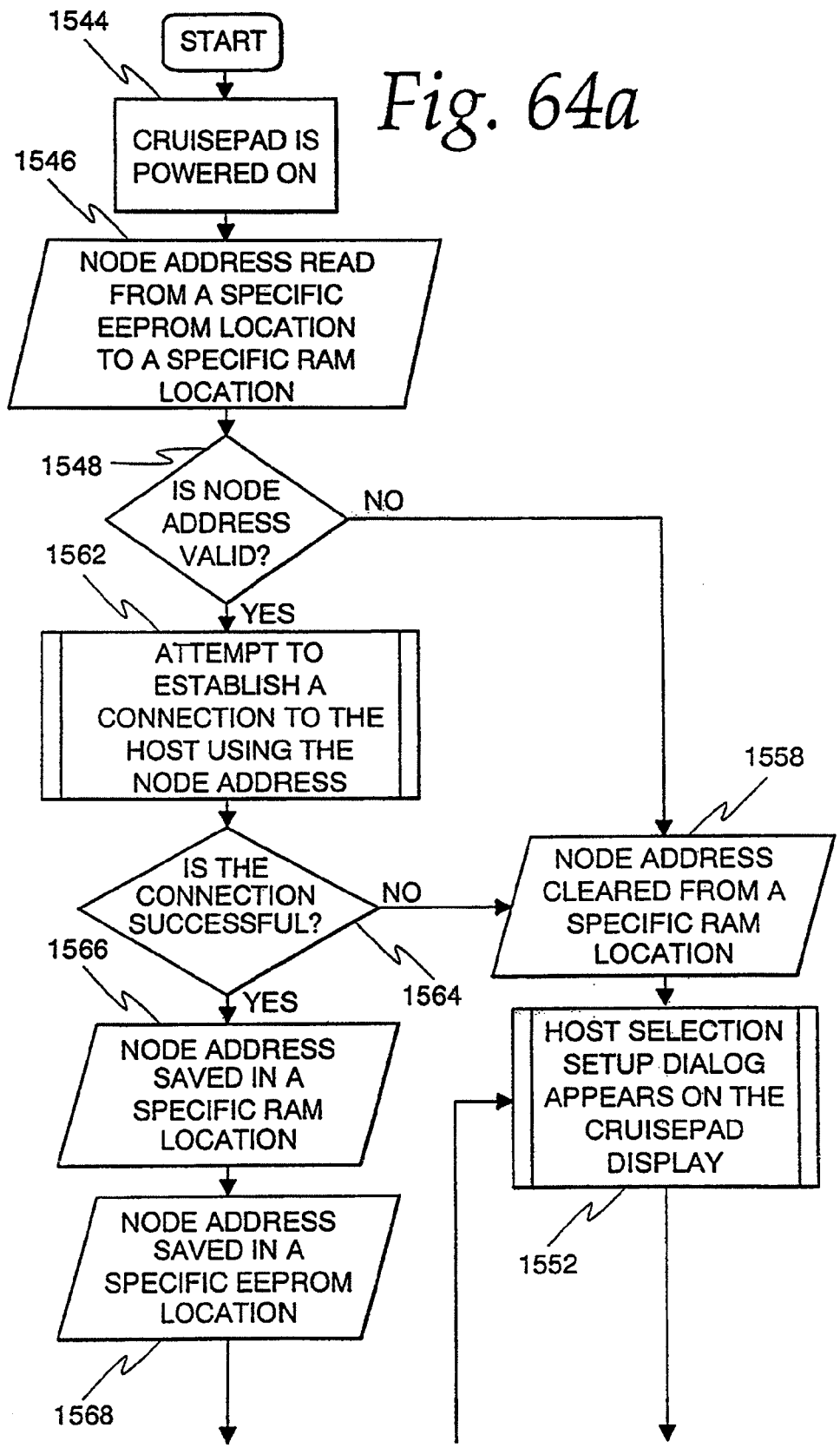
Figure 64B:
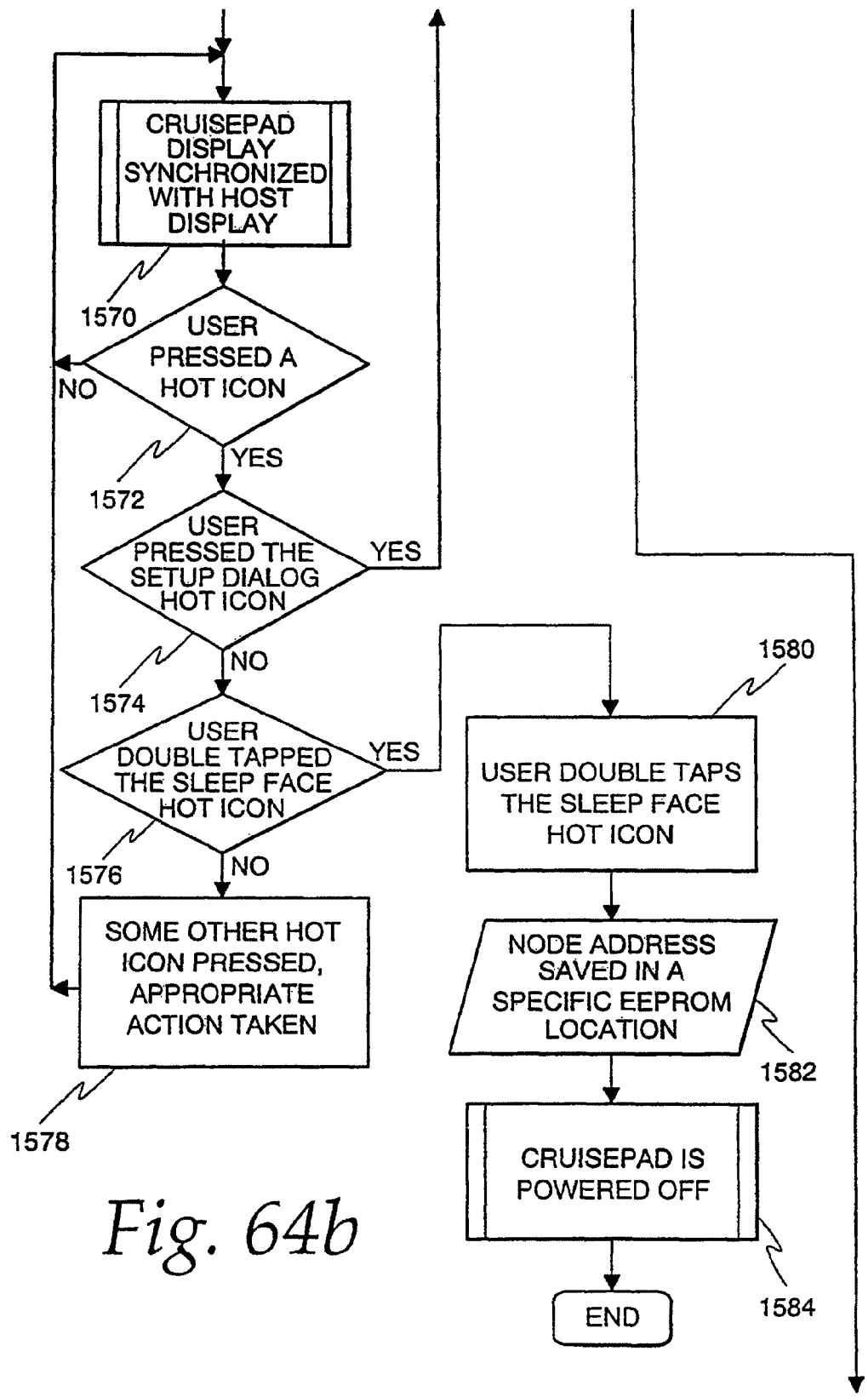

As mentioned above, the wireless interface device 100 can be connected to any of the available hosts 101 that appear in the dialog box illustrated in FIG. 53 in the manner described above. The system illustrated in FIGS. 64A, 64B and 64C obviate the need for the user to select a host 101 for connection each time the wireless interface device 100 is powered up, by automatically connecting the wireless interface device 100 to the last host 101 to which it was successfully connected. As will be discussed in more detail below, when a host 101 is selected from the dialog box illustrated in FIG. 53 for connection to the wireless interface device 100 and a connection is successfully achieved, the node address of that host 101 is stored in the EEPROM 111B (FIG. 12). Subsequently, once the wireless interface device 100 is powered up in step 1544, the system reads the node address from the EEPROM 111B, and reads it to a specific location in DRAM 111A (FIGS. 18 and 24) in step 1546. After the node address is written to the DRAM 111A, the system checks the node address to determine whether it is valid in step 1548. Invalid node addresses occur anytime the wireless interface device 100 makes an attempt to connect to a host 101, which fails during automatic reconnecting or is later disconnected by the end user. Thus, if a successful connection is not made or if there is a manual disconnection, the node address is cleared from the DRAM 111A in step 1550 and thus will be invalid. Subsequently, if the automatic reconnect fails in order to facilitate connection of the wireless interface device 100 to another available host 101, the set-up dialog box illustrated in FIG. 53 is displayed on the display 113C of the wireless interface device 100 in step 1552. After the host selection set-up dialog box is displayed on the wireless interface device 100, the system checks in step 1554 whether the wireless interface device 100 is connected to an available host 101. Normally, if an invalid address is found in step 1548 and the host selection set-up dialog box appears on the display 113C of the wireless interface device 100, there will be no connection to an available host 101 and the system will jump to step 1556, where it checks if the hot icon area 1202 (FIG. 37) has been depressed. Normally in this situation, since the host selection dialog box is already being displayed on the screen 1130 of the wireless interface device 100, the only hot icon that can affect the situation is a sleep-face hot icon 1558 (FIG. 37), which places the wireless interface device 100 in a low-power sleep mode. In a normal situation when the wireless interface device 100 is first powered up, the sleep-faced hot icon 1558 is not depressed and the system waits for the user to select an available host 101 from the host set-up dialog box illustrated in FIG. 53 as discussed above in step 1560. Once an available host 101 is selected, the system loops back to step 1562 and attempts to establish connection with the selected host 101.

In step 1564 the system checks whether or not the connection was successful. If not, the system goes to step 1550 and clears the node address for the selected host 101 from the DRAM 111A and displays the host selection set-up dialog box in step 1552. If the connection between the wireless interface device 100 and the host 101 is successful, the node address of the host 101 is saved in a specific DRAM location in step 1566, and in turn, written to the EEPROM 111B (FIG.

12) in step 1568. After the node address of the selected host 101 is stored in EEPROM 111B, the wireless interface device 100 will display whatever is being displayed on the host 101 in step 1570.

After a connection is established between the host 101 and the wireless interface device 100, the system continuously checks for hot icons being selected in step 1572. If no hot icons are selected, the system will loop back and continue to check for the selection of a hot icon. If the system determines that a hot icon is selected, the system checks in step 1574 whether the set-up dialog hot icon 1410 (FIG. 37) was selected. If so, the system loops back to step 1552 and displays the host selection set-up dialog box illustrated in FIG. 53 on the display 113C of the wireless interface device 100. If the set-up dialog hot icon 1410 is not selected, the system checks in step 1576 whether the sleep-face hot icon 1558 is selected in step 1576. If not, the system checks in step 1578 whether other hot icons in the hot icon area 1202 (FIG. 36) were selected and the appropriate action is taken. The system then goes to step 1570 and, in turn, and continually checks for the selection of other hot icons in step 1572.

If it is determined in step 1576 that the sleep-face hot icon 1410 is selected, the system checks in step 1580 whether a double pen-down event occurred at the location of the sleep-face hot icon 1410. As mentioned above, the sleep-face hot icon 1410 causes the wireless interface device 100 to go into a low-power mode. However, before placing the wireless interface device 100 in a low-power mode, the node address of the host 101 to which the wireless interface device 100 is connected is saved in a specific location of the DRAM 111A and, in turn, written to the EEPROM 111B in step 1582. After the node address is saved, the wireless interface device 100 is powered down in step 1584.

The system discussed above is thus able to automatically connect the wireless interface device 100 to the last host 101 to which it was connected. After the automatic reconnect, should the set-up window hot icon 1410 (FIG. 37) be selected, the host selection set-up dialog box illustrated in FIG. 53 will be displayed on the screen 113C of the wireless interface device 100. Subsequently, the system will go to step 1554 and check whether the wireless interface device 100 is connected to a host 101. In this case, since the wireless interface device 100 will still be connected to the available host, the system then checks in step 1586 whether a disconnect button on the host selection dialog box illustrated in FIG. 53 has been depressed. If not, the system goes to step 1556 and continuously waits for a hot icon in the hot icon area 1202 (FIG. 36) of the LCD 113C to be depressed. If the disconnect button in the host selection set-up dialog box illustrated in FIG. 53 is depressed, the node address for the host 101 to which the wireless interface device 100 is connected is erased from the specific location in the DRAM 111B in step 1588. Subsequently, the system goes to step 1556 and waits for a hot icon in the hot icon area 1202 (FIG. 37) to be depressed.

19. Remote Occlusion Region

Figure 66C:
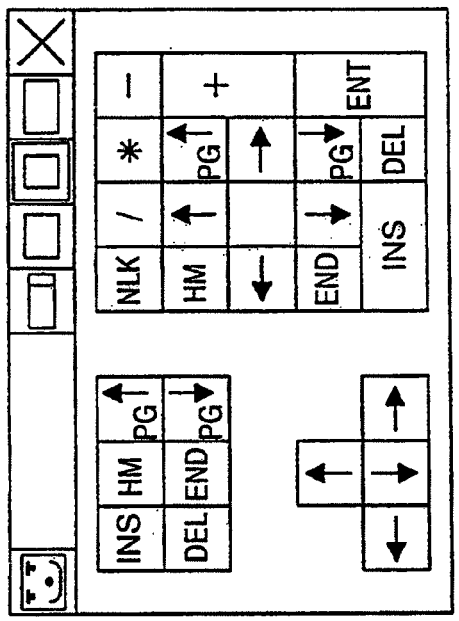
Figure 66D:
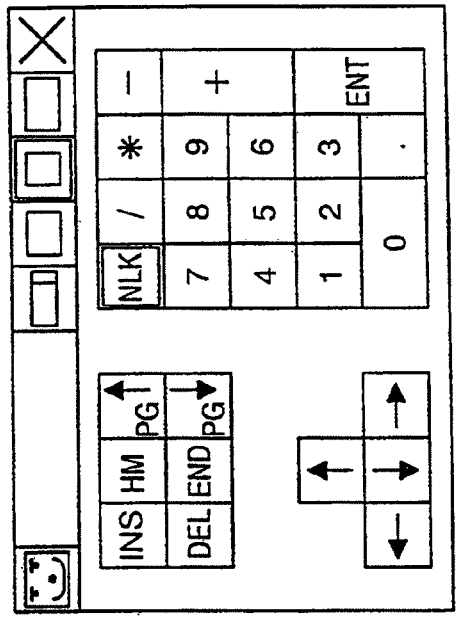

As mentioned above, the wireless interface device 100 includes a virtual on-screen keyboard (OSK), as illustrated in FIG. 66. More particularly, the OSK is configurable by the buttons 1590, 1592, 1594 and 1596 in a control box located at the top of the OSK. These buttons 1590, 1592, 1594 and 1596 enable the OSK to be configured. For example, a button 1590 displays the OSK as illustrated in FIG. 66A with a full keyboard and numeric keypad. The button 1592 is a toggle which displays the keyboard without the numeric keyboard as illustrated in FIG. 66B. The button 1594 displays the numeric keypad with the NUM LOCK off as illustrated in FIG. 66C, or alternatively displays the OSK as a numeric keyboard NUM LOCK on as illustrated in FIG. 66D. The button 1596 allows the size of the OSK to be varied. The "X" button closes the window displaying the OSK.

As mentioned above, the display 113C on the wireless interface device 100 displays whatever is being displayed on the host 101 when a connection is made. Since the graphics for the OSK is generated locally at the wireless interface device 100, a remote occlusion region is generated at the host 101 to prevent the host 101 from painting over the OSK on the display 113C of the wireless interface device 100. The remote occlusion region is analogous to a window in the display of the host 101 in which the host 101 is prevented from using.

Figure 65A:
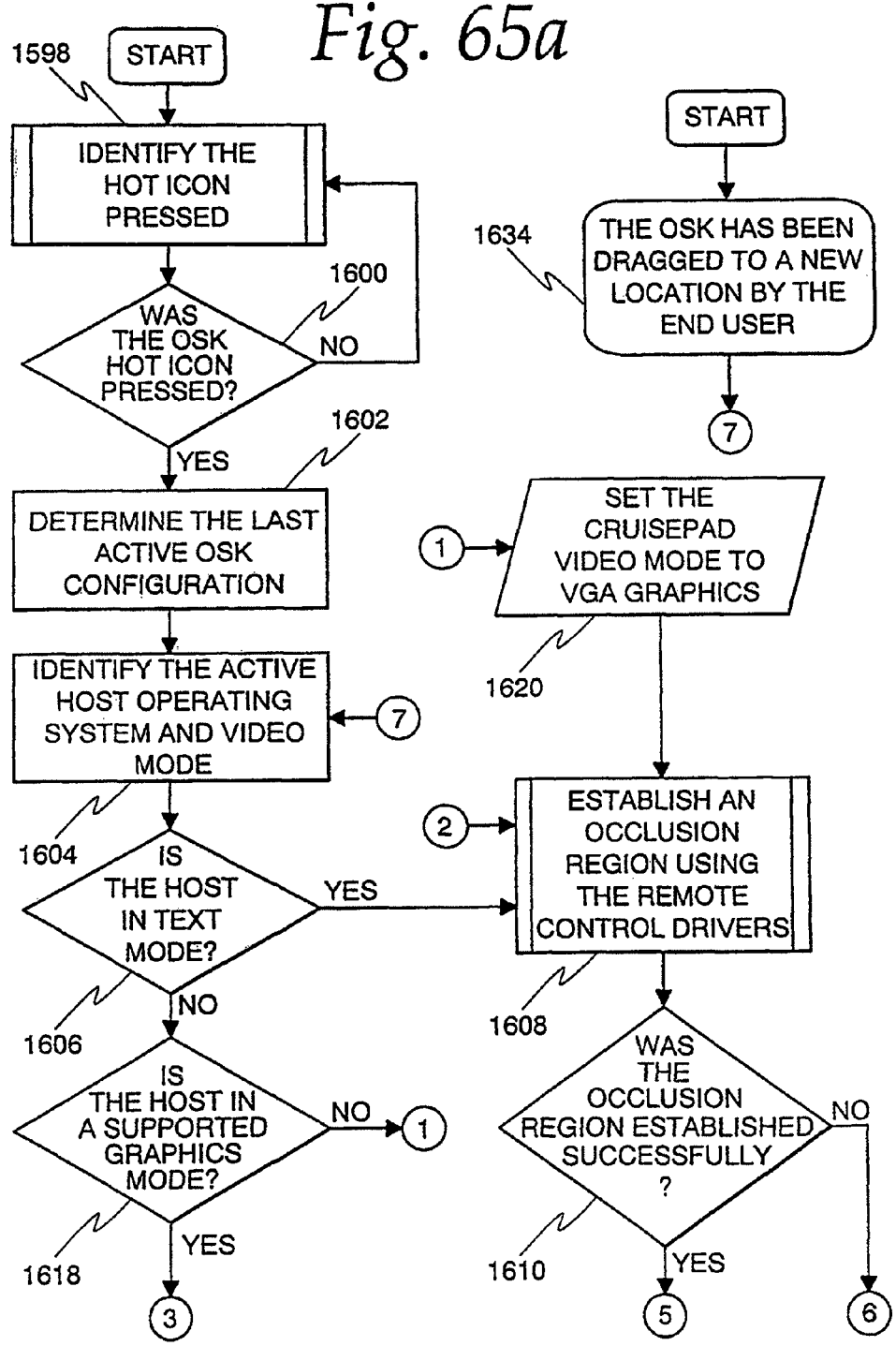
FIGS. 65A and 65B are flow charts relating to providing a remote occlusion region on the wireless interface device.

Referring to FIG. 65A, the system monitors the hot icon area 1202 (FIG. 36) to determine if any of the hot icons have been pressed. As discussed above, the system includes an OSK hot icon 1480 (FIG. 37), which displays the OSK on the LCD 113C of the wireless interface device 100 when depressed. If the system determines in step 1598 that a hot icon has been depressed, it checks in step 1600 whether the OSK hot icon 1480 was pressed. If not, the system loops back to 1598 and continually checks for hot icons being pressed. If the OSK hot icon 1480 has been depressed, the system determines the last configuration for the OSK in step 1602 (i.e. FIGS. 66A-66D). Once the configuration of the last OSK is determined in step 1602, the system then checks the operating system and video mode of the host 101 in step 1604. Depending on whether the host 101 is in text or graphics mode will determine whether the OSK image on the wireless interface device 100 is merely shadowed onto the display of the host 101 by way of a private message, as will be discussed in more detail below, or whether the remote occlusion region at the host 101 is established by drivers in the host software, which create the remote occlusion region by way of ASCII characters. Thus, in step 1606, if the system determines that the host 101 is in the text mode, an occlusion region on the display of the host 101 is created using the host control drivers in step 1608. In step 1610, the system checks whether the occlusion region was successfully established. If not, the system then checks in step 1612 whether the OSK is currently visible on the display 113C of the wireless interface device 100. If not, the display of the OSK is aborted in step 1614. If it is determined in step 1612 that the OSK is currently visible on the LCD 113C of the wireless interface device 100, any reconfiguration of the OSK is ignored and the configuration of the last OSK is continuously displayed in step 1614. If it is determined in step 1610 that the remote occlusion region is successfully established, the system goes to step 1616, which enables the OSK to be used.

If it is determined in step 1606 that the host 101 is not in a text mode, the system checks in step 1618 whether the host 101 is in a graphics mode. If not, the system goes to step 1620 and sets the video mode to VGA graphics in the wireless interface device 100 and subsequently proceeds to step 1608 to establish the occlusion region in the host 101 by host control drivers. If the host is in a graphics mode, the system next checks in step 1622 whether the host 101 is running a Windows application. If not, the system returns to step 1608 and establishes the occlusion region on the display of the host 101 using the host control drivers.

If it is determined in step 1622 that the host 101 is running a Windows application, the occlusion region on the host 101 is established by way of a private message sent by the wireless interface device 100 to the host 101 in step 1624. After the private message is sent, the system checks in step 1626 to determine if it was successfully sent. If not, the system proceeds to step 1612 and checks to determine if an OSK is currently visible. If the private message is successfully sent, the system checks in step 1628 whether the private message was successfully received by the host 101. If so, the system goes to step 1630 and checks whether the private message was acknowledged by the host 101. If so, the system goes to step 1616 and draws the OSK at the user-requested coordinates. If not, the system goes to 1612. If it is determined in step 1628 that the private message has not been received, the system continually checks for receipt of the private message for a predetermined time-out period in step 1632. Should a time-out occur before the private message is acknowledged by the host 101, the system again will go to step 1612.

The OSK includes a control bar 1632 (FIG. 66A). The control bar 1632 enables the location of the OSK on the LCD 113C of the wireless interface device 100 to be changed by touching the control bar 1632 with the pen and dragging it to the desired location on the LCD 113C of the wireless interface device 100. Anytime the user changes the location of the OSK on the LCD 113C of the wireless interface device 100 as acknowledged by the system in step 1634, the system then returns to step 1604 to determine the video mode of the host computer 101. As discussed above, the video mode determines whether the remote occlusion region on the display of the host 100 is created by shadowing the OSK on the display of the host by way of the private message or whether the occlusion region on the display of the host is created by local drivers using ASCII characters. The system then goes to step 1606.

20. Multiple Wireless Interfaces to a Single Server

The alternate embodiments of the invention discussed heretofore all relate to a single wireless interface device 100 interfaced to a single host implemented as a personal computer or to a local area network by way of an access point 109. The following embodiments illustrated in FIGS. 67-112 primarily relate to a system in which multiple wireless interface devices 100 interface in real time with a multi-device server which forms a portion of either a wired LAN or a wireless LAN, or multiple servers connected together by routers, as will be discussed in more detail below. The system for enabling multiple wireless interface devices 100 to interface in real time with a multi-device server or plurality of servers is generally identified with the reference numeral 1700 and illustrated in FIG. 67. In this system 1700, a plurality of wireless interface devices 100a, 100b, 100c, 100d, etc. communicate with one or more local area network (LAN) segments 1702 and 1704, by way of an access point 109 (discussed above). Each LAN segment 1702, 1704 includes a multi-device server 1708, 1710 with an extended Windows NT operating system, as discussed below. The LAN segments 1702 and 1704 are connected together by a router 1706, discussed in more detail below. Only four wireless interface devices, identified in FIG. 67 as 100a, 100b, 100c and 100d, are shown for example. However, more wireless interface devices 100 can be connected to the System 1700.

Various server platforms are suitable for use with the system 1700. For example, server platforms which include one to four microprocessors, for example, 32-bit x86 or Pentium Intel Microprocessors or RISC-based systems of at least 100 MHz or faster are suitable. Examples of suitable servers 1708, 1710 include: ZDS Z-Server MX Server (up to 4 Pentium microprocessors); ZDS Z-Server WG Server (up to 2 Pentium microprocessors); and Z-Station GT Desktop Server (single Pentium microprocessor); and the ZDS P6OE Server; all available from Zenith Data Systems, Sacramento, Calif. Each server should have at least 90 MB of free hard disk space and 16-32 MB of RAM; preferably 16 MB plus 4 MB per user.

Figure 68:
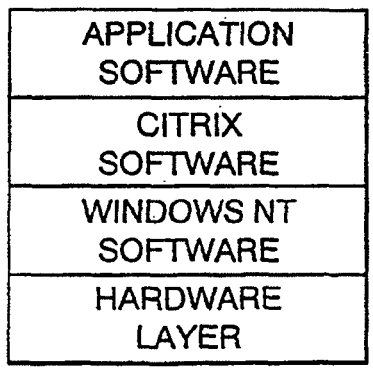
FIG. 68 is a block diagram illustrating the software architecture of the server illustrated in FIG. 67.

As mentioned above, each server 1708, 1710 utilizes an extended Windows NT Operating System. The Windows NT operating system is described in detail in "Windows NT Server Professional Reference", by K. P. Siyan, New Writers Publishing, 1995; "Programming Windows 95", by C. Pelzold and P. Yao, Microsoft Press, 1996; "WINDOWS 95 WIN 32 Programming API Bible", by R. Simon, M. Gauher and B. Barnes, Waite Group Press, 1996, hereby incorporated by reference. In order to enable remote control access of the servers 1708 and 1710 by the wireless interface devices 100, an additional layer of software, for example, WinFrame by Citrix Systems, Inc. is used in both the servers 1708, 1710, as generally shown in FIG. 68. The Citrix WinFrame software is described in detail in Citrix WinFrame, published by Citrix Systems, Inc., copyright 1995, hereby incorporated by reference. The WinFrame software supports Windows 95, Windows NT, Windows 3.X, as well as MS-DOS text applications.

The access point 109 allows multiple wireless interface devices 100 to be connected to one or more LAN segments 1702, 1704. Various devices are suitable for use as the access point 109. For example, a wireless LAN adapter, such as the CruiseLAN wireless LAN adapter, as manufactured by Zenith. Data Systems, Sacramento, Calif., is suitable, as described in detail in "CruiseLAN PCMCIA SPECIFICATIONS", published by Zenith Data Systems, copyright 1994, hereby incorporated by reference.

The CruiseLAN LAN adapter is adapted to be installed in a PCMCIA Type 2 interface or ISA interface, available on various desktop and portable personal computers. The CruiseLAN wireless LAN adapter is based on a frequency hopping spread spectrum technology in the 2.4-2.4835 GHz band, and can be used in both client server and pier-to-pier network architecture systems. The CruiseLAN wireless LAN adapter supports NetWare 2.x, 3.x, 4.x, NetWare Lite, Microsoft Windows for Work Groups, as well as Microsoft LAN Manager.

Various other wireless LAN adapters are suitable for use as the access point 109, as long as the data rate requirements of standard PC LAN applications are exceeded, for example, 1.6 Mbps, and suitable at a reasonable operating distance. Moreover, various configurations are intended to be within the broad scope of the invention. For example, the router 1706 can be used to connect the LAN 1702 to a gateway (not shown). Also, the router 1706 can be used to connect the LAN 1702 to a LAN 1704 which includes its own access point (not shown).

As mentioned above, the system 1700 may include multiple LAN segments 1702, 1704 connected together by a router 1206. Various commercially available devices are suitable for use as the router 1706, for example, as manufactured by CISCO Systems, Inc.

The hardware for the wireless interface device 100 is described in detail above and illustrated in FIGS. 11-30 with the exception of the audio input subsystem, described below. The software for the wireless interface devices 100 for use with the multi-device servers 1708, 1710, as well as the software for the multi-device servers 1708 and 1710, is described below and included in Appendix 2.

21. Wireless Enumeration of Available Servers

As mentioned above, the servers 1708, 1710 may be provided with the service advertising protocol (SAP), a Windows NT service as described in a CD-ROM entitled "Microsoft Developer Network Development Library January 96", published by Microsoft Corporation, copyright 1996, hereby incorporated by reference. The SAP enables the servers 1708, 1710 to provide a broadcast function for broadcasting its server name and node address to the network. The servers with the broadcast function may or may not be in the same LAN segment 1702, 1704, with the access point 109 through which the wireless interface device 100 communicates. If the server is not on the same LAN segment 1702, 1704, the enumeration will be across the network router 1706.

Figure 67:
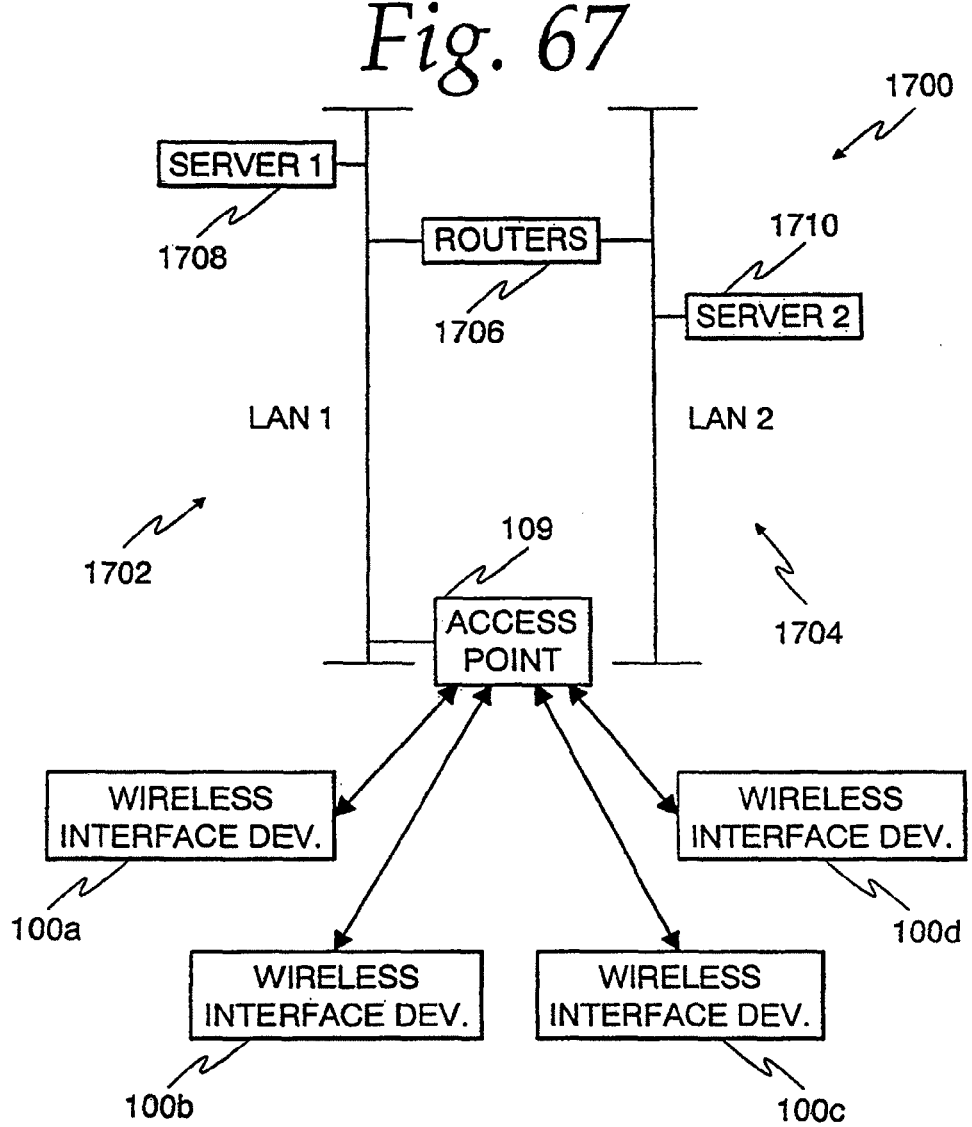
FIG. 67 is a block diagram of the hardware configuration for a system for interfacing multiple wireless interface devices to a single server in accordance with the present invention.
Figure 69:
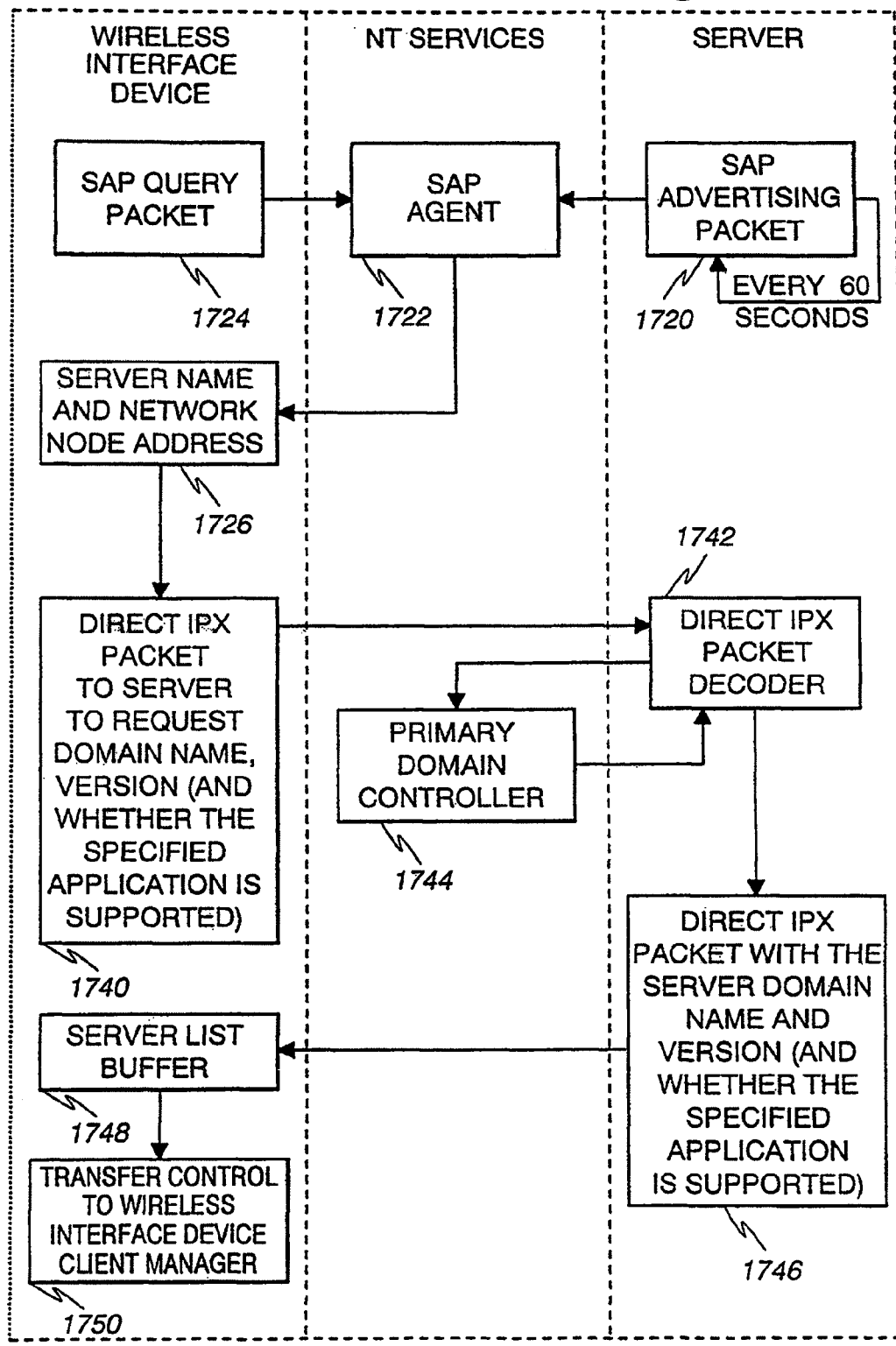
FIG. 69 is an overall diagram of the software for wireless enumeration of the server.
Figure 70:
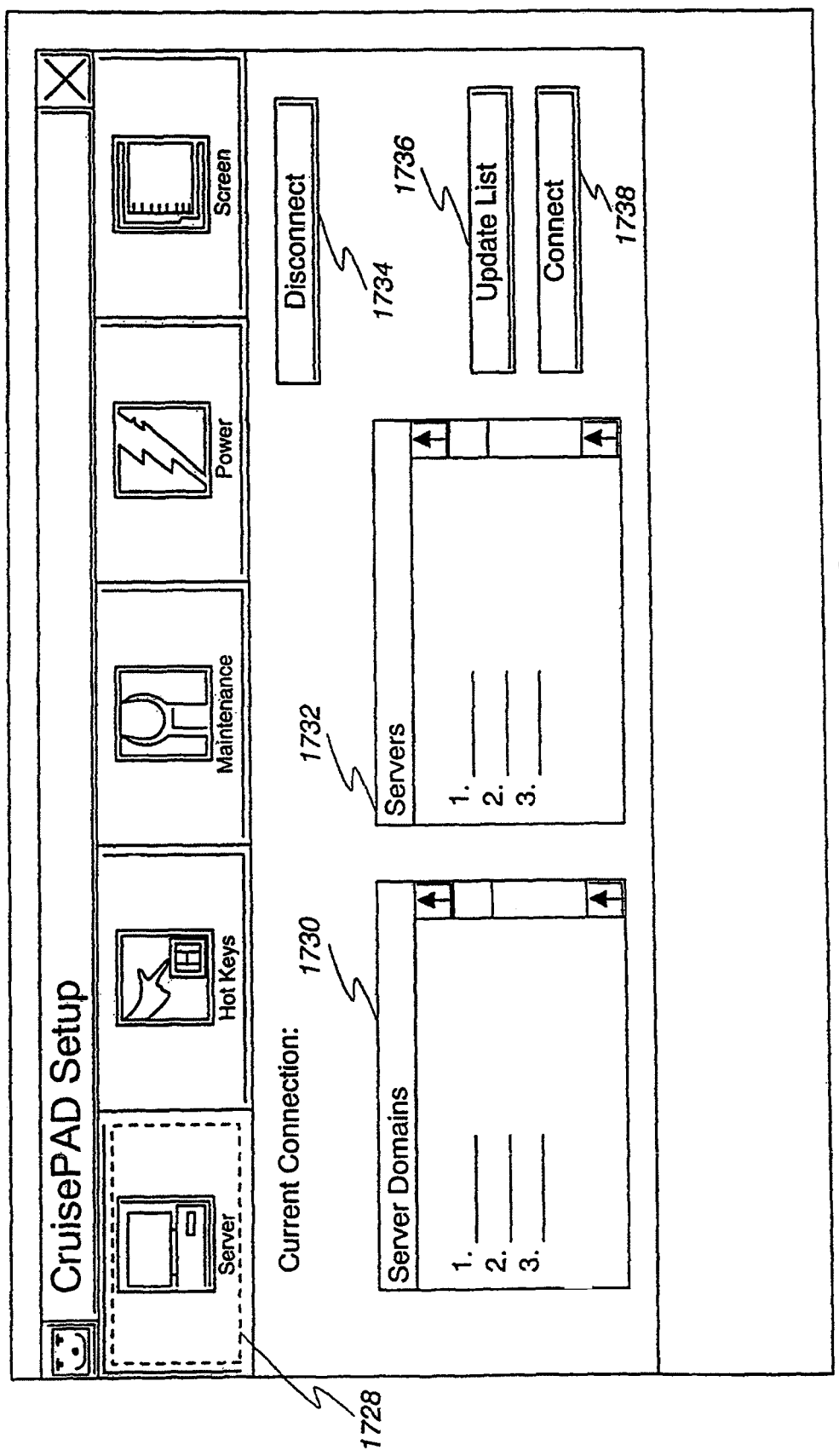
FIG. 70 is a view of a dialog box on the wireless interface device in a set-up mode.
Figure 71B:
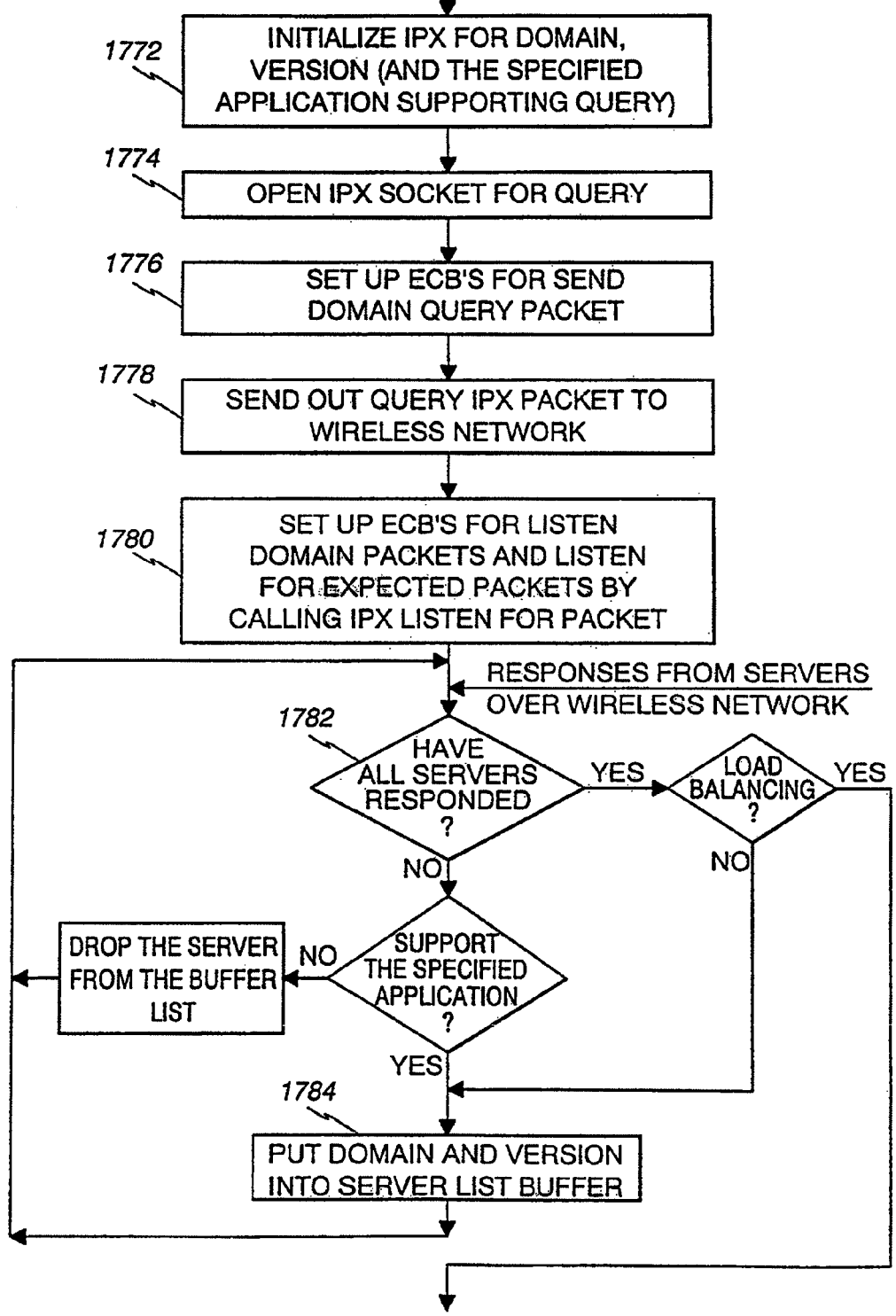
Figure 71C:
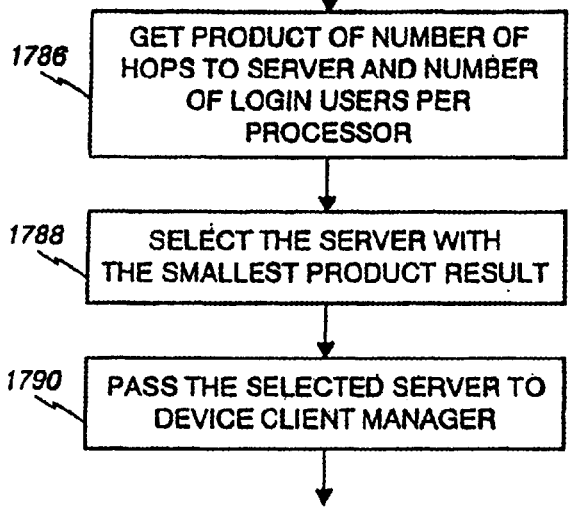
Figure 72:
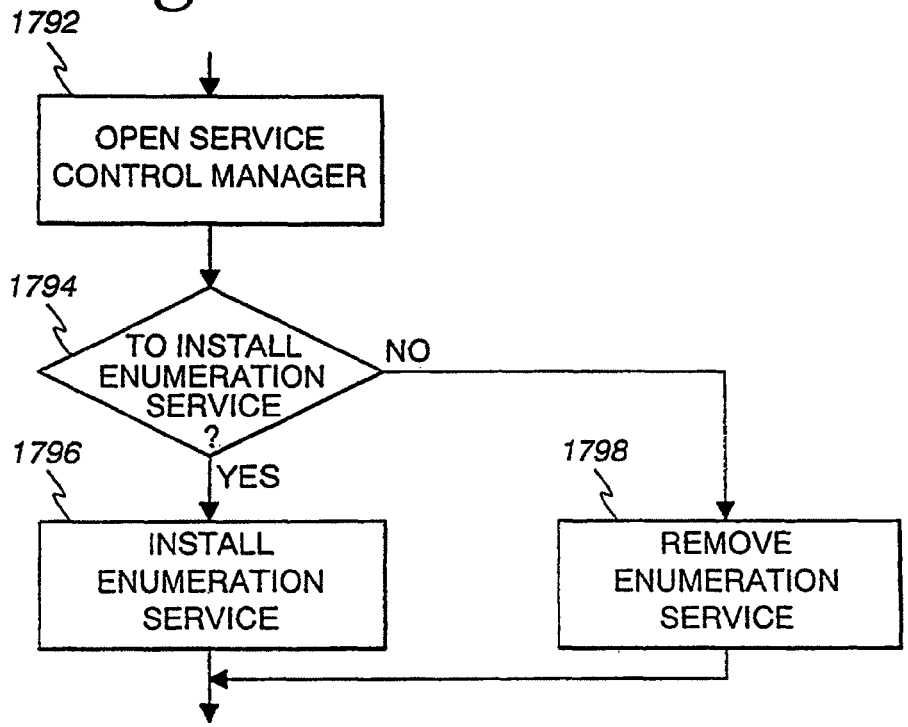
FIG. 72 is a flow chart of the software at the server side for the installation of the server side software for wireless enumeration of the servers available for connection to the wireless interface devices in accordance with the present invention.
Figure 73:
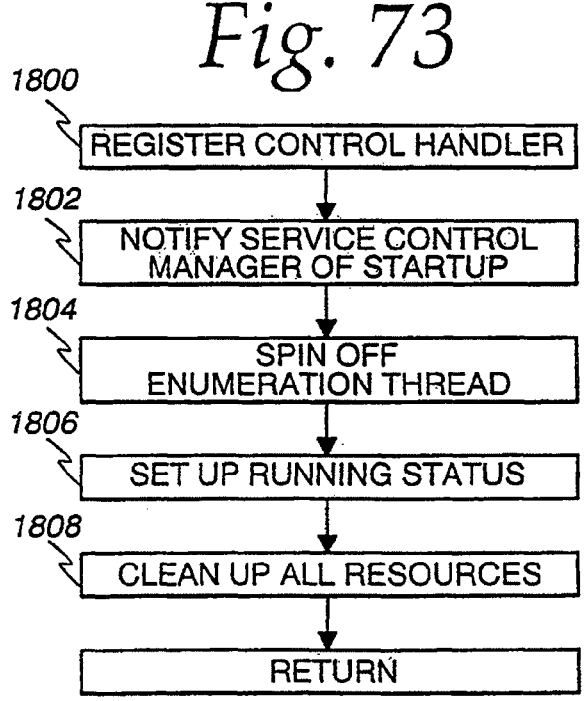
FIG. 73 is a flow chart for the software on the server side for providing wireless enumeration in accordance with the present invention.
Figure 74:
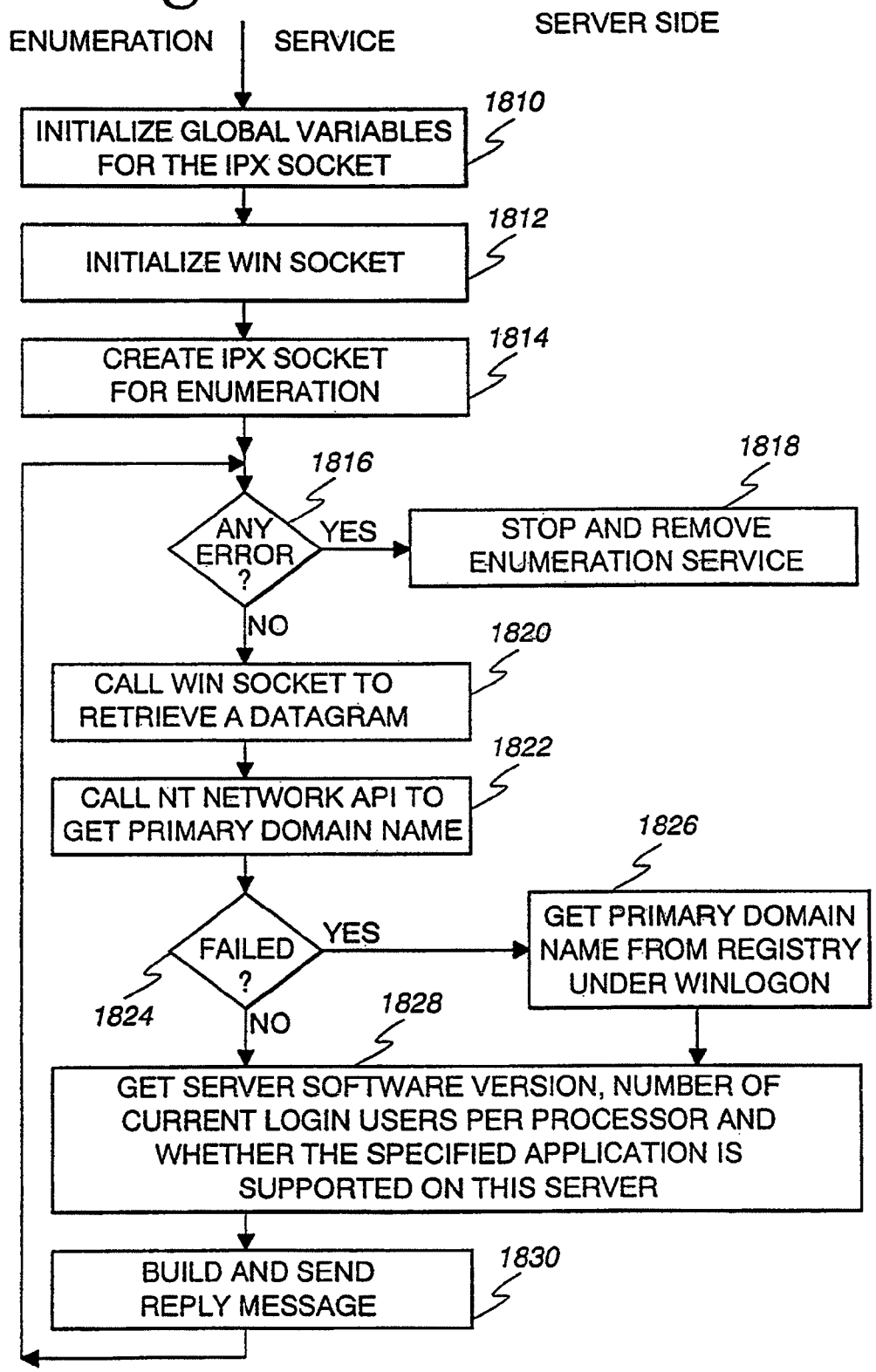
FIG. 74 is a flow chart for the software on the server side for providing wireless enumeration in accordance with the present invention.

The system for enabling wireless enumeration of the servers available for connection to a wireless interface device 100 is illustrated in FIGS. 67-74. FIG. 67 is an overall flow chart for both the servers 1708, 1710 and wireless interface devices 100. The software for the wireless interface device 100 is illustrated in FIGS. 71a-71c, while the server software is illustrated in FIGS. 72-74. FIG. 70 illustrates a set-up dialog box, available at the wireless interface device 100 for initiating the wireless enumeration of the servers and connecting to one of the servers.

Turning to FIG. 69, the servers 1708, 1710, which, as mentioned above, utilize a Windows NT operating system, are provided with the Service Advertising Protocol (SAP), which allows the servers 1708, 1710 to advertise their server names and node addresses. As shown in step 1720, the SAP uses the IPX Protocol, supported by Windows NT operating system, to transmit a SAP packet every 60 seconds to inform the other servers 1708, 1710, as well as routers 1706, on the network of their availability. When a wireless interface device 100 is seeking a server 1708, 1710 to connect to, the wireless interface device 100 sends a SAP query packet, as indicated in step 1724. The SAP query packet is received by those servers 1708, 1710 and routers which support SAP. The servers 1708, 1710 that support SAP return their server names and node address, as indicated in step 1726.

Referring to FIG. 69, after the server name and node address information is received by the wireless interface device 100, an IPX packet is directed to the server 1708, 1710 to request the domain name, software version, as indicated in step 1740. (Steps 1740 and 1746 may also include information whether a particular application is supported, which is part of a load balancing function described below.) The IPX packet is received by the server 1708, 1710, which, in turn, requests its domain name, as illustrated in steps 1742 and 1744. In a server running the Windows NT operating system, all domain names must be authenticated to a primary domain controller. The server then sets up packets identifying its server domain name and software version, in step 1746. This information is returned to the wireless interface device 100 and then put into a server list buffer in step 1748 and displayed in the dialog box 1732 (FIG. 70). Control is then transferred to the client manager for the wireless interface device 100 in step 1750 in the wireless interface device 100. The wireless interface device 100 may be then connected to the selected server by depressing the connect button 1738 in the set-up dialog box illustrated in FIG. 70.

The SAP query packet is initiated by way of the wireless interface device 100 by way of the set-up dialog box illustrated in FIG. 70. As discussed above, the set-up dialog box can be accessed by depressing the hot icon 1410 (FIG. 37) in the hot icon area 1202 (FIG. 36) of the wireless interface device 100. As illustrated in FIG. 70, the set-up dialog box includes a server button 1728, as well as dialog boxes 1730 and 1732 which identify the server domain names, as well as server name for those servers which broadcast a SAP advertising packet. The set-up dialog box also includes a disconnect button 1734 and update list dialog button 1736, as well as a connect button 1738. In order for the wireless interface device 100 to issue a SAP query packet, as discussed above, the update list button 1736 on the set-up dialog box is depressed. As mentioned above, the servers 1708, 1710 then return their server names and node addresses 1708, 1710, on the network. This information is communicated to the wireless interface devices 100 wirelessly. The server name and domain name is displayed in the dialog boxes 1730 and 1732. The dialog box 1730 displays the group or domain information—all of the servers in a particular group—while the dialog box 1732 displays the individual servers within each of the groups.

The software for the enumeration service for the wireless interface device 100 is illustrated in FIGS. 71a-71c. As discussed above, and illustrated in FIG. 3, the wireless interface devices 100 may include application software 105 (FIG. 3); for example, Novell NetWare. Referring to FIG. 71a, initially, the IPX protocol is initialized in step 1752 when the update list button 1736 (FIG. 70) is depressed in the set-up dialog box illustrated in FIG. 70. The IPX protocol (Internet Packet Exchange) is part of Novell NetWare's Protocol Stack and is used in this application to transfer data between the servers 1708, 1710 on the network and the various wireless interface devices 100. Once the IPX protocol is initialized, an IPX socket is opened for listening in step 1754. Once the IPX socket is opened for listening, event control blocks (ECBs) are set up for listening for the expected IPX packets by calling an application programming interface (API), known as an IPXListenForPacket. The event control blocks (ECBs) are used for controlling the communication between wireless interface device 100 and the server 1700, 1708. Once the ECBs are set up for listening, additional ECBs are set up for sending the SAP query packet in step 1758. Once the ECBs for the SAP query packet are set up, the SAP query packet is directed to the wireless network. As mentioned above, the servers running the SAP service broadcast a SAP advertising packet every 60 seconds. The wireless interface device 100 continues to receive these packets during a predetermined time-out period, as indicated in step 1762. Since the servers 1708, 1710, which can support multiple wireless interface devices 100, as well as personal computers, which can only support a single wireless interface device 100, respond to the SAP query packets, in step 1762 during a predetermined time-out period, the wireless interface device 100 checks in step 1764 whether the responding servers can support multiple wireless interface devices. If not, the system returns to step 1762 and continues to wait for a response from a server that can support multiple wireless interface devices 100 during the time-out period. Once a response is received during the time-out period from a server 1708, 1710 which can support multiple wireless interface devices, the server name and node address is written to a list buffer in step 1766. Once the time-out period has expired, the listen ECBs are removed in step 1768 and the IPX socket is closed in step 1770. In other words, the servers 1708, 1710 on the network only have within the time-out period to respond to a SAP query packet from a requesting wireless interface device 100. Whatever servers respond during the time-out period are identified by server name and node address in the list buffer. After that, the listen ECBs are removed and the IPX listening socket is closed in steps 1768 and 1770.

The server list buffer at this point contains the names of the servers connected to the network. The wireless interface device 100 then determines the domain names of the various servers, as illustrated in FIG. 71b. In particular, in step 1772, an IPX packet is initialized for a domain query to determine the domain name and software version and may also be used to determine whether a particular application is supported. Once the IPX packet is initialized, a socket is opened in step 1774 as well as an event control block (ECB) for setting up an IPX packet for the domain query in step 1776, in order for the IPX packet to be sent to the wireless network 100 in step 1778. The domain query packet is sent out to the wireless interface device 100 in step 1778. Then ECBs are set up for listening for the domain packets and for the expected packets by calling IPXListenForPacket service in step 1780. The system waits for servers 1708, 1710 to respond and checks in step 1782 whether all of the servers have responded. For each of the responses, the domain and software version number is written to the server list buffer in step 1784 by the wireless interface device 100. The complete list buffer is displayed in the dialog box, as discussed above.

The software for the servers 1708, 1710 equipped with the enumeration service is illustrated in FIGS. 72-74. FIG. 72 relates to the enumeration service initialization, while FIGS. 73 and 74 relate to the enumeration service.

Initially, the particular server 1708, 1710 in which the enumeration service is to be installed is initialized by calling a Windows NT API, known as an open service control manager in step 1792, used for installing services on the servers 1708, 1710. In order to determine whether the enumeration service is being installed or removed, a parameter of the installation program is checked in step 1794 to determine whether the enumeration service is being installed or removed. If the parameter indicates that the enumeration service is to be installed, the enumeration service is installed on the server 1708, 1710 in step 1796. If the particular parameter in the installation program indicates that the enumeration service is to be removed, the enumeration service is removed in step 1798.

FIG. 73 indicates the initialization of the enumeration service on server 1708, 1710. In order to install the enumeration service on a particular server 1708, 1710, the service is registered in the Windows NT registry in step 1800. Once the service is registered in the Windows NT registry, the service control manager, is notified of start-up in step 1802. In step 1804, the enumeration service is spun off as a thread within the Windows NT Operating. System. A thread is the smallest unit of a task that can be scheduled. Thus, once the enumeration service is spun off as a thread, the server 1708, 1710 is able to provide the domain name and software version information, as discussed above, to respond to IPX packets from the wireless interface device 100. Subsequently, the running status of the enumeration service is set up in step 1806. Whenever service is registered in the NT service register, various resources of the server are utilized, thus, the system resources are released in step 1808.

The operation of the enumeration service at the server side is illustrated in FIG. 74. In particular, FIG. 74 illustrates the software that enables the server 1708, 1710 to respond to an IPX packet from the wireless interface device 100 regarding the server domain name and software version. In order to enable a server 1708, 1710 to respond to an IPX packet from the wireless interface device 100, as set forth above, the global variables for an IPX socket at the server 1708, 1710 are initialized in step 1810. Subsequently, in step 1812, a WIN socket is initialized. After the WIN socket is initialized, an IPX socket is created in step 1814 to enable the servers 1708, 1710 to communicate with the wireless interface device 100. The system then checks in step 1816 whether there are any errors in creating the IPX socket for enumeration. If so, the enumeration service is stopped and removed, as discussed above. If there are no errors, the WIN socket API is called in step 1820 to retrieve a datagram RecvFrom (API call which retrieves packets sent from the wireless interface device 100 to server from the network indicating a request packet has been sent by client). Subsequently, in step 1822, the network Application Program Interface (API) is called to get the primary domain name of the server. If this process fails, the primary domain name is obtained from the NT registry under key WINLOGON.

As will be discussed below in connection with the load balancing function, the system may obtain certain other information, including the server software version, the number of current log-in users per processor, whether the specified application is supported by the server in step 1828. The server software version, number of current log-in users per processor, and whether the specified application is supported by the server, is combined with the domain name, and used to build and send a reply message in step 1830 which, as discussed above, is returned to the wireless interface device 100 and stored in a server list buffer.

22. Dynamic Server Allocated for Load Balancing Wireless Remote Interface Processing.

In accordance with another important aspect of the invention, the system can provide for dynamic server allocation for load balancing the wireless interface devices 100. In order to provide dynamic load balancing, the system checks the number of users per processor on each server and passes this information to the wireless interface device 100 directly. In one embodiment, only the server with the smallest load is identified in the server list buffer made available and displayed in the dialog box on the wireless interface device 100, as discussed above.

In this application, the software is essentially the same as discussed above for the enumeration service, with the exceptions noted below. Since only one server will be made available to the wireless interface device, the wireless interface device 100 initiates a request to launch a specific application by name, in addition to requesting the server domain name and version in steps 1740 (FIG. 69) and 1772 (FIG. 71B). The responding server 1708, 1710 indicates whether the specified application is supported in addition to providing its domain name and version in steps 1746 (FIG. 69) and 1828 (FIG. 74). Once the server with the smallest load is detected which supports the application specified by the wireless interface device 100, the number of hops for each server and number of log-in users per processor on each server is multiplied to obtain a product in step 1786 (FIG. 71C). Each hop is identified as the number of links (LAN segments or routers) between a source node to a destination node. For example, in FIG. 67, there is one hop between the source node (i.e., a wireless interface device 100) and the server 1708, while there are two hops between the source node and the server 1710. The product of the number of hops and the number of log-in users per processor provides an indication of the amount of load per server. In order to select the server with the smallest load, the server with the smallest product result is selected in step 1788. Thus, for the selected server group, as illustrated in the dialog box 1730 in the set-up dialog box illustrated in FIG. 70, the server with the smallest load is identified in the dialog box 1732, while passing control to the client manager in the wireless interface device in step 1790. After the server with the smallest load is identified and control is passed to the client manager in the wireless interface device 100, connection between the selected server and the wireless interface device 100 can be initiated by depressing the connect button 1738 (FIG. 70) on the set-up screen.

23. Data Compression Loader

In order to minimize memory storage space, local software for the wireless interface device 100 is stored in a compressed format, for example, in a read only memory device (ROM), such as the flash memory devices 742-748 (FIG. 25), then decompressed, written and executed from the DRAM memory devices 111A (FIG. 18). As will be discussed in more detail below, both .EXE files and .COM files, as well as various other types of files are compressed and decompressed. An .EXE file is any executable file with an extension .EXE, i.e., FIND.EXE, MSD.EXE. A .COM file is any executable file with an extension .COM, i.e., EDIT.COM, SYS.COM. Such files, as known by those of ordinary skill in the art, include a header portion as well as a data, or code portion, where either data or a software program is stored. An exemplary header for an .EXE file is illustrated in Table 8 below.

TABLE 8

Exemplary .EXE File Header

| | |
|---|---|
| .EXE size (bytes) | 602d6 |
| Magic number: | 5a4d |
| Bytes on last page: | 01a4 |
| Pages in file: | 0171 |
| Relocations: | 051a |
| Paragraphs in header: | 0160 |
| Extra paragraphs needed: | 0000 |
| Extra paragraphs wanted: | ffff. |
| Initial stack location: | 2cb4:0064 |
| Word checksum: | 5a3a |
| Entry point: | 00b8:0000 |
| Relocation table address: | 001e |
| Memory needed: | 179K |

As shown in Table 8, an executable file header identifies the various attributes of an .EXE file, including the size of the file, the required memory storage space for the file, as well as various attributes of the header file, such as the number of bytes in the header. Utilizing the example of Table 8, the exemplary header file indicates that there are $160 or 352 paragraphs in the header. Since there are 16 bytes per paragraph, the exemplary header file illustrated in Table 8 is a 5632 byte file.

With known data compression techniques, the data, or code portion, of both .COM files, as well as .EXE files, are compressed by various techniques, for example, as disclosed in "DATA COMPRESSION", by James A. Storer, Computer Science Press, Copyright 1988, pps. 146-163, hereby incorporated by reference. However, due to the complexity of the structure of the headers for an .EXE file, for example, as shown in Table 8, such header files have not heretofore been known to be compressed. Thus, using the example illustrated in Table 8, the entire 5632 byte header for the .EXE file would be stored in a decompressed format, while the code, or data portion of the file is stored in a compressed format.

For applications to be run locally on the wireless interface device 100, which include a number of .EXE files, the header for such an .EXE file can occupy a relatively substantial portion of the available memory storage space provided by the flash memory devices 742-748 (FIG. 25). In order to reduce the required memory storage space in the flash memory devices 742-748 in the wireless interface device 100, the headers for the .EXE files are at least partially compressed, in accordance with an important aspect of the invention. As will be discussed in more detail below, the header for such .EXE file is transformed into a customized header 1882 (FIG. 79), which may include an uncompressed portion 1884 and a compressed portion 1886. The data or code portion 1888 is totally compressed, as discussed above.

The uncompressed portion 1884 of the header, for example, the first 100 bytes, may be used for various attributes of the file which may be used either before or during the decompression process, in order to speed it up. For example, the uncompressed portion 1884 of the header 1882 may include an attribute of the original header, such as the length of the original header. Various other types of information may also be included in the uncompressed portion 1884 of the customized header 1882. For example, the uncompressed portion 1884 of the customized header 1882 may include a signature field 1890. The signature field can be used to indicate whether the file is a .COM file or an .EXE file, as well as the version of the compression software. Such information can be used to speed up the decompression process.

Figure 75:
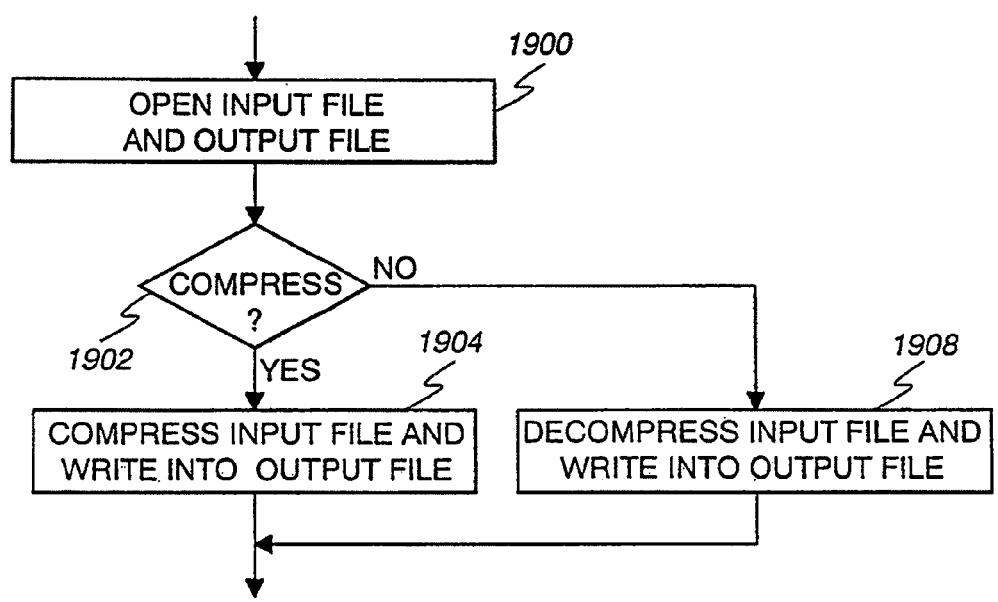
FIG. 75 is an overall flow chart for compressing and decompressing files in accordance with the present invention.

The overall flow chart for the compression/decompression process is illustrated in FIG. 75. The flow diagram for the compression process is illustrated in FIGS. 76*a* and 76*b*, while FIG. 77 illustrates the flow diagram for the decompression process.

New software to be loaded into the wireless interface device 100 may be loaded by way of the UART 788 (FIG. 23) by way of the serial port 790 (FIG. 30), or by way of the radio interface 960 (FIG. 16). In particular, in order to load software into the wireless interface device 100 wirelessly in a system in which multiple wireless interface devices 100 are supported by a single server, the software is first loaded into, an available server 1708, 1710 (FIG. 67). In such an application, the wireless interface device 100 is placed in a set-up mode of operation. In particular, the hot icon 1410 (FIG. 37) is initially selected from the hot icons 1202 (FIG. 36) illustrated in FIG. 55. The MAINTENANCE BUTTON 1392 is then depressed to provide the dialog box as illustrated in FIG. 55.

The overall flow chart for the compression/decompression process is shown in FIG. 75. Initially, files are compressed and transmitted to the wireless interface device 100. In particular, the compressed files are written directly to the flash memory devices 742. In order to execute the file, the compressed file from the flash memory device 742 is written to a temporary file within the DRAM memory devices 111*a* (FIG. 18) in the memory space 10000 to 1FFFFF. In such an application, the flash memory devices 742 act as input files, while the temporary file in the DRAM memory devices 111*a* serves as an output file. Alternatively, new files to be written to the flash memory devices 742 are initially uncompressed and stored in an external input file 1896, external from said wireless interface device 100. The input file 1896 is then compressed and stored in an output file 1898. The compressed output file 1898 is then transferred to the flash memory devices 742 within the wireless interface device 100 over a radio link. Thus, in step 1900, depending upon whether compressed data is being written to the flash memory devices 742, or whether the compressed data within the flash memory device is being executed, input and/or output files 1896, 1898 are opened in step 1900 as generally discussed above. If the file is to be transferred to the flash memory devices 742 in the wireless interface device, the file is compressed and written to an output file 1898 and transferred to the flash memory devices 742, as indicated by steps 1902 and 1904. For files that are currently stored in the flash memory devices 742 in a compressed format, these files are decompressed and written to an output file 1898 for execution as indicated in steps 1902 and 1904.

Figure 76A:
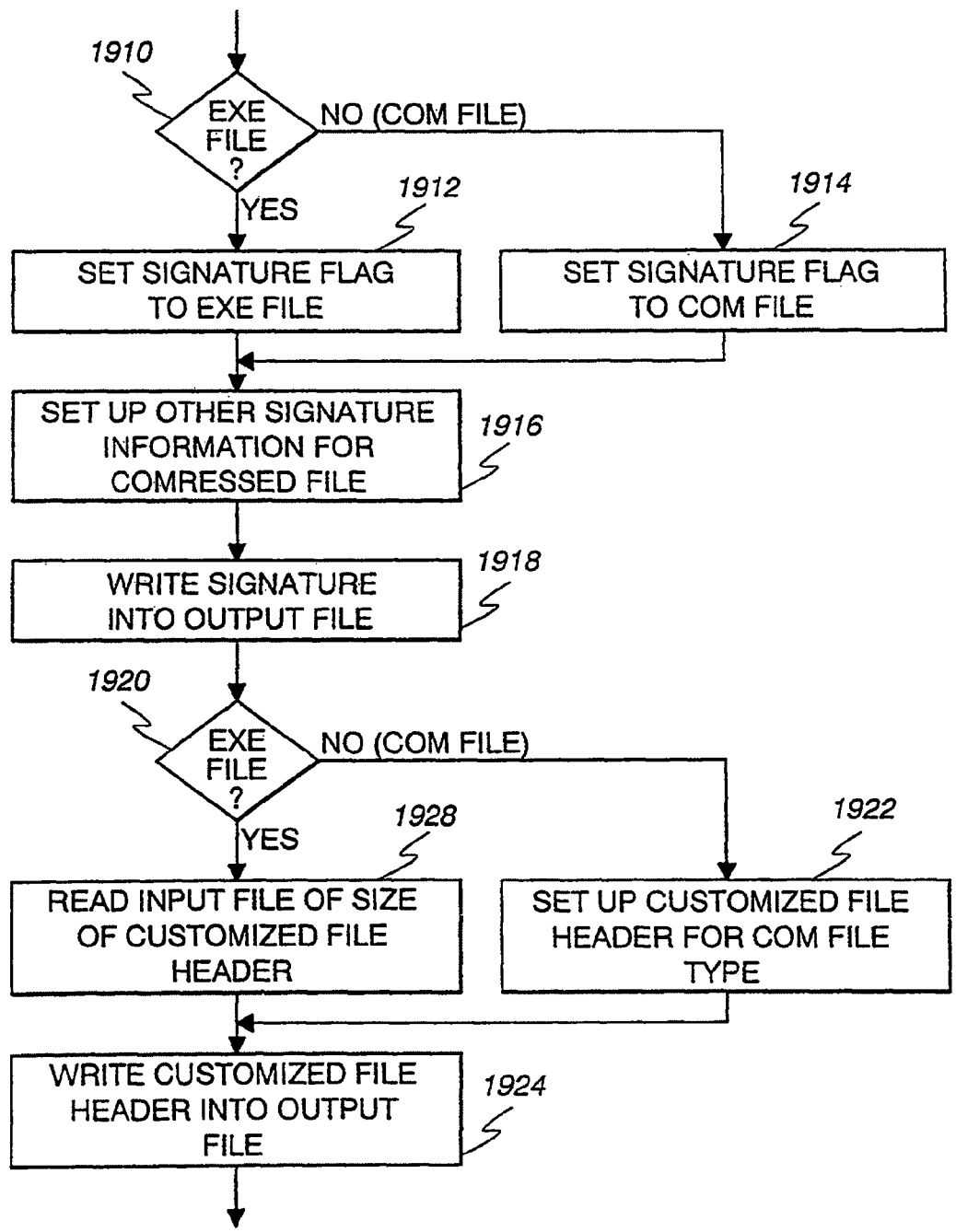
Figure 77:
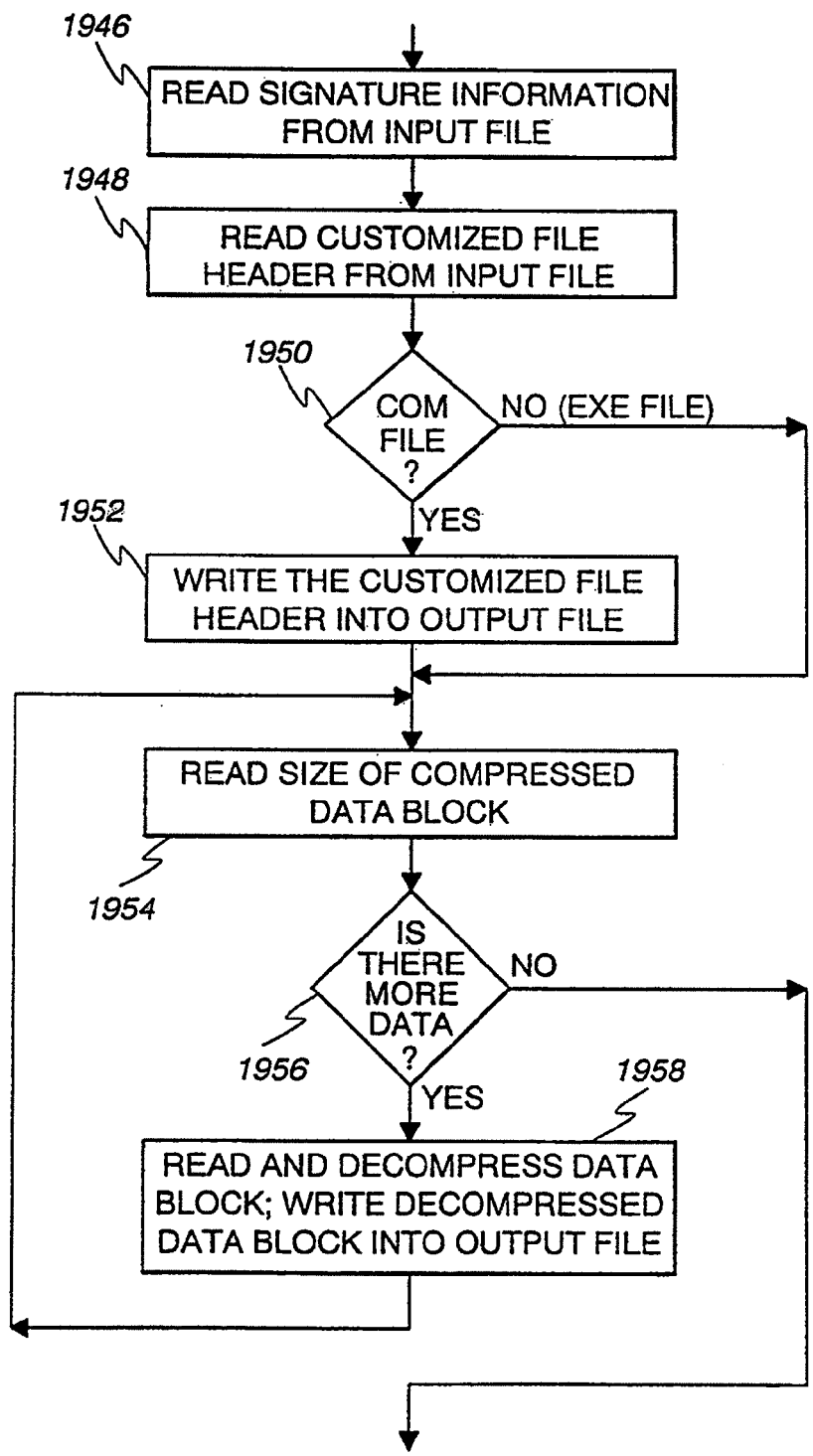
FIG. 77 is a flow chart for decompressing .EXE and .COM files in accordance with the present invention.
Figure 78:
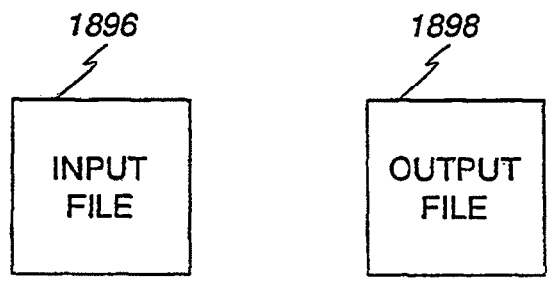
FIG. 78 is a block diagram of an exemplary customized file in accordance with the present invention.
Figure 79:
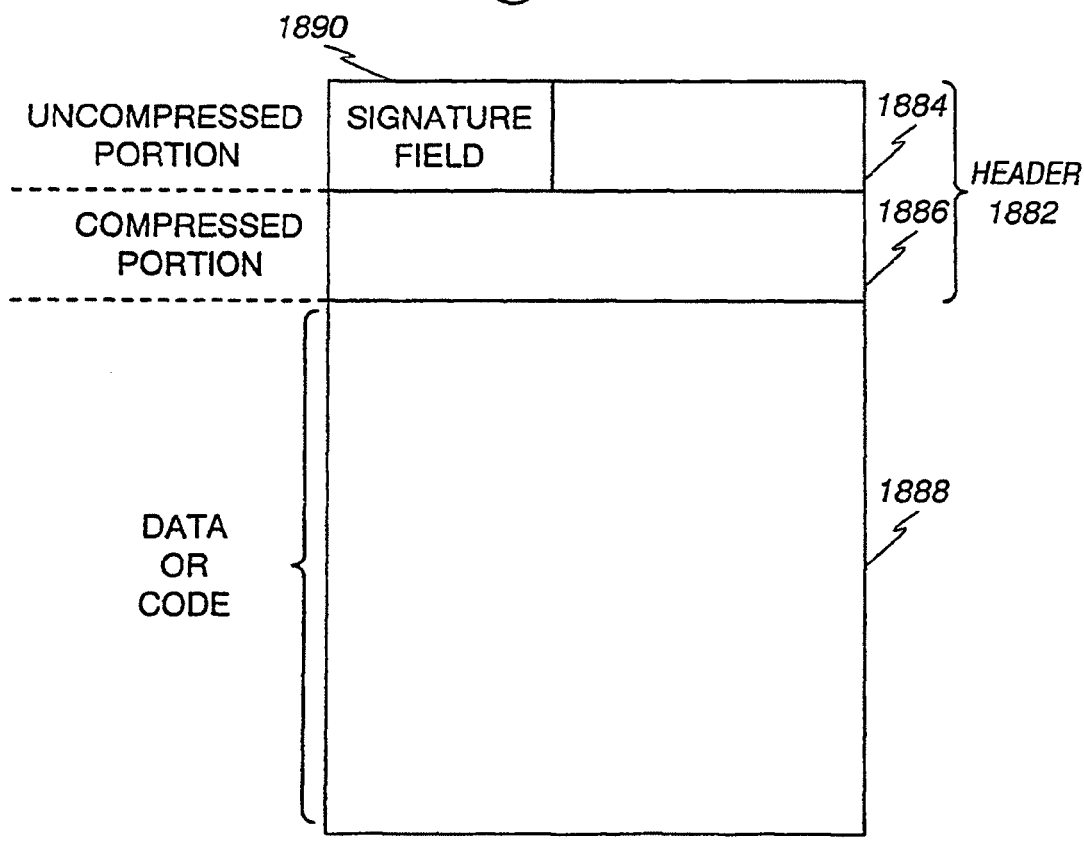
FIG. 79 is a block diagram illustrating an input file and an output file.
Figure 80A:
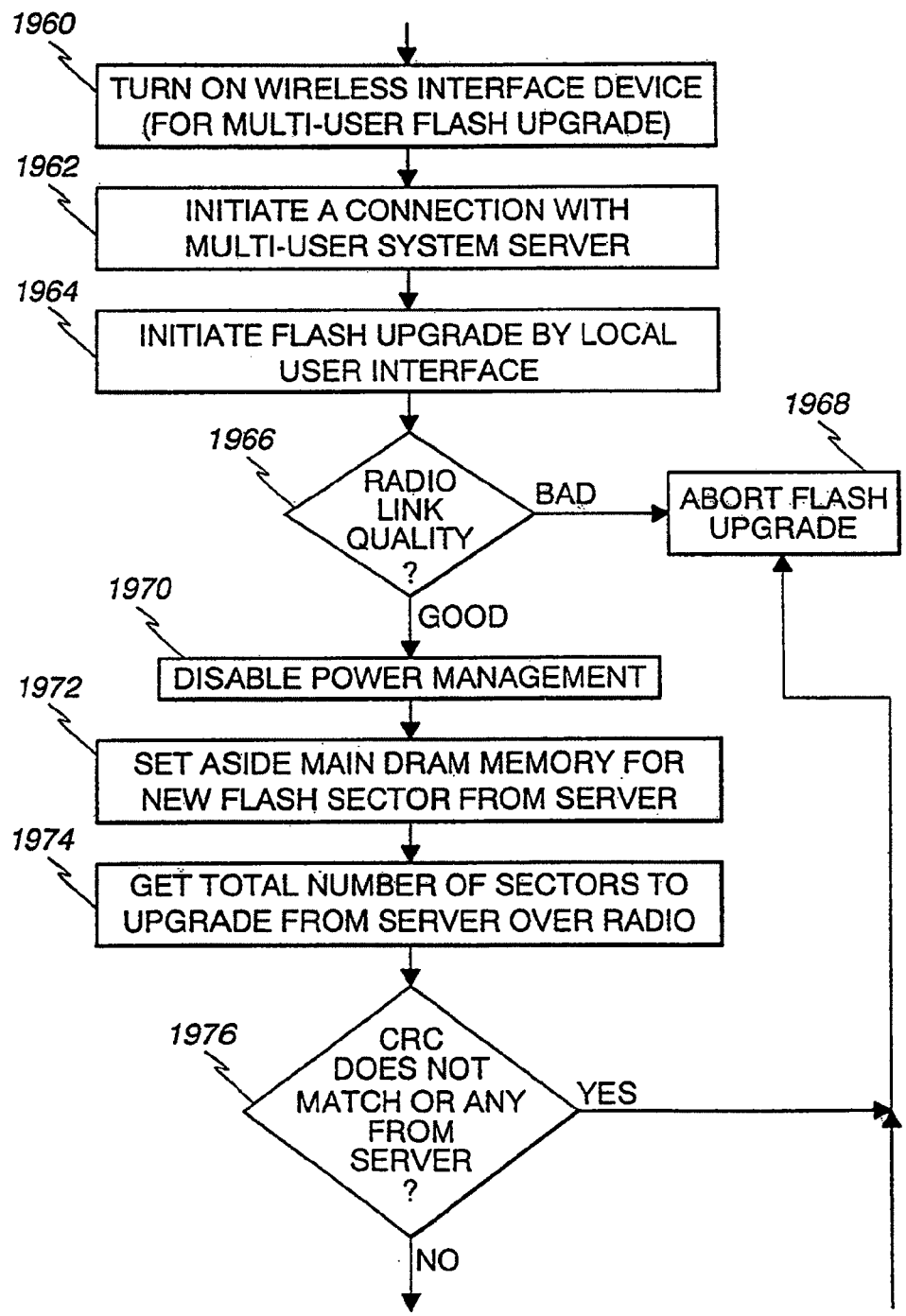

The software for compressing the various software to be stored in the wireless interface device 100 is illustrated in FIGS. 76*a* and 76*b*. Files to be compressed are read to determine whether the file is an .EXE file or a .COM file in step 1910. The system then sets up a signature field 1890 (FIG. 79). As discussed above, the signature field 1890 is stored in the uncompressed portion 1884 of the customized header 1882 and may include information as to whether the file is an EXE file or a .COM. Thus, in step 1910, the input file 1396 is read to determine the type of file written to the input file 1896

(FIG. 80). If the file is an .EXE file, a signature flag for an .EXE file is set in the signature field 1390, as illustrated in step 1912. On the other hand, if the file is a .COM file, the signature flag within the signature field 1890 (FIG. 70) is set to represent a .COM file in step 1914. Once the signature flag is set, other signature information may be added to the signature field 1890 in step 1916. For example, as discussed above, the software version of the compression software may be included in the signature field 1890 in order to speed up the decompression process. Once the signature field is set up, the signature field is written to the output file 1898 in step 1918.

As mentioned above, due to the complexity of the headers for the .EXE files, for example, as illustrated in Table 8, a customized header 1882 (FIG. 79) is set up for both an .EXE file and a .COM file. Once the signature field 1890 is written to the output file 1898 (FIG. 78), the system determines in step 1920 whether the file is an .EXE file or a .COM file. If the file is a .COM file, a customized file header for a .COM file is set up in step 1922. As such, in step 1922, the entire header 1882 and the data or code portion 1888 for the .COM file is compressed, after which the system goes to step 1938. Since the headers for .COM files may rather easily be compressed, the customized header for a .COM file may merely indicate the size of the header and store it in an uncompressed portion 1884 of the customized header 1882. The customized header file 1882 is then written to the output file 1898 in step 1924. After the customized file header 1882 is set up, the system checks in step 1926 whether the file is an .EXE file or a .COM file.

If the file is a .COM file, the entire file, including the header, is compressed. If it is determined in step 1920 that the file is an .EXE file, the system reads the file block by block in order to determine the size for the customized file header 1882. As indicated above, the customized file header for .EXE files may include an uncompressed portion 1884, as well as a compressed portion 1886 (FIG. 79). Once the signature field 1890 is set up, the system can then begin processing the header for the .EXE file block by block in order to form the customized file header 1882, as discussed above. As shown in Table 8, .EXE files include various types of information. Thus, in steps 1928 through 1936, the system reads portions of the header on a block by block basis for such .EXE files in order to form the customized header 1882, which includes the uncompressed portion 1884, as well as the compressed portion 1886, as generally illustrated in FIG. 79. As mentioned above, by the time the system reaches step 1920, the signature field has already been set up. The system continually loops from step 1926 to step 1936, until all of the blocks of data in the file header, for example, as illustrated in Table 8, is transformed, for example, as indicated above, into a customized file header 1882, which includes an uncompressed portion 1884 and a compressed portion 1886. The system constantly checks in step 1926 whether the entire header (i.e., all of the blocks) for the .EXE file has been written to the output file 1898.

As mentioned above, the header for an .EXE file indicates the size of the header. For example, as illustrated in Table 8, the exemplary header is 5632 bytes long. Once the uncompressed portion 1884 is formed, the amount of space for the compressed portion 1886 can be determined in step 1928. Once the size of the compressed portion 1886 of the customized file header 1882 is determined, space for the size of the compressed block of the customized header 1882 is reserved in the output file 1898 in step 1928. A first block of data from the header in the input file 1896 is read in step 1930. The first block of data is then compressed in step 1932 and written to the output file 1898 in step 1934. The total length of the compressed block of data is written to the output file 1898 in step 1936. The system then loops back to step 1926 to determine if 'additional data from the original header written to the input file 1896 needs to be processed.

After the customized file header 1882 is formed and written to the output file 1898, the data or code portion 1888 (FIG. 79) for both .EXE and .COM files, is read, compressed and written to the output file 1898 in steps 1938-1944. In order to identify the beginning of the data or code portion 1888, the signature field 1890 may include a data image index which indicates the memory location of the data or code portion 1888 in the input file 1896. Since the customized header 1882 may be at least partially compressed, the address location in the output file 1898 of the beginning of the data or code portion 1888 is modified in the signature field 1890 in the output file 1898 in step 1938. Subsequently, space is reserved in the output file 1898 for the data or code portion 1888 of the file in step 1940. The data or code portion 1888 is then read from the input file and compressed according to known compression techniques, for example, as discussed above, and written to the output file 1898 in step 1942. After the compressed data is written to the output file 1898, the size of the compressed data or code portion 1888 is written to the output file 1898 in step 1944.

The flow chart for decompressing stored compressed files in the flash memory devices 742-748 is illustrated in FIG. 77. Initially, any file to be executed is in a compressed format as discussed above. Initially, as indicated by step 1946, the signature field 1890 (FIG. 78) is read from the input file 1896. After the signature field 1890 is read from the input file 1896, the customized file header 1882 is read in step 1948. As mentioned above, the signature field 1890 identifies whether the particular file is an .EXE file or a .COM file. Thus, the system ascertains in step 1950 whether the file is an .EXE file or a .COM file. As indicated above, the signature field 1890 (FIG. 79) may include data regarding the file as to whether it is an .EXE file or a .COM file, as well as the software version of the compression software in order to speed up the decompression process. Before the file can be decompressed, the size of the compressed data or code portion 1888 (FIG. 79) must be ascertained. As indicated above, for .EXE files, the size of the header may be ascertained directly from the customized file header 1882 (FIG. 79). Since the header for a .COM file is compressed in the same manner as the code portion 1888 for the .COM file, the header portion 1882 is treated the same as the code portion 1888. Thus, the entire . COM file, header portion 1882 and code portion 1888 are written directly into the output file 1898 (FIG. 78) in step 1952. In the case of .EXE files, the customized file header 1882 is written to the output file 1898. The system then reads the size of the block in step 1954. In the case of a .COM file, the size of the compressed data or code block may be read directly from the flash memory device 742. In the case of an .EXE file, the file header is partially compressed, as indicated above, in data blocks. Thus, in steps 1954-1958, the system reads decompressed blocks of data from the input file 1896 and writes the decompressed data to the output file 1898. Both the headers portions 1882, as well as the data or code portions 1888 are decompressed one data block at a time by the loop consisting of the steps 1954-1958. Once all of the data has been decompressed, including the header, the decompressed file may be executed directly from the output file 1898, which may be a part of the DRAM 111A.

24. Multi-User Radio Flash Memory Device Update.

As previously indicated, the wireless interface devices 100 may include one or more flash memory devices 742-748 (FIG. 25). However, the present invention also applies to other electronically programmable memory storage devices, such as electronically erasable programmable read only memory (EEPROM). For a "single user" system, as indicated above, any software updates to the wireless interface device 100 may be accomplished by loading the software onto an available host 101 and then establishing a connection between a host computer 101 and the wireless interface device 100. For a "single user" wireless interface device, as discussed above, the user simply goes to the set-up dialog box, as indicated in FIG. 55, and depresses the upgrade button for automatic, wireless loading of the software to the wireless interface device 100. In a multi-user environment, for example, as illustrated in FIG. 67, each of the wireless interface devices 100 can individually initiate an upgrade from the available server 1708, 1710. In such an application, the server, and, in particular the network administrator notifies all of the various wireless interface devices 100a-100d users connected to the network 1700 that the local software within the wireless interface device needs to be updated. Each of the individual wireless interface devices 100 can then be updated from the server 1708 wirelessly, as illustrated in FIGS. 80-85 and discussed below.

More particularly, initially, each of the wireless interface devices 100a-100d are turned on in step 1960 (FIG. 80a) and a connection is established with the system servers 1708 in step 1962 as discussed above. Once the connection with the server 1708 is established, each of the individual wireless interface devices 100a-100d is notified by the network administrator regarding the need for a local software update. The software in each of the individual wireless interface devices 100a-100d can be initiated by a local user interface as indicated in step 1964. In particular, the flash upgrade is initiated by going to the set-up dialog box on the wireless interface device 100 and depressing the MAINTENANCE BUTTON to arrive at the dialog box as indicated in FIG. 55. The user depresses the upgrade button to initiate automatic wireless installation of the software into the flash memory devices 742-748 in the wireless interface device. In order to prevent programming errors, the radio quality is checked in step 1966 before proceeding. If the radio link quality is poor, the upgrade is aborted, as indicated by step 1968. If the radio link quality is sufficient, any power management functions in the wireless interface device 100 is disabled in step 1970 to prevent the wireless interface device 100 from going into a reduced power state, as discussed above, during programming of the flash memory devices 742-748. After the power management function is disabled, a portion of the DRAM memory 111A (FIGS. 18-24) in the wireless interface device 100 is set aside to receive a flash sector from the server 1708 (FIG. 67) in step 1972. Subsequently, in step 1974, wireless interface device 100 polls the servers 1708, 1710 to determine the total number of sectors in the flash update over the radio link in step 1974. After the total number of sectors is obtained for the upgrade, the system checks in step 1976 whether there have been any errors in the data transmission from the server 1708. The errors may be checked, for example, by checking whether cyclic redundancy checking (CRC) code matches a specified CRC code for each file or whether there are any other server errors. Thus, if the value resulting from the CRC at the wireless interface device 100 does not match the value of the CRC of the server 1708, the flash upgrade is aborted in step 1968. Otherwise, the system proceeds to step 1978 and sets up a receiving buffer in the DRAM memory devices 111A and requests a sector of the upgrade from the server 1708. Once a request for a sector is initiated, the sector is transmitted from the servers 1708, 1710 over the radio link to the DRAM memory devices 111A. A BIOS routine is called in step 1982 to write the flash sector from the DRAM memory device 111A to the flash memory devices 742-748 in step 1982. In step 1984, the system checks for any errors in writing the flash sectors to the flash memory devices 742-748. Should any errors be detected, the flash upgrade is aborted and the system returns to step 1968. If no errors are detected, the system checks in step 1986 whether additional sectors need to be requested from the server 1708. If so, the system loops back to step 1978. If all of the sectors have been requested, the system goes to step 1988 and reboots the wireless interface device 100.

Figure 81:
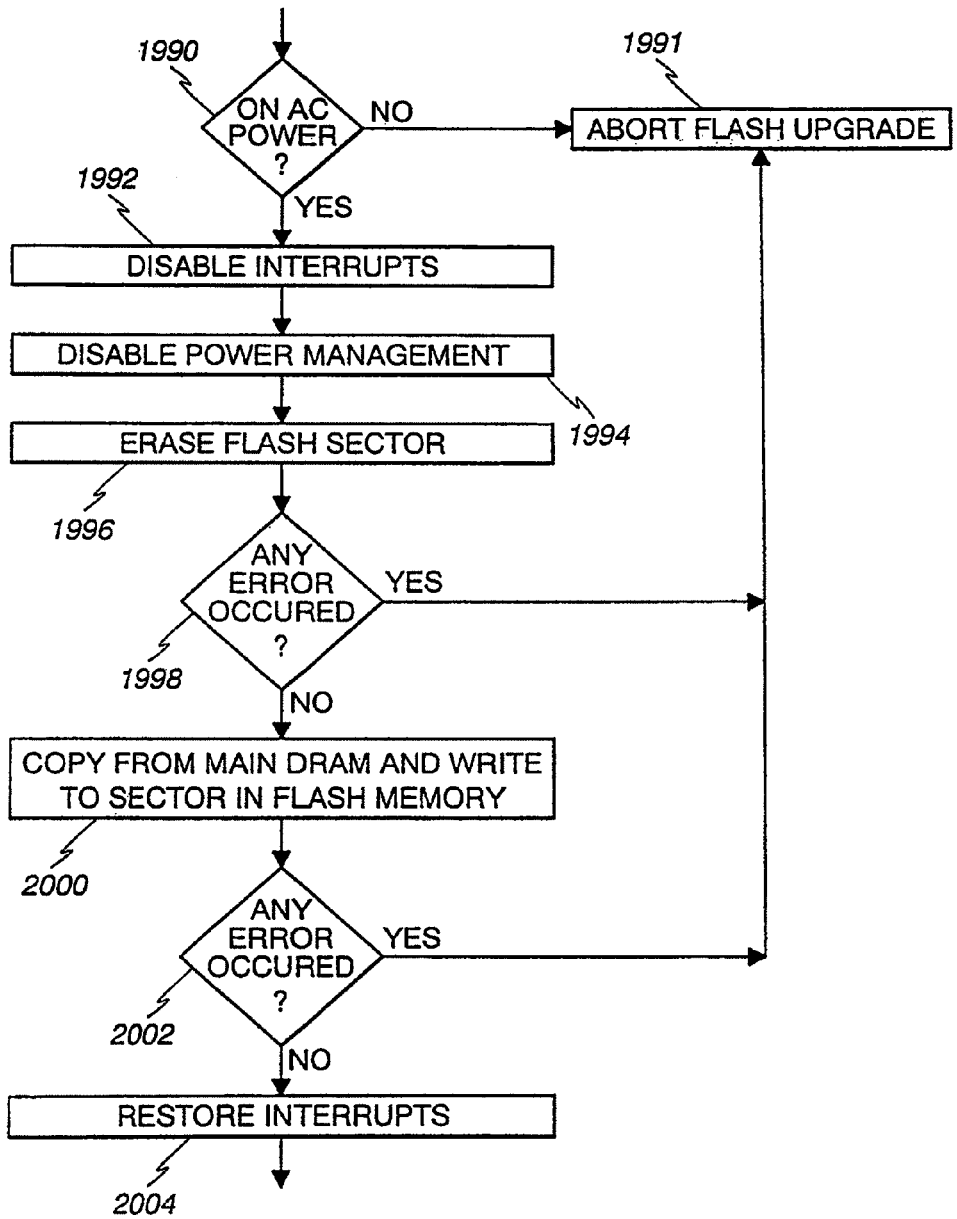

FIGS. 81 and 82 illustrate the routine for writing the flash update sectors from the DRAM 111A to the flash memory devices 742-748. Since the flash sector updates are stored in the DRAM memory devices 111A, programming is aborted if AC power is turned off as determined in step 1990, since the flash update data in the DRAM 111A will be lost when the battery power goes down. In order to prevent any errors during programming, interrupts, as well as power management functions are disabled in the wireless interface device in steps 1992 and 1994. After the interrupts and the power management functions have been disabled, a sector of the flash memory device is erased in step 1996. If any errors occur during erasure as determined in step 1998, the flash upgrade is aborted and the system returns to step 1991. If not, a sector from the DRAM 111A is written to the flash memory devices 742-748 in step 2000. After the sector is copied to the flash memory devices 742-748, the system checks for errors in step 2002. If any errors occurred during the upgrade of the flash memory devices 742-748, the system returns to step 1991 and the upgrade is aborted. If there are no errors in the transfer of the data to the flash memory devices 742-748, interrupts are restored in step 2004.

FIGS. 82-85 illustrate the software at the server 1708, 1710 for the wireless update of the flash memory devices 742-748. Initially, the files to be updated are identified by file name and path in the server registry and assigned a value, for example, USERINIT, in step 2006. By placing the file name in the path of the software in the server's registry, the software will be launched in the user's context, whenever the user logs in, as discussed above. Since there may be multiple wireless interface devices 100a-100d (FIG. 67) connected to the network, each wireless interface device 100 must individually request an update by requesting the file name and providing the path.

As mentioned above, updating of the software in the flash memory devices 742-748 may be initiated depressing the upgrade button in the set-up dialog box (FIG. 55) in the individual wireless interface devices 100a-100d. FIG. 83 illustrates the method for installing the upgrade files onto the server to be wirelessly transferred to the wireless interface devices 100. In particular, in order to prevent unauthorized updating of files in the server 1708, the system checks in step 2008 whether the current log-in user of the servers 1708, 1710 has administrative privilege. If not, the flash upgrade is aborted in step 2010. If the log-in user to the server 1708 has administrative privilege, the flash upgrade binary files, for example, from a floppy disk, may be loaded onto the server, for example, by way of a floppy disk, and recorded in the server registry in step 2014.

FIG. 84 represents the overall flow diagram for the software within the server 1708, 1710 for handling flash updates with the wireless interface devices 100. As shown by the block 2016, a communication driver channel is opened by the server 1708 for each of the individual wireless interface devices 100 connected to the server 1708. The flash upgrade variables are initiated in step 2018, in order to set up the system for a wireless flash upgrade. The wireless flash upgrade is set up as a thread in step 2020.

Figure 85:
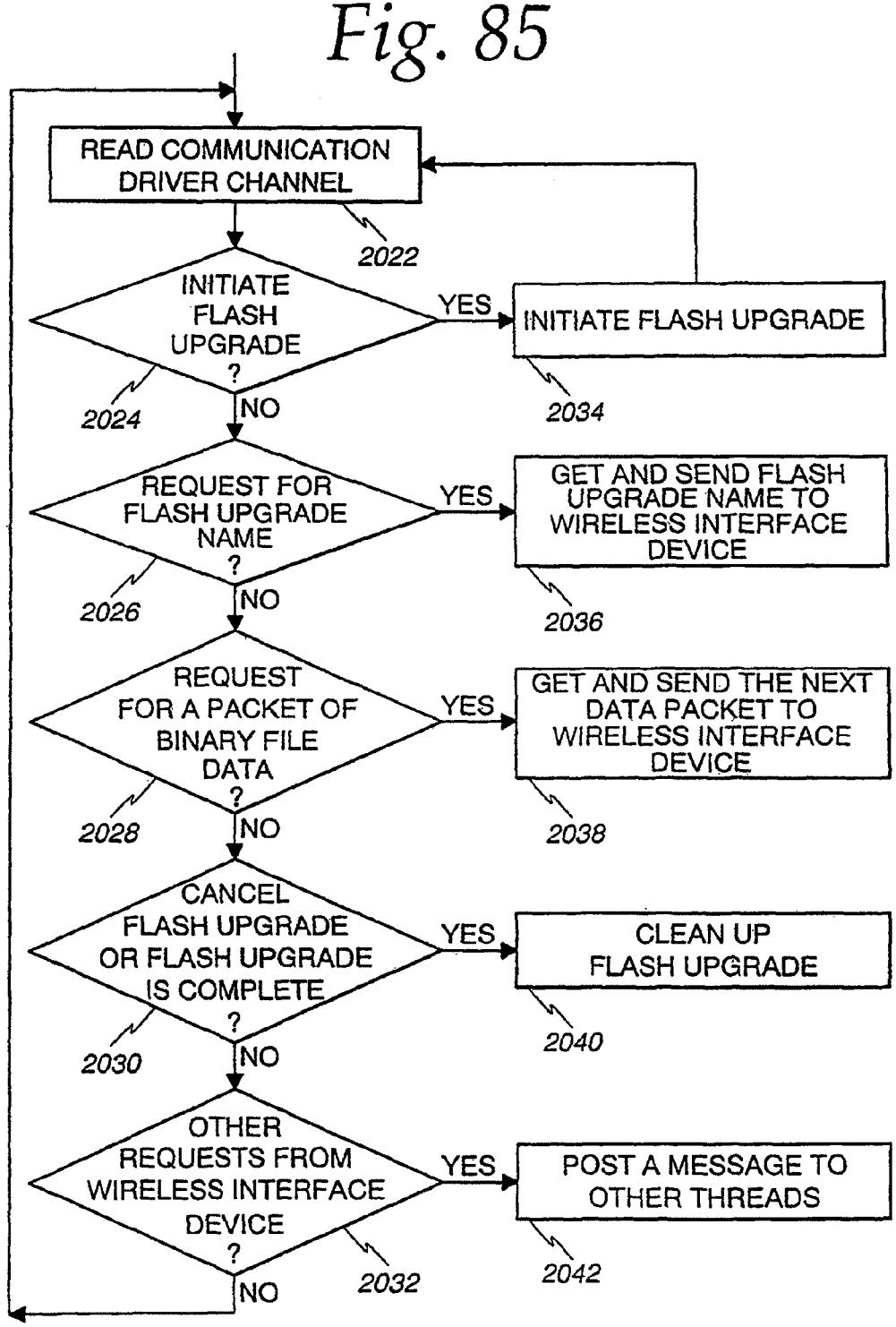

The thread for the wireless flash upgrade is illustrated in more detail in connection with FIG. 85. Once a wireless interface device 100 is connected to a particular server 1708, a communication channel is set up between the server 1708, 1710 and the wireless interface device 100 requesting an update. Initially, in step 2022, the server continuously reads the communication driver channel for requests from the various wireless interface devices 100 connected to the servers 1708, 1710. In steps 2024 through 2032, the server ascertains the type of request from the wireless interface device. For example, in step 2024, the system ascertains whether the wireless interface device 100 is initiating an upgrade of the flash memory devices 742-748. If so, the system ascertains in step 2024 whether the wireless interface device 100 has initiated an upgrade by way of the set-up dialog box illustrated in FIG. 55 as discussed above. If so, the server 1708 initiates a flash upgrade by processing the overhead associated with a flash update, such as obtaining sector numbers and getting the CRC code for the number of sectors as well as the sectors themselves in step 2034. If the request from the wireless interface device 100 is not an initiate flash upgrade request, the system checks in step 2026 whether the request is for a flash upgrade name. If so, the system checks with the server registry for the latest flash upgrade name and passes it on to the wireless interface device in step 2036. If not, the system checks in step 2028 whether the request is a request for a packet of binary file data associated with the flash update. If so, the server 1708 sends data packets to the wireless interface device 100 for the various sectors of the flash upgrade in step 2038, as discussed above. In step 2030, after reading the communication driver channel, the server checks to determine if the request from the wireless interface device 100 is a request to cancel the flash upgrade or that the flash upgrade is complete. If so, the flash upgrade clears or frees up all resources it utilized. In step 2032, the system checks whether there is any other type of request from the wireless interface device 100. If not, the system loops back to step 2022 and continues to read the communication driver channel. If there is a request from the wireless interface device other than as enumerated in steps 2024 to 2030, the server posts a message to other threads associated with that request in step 2042.

25. Audio Compression in a Wireless Interface Device.

Figure 89A:
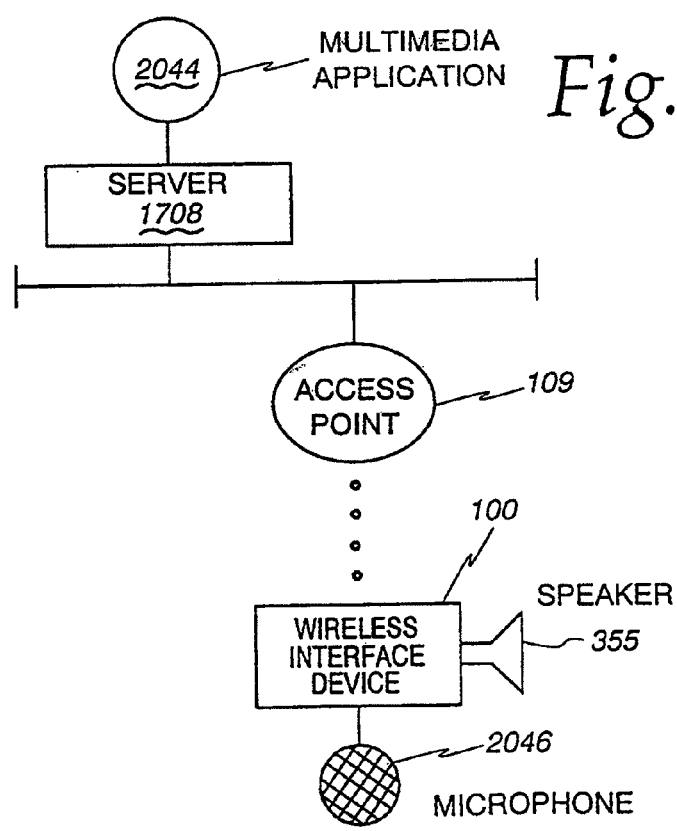
FIG. 89A is a simplified block diagram of the system illustrated in FIG. 67, illustrating the speaker and microphone on wireless interface device for running multimedia applications.
Figure 89B:
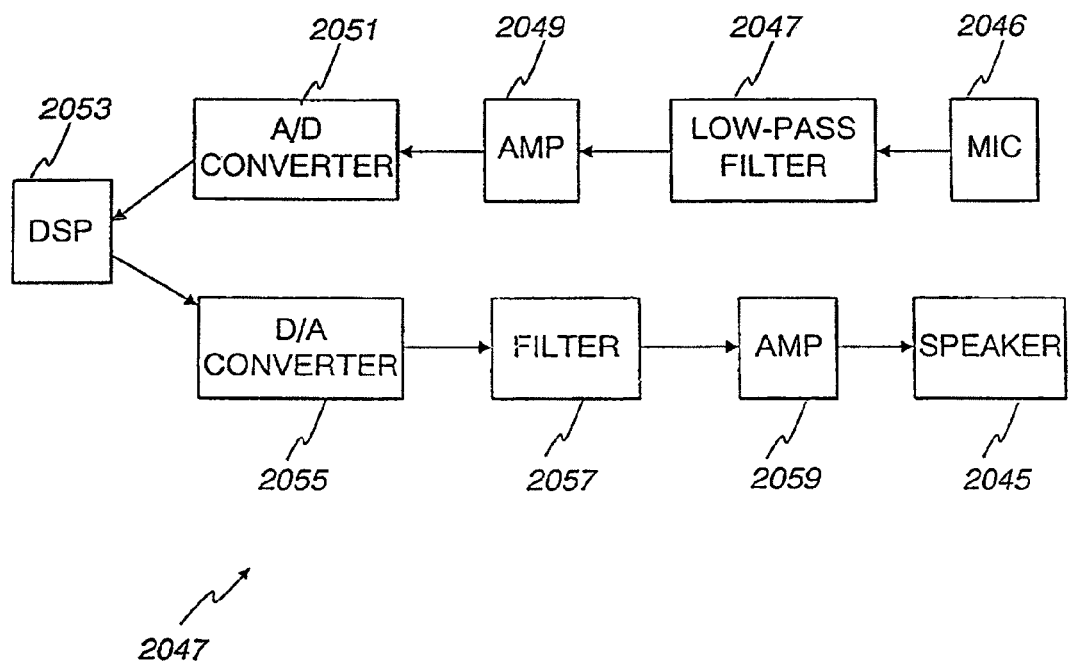
FIG. 89B is a block diagram of an audio subsystem in accordance with the present invention.

The wireless interface device 100 is adapted to support multi-media applications features running on the server 1708, wirelessly transmitted to the wireless interface device 100 by way of the access point 109. In support of the multi-media applications, the wireless interface device may be provided with a speaker 2045 as well as a microphone 2046 (FIG. 89B). In order to receive audio input data as well as broadcast audio at to the wireless interface device 100 to receive audio data, an audio processing system 2047 (FIG. 89B) is provided which includes a speaker 2045 and a microphone 2046. The audio processing system 2047 processes input audio data from the microphone 2046 to simulate that the audio input is directly received by the server 1708. As will be discussed in more detail below, audio data received by the wireless interface device 100 is compressed and wirelessly transmitted to the servers 1708, 1710. The audio data is decompressed by a decompressor at the servers 1708, 1710 and formulated by a kernel-mode driver, forcing the server to assume that the audio data was input directly into the server 1708.

FIGS. 86-89 relate to the audio input processing system 2047. The audio input processing system 2047 includes an input path which, in turn, is connected to the microphone 2046 and an outpath which is connected to a speaker 2045. Audio input data is received by the microphone 2046 and filtered, for example, by a low-pass filter 2047 selected to pass signals of 3 Khz or less to only permit data in the voice range to be amplified by an amplifier 2049 and converted to a digital signal by an A-D converter 2051. The amplifier 2049 is used to increase the amplitude of the signal to produce a voltage reference to maximize the range of the analog-to-digital converter 251. The output of the A-D converter 2051 may be applied directly to the data bus, as discussed above, or may be applied to a digital signal processor 2053, for example, a Model No. CS 4237B or CS 4236B, as manufactured by Crystal Semiconductor; a Model No. ES-5510, as manufactured by Ensonic; or a Model No. SAA7710T, as manufactured by Phillip Semiconductor, all preloaded with factory installed firmware.

As mentioned above, the audio input processing system 2047 includes an output path, which includes the speaker 2045 for supporting various multimedia applications. Referring to FIG. 89B, digital audio signals, either from the ISA bus, as discussed above, or the digital signal processor 2053, are applied to a D-A converter 2055 which are, in turn, filtered and amplified by a filter 2057 and amplifier 2059 and broadcast through the speaker 2045.

Figure 86:
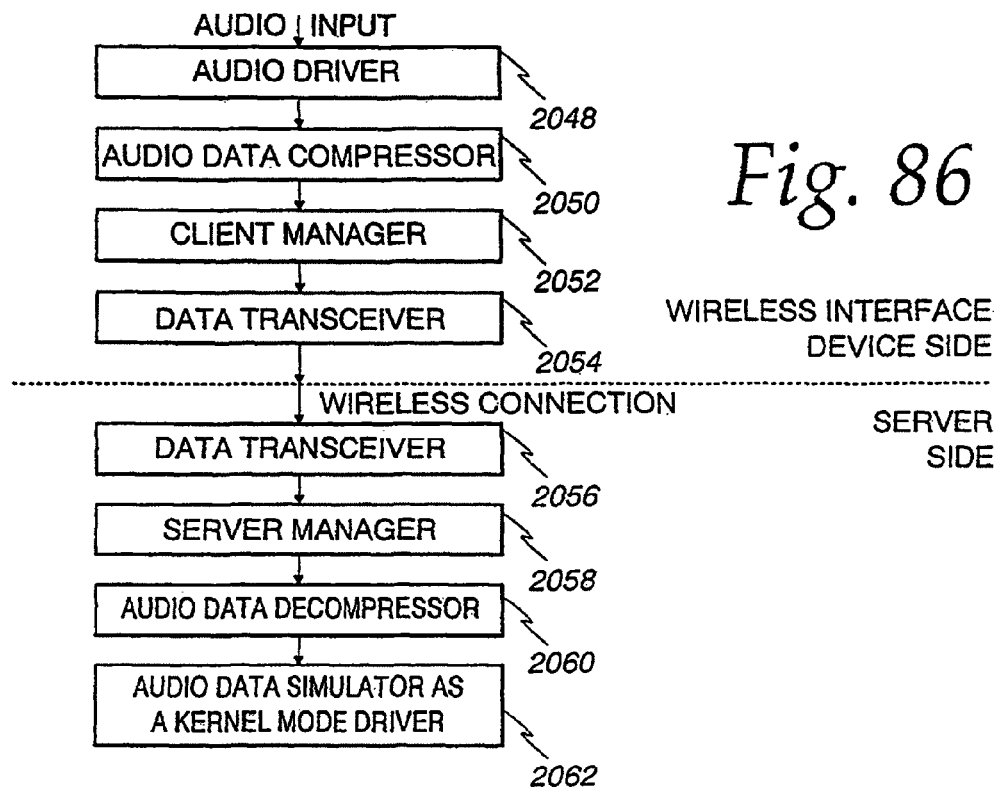
FIGS. 86 and 87 are flow charts for an audio compression system in accordance with the present invention.

Referring to FIG. 86, input audio data is converted to a digital signal by the A-D converter 2051 and applied to an audio driver, such as the digital signal processor 2053 in step 2048. The audio signals are then compressed in step 2050. Control of the compressed audio data is then turned over to the client manager for the wireless interface device 100 which reformulates the compressed audio data for data transmission over the radio link, as indicated by step 2054. On the server side, the compressed audio signals from the wireless interface device 100 are received over the radio link by the server 1708, 1710, as indicated by step 2056. Control of the compressed audio signals at the server side is turned over to the server manager in step 2058, which formulates the data for decompression in step 2060. In order to simulate that the original audio input was input directly into the server 1708, the uncompressed audio data is fed into a kernel-mode driver in step 2062 running in the Windows NT kernel to simulate that the audio input is directly to the server 1708, 1710. The algorithms for compressing and decompressing the audio data are discussed in detail in "DATA COMPRESSION", by James A. Storer, Computer Science Press, copyright 1988, hereby incorporated by reference.

Figure 87:
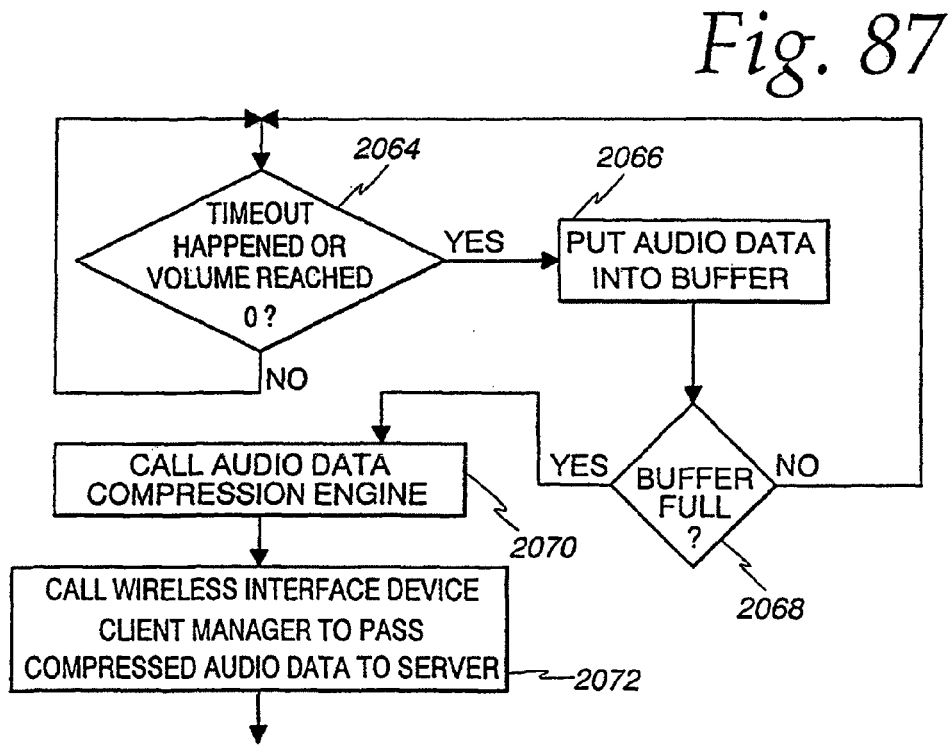
Figure 88:
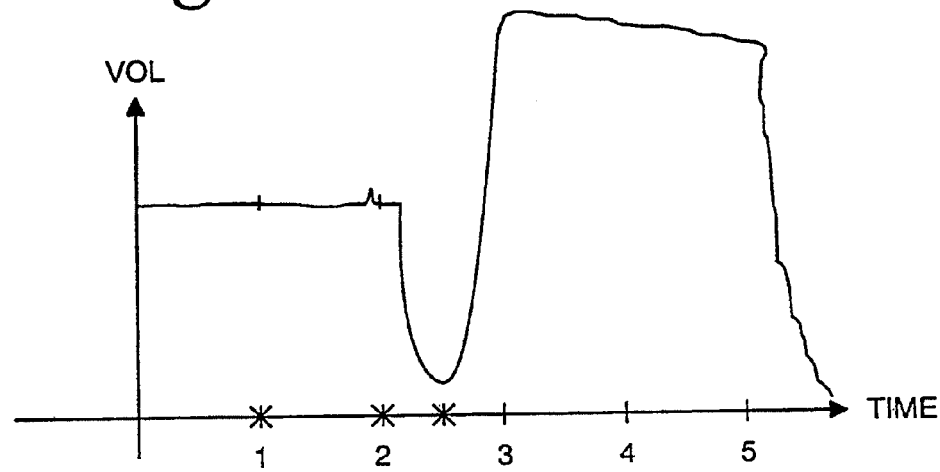
FIG. 88 is a graphical representation of an exemplary audio signal.

An important aspect of the invention relates to the manner in which the audio data is compressed. Referring to FIGS. 87 and 88, audio data, prior to being compressed, is stored in a temporary buffer in the wireless interface device 100. Uncompressed data, as illustrated in FIG. 88, is sampled every predetermined time period, or when the volume is below a predetermined level as illustrated and stored in a temporary buffer. As illustrated in FIG. 88, the sample points on the horizontal axes marked with the 'X' are exemplary data points stored in the temporary buffer. As shown, the points 1 and 2 are at predetermined time intervals, while the point between 2 and 3 seconds is a point where the amplitude or volume is below a predetermined level. Thus, as indicated in step 2064, the system samples the audio data points at every predetermined time period or when the volume has reached a predetermined level and places the data in a temporary buffer in step 2066. The system loops back to step 2064 and continues sampling data points until the buffer is full, as ascertained in step 2068. Once the temporary audio buffer is full, the entire buffer is compressed at one time, as indicated by step 2070. The compressed audio data is then passed to the wireless interface device client manager in order to pass the data over the radio link to the server 1708 in step 2072.

26. Multi-User on-Screen Keyboard.

Figure 36:
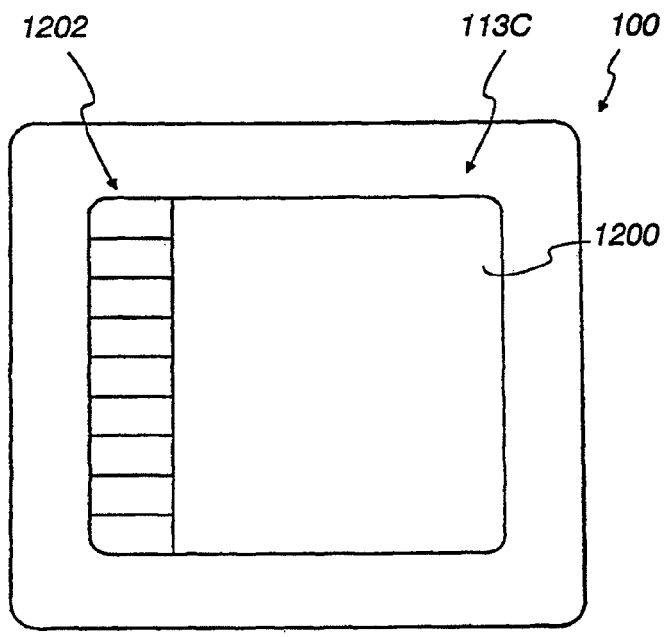
FIG. 36 is a plan view of the wireless interface device illustrating the hot icon area and viewing area of the display.

As mentioned above, in a single user mode, the wireless interface device is provided with an on-screen keyboard (OSK) which can be actuated by pressing the hot icon 1480 (FIG. 37) in the hot icon area 1202 (FIG. 36). In such an application, once the OSK is selected, a remote occlusion area on the host 101 is created to prevent the host 101 from painting over the OSK on the wireless interface device 100. The operation of the OSKs in a single user environment have been discussed above and illustrated in FIGS. 66a-66d.

Figure 65B:
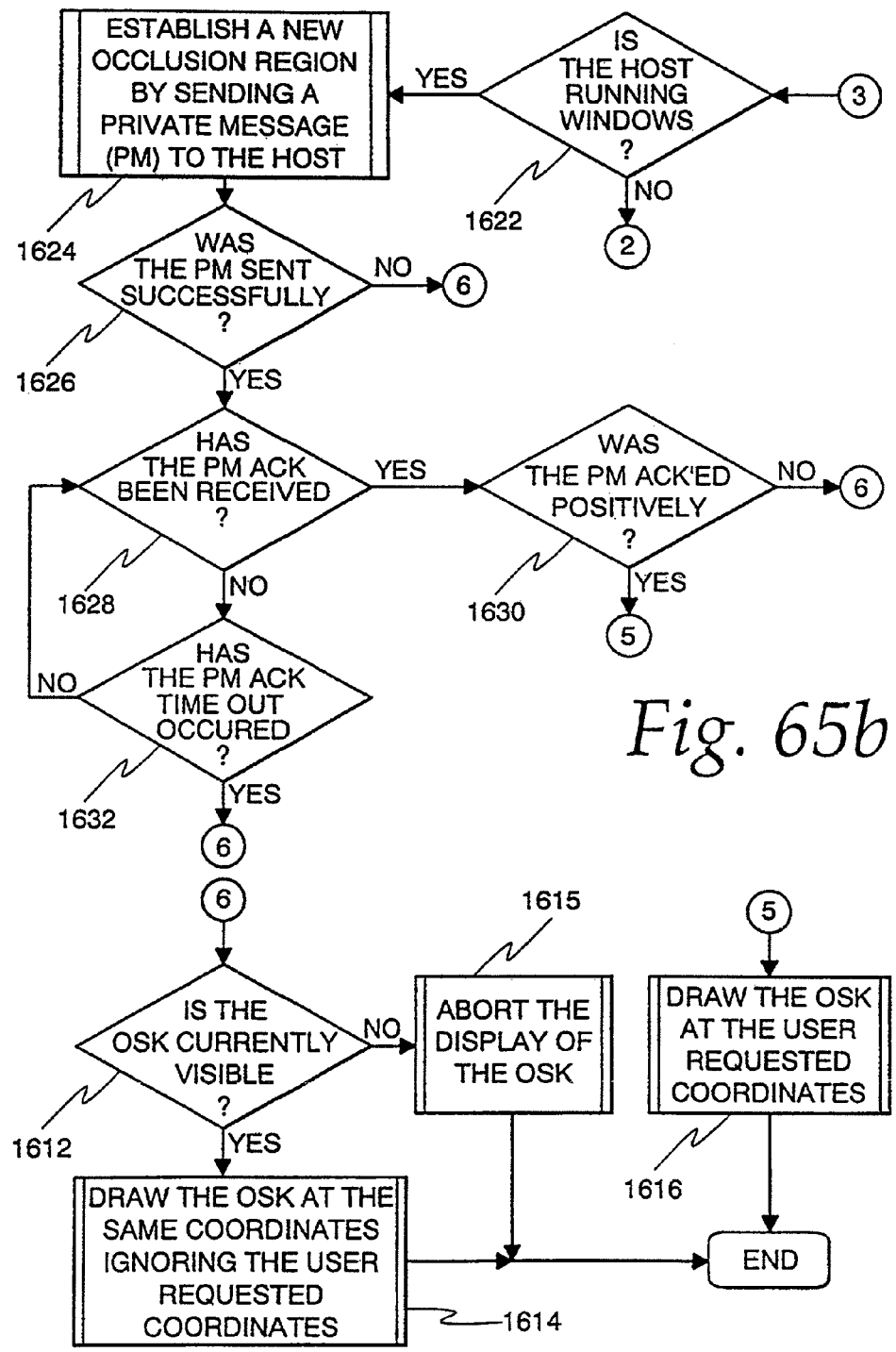

In a system where a plurality of wireless interface devices 100a-100d are connected to servers 1708, 1710 by way of a single access point 109, for example, as illustrated in FIG. 67, each of the wireless interface devices 100 in such a multi-user environment, can be provided with an OSK in much the same manner, as discussed above. In fact, the software for the OSK at the side of the wireless interface device 100 is essentially the same, with the exception that in this application, rather than a single wireless interface device 100 communicating with a single host, a plurality of wireless interface devices 100a-100d communicate with servers 1708, 1710. Thus, the software for the multi-user application for the wireless interface devices is essentially as illustrated in FIGS. 65a and 65b. The server side software for the multi-user OSK is illustrated in FIGS. 90-94. The server software is used to prevent overwriting of the OSK on the display of the wireless interface device by the server.

Figure 95:
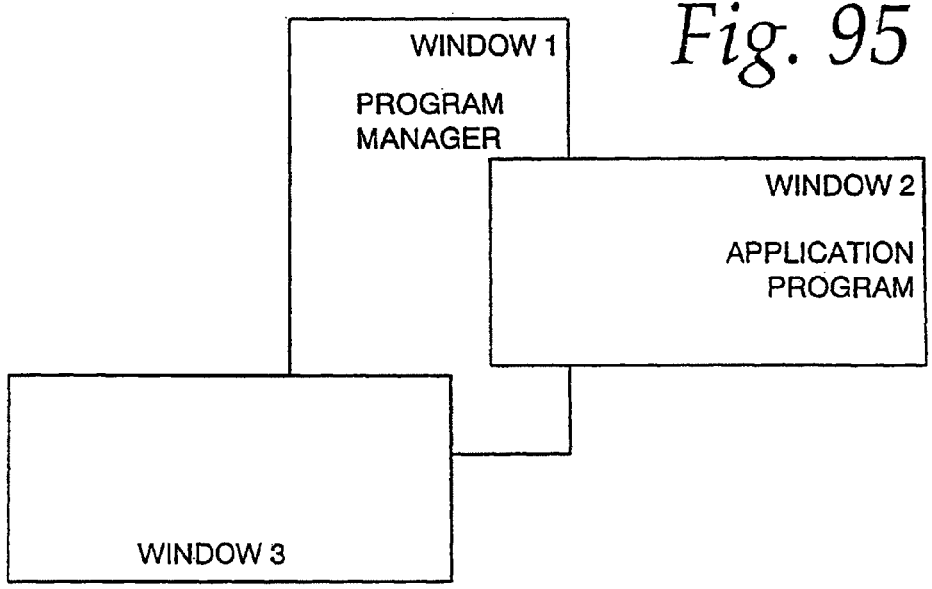
FIG. 95 is a simplified diagram illustrating a plurality of overlapping windows and the on-screen keyboard on a display.

FIG. 90 relates to registering an occlusion window on the servers 1708, 1710. In particular, an occlusion window is registered to prevent the server from overwriting the OSK on the wireless interface device 100. The occlusion window, for example, in a Windows NT server, relates to a no-paint window within a portion of the viewing area 1260 (FIG. 36) of the LCD 113c for the wireless interface device 100. The occlusion window corresponds to the window displayed on the wireless interface device 100 for the on-screen keyboard (OSK). For each window in a network system, the window is registered with the server window system in step 2076. The occlusion window is registered by registering the class of the window, as indicated in step 2078 by calling the Register Class API. The class of the window refers to the various attributes of the window, for example, a dialog box or no-paint window. Once the class of the window is registered with the server window system, in order to make the occlusion window visible to all windows running on the system 1708, 1710 at one time, memory space in the servers 1708, 1710 is created for the occlusion window global data in step 2080. The global data relates to the position and dimensions of the on-screen keyboard. Thus, the OSK can be utilized on the wireless interface device 100 during conditions when multiple windows are running and even overlapping windows, as indicated in FIG. 95. As such, the OSK program may be formulated as a dynamic link library (DLL) that can be used by any windows running in the system.

Once the shared memory is created, global data, i.e., position and dimension of the OSK, is initialized for a default position. In particular, when the OSK hot icon 1480 (FIG. 37) is depressed, the OSK will appear in a predetermined position on the display. Thus, in step 2080, the initial position of the OSK is identified. As will be discussed in more detail below, the OSK can be moved around the display.

FIG. 91 illustrates the process for creating and moving the occlusion window. Initially, the system checks in step 2082 whether an occlusion window has already been requested. If so, the system assumes that the OSK will be moved and, thus, calls a Windows support function SetWindowPos to move the occlusion window in step 2084. After the window is moved in step 2084, the occlusion window global data is updated in step 2086. As indicated above, the global data relates to the XY position relative to the screen on the wireless interface device 100 of the OSK. After the global data is updated in step 2086, the success and failure status of the operation is determined in step 2088 by the return value of the API call.

If an occlusion window does not exist, steps 2090-2094 are used to create the occlusion window. The occlusion window is created in response to a private message sent by the wireless interface device 100. In particular, a no-paint occlusion window is created in step 2090. A no-paint window is a window in which the background is not painted during movement. In addition to the no-paint window, a holder window may be created in step 2092. A holder window is simply a wire frame which prevents the original no-paint window from being painted while the no-paint is being moved. Both the no-paint window as well as the holder window are registered in steps 2076-2080, as set forth above. In step 2094, a system-wide WH_CALLWNDPROC hook is created by way of an API call. A system-wide hook is called for any system-wide messages in order to coordinate with pop-up menus, as well as keyboard and mouse messages. In particular, the system-wide hook is registered with the Window NT system such that during conditions when the OSK is running, certain Windows messages, such as a pop-up menu, will automatically disable the OSK. Once the window and the hook are created, the X-Y position of the OSK is updated in step 2086, and a success or failure rate is checked in step 2088.

The procedure for closing the occlusion window is illustrated in FIG. 92. Initially, an API call is made in step 2090 to uninstall the WH_CALLWNDPROC hook in order to remove it from the system. After the Windows WN_CALLWND-PROC hook is uninstalled, the holder window and no-paint window data are destroyed by removing these windows from the system in step 2092. Subsequently, in step 1594, the occlusion region global data is destroyed.

The process illustrated in FIG. 92 is initiated any time the hot icon 1480 (FIG. 37) is toggled to disable the on-screen keyboard. The software for creating the occlusion window, as indicated in steps 2090 and 2092, is illustrated in FIG. 94.

Figure 93:
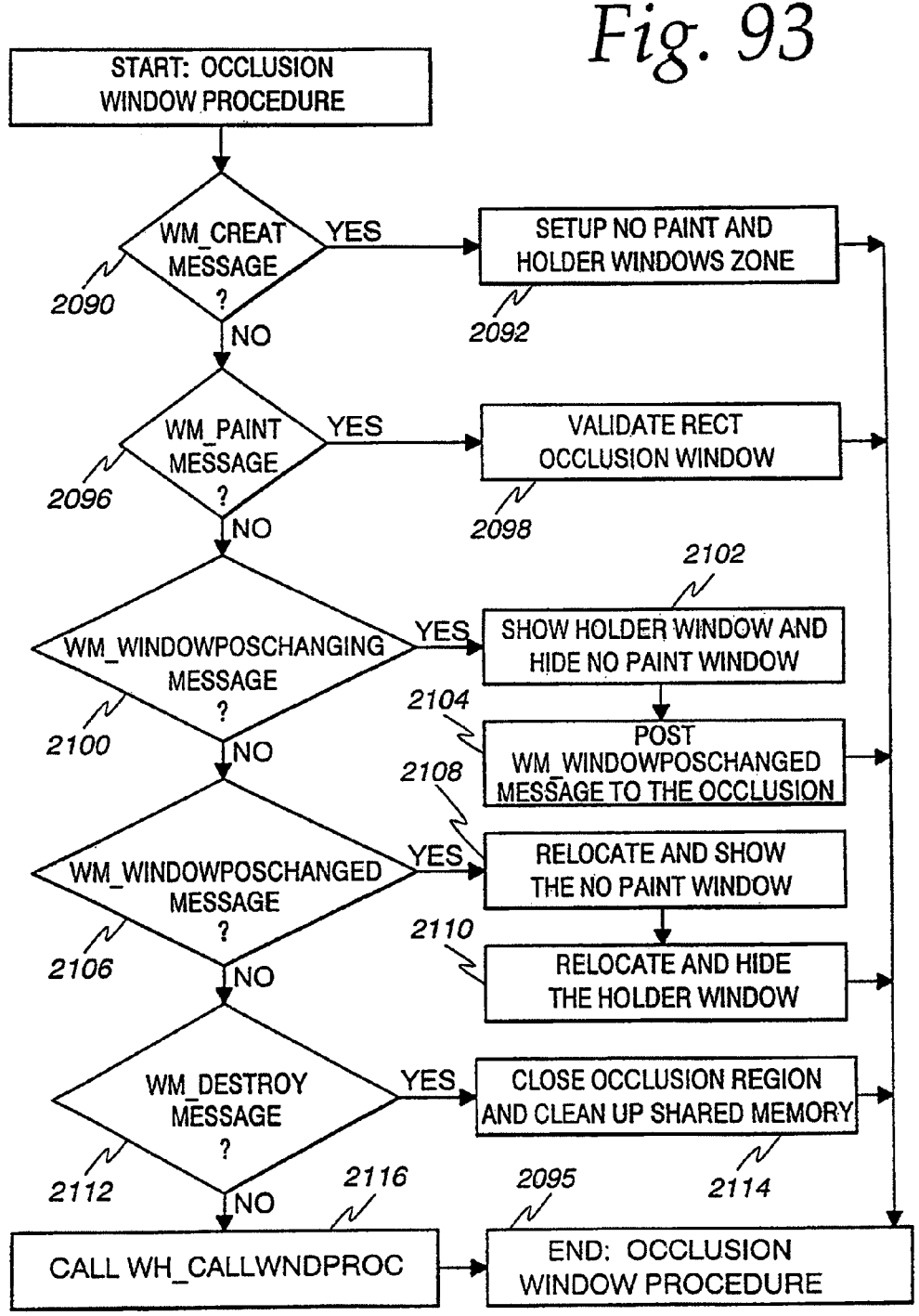

Referring to FIG. 93 in a Windows environment, all windows have procedures for processing keyboard and mouse inputs for that window. Initially, the system determines whether a window is being created in step 2090 by checking for a WM_CREATE Windows message. The WM_CREATE Windows message, as well as other Windows messages, are described in detail in "Programming Windows 95", by C. Petzold, Microsoft Press, 1996. If a new OSK window is being created, the no-paint and holder windows are set up in step 2092, as discussed above. In particular, the no-paint and holder windows are set up by registering the windows with respect to the class and the shared memory. Once the no-paint and holder windows are set up, the system exits to step 2095.

If a new OSK window is not being created, the system determines in step 2096 whether there are any messages for painting, in step 2096 by checking for WM_PAINT messages. The WM_PAINT message indicates that the window needs to repaint itself. If so, a ValidateRect function is called to cause the client area of the no-paint window to be repainted.

The function identifies the window whose update region is to be modified.

The ValidateRect function is specified below.

```
BOOL ValidateRect (
HWND hWnd,        //handle of window
CONST RECT *IpR   //address of validation rectangle coordinates
);
```

Parameters hWnd.

The hWnd parameter in the ValidateRect function identifies the Window whose update region is to be modified. If this parameter is null, the Windows program invalidates and redraws all windows and sends a message WM_ERASEBKGND and WM_NCPAINT messages to the window procedure before the function returns. The IpRect parameter points to a rectangular structure which contains the client coordinates of the rectangle to be removed from the update region. If the parameter is null, the entire client area is removed. The return values are used to identify whether the function is a success or a failure. 'True' is normally used to indicate a success, while 'false' is used to indicate a failure. As mentioned above, if the message is a WM_PAINT message from the Windows NT operating system, the ValidateRect function is called to update the content of the window in step 2098.

The system continually checks the Windows messages and checks in step 2100 whether the message is a window position change message WM_WINDOWPOSCHANGING. If the message is a WM_WINDOWPOSCHANGING message, a holder window is shown and the no-paint window is hidden in step 2102 while the position is changing. Afterwards, in step 2104, a message is posted that the window position has changed. In response to a window position change message WM_WINDOWPOSCHANGED, as ascertained in step 2106, the no-paint window is relocated and shown in step 2108, while the holder window is relocated and hidden in step 2110. In step 2112, the system checks for any window destroy messages WM_DESTROY. These messages are usually sent by the system when the windows are closed. In the case of the OSK, the WM_DESTROY message is sent anytime the OSK on the wireless interface device 100 is disabled by the hot icon. In response to a window-destroy message WM_DESTROY, the system closes the occlusion region and releases the shared memory in step 2114. If there are no Windows messages as set forth in steps 2090, 2096, 2100, 2106 or 2112, then the default window-processing function, DEFWINDOWPROC, is called in step 2116.

The flow chart for installing a hook is illustrated in FIG. 94. A standard Windows function call is used to set up a WH_CALLWNDPROC hook. This hook is used to avail the occlusion window to any window messages on the system. Thus, in step 2118, in order to access various Windows messages on the system, the pointer for the occlusion region global data shared memory is obtained in step 2118. Subsequently, in step 2120, the system ascertains whether the message is a window position changing message. If not, the message is passed on to the next hook by calling a standard API called CALLNEXTHOOKEX in step 2122. The CALLNEXTHOOKEX function is used to pass information to the next hook procedure in the chain. The system then exits in step 2124. If the message is a window-position-changing message, the system then checks the window to determine any overlap in step 2126. Essentially, if a pop-up window or other window will conflict with the OSK, the OSK, as well as the occlusion window, is closed in step 2128. The global data for the occlusion window is updated in step 2130. If the window being tracked does not conflict with the position of the OSK, the system exits in step 2124.

27. Ink Trails on a Wireless Remote Interface Tablet; Wireless Remote Interface Ink Field Object; and Distributed Pen Support of Ink Trails.

As discussed above, on power-up, the wireless interface device 100 comes up in a mouse mode with a left mouse button default. The hot icon 1232 (FIG. 37) allows the pen events to be converted to right mouse button events. In the mouse mode, all pen events are translated as mouse messages back to the servers 1708, 1710, as either right mouse button or left mouse button data, depending on the status of the hot icon 1232 (FIG. 37). As mentioned above, the wireless interface device 100 is also adapted to operate in a pen mode. In a pen mode, the pen events are translated into pen data and transmitted back to the servers 1708, 1710. Ink trails are created on the wireless interface device 100 to follow the pen wherever it is moved within the ink field 2142.

There are various methods for transferring the mode of operation of the wireless interface device 100 from a mouse mode to a pen mode. For example, the pen mode may be entered by depressing a hot icon (not shown), as discussed above. Alternatively, an active stylus can be used which to enable the wireless interface device 100 to switch between a mouse mode and a pen mode by depressing a barrel switch on the stylus, as discussed above. Alternatively, as will be discussed below, the pen mode can be initiated by way of an application program such as: Microsoft VISUAL BASIC; MICROSOFT ACCESS; MICROSOFT VISUAL; FOXPRO; or BORLAND DELPHI. Such application programs are used to create custom forms or containers for embedding controls. The form is customized by way of the various controls placed on the container. An OLE 2.0 control (object linking and embedding) can be implemented as an ink field control to support the ink trails on the wireless interface device 100. In particular, with reference to FIG. 96, a sample container application 2140 with an ink field 2142 is illustrated. In such an application, any time a pen event is detected in the ink field 2142, data is interpreted as pen data. The pen data is passed to the server 1708, 1710 over the wireless radio link which, in turn, transmits the information back to the wireless interface device 100 for display. More particularly, each point which the pen moves across in the ink field 2142 within the container application 2140 is formulated into a data packet and transmitted back to the server 1708, 1710 over the wireless radio link. The server 1708, 1710 then processes the data packets for all the pen points and causes lines to be drawn between successive pen points. This data is transmitted back to the wireless interface device 100 for display within the ink field 2142.

Figure 97:
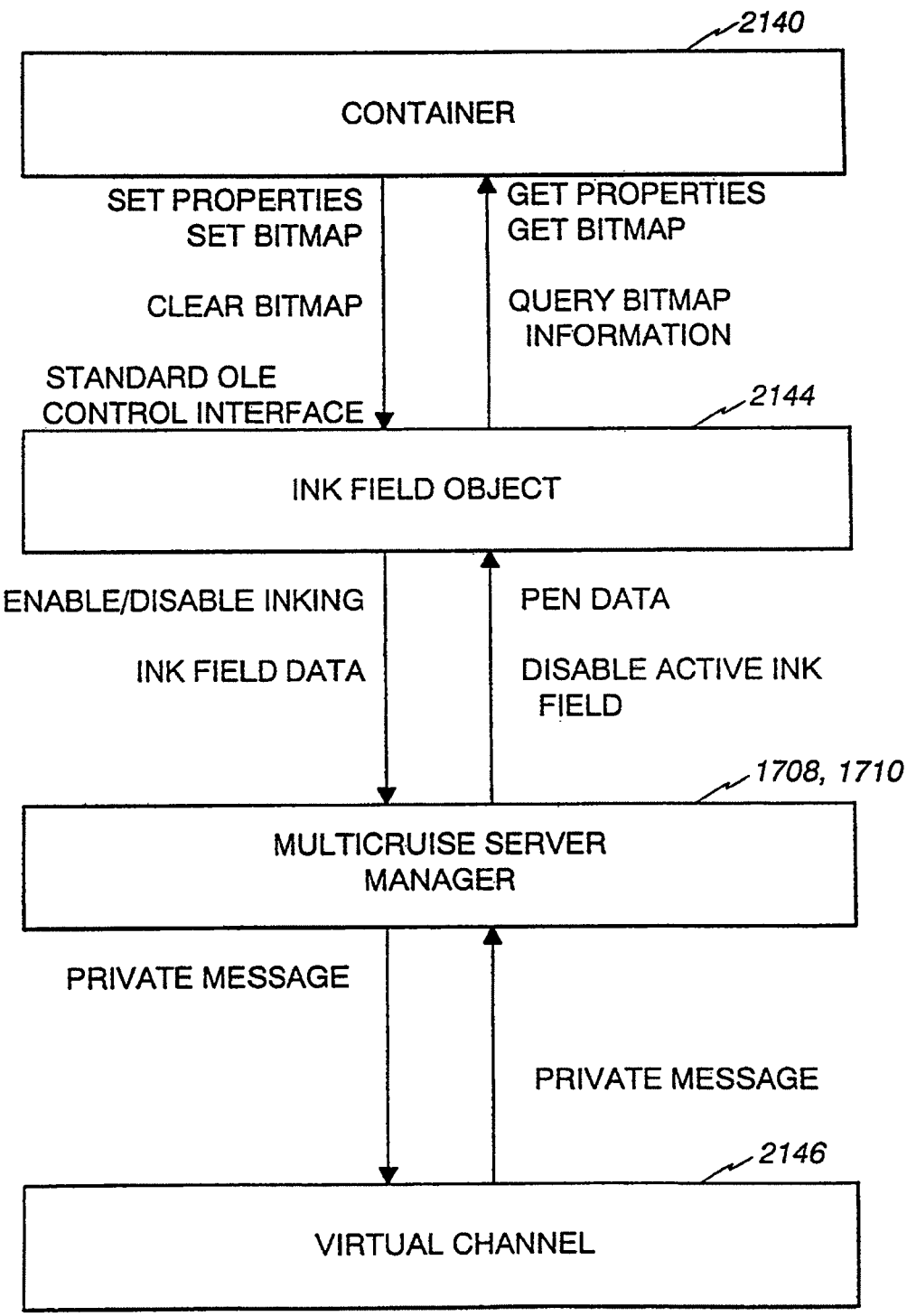
FIG. 97 illustrates a data flow diagram for a system for providing ink trails on a wireless interface device in accordance with the present invention.

A data flow diagram for the system is illustrated in FIG. 97. The container application 2140 is under the control of the application program discussed above, i.e., VISUAL BASIC, etc. The ink field object provides the ink field control for one or more ink fields 2142 within the container application 2140. As mentioned above, an OLE 2.0 (object linking and embedding) object is implemented as the ink field object by registering the OLE 2.0 object in the registry in the Windows NT servers 1708, 1710. After the OLE 2.0 object is registered in the registry, the ink field control can be added to a tool box in the application program, such as VISUAL BASIC, to provide ink field control for the ink field 2142. Ink field data is processed by the servers 1708, 1710. In particular, each point within the ink field 2142 over which the pen passes is converted to pen data packets in the wireless interface device 100 by way of a virtual communication channel 2146. The server 1708, 1710, in turn, processes the pen packets and communicates back with the wireless interface device 100 to draw lines between successive pen points within the ink field object in order to display the ink within the ink field 2142 in the container application 2140.

Figure 98:
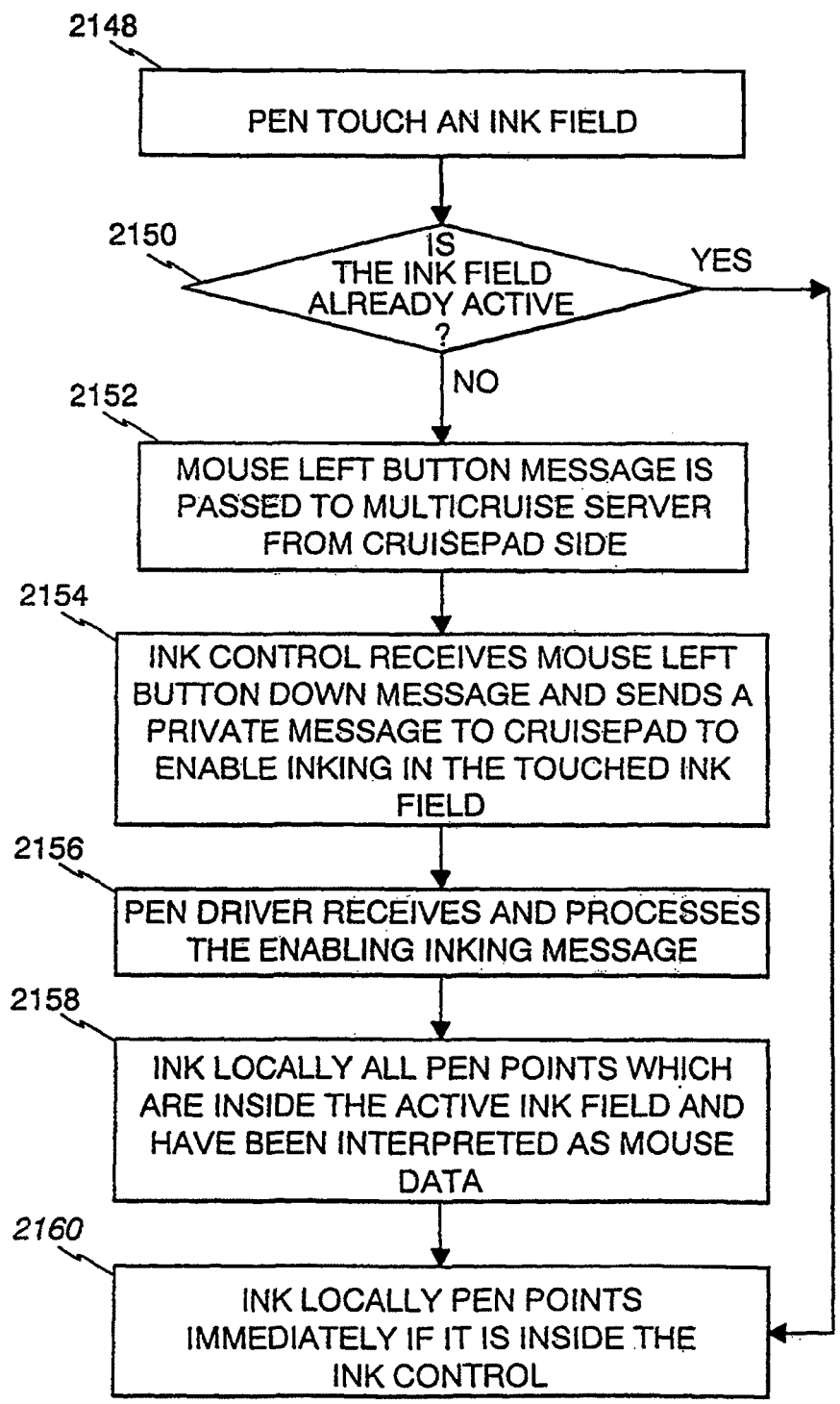

The ink field 2142 within the container application 2140 is activated as illustrated in FIG. 98. As mentioned above, the pen mode is initiated by a pen down event within the ink field 2142 (FIG. 96) within the container application 2140, as indicated by step 2148. Following a pen down event within the ink field 2142, the system checks in step 2150 whether the ink field 2142 is already active. If so, the system proceeds directly to step 2160 and provides for local inking for all pen down events within the ink field 2142. If the ink field 2142 is not previously activated, the system is assumed to be in a mouse mode, as discussed above. In such a mode, the left mouse button is the default button state in the mouse mode. Thus, as indicated in step 2152, a mouse left button message WM_LBUTTONDOWN is passed to the server 1708, 1710 from the wireless interface device 100. If the pen down events are within the ink field 1642 and the container application 1644, the ink field object enables the pen mode for the system. In particular, a private message is sent by the servers 1708, 1710 to the wireless interface device 100 to enable the pen mode in step 2154. The pen driver processes the private message to enable local inking. Prior to the pen mode being enabled, all pen down events within the ink field 2142 are stored as mouse data points. All points interpreted as mouse data points within the ink field 2142 are inked locally, as indicated in step 2158. Once the system is in a pen mode, all points within the ink field 2142 are inked locally immediately.

Figure 99:
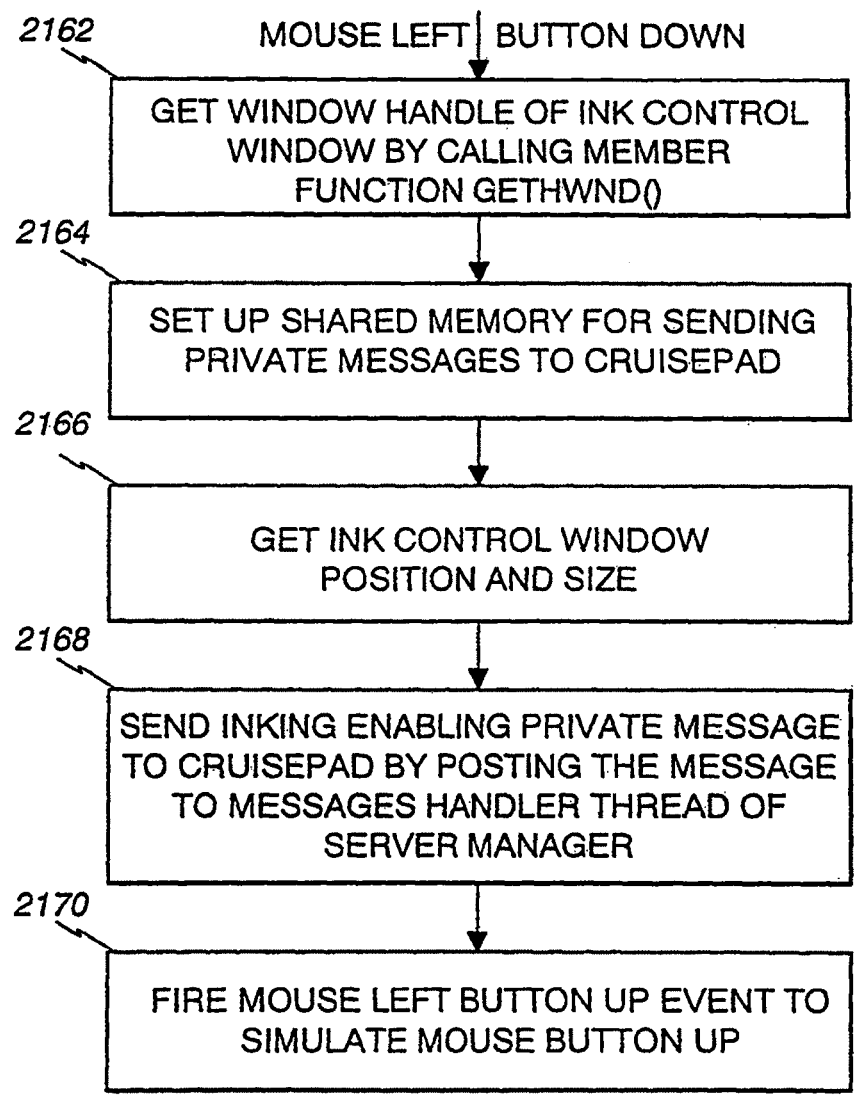

The ink field is enabled as illustrated in FIG. 99. As mentioned above, in step 2152 (FIG. 98), a mouse left button down message WM_LBUTTONDOWN is sent from the wireless interface device 100 to the servers 1708, 1710 anytime a pen down event occurs in the ink field 2142 (FIG. 92). In response to the left button down message WM_LBUTTONDOWN, the window handle, for the ink control window (i.e., ink field 2142) is obtained in step 2162 by calling the member function GETHWND( ) for the OLE 2.0 control in step 2162. After the window handle of the ink field 2142 is obtained, shared memory is set up by the server for sending private messages to the wireless interface device 100 in step 2164. In step 2166, the window position and size of the ink field 2142 window is obtained. After the window position and size is obtained, a private message is sent by the servers 1708, 1710 to the wireless interface device to enable inking by posting the message on a message handler thread of the server manager in step 2168. After the private message is sent to the wireless interface device 100, a mouse button up event is simulated in step 2170.

Figure 100:
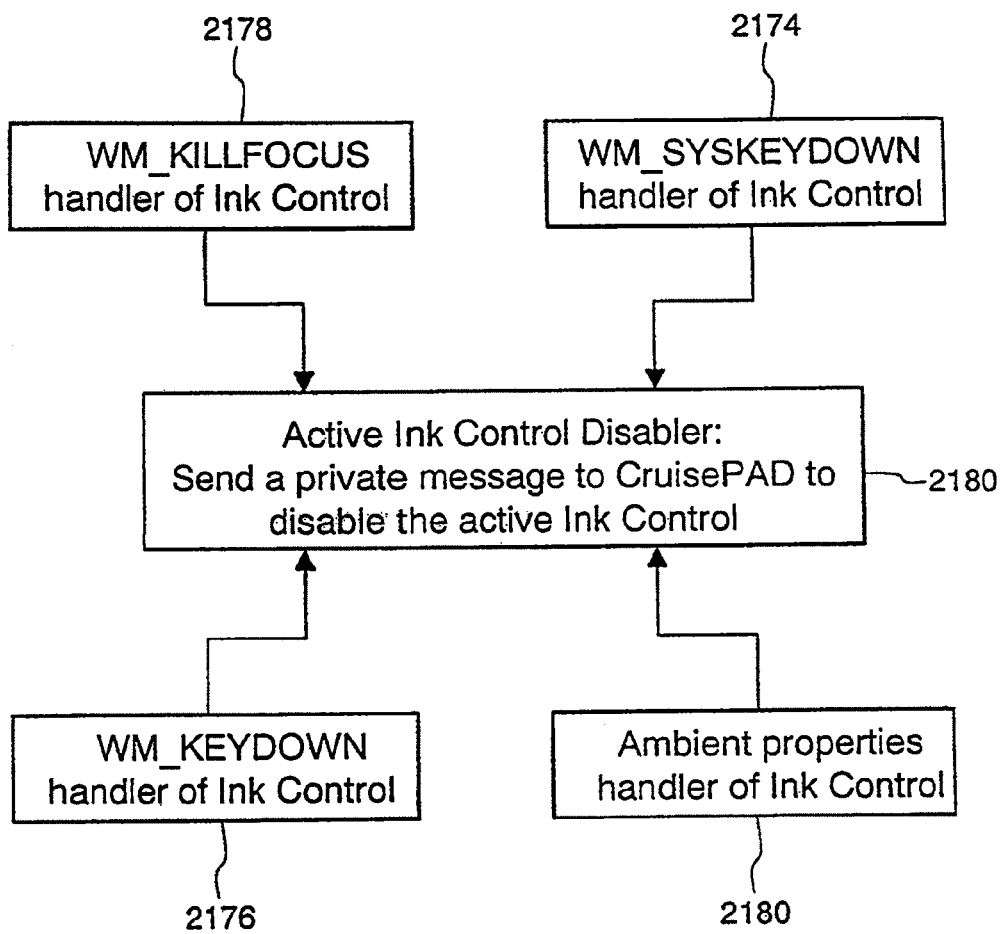
Figure 101:
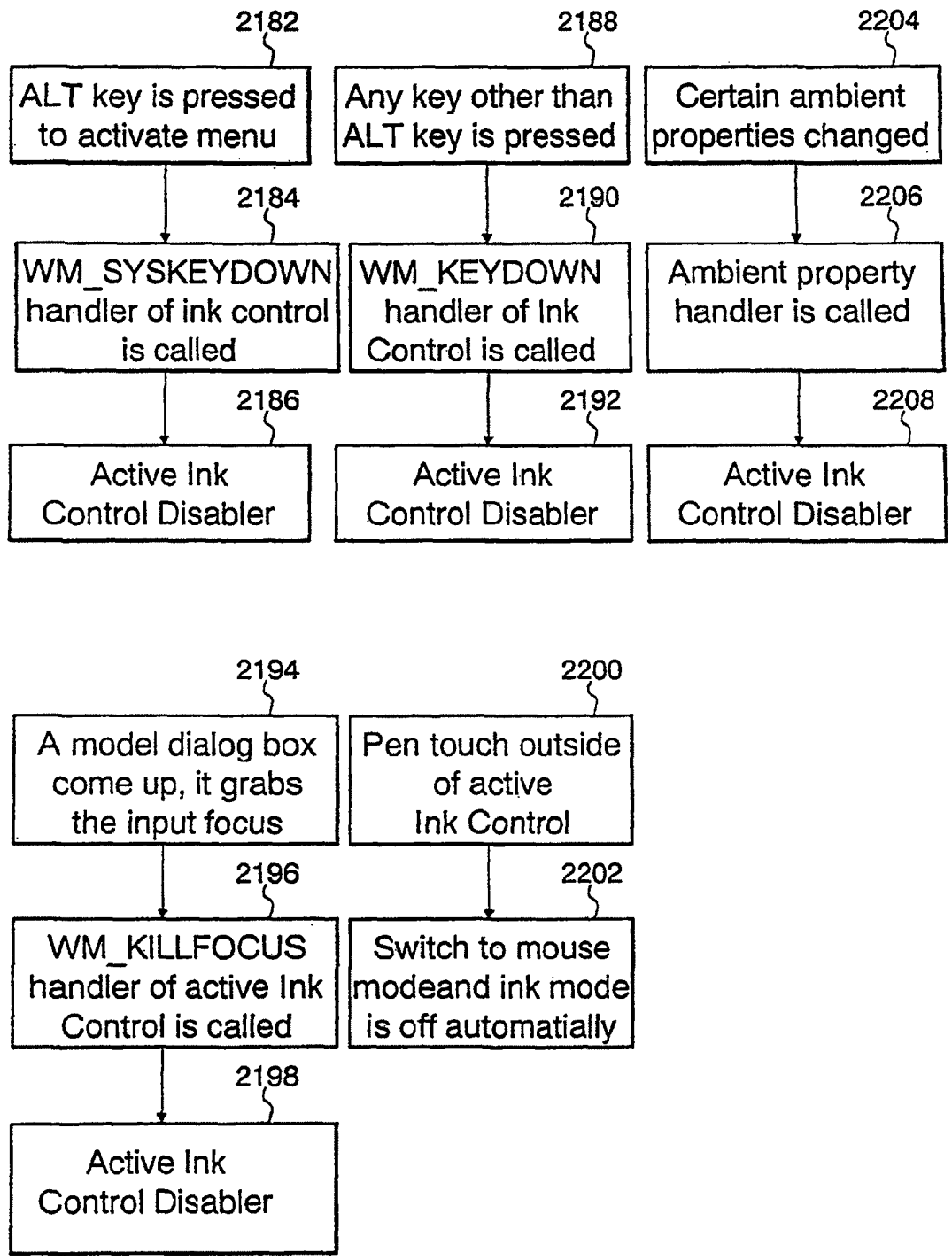

FIGS. 100-102 indicate situations in which the ink control is disabled. For example, any time either the ALTERNATE key or any other key on the keyboard is depressed, for example, on the on-screen keyboard, ink control field is disabled. In addition, certain ambient property changes (i.e., area within the container application 2140 outside of the ink field 2142) disable the ink control. Also, closing the Windows program will also disable the ink field control.

Referring to FIG. 100, an active ink control disabler 2172 is responsive to standard Windows messages, as well as certain ambient property changes, such as changes in the UIDead and user mode status as discussed below. A WM_SYSKEYDOWN message is transmitted to the active ink control disabler anytime the ALTERNATE key is depressed, as indicated by step 2174. A WM_KEYDOWN message is sent to the active ink control disabler 2172 anytime any other keyboard key is depressed, as indicated by step 2176. A WM_KILLFOCUS message 2178 indicates that the ink control field 2142 has lost its focus, for example, when a model dialog box pops up. Lastly, the ambient property changes of the container application 2140, as indicated by the block 2180 cause the ink field to be disabled.

FIGS. 101 and 102 are detailed flow charts for the system illustrated in FIG. 100. Referring first to FIG. 101, as mentioned above, anytime the ALTERNATE key is depressed, for example, to activate the menu, as indicated in step 2182, an ink control window message handler is called in response to a WM_SYSKEYDOWN message. In response to the WM_SYSKEYDOWN message, the active ink control is disabled, as indicated in step 2186. Other keyboard strokes, other than the ALT key, also cause the ink control to be disabled. In particular, as indicated in step 2188 and 2190, anytime a key other than the ALTERNATE key is depressed, the ink control windows message handler is called in response to a WM_KEYDOWN message. This message is then received by the message handler for the ink field control. As discussed above, modal dialog boxes also cause a deactivation of the ink control. For example, any time a modal dialog box pops up, as indicated in step 2194, a WM_KILLFOCUS message is received by the ink control window message handler in 2196 to indicate that the container application 2140 no longer has focus. In such a situation, focus is transferred to the other window overlaying the container application 2140. In response to the WM_KILLFOCUS message, active ink control is disabled in step 2198.

As mentioned above, ambient property changes also disable the ink field. These events, as indicated in step 2200, cause the system to switch to mouse mode as indicated in step 2202. In particular, with reference to FIG. 101, any changes in the ambient property, as indicated in step 2204 cause the ambient property handler to be called in step 2206, which, in turn, calls the active ink control disabler in step 2208.

Figure 96:
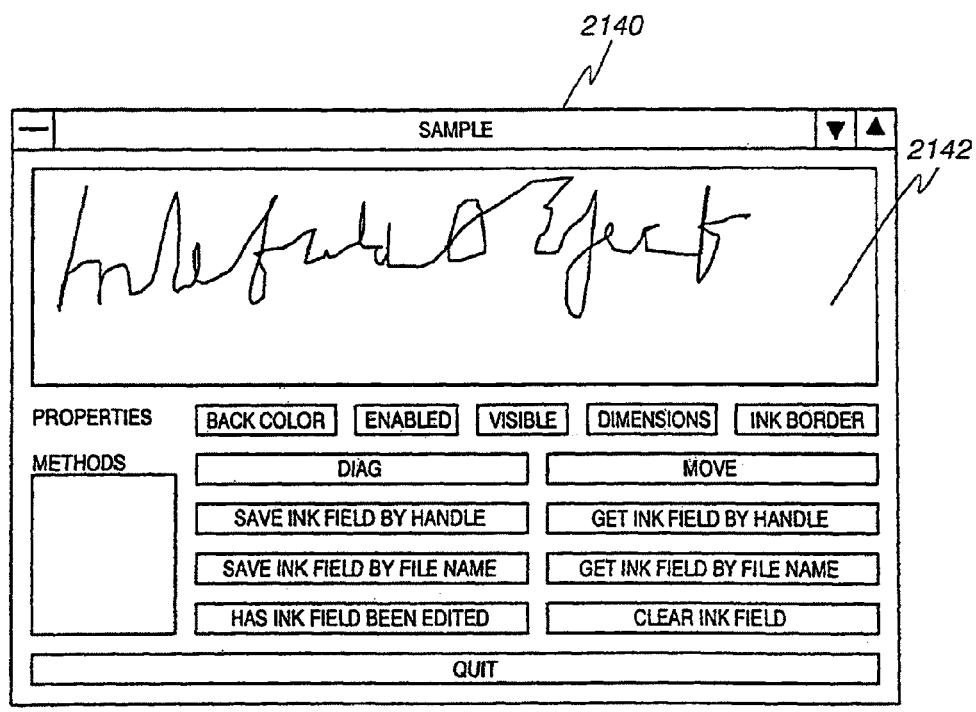
FIG. 96 illustrates a container supported by various application programs, such as VISUAL BASIC with an ink field.

The ambient property handler is illustrated in FIG. 102, while the Windows message handler is illustrated in FIG. 103. The ambient property handler, illustrated in FIG. 102, determines if there are any changes in the application program, such as VISUAL BASIC, to the inking control in step 2210. In particular, controls for the container are set up by the application program as is illustrated in FIG. 96. The ink control software checks in step 2210 whether the UIDead status is true (i.e., ink control cannot receive input). If the UIDead status has changed to true, the active ink control disabler is called to disable the ink control. The user mode relates to either a design mode for setting up the controls on the container application 2140 or a run mode for utilizing the container application 2140. Otherwise, the user mode is checked in step 2214. If the user mode changes to false, which means a switch to the design mode, the ink control is disabled in step 2214. Otherwise the default handler of the On-Ambient PropertyChange processes the ambient property changes.

As mentioned above, various Windows messages such as WM_SYSKEYDOWN; WM_KILLFOCUS; and WM_KEYDOWN all cause disabling of the ink control. In response to any of the standard Windows messages, the active ink control disabler is called in step 2218 (FIG. 103). After the active ink control disabler is called, the default handler for the corresponding message is called in step 2220 to process the particular message.

28. Ink Trails on a Wireless Remote Object

FIG. 104 illustrates the process when the ink field 2142 is drawn. In such a situation, the system checks in step 2222 to determine whether the UIDead is true, as discussed above. If so, the ink control disabler is called in step 2224. If the UIDead status is false, the user mode is checked to determine whether it is false in step 2226 to determine whether the container is in a design mode or a run mode. If the container is in a design mode, the active ink control disabler is called in step 2224. If not, the system redraws whatever was in the ink field 1642 by continuously checking for ink data in the pen data buffer in step 2228. As long as there is ink data in the pen data buffer, the system proceeds one point at a time and inks one point or segment in step 2230 and 2232, and loops back to step 2228. After all of the ink data in the pen data buffer is redrawn, the system goes to step 2224.

Inking within the ink field 2142 of the container application 2140 can be cleared by way of a right mouse button double click. In particular, as discussed above, certain ambient property changes disable the inking function and return the system to a mouse mode. Once the mouse button has been toggled to the right mouse button state, a double click, as discussed above, is used to clear the ink in the ink field 2142. In particular, in response to the right mouse button double click event, a Windows WM_RBUTTONDBCLK message is sent by the Windows message handler, which clears the ink data buffer, as indicated in step 2234 (FIG. 105). Once the ink data buffer is cleared, a member function, InvalidateControl, is called, to cause redrawing of the ink field 2142, which clears all inking in step 2236.

Figure 107:
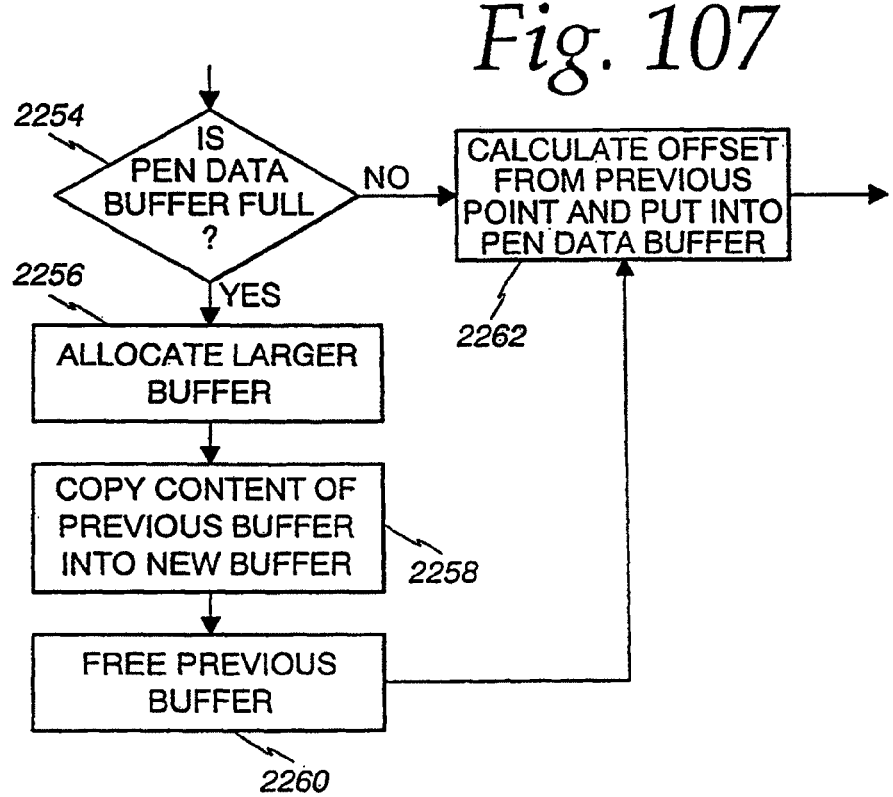

The pen data processor and pen data buffer manager are illustrated in FIGS. 106 and 107. The pen data processor is shown in FIG. 106. The pen data processor manages pen data sent by the wireless interface device 100 to the servers 1708, 1710. As discussed above, once the system is determined to be in a pen mode, pen data packets are formulated for each point in the ink field 2142 touched by the pen. These pen-data packets are stored in a message buffer. Thus, in step 2238, the system ascertains whether there are any pen data packets in the message buffer. If there are pen data packets in the message buffer, one pen data packet is processed at a time. In particular, in step 2242, one pen data packet is retrieved from the message buffer in step 2242 and converted to a VGA point in step 2244. The VGA point is then stored in the message buffer in step 2246 by calling the pen data buffer manager. After each point is processed, the system checks in step 2246 to determine whether the inking field has been disabled by way of the user interface in the application program and whether the mode of the application program is in a run mode as opposed to a design mode in step 2250. If not, one point or segment is inked in step 2252. The system continues looping between step 2238 and step 2252 until all of the pen data packets in the message buffer have been processed.

The pen data buffer manager is illustrated in FIG. 107. Initially, in step 2254, the system ascertains whether the pen data buffer is full. If so, a larger buffer is allocated in step 2256. Once a larger buffer is allocated, the contents of the previous buffer are copied into the new buffer in step 2258 to enable the previous buffer to be freed in step 2260.

The buffer manager, in order to conserve space, stores the offsets between the various points. Thus, in step 2262, the offset from the previous point is calculated and stored in the pen data buffer.

Figure 108:
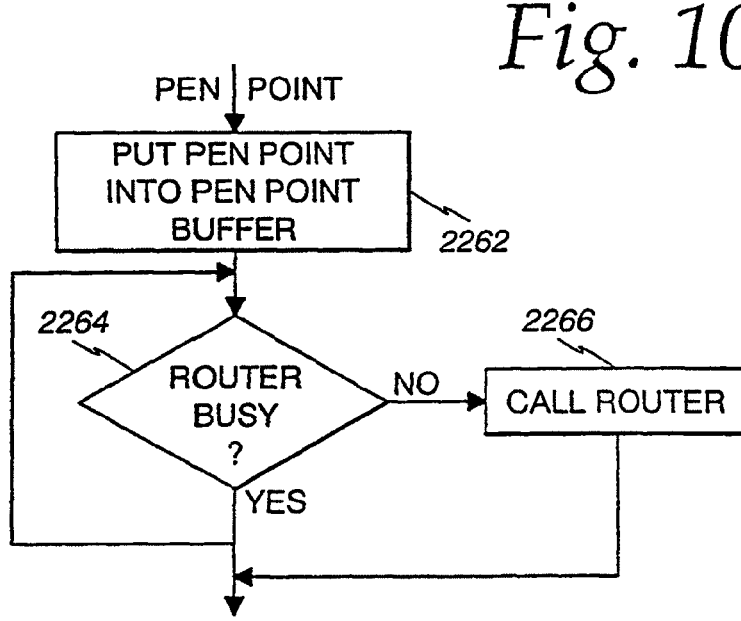
Figure 109A:
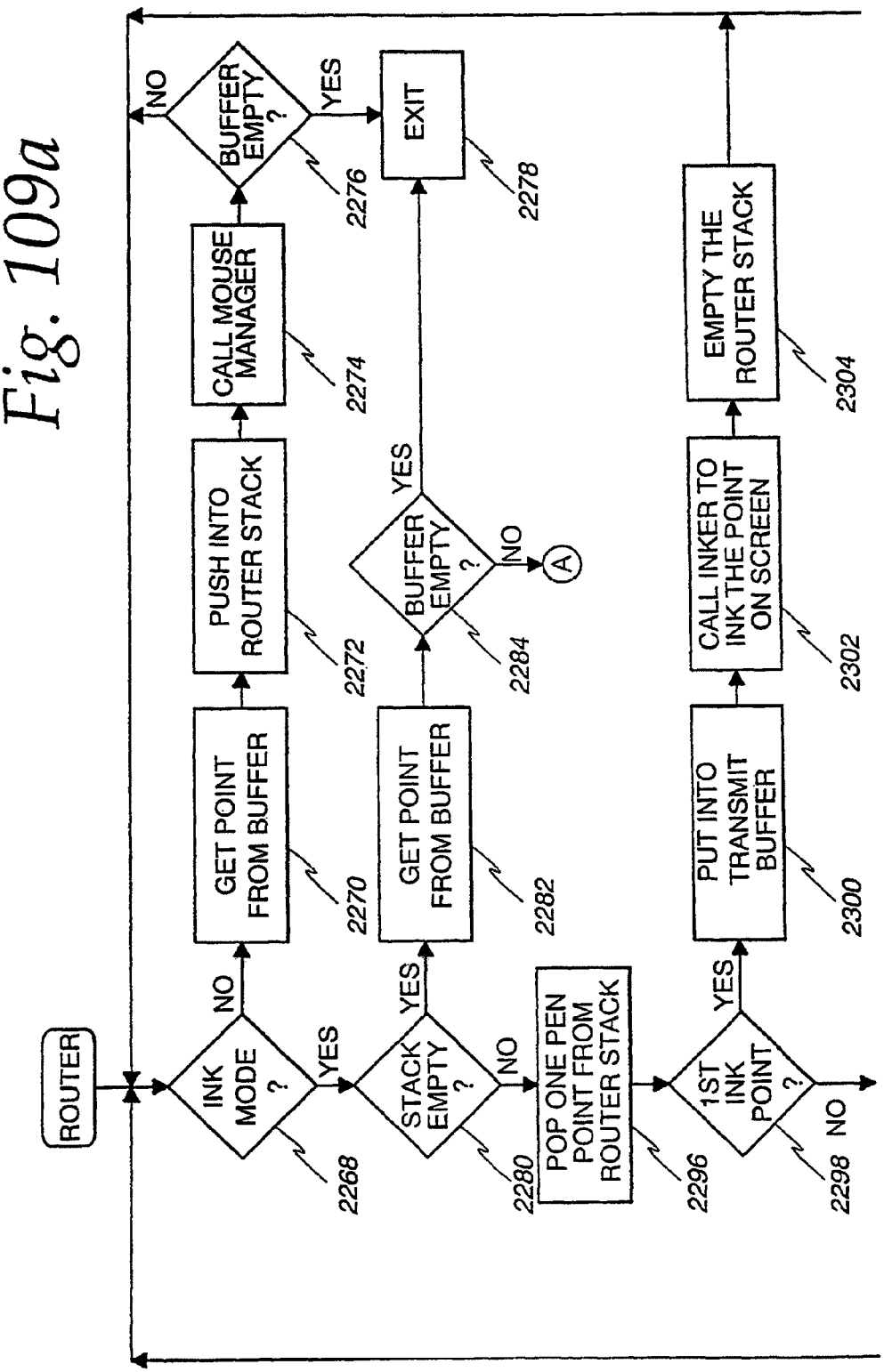
Figure 110:
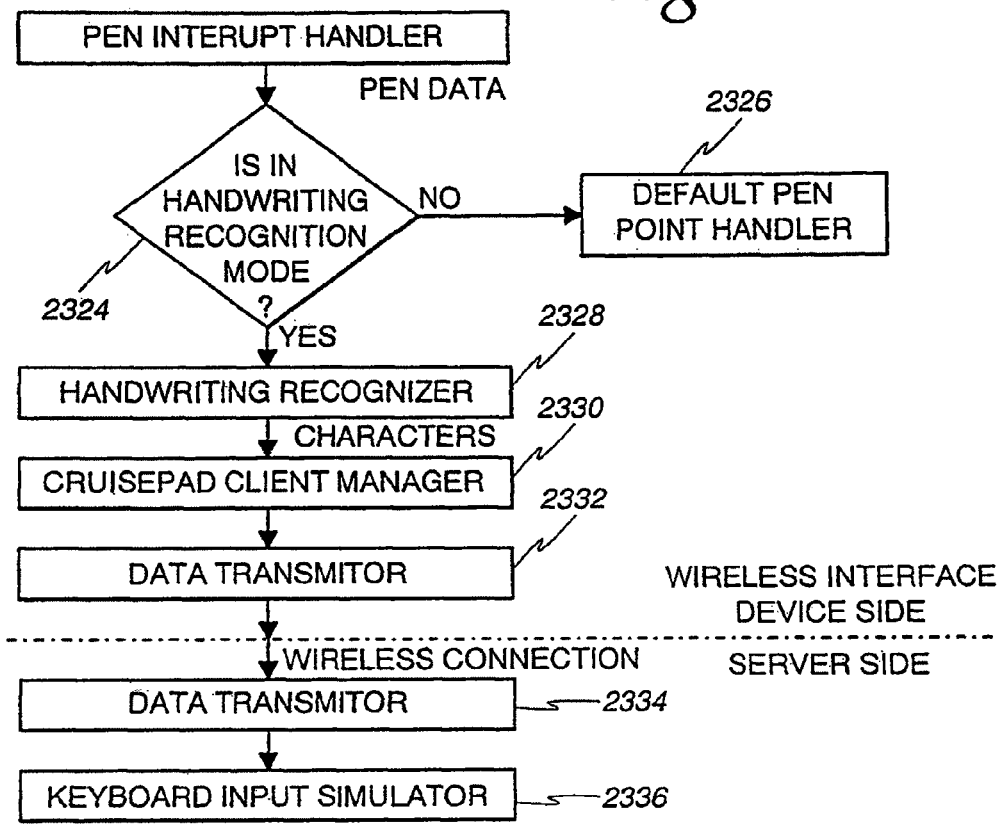
FIGS. 110-112 represent flow charts for a local handwriting recognition system in accordance with the present invention.
Figure 111:
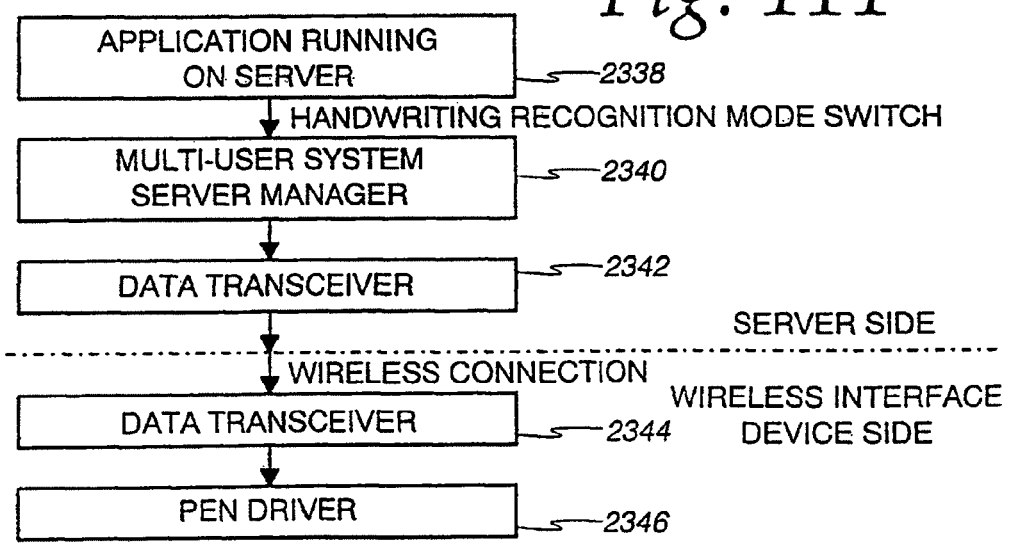

FIGS. 108 and 109 illustrate the software at the wireless interface device for processing pen points. All points touched by the pen are stored in a buffer. Initially, the wireless interface device 100 powers up in a mouse mode and interprets all pen down events as mouse left button down points and assembled into data packets. Once it is determined that the system is in a pen mode, for example, when a pen down event occurs within an ink field 1642, the pen data points are assembled into pen data points and stored in a pen data buffer in the wireless interface device 100 and wirelessly transmitted to the server 1708, 1710, and, in particular, to the pen data buffer manager and the pen data processor at the servers 1708, 1710. As indicated in step 2262 (FIG. 108), pen down and pen up events are assembled into pen data packets and stored in a pen data buffer in the wireless interface device 100. After each point is stored in the pen data buffer, the point is sent to a router module for processing. Thus, after a pen data packet is assembled, the system checks in step 2264 to determine whether the router is busy. If so, this module will return. If the router is not busy, the router is called in step 2266 to process the pen data point.

The flow chart for the router is illustrated in FIG. 109. Initially, in step 2268, the system determines whether the wireless interface device 100 is in an ink mode, as discussed above. If the wireless interface device 100 is not in an ink mode, the system assumes that the wireless interface device 100 is in a mouse mode and proceeds to get the packet for the point from the data buffer in step 2270. This point is pushed onto the router stack in step 2272. The mouse manager is called in step 2274 to process the point as a mouse data point, as discussed above. The system continuously processes the points in the buffer while the system is in a mouse mode, until it is determined in step 2276 that the buffer is empty, at which point the system exits the router in step 2278.

If it is determined in step 2268 that the wireless interface device 100 is in an ink mode, the system checks in step 2280 whether the router stack is empty. Thus, if it is determined in step 2280 that the stack is empty, a pen data packet is obtained from the buffer in step 2282. If the buffer is empty, as determined in step 2284, the system exits. If the buffer is not empty, the system proceeds to step 2286 to determine if the packet represents the first pen down event. If the pen data point is not the first pen down event, the system checks in step 2288 whether the pen data point was in the ink field 2142 in step 2288. If not, the system ignores the point in step 2290 and returns to step 2268 for processing further packets. If it is determined in step 2288 that the data packet was within the ink field 2142, the data packet is placed into a transmit buffer in step 2292 for a wireless transmission to the servers 1708, 1710. After the data packet is placed into the transmit buffer, a local inker is called to ink the point on the screen of the wireless interface device 100 in step 2294. The system then returns to step 2268 for processing additional data packets.

If it is determined in step 2280 that the router stack is not empty, one data packet is popped from the stack in step 2296. After the data packet is popped from the router stack in step 2296, the system ascertains in step 2298 whether the data packet represents the first input ink point. If not, the data packet is placed in the transmit buffer in step for a wireless transmission to the servers 1708, 1710. Subsequently, a video manipulation module, included in Appendix 2, is called to draw the point in step 2302. The system then proceeds to empty the router stack, as indicated in step 2304, and subsequently returns to step 2268 for a further data packet processing.

If it is determined in step 2286 that the data packet represents the first pen down point, the system then checks in step 2306 whether the data packet is a stack point. If not, the system checks whether the point was within the ink field 2142 in step 2308. If not, the ink field is disabled in step 2310, and the mouse data packets are pushed into the router stack in step 2312. After the mouse data packets are pushed into the router stack, the mouse manager is called in step 2314 to process the data packet as a mouse data packet in step 2314. Subsequently, the system returns to step 2268 for processing.

If it is determined in step 2306 that the data packet is a stack point, the system then checks in step 2316 whether the data packet was within the ink field 2142 in step 2316. If not, the point is ignored in step 2318, and the system returns to step 2268 for further data packet processing. If it is determined in step 2316 that the data packet in the stack was within the ink field 2142, the data packet is put into the transmit buffer in step 2320 for wireless transmission to the server 1708, 1710. After the data packet is placed into the transmit buffer, the point is inked on the display of the wireless interface device in step 2322.

28. Local Handwriting Recognition in a Wireless Remote Interface Tablet

As mentioned above, the wireless interface device is provided with an ink field 2142 (FIG. 96). As mentioned above, wireless interface device 100 powers up in a left button down mouse mode. A pen down event within the ink field 2142 causes the wireless interface device 100 to switch to a pen mode. As mentioned above, all pen down events are formulated into pen data packets and stored in a buffer. Initially, the system determines in step 2324 (FIG. 110) whether the wireless interface device 100 is in a handwriting recognition mode, which, as will be discussed below, may be controlled in a manner as discussed above by pen events in the ink control field running on the servers 1708, 1710. If the system is not in a handwriting recognition mode, the system calls the default pen point handler which processes pen data, as discussed above. If the system is in a handwriting recognition mode, the system calls the handwriting recognizer in step 2328, which takes the pen data and converts it to characters and passes it onto the client manager in step 2330 for transmission to the servers 1708, 1710, by way of the radio link. The character data is received by the servers 1708, 1710 in step 2334 and converted to a keyboard input in step 2336.

As indicated above, a pen events in an ink control field may be used to place the system in a handwriting recognition mode, as indicated in step 2338. This information is transmitted to the server manager in step 2340 for wireless transmission to the wireless interface device in step 2342. The wireless interface device 100 receives this data in step 2344 and passes it to the pen driver in step 2346.

Figure 112:
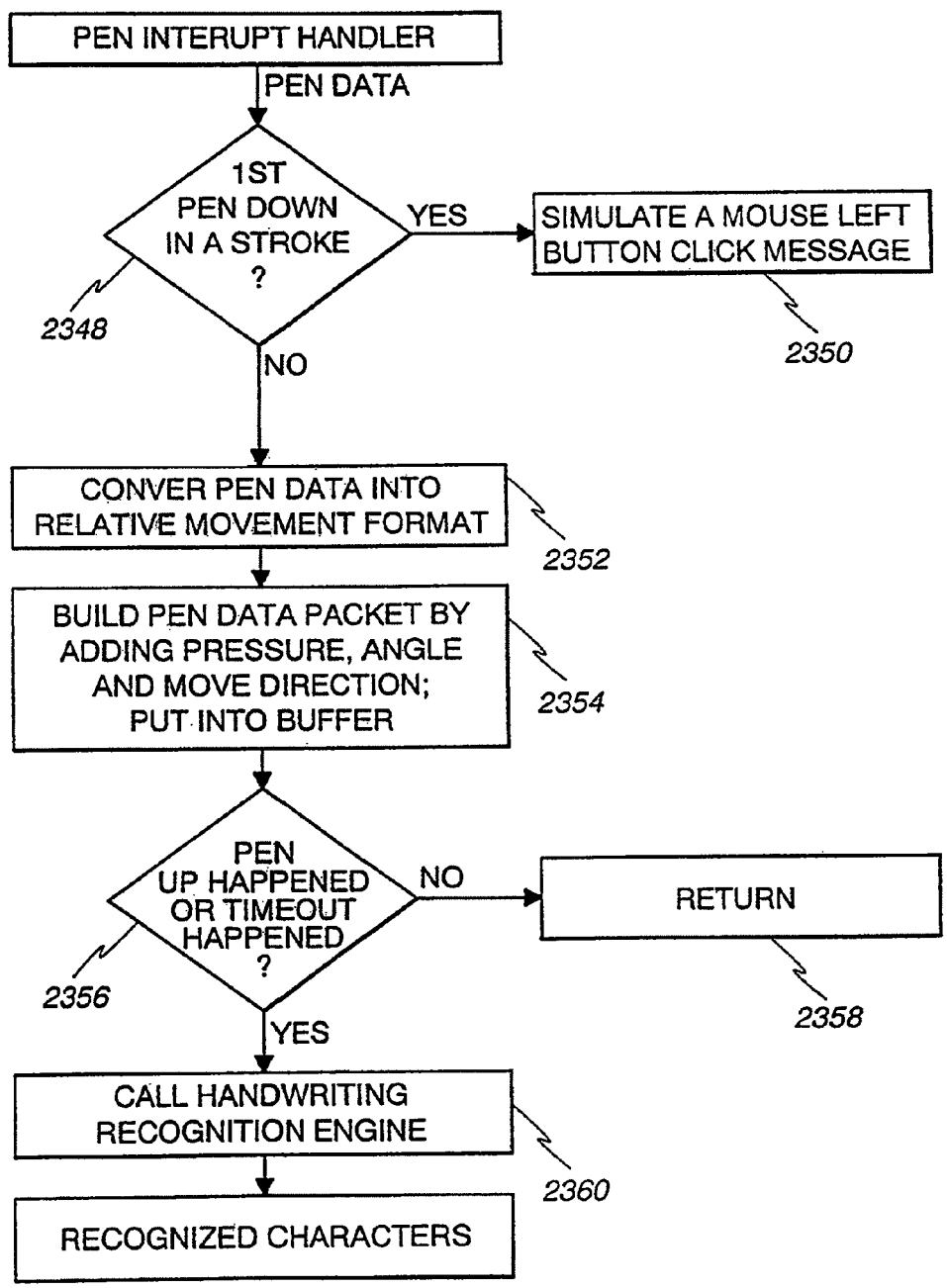

The handwriting recognizer is illustrated in FIG. 112. Initially, pen data from the pen interrupt handler is analyzed in step 2348 to determine whether the pen data represents the first pen down event. If so, as mentioned above, a mouse left button down message is formulated in step 2350. If not, the pen data is converted into relative movement format in step 2352. In step 2354, a pen data packet is built by adding pressure, angle and move direction in the buffer. Default values may be used for the pressure and angle data. The system then checks in step 2356 whether there were any pen up events or a time out. If not, the system returns in step 2358. If so, the system calls a handwriting recognition engine in step 2360. Various handwriting recognition systems are suitable for use with the system. For example, the handwriter recognition system by CIC Products and Services, of Tokyo, Japan, is suitable. As mentioned above, a handwriting recognition engine converts the pen data to characters for transmission to the servers 1708, 1710.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A computer system comprising:
one or more wireless interface devices, each wireless interface device being a pen-based system and including a digitizer responsive to pen events, said wireless interface devices also including means for enabling radio communication with a remote host and means for translating pen events into pen data packets and transmitting said pen data packets to a remote host for processing; and
a host for communicating with said one or more wireless interface devices, said host including means for enabling communication with said one or more wireless interface devices by way of a radio link, said host also including means for receiving and processing said pen data packets.

2. The system as recited in claim 1, wherein said one or more wireless interface devices include means for providing local inking of said pen events at said one or more wireless interface devices.

3. The system as recited in claim 1, wherein said translating means includes an embedded ink field control wherein pen events within said embedded ink field control are translated into pen data packets for transmission to a remote host.

4. The system as recited in claim 1, wherein said host is a server connected to a local area network (LAN) defining a LAN segment.

5. The system as recited in claim 1, wherein said host includes means for communicating with a single wireless interface device.

6. The system as recited in claim 1, wherein said host includes means for communicating with a plurality of wireless interface devices.

7. The system as recited in claim 6, wherein said disabling means disables said ink field control when any key on said keyboard is selected.

8. The system as recited in claim 1, wherein said enabling means includes one or more wireless LAN adapters.

9. The system as recited in claim 1, further including switching means which, in turn, includes an embedded ink field control which enables the wireless interface device to be switched to and from a pen mode from a second mode of operation as a function of pen events relative to the ink field control.

10. The system as recited in claim 9, further including means for establishing a predetermined default state for the mode of operation during predetermined conditions.

11. The system as recited in claim 10, wherein predetermined default state is a non-pen mode.

12. The system as recited in claim 10, wherein said predetermined conditions include power-up of said wireless interface device.

13. The system as recited in claim 12, wherein said predetermined default state is a mouse mode.

14. The system as recited in claim 12, wherein said predetermined default state is a pen mode.

15. The system as recited in claim 14, wherein said disabling means includes means for automatically disabling said ink field control as a result of predetermined events.

16. The system as recited in claim 15, wherein said keyboard includes an ALTERNATE key and said disabling means disables said ink field control when said ALTERNATE key is selected.

17. The system as recited in claim 9, wherein said switching means includes a predetermined default state on power-up of said wireless interface device.

18. The system as recited in claim 9, further including means for disabling said ink field control.

19. The system as recited in claim 18, wherein said wireless interface device includes a keyboard and said disabling means including means for monitoring said keyboard and disabling said ink field control when one or more predetermined keys are selected.

20. The system as recited in claim 18, wherein said keyboard is an on-screen keyboard.

21. The system as recited in claim 18, wherein said predetermined event includes pen-down events outside said ink field control.

22. A wireless interface device comprising:
   means for enabling radio communication with a remote host;
   a digitizer panel for receiving input data from a passive stylus;
   means for translating pen events relative to said digitizer panel to pen data defining a pen mode; and
   means for transmitting said pen data to a remote host for processing by way of a radio link during a pen mode; and
   means for providing local inking of said pen events.

23. The system as recited in claim 22, wherein said enabling means includes one or more wireless LAN adapters.

24. The system as recited in claim 23, further including means for disabling said ink field control.

25. The system as recited in claim 23, wherein said wireless interface device includes a keyboard and said disabling means including means for monitoring said keyboard and disabling said ink field control when one or more predetermined keys are selected.

26. The system as recited in claim 23, wherein said keyboard is an on-screen keyboard.

27. The system as recited in claim 23, wherein said keyboard includes an ALTERNATE key and said disabling means disables said ink field control when said ALTERNATE key is selected.

28. The system as recited in claim 23, wherein said disabling means disables said ink field control when any key on said keyboard is selected.

29. The system as recited in claim 23, wherein said predetermined event includes pen-down events outside said ink field control.

30. The system as recited in claim 22, wherein said wireless interface device includes an ink field control which enables pen events relative thereto to be translated into pen data.

31. The system as recited in claim 30, wherein said predetermined default state is a pen mode.

32. The system as recited in claim 31, wherein said disabling means includes means for automatically disabling said ink field control as a result of predetermined events.

33. The system as recited in claim 22, wherein said wireless interface device has multiple modes of operation, further including means for establishing a predetermined default state for the mode of operation during predetermined conditions.

34. The system as recited in claim 22, wherein predetermined default state is a non-pen mode.

35. The system as recited in claim 22, wherein said predetermined conditions include power-up of said wireless interface device.

36. The system as recited in claim 22, wherein said switching means includes a predetermined default state on power-up of said wireless interface device.

37. The system as recited in claim 22, wherein said predetermined default state is a non-pen mode.

* * * * *